US010938032B1

(12) United States Patent
El-Kady et al.

(10) Patent No.: US 10,938,032 B1
(45) Date of Patent: Mar. 2, 2021

(54) COMPOSITE GRAPHENE ENERGY STORAGE METHODS, DEVICES, AND SYSTEMS

(71) Applicant: The Regents of the University of California, Oakland, CA (US)

(72) Inventors: Maher F. El-Kady, Los Angeles, CA (US); Haosen Wang, Chico, CA (US); Richard B. Kaner, Pacific Palisades, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 16/784,578

(22) Filed: Feb. 7, 2020

Related U.S. Application Data

(60) Provisional application No. 62/906,844, filed on Sep. 27, 2019.

(51) Int. Cl.

| | |
|---|---|
| ***H01M 4/583*** | (2010.01) |
| ***H01M 4/62*** | (2006.01) |
| ***H01M 4/64*** | (2006.01) |
| ***H01G 11/36*** | (2013.01) |
| ***H01M 4/58*** | (2010.01) |
| ***H01G 11/38*** | (2013.01) |

(Continued)

(52) U.S. Cl.
CPC ............ *H01M 4/583* (2013.01); *H01G 11/36* (2013.01); *H01G 11/38* (2013.01); *H01G 11/66* (2013.01); *H01M 4/136* (2013.01); *H01M 4/5815* (2013.01); *H01M 4/621* (2013.01); *H01M 4/624* (2013.01); *H01M 4/64* (2013.01)

(58) Field of Classification Search
CPC .... H01M 4/583; H01M 4/136; H01M 4/5815; H01M 4/621; H01M 4/624; H01M 4/64; H01G 11/36; H01G 11/38; H01G 11/66
See application file for complete search history.

(56) References Cited

U.S. PATENT DOCUMENTS

| | | | |
|---|---|---|---|
| 2,800,616 | A | 7/1957 | Becker |
| 3,288,641 | A | 11/1966 | Rightmire |
| 3,536,963 | A | 10/1970 | Boos |

(Continued)

FOREIGN PATENT DOCUMENTS

| | | | |
|---|---|---|---|
| CN | 100372035 | C | 2/2008 |
| CN | 101723310 | A | 6/2010 |
| CN | 101894679 | A | 11/2010 |
| CN | 102187413 | A | 9/2011 |

(Continued)

OTHER PUBLICATIONS

Notice of Acceptance for Australian Patent Application No. 2015277264, dated Jul. 31, 2019, 3 pages.

(Continued)

*Primary Examiner* — Michael P McFadden
(74) *Attorney, Agent, or Firm* — Withrow & Terranova, P.L.L.C.

(57) ABSTRACT

Provided herein are energy storage devices having an anode comprising a layered double hydroxide comprising divalent ions and trivalent ions both of which contribute to energy storage. In some embodiments, the specific combination of device chemistry, active materials, and electrolytes described herein form storage devices that operate at high voltage and exhibit the capacity of a battery and the power performance of supercapacitors in one device.

20 Claims, 40 Drawing Sheets

(51) Int. Cl.
*H01G 11/66* (2013.01)
*H01M 4/136* (2010.01)

(56) References Cited

U.S. PATENT DOCUMENTS 3,652,902 A 3/1972 Hart et al.
4,327,157 A 4/1982 Himy et al.
5,225,296 A 7/1993 Ohsawa et al.
5,442,197 A 8/1995 Andrieu et al.
6,043,630 A 3/2000 Koenck et al.
6,117,585 A 9/2000 Anani et al.
6,252,762 B1 6/2001 Amatucci
6,451,074 B2 9/2002 Bluvstein et al.
6,510,043 B1 1/2003 Shiue et al.
6,522,522 B2 2/2003 Yu et al.
6,982,517 B2 1/2006 Reineke et al.
7,623,340 B1 11/2009 Song et al.
7,833,663 B2 11/2010 Phillips et al.
7,875,219 B2 1/2011 Zhamu et al.
8,315,039 B2 11/2012 Zhamu et al.
8,503,161 B1 8/2013 Chang et al.
8,593,714 B2 11/2013 Agrawal et al.
8,753,772 B2 6/2014 Liu et al.
8,771,630 B2 7/2014 Wu et al.
8,828,608 B2 9/2014 Sun et al.
8,906,495 B2 12/2014 Chen
8,951,675 B2 2/2015 Bhardwaj et al.
9,118,078 B2 8/2015 Huang et al.
9,295,537 B2 3/2016 Cao
9,437,372 B1 9/2016 Zhamu et al.
2002/0136881 A1 9/2002 Yanagisawa et al.
2002/0160257 A1 10/2002 Lee et al.
2003/0013012 A1 1/2003 Ahn et al.
2003/0169560 A1 9/2003 Welsch et al.
2004/0090736 A1 5/2004 Bendale et al.
2004/0099641 A1 5/2004 Mathieu et al.
2004/0131889 A1 7/2004 Leddy et al.
2005/0153130 A1 7/2005 Long et al.
2006/0121342 A1 6/2006 Sano et al.
2006/0201801 A1 9/2006 Bartlett et al.
2006/0207878 A1 9/2006 Myung et al.
2006/0269834 A1 11/2006 West et al.
2007/0172739 A1 7/2007 Visco et al.
2007/0204447 A1 9/2007 Bernstein et al.
2008/0090141 A1 4/2008 Meitav et al.
2008/0158778 A1 7/2008 Lipka et al.
2008/0180883 A1 7/2008 Palusinski et al.
2008/0199737 A1 8/2008 Kazaryan et al.
2008/0220293 A1 9/2008 Marmaropoulos et al.
2009/0059474 A1 3/2009 Zhamu et al.
2009/0117467 A1 5/2009 Zhamu et al.
2009/0289328 A1 11/2009 Tanioku
2009/0290287 A1* 11/2009 Lipka .................... H01G 11/46
361/502
2010/0159346 A1 6/2010 Hinago et al.
2010/0159366 A1 6/2010 Shao-Horn et al.
2010/0195269 A1 8/2010 Kim et al.
2010/0203362 A1 8/2010 Lam et al.
2010/0221508 A1 9/2010 Huang et al.
2010/0226066 A1 9/2010 Sweeney et al.
2010/0237296 A1 9/2010 Gilje
2010/0266964 A1 10/2010 Gilje
2010/0273051 A1 10/2010 Choi et al.
2010/0317790 A1 12/2010 Jang et al.
2011/0026189 A1 2/2011 Wei et al.
2011/0111283 A1 5/2011 Rust, III et al.
2011/0111299 A1 5/2011 Liu et al.
2011/0143101 A1 6/2011 Sandhu
2011/0159372 A1 6/2011 Zhamu et al.
2011/0163274 A1 7/2011 Plee et al.
2011/0163699 A1 7/2011 Elder et al.
2011/0183180 A1 7/2011 Yu et al.
2011/0227000 A1 9/2011 Ruoff et al.
2011/0242730 A1 10/2011 Zhou et al.
2011/0256454 A1 10/2011 Nicolas et al.
2011/0318257 A1 12/2011 Sokolov et al.
2012/0111730 A1 5/2012 Choi et al.
2012/0129736 A1 5/2012 Tour et al.
2012/0134072 A1 5/2012 Bae et al.
2012/0145234 A1 6/2012 Roy-Mayhew et al.
2012/0300364 A1 11/2012 Cai et al.
2012/0313591 A1 12/2012 Brambilla et al.
2013/0026409 A1 1/2013 Baker et al.
2013/0048949 A1 2/2013 Xia et al.
2013/0056346 A1 3/2013 Sundara et al.
2013/0056703 A1 3/2013 Elian et al.
2013/0100581 A1 4/2013 Jung et al.
2013/0155578 A1 6/2013 Tsai et al.
2013/0161570 A1 6/2013 Hwang et al.
2013/0168611 A1 7/2013 Zhou et al.
2013/0171502 A1 7/2013 Chen et al.
2013/0180912 A1 7/2013 Li
2013/0182373 A1 7/2013 Yu et al.
2013/0189602 A1 7/2013 Lahiri et al.
2013/0217289 A1 8/2013 Nayfeh et al.
2013/0230747 A1 9/2013 Patolsky et al.
2013/0264041 A1 10/2013 Zhamu et al.
2013/0266858 A1 10/2013 Inoue et al.
2013/0280601 A1 10/2013 Geramita et al.
2013/0314844 A1 11/2013 Chen et al.
2013/0330617 A1 12/2013 Yoshimura et al.
2014/0029161 A1 1/2014 Beidaghi et al.
2014/0030590 A1 1/2014 Wang et al.
2014/0045058 A1 2/2014 Zhao et al.
2014/0050947 A1 2/2014 Donnelly
2014/0065447 A1 3/2014 Liu et al.
2014/0099558 A1 4/2014 Itakura et al.
2014/0118883 A1 5/2014 Xie
2014/0120453 A1 5/2014 Ajayan et al.
2014/0134503 A1 5/2014 Lockett et al.
2014/0154164 A1 6/2014 Chen et al.
2014/0170476 A1 6/2014 Tan et al.
2014/0178763 A1 6/2014 Mettan
2014/0205841 A1 7/2014 Qiu et al.
2014/0255776 A1 9/2014 Song et al.
2014/0255785 A1 9/2014 Do et al.
2014/0287308 A1 9/2014 Okada et al.
2014/0313636 A1 10/2014 Tour et al.
2014/0323596 A1 10/2014 Jeong et al.
2015/0050554 A1 2/2015 Fukumine et al.
2015/0098167 A1 4/2015 El-Kady et al.
2015/0103469 A1 4/2015 Lee et al.
2015/0111449 A1 4/2015 Cruz-Silva et al.
2015/0218002 A1 8/2015 Plomb et al.
2015/0235776 A1 8/2015 Miller
2015/0259212 A1 9/2015 Li et al.
2015/0287544 A1 10/2015 Irazoqui et al.
2015/0311504 A1 10/2015 Hong et al.
2015/0332868 A1 11/2015 Jung et al.
2015/0364738 A1 12/2015 Pope et al.
2015/0364755 A1 12/2015 Liu et al.
2016/0035498 A1 2/2016 Honma et al.
2016/0055983 A1 2/2016 Kurungot et al.
2016/0077074 A1 3/2016 Strong et al.
2016/0099116 A1 4/2016 Yang
2016/0133396 A1 5/2016 Hsieh
2016/0148759 A1 5/2016 El-Kady et al.
2017/0062821 A1 3/2017 Tour et al.
2017/0149107 A1 5/2017 El-Kady et al.
2017/0178824 A1 6/2017 Kaner et al.
2017/0213657 A1 7/2017 Kaner et al.
2017/0240424 A1 8/2017 Roberts et al.
2017/0271093 A1 9/2017 El-Kady et al.
2017/0278643 A1 9/2017 El-Kady et al.
2017/0287650 A1 10/2017 Kaner et al.
2017/0299563 A1 10/2017 Strong et al.
2017/0338472 A1 11/2017 Zhamu et al.
2017/0369323 A1 12/2017 Kowal et al.
2018/0062159 A1 3/2018 El-Kady et al.
2018/0323016 A1 11/2018 El-Kady et al.
2018/0366280 A1 12/2018 Hwang et al.
2019/0006675 A1 1/2019 Cheng et al.
2019/0019630 A1 1/2019 Strauss et al.
2019/0088420 A1 3/2019 Tour et al.

(56) References Cited

U.S. PATENT DOCUMENTS

| | | | |
|---|---|---|---|
| 2019/0123409 | A1 | 4/2019 | El-Kady et al. |
| 2019/0284403 | A1 | 9/2019 | Kaner et al. |
| 2020/0090880 | A1 | 3/2020 | Kaner et al. |

FOREIGN PATENT DOCUMENTS

| | | | |
|---|---|---|---|
| CN | 102509632 | A | 6/2012 |
| CN | 102543483 | A | 7/2012 |
| CN | 102923698 | A | 2/2013 |
| CN | 103208373 | A | 7/2013 |
| CN | 103723715 | A | 4/2014 |
| CN | 203631326 | U | 6/2014 |
| CN | 203839212 | U | 9/2014 |
| CN | 104299794 | A | 1/2015 |
| CN | 104355306 | A | 2/2015 |
| CN | 104617300 | A | 5/2015 |
| CN | 104637694 | A | 5/2015 |
| CN | 105062074 | A * | 11/2015 |
| EP | 1843362 | A1 | 10/2007 |
| EP | 2088637 | A2 | 8/2009 |
| EP | 2933229 | A1 | 10/2015 |
| JP | S61010855 | A | 1/1986 |
| JP | S62287568 | A | 12/1987 |
| JP | 2002063894 | A | 2/2002 |
| JP | 2003217575 | A | 7/2003 |
| JP | 2004039491 | A | 2/2004 |
| JP | 2004055541 | A | 2/2004 |
| JP | 2004063297 | A | 2/2004 |
| JP | 2005138204 | A | 6/2005 |
| JP | 2005199267 | A | 7/2005 |
| JP | 2005317902 | A | 11/2005 |
| JP | 2006252902 | A | 11/2005 |
| JP | 2007160151 | A | 6/2007 |
| JP | 2009525247 | A | 7/2009 |
| JP | 2010222245 | A | 10/2010 |
| JP | 2011026153 | A | 2/2011 |
| JP | 2011165680 | A | 8/2011 |
| JP | 2012169576 | A | 9/2012 |
| JP | 2013534686 | A | 9/2013 |
| JP | 2014053209 | A | 3/2014 |
| KR | 20070083691 | A | 8/2007 |
| KR | 10-2009-0107498 | A | 10/2009 |
| KR | 1020100114827 | A | 4/2017 |
| WO | 9632618 | A1 | 10/1996 |
| WO | 2011019431 | A1 | 2/2011 |
| WO | 2011021982 | A1 | 2/2011 |
| WO | 2011072213 | A2 | 6/2011 |
| WO | 2012006657 | A1 | 1/2012 |
| WO | 2012087698 | A1 | 6/2012 |
| WO | 2012138302 | A1 | 10/2012 |
| WO | 2013024727 | A1 | 2/2013 |
| WO | 2013040636 | A1 | 3/2013 |
| WO | 2013066474 | A2 | 5/2013 |
| WO | 2013070989 | A1 | 5/2013 |
| WO | 2013128082 | A1 | 9/2013 |
| WO | 2013155276 | A1 | 10/2013 |
| WO | 2014011722 | A2 | 1/2014 |
| WO | 2014028978 | A1 | 2/2014 |
| WO | 2014062133 | A1 | 4/2014 |
| WO | 2014072877 | A2 | 5/2014 |
| WO | 2014134663 | A1 | 9/2014 |
| WO | 2015023974 | A1 | 2/2015 |
| WO | 2015069332 | A | 5/2015 |
| WO | 2015153895 | A1 | 10/2015 |
| WO | 2015195700 | A1 | 12/2015 |
| WO | 2016094551 | A1 | 6/2016 |
| WO | 2016133571 | A2 | 8/2016 |

OTHER PUBLICATIONS

Cannarella et al., "Mechanical Properties of a Battery Separator under Compression and Tension," Journal of the Electrochemical Society, vol. 161, No. 11, Sep. 26, 2014, pp. F3117-F3122.

Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.

Gao, C. et al., "Superior Cycling Performance of SiOx/C Composite with Arrayed Mesoporous Architecture as Anode Material for Lithium-Ion Batteries," Journal of the Electrochemical Society, vol. 161, No. 14, 2014, The Electrochemical Society, pp. A2216-A2221.

Lu, J. et al., "Advanced applications of ionic liquids in polymer science," Progress in Polymer Science, vol. 34, 2009, Elsevier Ltd., pp. 431-448.

Vranes, M. et al., "Physicochemical Characterization of 1-Butyl-3-methylimidazolium and 1-Butyl-methylpyrrolidinium Bis{trifluoromethylsulfonyl)imide," Journal of Chemical & Engineering Data, vol. 57, Mar. 7, 2012, American Chemical Society, pp. 1072-1077.

Yan, Jun et al., "High-performance supercapacitor electrodes based on highly corrugated graphene sheets," Carbon, vol. 50, 2012, Elsevier Ltd., pp. 2179-2188.

Non-Final Office Action for U.S. Appl. No. 15/427,210, dated Sep. 3, 2019, 16 pages.

Notice of Allowance for U.S. Appl. No. 15/427,210, dated Dec. 18, 2019, 9 pages.

Office Action for Canadian Patent Application No. 2,862,806, dated Sep. 30, 2019, 3 pages.

Grant of Patent for Korean Patent Application No. 10-2014-7020353, dated Oct. 29, 2019, 3 pages.

Final Office Action for U.S. Appl. No. 15/612,405, dated Dec. 27, 2019, 17 pages.

Final Office Action for U.S. Appl. No. 16/029,930, dated Nov. 15, 2019, 16 pages.

Office Action for Canadian Patent Application No. 2,866,250, dated Dec. 17, 2019, 3 pages.

Examination Report for European Patent Application No. 13757195.6, dated Jan. 29, 2020, 4 pages.

Notice of Preliminary Rejection for Korean Patent Application No. 10-2014-7028084, dated Aug. 22, 2019, 30 pages.

Office Action for Brazilian Patent Application No. 112016029468, dated Jan. 21, 2020, 6 pages.

Third Office Action for Chinese Patent Application No. 201580043429.1, dated Jan. 3, 2020, 20 pages.

Examination Report for European Patent Application No. 15809519.0, dated Dec. 9, 2019, 7 pages.

Office Action for Israeli Patent Application No. 249506, dated Dec. 3, 2019, 8 pages.

Decision of Rejection for Japanese Patent Application No. 2016-573846, dated Oct. 29, 2019, 9 pages.

Non-Final Office Action for U.S. Appl. No. 14/945,232, dated Sep. 3, 2019, 8 pages.

Notice of Allowance for U.S. Appl. No. 14/945,232, dated Dec. 20, 2019, 9 pages.

Supplemental Notice of Allowability for U.S. Appl. No. 14/945,232, dated Feb. 12, 2020, 5 pages.

Office Action for Brazilian Patent Application No. 112017010257, dated Jan. 28, 2020, 7 pages.

Official Action for Eurasian Patent Application No. 201791078, dated Nov. 6, 2019, 4 pages.

Notification of Reasons for Rejection for Japanese Patent Application No. 2017-526533, dated Aug. 20, 2019, 4 pages.

Non-Final Office Action for U.S. Appl. No. 15/382,871, dated Sep. 16, 2019, 9 pages.

Applicant-Initiated Interview Summary for U.S. Appl. No. 15/382,871, dated Dec. 31, 2019, 5 pages.

Non-Final Office Action for U.S. Appl. No. 16/428,409, dated Sep. 16, 2019, 12 pages.

First Office Action for Chinese Patent Application No. 2016800753323, dated Aug. 27, 2019, 15 pages.

Notice of Allowance and Examiner-Initiated Interview Summary for U.S. Appl. No. 15/410,404, dated Oct. 25, 2019, 11 pages.

Corrected Notice of Allowability for U.S. Appl. No. 15/410,404, dated Dec. 3, 2019, 6 pages.

(56) References Cited

OTHER PUBLICATIONS

International Preliminary Report on Patentability for International Patent Application No. PCT/US2018/041728, dated Jan. 23, 2020, 7 pages.
First Office Action for Chinese Patent Application No. 2017800076125, dated Nov. 28, 2019, 20 pages.
Extended European Search Report for European Patent Application No. 17741923.1, dated Nov. 15, 2019, 18 pages.
Notice of Allowance for U.S. Appl. No. 15/472,409, dated Dec. 11, 2019, 11 pages.
Official Action for Eurasian Patent Application No. 201892199, dated Nov. 28, 2019, 6 pages.
Extended European Search Report for European Patent Application No. 17776536.9, dated Oct. 30, 2019, 8 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Applicant-Initiated Interview Summary for U.S. Appl. No. 15/466,425, dated Oct. 22, 2019, 3 pages.
Final Office Action for U.S. Appl. No. 15/466,425, dated Jan. 28, 2020, 8 pages.
Official Action for Eurasian Patent Application No. 201892118, dated Nov. 28, 2019, 4 pages.
Extended European Search Report for European Patent Application No. 17771081.1, dated Oct. 22, 2019, 6 pages.
Notice of Reexamination for Chinese Patent Application No. 201280070343.4, dated Feb. 3, 2020, 7 pages.
Notice of Preliminary Rejection for Korean Patent Application No. 10-2014-7028084, dated Feb. 17, 2020, 5 pages.
Examination Report for Indian Patent Application No. 201617042976, dated Mar. 13, 2020, 7 pages.
Gao, Yu et al., "High power supercapcitor electrodes based on flexible TiC-CDC nano-felts," Journal of Power Sources, vol. 201, Issue 1, Mar. 2012, Elsevier B.V., pp. 368-375.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.
Gilje, Scott et al., "A Chemical Route to Graphene for Device Applications," Nano Letters, vol. 7, Issue 11, Oct. 18, 2007, American Chemical Society, pp. 3394-3398.
Gilje, Scott et al., "Photothermal Deoxygenation of Graphene Oxide for Patterning and Distributed Ignition Applications," Advanced Materials, vol. 22, Issue 3, Oct. 26, 2009, Wiley-VCH Verlag GmbH & Co. KGaA, Weinheim, Germany, pp. 419-423.
Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y. et al., "True Performance Metrics in Electrochemical Energy Storage," Science Magazine, vol. 334, Issue 6058, Nov. 18, 2011, 4 pages.
Gracia, J. et al., "Corrugated layered heptazine-based carbon nitride: the lowest energy modifications of $C_3$ $N_4$ ground state," Journal of Materials Chemistry, vol. 19, 2009, pp. 3013-3019.
Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Hu, Liangbing et aL, "Symmetrical $MnO_2$—Carbon Nanotube—Textile Nanostructures for Wearable Pseudocapacitors with High Mass Loading," ACS Nano, vol. 5, Issue 11, Sep. 16, 2011, American Chemical Society, pp. 8904-8913.
Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.
Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hwang, Jee Y. et al., "Direct preparation and processing of graphene/RuO2 nanocomposite electrodes for high-performance capacitive energy storage," Nano Energy, vol. 18, Sep. 25, 2015, Elsevier B.V., pp. 57-70.
Jana, Milan et al., "Non-covalent functionalization of reduced graphene oxide using sulfanilic acid azocromotrop and its application as a supercapacitor electrode material," Joumal of Materials Chemistry A, vol. 3, Issue 14, Feb. 24, 2015, The Royal Society of Chemistry, pp. 7323-7331.
Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.
Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.
Kiani, M.A. et al., "Size effect investigation on battery performance: Comparison between micro- and nano-particles of β-$Ni(Oh)_2$ as nickel battery cathode material," Journal of Power Sources, vol. 195, Issue 17, Apr. 2, 2010, Elsevier B.V., pp. 5794-5800.
Kiani, M.A. et al., "Synthesis of Nano- and Micro-Particles of $LiMn_2O_4$: Electrochemical Investigation and Assessment as a Cath-

(56) References Cited

OTHER PUBLICATIONS ode in Li Battery," International Journal of Electrochemical Science, vol. 6, Issue 7, Jul. 1, 2011, ESG, pp. 2581-2595.
Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.
Lam, L.T. et al., "Development of ultra-battery for hybrid-electric vehicle applications," Journal of Power Sources, vol. 158, Issue 2, May 2, 2006, Elsevier B.V., pp. 1140-1148.
Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Dan et al., "Processable aqueous dispersions of graphene nanosheets," Nature Nanotechnology, vol. 3, Feb. 2008, Nature Publishing Group, pp. 101-105.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American chemical Society, pp. 5228-5234.
Li, Qi et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.
Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.
Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Linden, David et al., "Handbook of Batteries," McGraw-Hill Handbooks, Third Edition, 2010, New York, The McGraw-Hill Companies, Inc., 1,454 pages.
Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen et al., "Superior Micro-Supercapacitors Based on Graphene Quantum Dots," Advanced Functional Materials, vol. 23, Issue 33, Mar. 26, 2013, Wiley-VCH Verlag GmbH & Co. KGaA, Weinheim, pp. 4111-4122.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.
Notice of Allowance for U.S. Appl. No. 15/319,286, dated Oct. 1, 2018, 8 pages.
Corrected Notice of Allowability for U.S. Appl. No. 15/319,286, dated Oct. 29, 2018, 5 pages.
Corrected Notice of Allowability for U.S. Appl. No. 15/319,286, dated Nov. 30, 2018, 5 pages.
Corrected Notice of Allowability for U.S. Appl. No. 15/319,286, dated Jan. 18, 2019, 5 pages.
Notification of the First Office Action for Chinese Patent Application No. 201580043429.1, dated Oct. 29, 2018, 19 pages.
Advisory Action for U.S. Appl. No. 14/945,232, dated Oct. 15, 2018, 3 pages.
Non-Final Office Action for U.S. Appl. No. 14/945,232, dated Jan. 9, 2019, 7 pages.
Extended European Search Report for European Patent Application No. 15861794.4, dated Oct. 2, 2018, 13 pages.
Final Office Action for U.S. Appl. No. 15/382,871, dated Jan. 25, 2019, 16 pages.
Non-Final Office Action for U.S. Appl. No. 15/410,404, dated Sep. 27, 2018, 9 pages.
Final Office Action for U.S. Appl. No. 15/472,409, dated Jan. 18, 2019, 12 pages.
International Preliminary Report on Patentability for International Patent Application No. PCT/US2017/024716, dated Oct. 11, 2018, 10 pages.
International Preliminary Report on Patentability for International Patent Application No. PCT/US2017/038992, dated Jan. 3, 2019, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
International Search Report and Written Opinion for International Patent Application No. PCT/US2018/041728, dated Nov. 9, 2018, 10 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Non-Final Office Action for U.S. Appl. No. 15/427,210, dated Feb. 28, 2019, 17 pages.
Applicant-Initiated Interview Summary for U.S. Appl. No. 15/427,210, dated May 29, 2019, 3 pages.
Notice of Reexamination for Chinese Patent Application No. 201280070343.4, dated Jun. 27, 2019, 14 pages.
Examination Report for European Patent Application No. 12874989.2, dated Mar. 5, 2019, 5 pages.
Notice of Preliminary Rejection for Korean Patent Application No. 10-2014-7020353, dated Apr. 15, 2019, 11 pages.

(56) References Cited

OTHER PUBLICATIONS

Non-Final Office Action for U.S. Appl. No. 15/612,405, dated Jun. 18, 2019, 12 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Notification of the Second Office Action for Chinese Patent Application No. 201580043429.1, dated Jun. 20, 2019, 9 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Interview Summary for U.S. Appl. No. 14/945,232, dated Apr. 11, 2019, 3 pages.
Final Office Action for U.S. Appl. No. 14/945,232, dated Jul. 17, 2019, 8 pages.
Examination Report No. 1 for Australian Patent Application No. 2015349949, dataed Mar. 8, 2019, 4 pages.
Notice of Acceptance for Australian Patent Application No. 2015349949, dated Jul. 12, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Final Office Action for U.S. Appl. No. 15/410,404, dated Feb. 21, 2019, 9 pages.
Non-Final Office Action for U.S. Appl. No. 15/410,404, dated May 24, 2019, 9 pages.
Applicant-Initiated Interview Summary for U.S. Appl. No. 16/029,930, dated Jul. 29, 2019, 4 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Non-Final Office Action for U.S. Appl. No. 15/688,342, dated Mar. 26, 2019, 9 pages.
International Preliminary Report on Patentability for International Patent Application No. PCT/US2017/048883, dated Mar. 14, 2019, 7 pages.
Non-Final Office Action for U.S. Appl. No. 15/466,425, dated Jul. 10, 2019, 8 pages.
Notification of the Third Office Action for Chinese Patent Application No. 201580072540.3, dated Jul. 17, 2019, 9 pages.
Advisory Action for U.S. Appl. No. 15/612,405, dated Jun. 24, 2020, 3 pages.
Non-Final Office Action for U.S. Appl. No. 16/029,930, dated Jun. 24, 2020, 16 pages.
Final Office Action for U.S. Appl. No. 16/428,409, dated Jun. 23, 2020, 16 pages.
Office Action for Vietnamese Patent Application No. 1-2016-05086, dated May 29, 2020, 2 pages.
Decision of Rejection for Chinese Patent Application No. 201580072540.3, dated Apr. 22, 2020, 8 pages.
Wikipedia, "Ferromagnetism," Feb. 13, 2017, Retrieved Aug. 7, 2018 from https://en.wikipedia.org/w/index.php?title=Ferrornagnetism&oldid=765289868, 1 page.
Grosu, Yaroslav et al., "Natural Magnetite for thermal energy storage: Excellent thermophysical properties, reversible latent heat transition and controlled thermal conductivity," Solar Energy Materials & Solar Cells, vol. 161, Available online Dec. 6, 2016, Elsevier B.V., pp. 170-176.
Hwang, J. Y., et al., "Boosting the Capacitance and Voltage of Aqueous Supercapacitors via Redox Charge Contribution from both Electrode and Electrolyte," Nano Today, vol. 15, Available online Jul. 22, 2017, pp. 15-25.
Karami, Hassan et al., "Sodium Sulfate Effects on the Electrochemical Behaviors of Nanostructured Lead Dioxide and Commercial Positive Plates of Lead-Acid Batteries," International Journal of Electrochemical Science, vol. 5, 2010, ESG, pp. 1046-1059.
Lee, Juhan, et al., "High Performance Hybrid Energy Storage with Potassium Ferricyanide Redox Electrolyte," Applications of Materials and Interfaces, vol. 8, Aug. 2016, ACS, pp. 23676-23687.
Notice of Allowance for U.S. Appl. No. 15/612,405, dated Sep. 8, 2020, 7 pages.
Examination Report for Indian Patent Application No. 201817023184, dated Aug. 13, 2020, 6 pages.
Examination Report for Indian Patent Application No. 201817034180, dated Aug. 13, 2020, 6 pages.
Examination Report for European Patent Application No. 17816292.1, dated Aug. 24, 2020, 4 pages.
Examination Report for Indian Patent Application No. 201817033309, dated Aug. 28, 2020, 6 pages.
Invitation to Pay Additional Fees for International Patent Application No. PCT/US2018/036846, dated Aug. 24, 2018, 2 pages.
International Search Report and Written Opinion for International Patent Application No. PCT/US2018/036846, dated Nov. 9, 2018, 14 pages.
International Preliminary Report on Patentability for International Patent Application No. PCT/US2018/036846, dated Dec. 26, 2019, 10 pages.
Non-Final Office Action for U.S. Appl. No. 16/0004,818, dated Jun. 24, 2020, 18 pages.
Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, WILEY-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Moosavifard, Seyyed E et al., "Designing 3D highly ordered nanoporous CuO electrodes for high-performance asymmetric supercapacitors," ACS Applied Materials & Interfaces, vol. 7, Issue 8, American Chemical Society, 13 pages.
Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.
Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, Wiley-VCH Verlag GmbH & Co., pp. 1-7.

(56) References Cited

OTHER PUBLICATIONS

Oudenhoven, Jos F. M. et al., "All-Solid-State Lithium-Ion Microbatteries: A Review of Various Three-Dimensional Concepts," Advanced Energy Matterials, vol. 1, Issue 1, Wiley-VCH Verlag GmbH & Co. KGaA, Weinheim, pp. 10-33.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David et al, "Ultrahigh-power micrometre-sized supercapacitors based on onion-like carbon," Nature Nanotechnology, vol. 5, Sep. 2010, Macmillan Publishers Limited, 10 pages.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.
Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qiu, Ling et al., "Controllable Corrugation of Chemically Converted Graphene Sheets in Water and Potential Application for Nanofiltration," Chemical Communications, vol. 47, 2011, pp. 5810-5812.
Qu, Qunting et al., "Core-Shell Structure of Polypyrrole Grown on $V_2$ $O_5$ Nanoribbon as High Performance Anode Material for Supercapacitors," Advanced Energy Materials, vol. 2, Issue 8, 2012, Wiley-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.
Shao, Yuanlong et al., "Graphene-based materials for flexible supercapacitors," Chemical Society Review, vol. 44, Issue 11, Apr. 22, 2015, The Royal Society of Chemistry, 27 pages.
Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.
Sheats, James R., "Manufacturing and commercialization issues in organic electronics," Journal of Materials Research, vol. 19, Issue 7, Jul. 2004, Materials Research Society, pp. 1974-1989.
Shen, Caiwei et al., "A high-energy-density micro supercapacitor of asymmetric $MnO_2$-carbon configuration by using micro-fabrication technologies," Journal of Power Sources, vol. 234, Feb. 9, 2013, Elsevier B.V., pp. 302-309.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Simon, Patrice et al., "Materials for electrochemical capacitors," Nature Materials, vol. 7, Issue 11, Nov. 2008, Macmillan Publishers Limited, pp. 845-854.
Simon, Patrice et al., "Where Do Batteries End and Supercapacitors Begin?" Science, vol. 343, Issue 6176, Mar. 14, 2014, American Association for the Advancement of Science, 3 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.
Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, Wiley-VCH Verlag GmbH & Co. KGaA, Weinheim, pp. 2809-2815.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.
Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, Wiley-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene—Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/

(56) References Cited

OTHER PUBLICATIONS

SWCNT composites," Journal of Materials Chemistry, vol. 21, Issue 41, Sep. 20, 2011, The Royal Society of Chemistry, pp. 16373-16378.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, Wiley-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.
Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Non-Final Office Action for U.S. Appl. No. 13/725,073, dated Aug. 28, 2017, 41 pages.
Fourth Office Action for Chinese Patent Application No. 201280070343.4, dated Apr. 26, 2017, 22 pages.
Examination Report for European Patent Application No. 12874989.2, dated Jul. 24, 2017, 5 pages.
Notice of Reason for Rejection for Japanese Patent Application No. 2014-548972, dated May 23, 2017, 4 pages.
Second Office Action for Chinese Patent Application No. 201380023699.7, dated Aug. 9, 2017, 8 pages.
Communication pursuant to Article 94(3) EPC for European Patent Application No. 13757195.6, dated Jul. 6, 2017, 3 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/024716, dated Jun. 20, 2017, 13 pages.
International Search Report and Written Opinion for International Patent Application No. PCT/US2017/023632, dated May 31, 2017, 11 pages.
International Search Report and Written Opinion for International Patent Application No. PCT/US2017/038992, dated Sep. 21, 2017, 12 pages.
Invitation to Pay Additional Fees for International Patent Application No. PCT/US2017/048883, dated Sep. 29, 2017, 2 pages.
International Search Report and Written Opinion for International Patent Application No. PCT/US2017/048883, dated Dec. 26, 2017, 10 pages.
Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Examination Report for European Patent Application No. 13757195.6, dated Jun. 13, 2018, 7 pages.
Non-Final Office Action for U.S. Appl. No. 15/319,286, dated Jun. 27, 2018, 9 pages.
Final Office Action for U.S. Appl. No. 14/945,232, dated Aug. 10, 2018, 7 pages.
Notification of the First Office Action for Chinese Patent Application No. 201580072540.3, dated Jun. 25, 2018, 14 pages.
Partial Supplementary European Search Report for European Patent Application No. 15861794.4, dated Jun. 28, 2018, 16 pages.
Non-Final Office Action for U.S. Appl. No. 15/382,871, dated Jun. 27, 2018, 11 pages.
International Preliminary Report on Patentability for International Patent Application No. PCT/US2016/067468, dated Jul. 5, 2018, 7 pages.
International Preliminary Report on Patentability for International Patent Application No. PCT/US2017/014126, dated Aug. 2, 2018, 10 pages.
Non-Final Office Action for U.S. Appl. No. 15/472,409, dated Jun. 29, 2018, 11 pages.
Decision on Rejection for Chinese Patent Application No. 201380023699.7, dated Aug. 16, 2018, 11 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
First Office Action for Canadian Patent Application No. 2,862,806, dated Nov. 22, 2018, 5 pages.
Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.
Allen, Matthew J. et al., "Honeycomb Carbon: A Review of Graphene," Chemical Reviews, vol. 110, Issue 1, Jul. 17, 2009, American Chemical Society, pp. 132-145.

(56) References Cited

OTHER PUBLICATIONS

Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.
Author Unknown, "ELTON: Super Capactiors," www.elton-cap.com/, Retrieved Apr. 15, 2016, ELTON, 1 page.
Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.
Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Author Unknown, "Turnigy Graphene Batteries," Batteries & Accessories, https://hobbyking.com/en_us/batteries-accessories/tumigy-graphene-2.html, retrieved Apr. 3, 2017, HobbyKing, 39 pages.
Arthur, Timothy, S. et al., "Three-dimensional electrodes and battery architectures," MRS Bulletin, vol. 36, Jul. 2011, Materials Research Society, pp. 523-531.
Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.
Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, Wiley-VCH Verlag GmbH & Co. KGaA, Weinheim, pp. 4501-4510.
Beidaghi, Majid et al.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.
Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.
Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.
Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.
Brodie, B.C., "Ueber das Atomgewicht des Graphits," Justus Liebigs Annalen der Chemie, vol. 114, Issue 1, 1860, Wiley-VCH Verlag GmbH & Co. KGaA, Weinheim, pp. 6-24.
Burke, Andrew, "R&D considerations for the performance and application of electrochemical capacitors," Electrochimica Acta, vol. 53, Jan. 26, 2007, Elsevier Ltd., pp. 1083-1091.
Cao, Liujun et al., "Direct Laser-Patterned Micro-Supercapacitors from Paintable $MoS_2$ Films," Small, vol. 9, Issue 17, Apr. 16, 2013, Wiley-VCH Verlag GmbH & Co. KGaA, Weinheim, pp. 2905-2910.
Chan, Candace K. et al, "High-performance lithium battery anodes using silicon nanowires," Nature Nanotechnology, vol. 3, Issue 1, Jan. 2008, Nature Publishing Group, pp. 31-35.
Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.
Chen, Ji et al., "High-yield preparation of graphene oxide from small graphite flakes via an improved Hummers method with a simple purification process," Carbon, vol. 81, Jan. 2015, Elsevier Ltd., pp. 1-9.
Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, Wiley-VCH Verlag GmbH & Co. KGaA, Weinheim, pp. 851-856.
Chen, Wei et al., "High-Performance Nanostructured Supercapacitors on a Sponge," Nano Letters, vol. 11, Issue 12, Sep. 16, 2011, American Chemical Society, 22 pages.
Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.
Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.
Chi, Kai et al., "Freestanding Graphene Paper Supported Three-Dimensional Porous Graphene—Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.
Chmiola, John et al., "Monolithic Carbide-Derived Carbon Films for Micro-Supercapacitors," Science, vol. 328, Issue 5977, Apr. 2010, American Association for the Advancement of Science, 4 pages.
Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.
Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.
Deville, Sylvain, "Freeze-Casting of Porous Ceramics: A Review of Current Achievements and Issues," Advanced Engineering Materials, vol. 10, Issue 3, Mar. 20, 2008, Wiley-VCH Verlag GmbH & Co., pp. 155-169.
Deville, Sylvain, "Metastable and unstable cellular solidification of colloidal suspensions," Nature Materials, vol. 8, Dec. 2009, Macmillan Publishers Limited, pp. 966-972.
De Volder, Michaël et al., "Corrugated Carbon Nanotube Microstructures with Geometrically Tunable Compliance," ACS Nano, vol. 5, Issue 9, Aug. 1, 2011, pp. 7310-7317.
Dunn, Bruce et al., "Electrical Energy Storage for the Grid: A Battery of Choices," Science, vol. 334, Issue 928, Nov. 18, 2011, American Association for the Advancement of Science, pp. 928-935.
Eda, Goki et al., "Chemically Derived Graphene Oxide: Towards Large-Area Thin-Film Electronics and Optoelectronics," Advanced Materials, vol. 22, Issue 22, Apr. 28, 2010, Wiley-VCH Verlag GmbH & Co., pp. 2392-2415.
El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F. et al, "Laser Scribing of High-Performance and Flexible Graphene-Based Electrochemical Capacitors," Science Magazine, Mar. 16, 2012, vol. 335, No. 6074, 6 pages.
El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.
El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.

(56) References Cited

OTHER PUBLICATIONS

El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, Wiley-VCH Verlag GmbH & Co. KGaA, Weinheim, pp. 2366-2375.
Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.
Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.
Foo, Ce Yao et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, Wiley-VCH Verlag GmbH & Co. KGaA, Weinheim, pp. 1-7.
Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, Wiley-VCH Verlag GmbH & Co, pp. 3958-3964.
Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.
Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.
Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.
Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.
Office Action for Mexican Patent Application No. Mx/a/2016/016239, dated Feb. 26, 2020, 5 pages.
Supplemental Notice of Allowability for U.S. Appl. No. 14/945,232, dated Feb. 26, 2020, 5 pages.
Notification of Reasons for Rejection for Japanese Patent Application No. 2017-526533, dated Mar. 16, 2020, 7 pages.
Second Office Action for Chinese Patent Application No. 2016800753323, dated Mar. 5, 2020, 15 pages.
Non-Final Office Action for U.S. Appl. No. 16/692,123, dated Dec. 27, 2019, 11 pages.
Non-Final Office Action for U.S. Appl. No. 15/688,342, dated Apr. 9, 2020, 10 pages.
Office Action for Eurasian Patent Application No. 201990587/31, dated Mar. 26, 2020, 4 pages.
Partial Supplemental European Search Report for European Patent Application No. 17847303.9, dated Apr. 3, 2020, 10 pages.
First Office Action for Chinese Patent Application No. 2017800249783, dated Jan. 6, 2020, 15 pages.
Final Office Action for U.S. Appl. No. 15/630,758, dated Apr. 15, 2020, 13 pages.
Author Unknown, "Sulfuric Acid—Density," The Engineering Toolbox, accessed Apr. 10, 2020 at https://www.engineeringtoolbox.com/indsulfuric-acid-density-d_2163.html, 6 pages.
Kang, J.H et al., "Hidden Second Oxidation Step of Hummers Method," Chemistry of Materials, vol. 28, 2016, American Chemical Society, pp. 756-764.
Dubal, D. P., et al., "Hybrid energy storage: the merging of battery and supercapacitor chemistries," Chemical Society Review, vol. 44, No. 7, 2015, pp. 1777-1790.
Garg, R. et al., "Nanowire Mesh Templated Growth of Out-of-Plane Three-Dimensional Fuzzy Graphene," ACS Nano, vol. 11, 2017, American Chemical Society, pp. 6301-6311.
Gong, M., et al., "Ultrafast high-capacity NiZn battery with NiAlCo-layered double hydroxide," Energy & Environmental Science, vol. 7, No. 6, 2014, pp. 2025-2032.
Humble, P. H., et al., "Microscopic nickel-zinc batteries for use in autonomous microsystems," Journal of the Electrochemical Society, vol. 148, No. 12, 2001, pp. A1357-A1361.
Li, Qintao et al., "Carbon nanotubes coated by carbon nanoparticles of turbostratic stacked graphenes," Carbon, vol. 46, 2008, Elsevier Ltd., pp. 434-439.
Mishra, G., et al., "Layered double hydroxides: A brief review from fundamentals to application as evolving biomaterials," Applied Clay Science, vol. 153, 2018, Elsevier B.V., pp. 172-186.
Parker, J. F., et al. "Rechargeable nickel-3D zinc batteries: An energy-dense, safer alternative to lithium-ion," Science, vol. 356, No. 6336, 2017, American Association for the Advancement of Science, pp. 415-418.
Examination Report No. 1 for Australian Patent Application No. 2019250120, dated Apr. 24, 2020, 4 pages.
Non-Final Office Action for U.S. Appl. No. 16/033,266, dated Apr. 29, 2020, 12 pages.
Office Action for Eurasian Patent Application No. 201790003, dated Feb. 26, 2020, 6 pages.
First Office Action and Search Report for Chinese Patent Application No. 201811438766.2, dated Mar. 31, 2020, 32 pages.
Notice of Allowance for U.S. Appl. No. 16/223,869, dated Jul. 9, 2020, 9 pages.
Official Action for Eurasian Patent Application No. 201791078, dated Jun. 23, 2020, 4 pages.
Examination Report for Indian Patent Application No. 201717016755, dated Jul. 2, 2020, 6 pages.
Examination Report for Indian Patent Application No. 201817020826, dated Jul. 13, 2020, 7 pages.
Notice of Allowance for U.S. Appl. No. 16/692,123, dated Jul. 15, 2020, 9 pages.
First Office Action and Search Report for Chinese Patent Application No. 2017800273161, dated Jun. 5, 2020, 15 pages.
Extended European Search Report for European Patent Application No. 17847303.9, dated Jul. 13, 2020, 9 pages.
Official Notification for Eurasian Patent Application No. 201990068, dated Jun. 23, 2020, 5 pages.
Advisory Action for U.S. Appl. No. 15/466,425, dated Jul. 7, 2020, 3 pages.
Non-Final Office Action for U.S. Appl. No. 15/466,425, dated Jul. 28, 2020, 8 pages.
Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.
Wassei, Jonathan K. et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, Wiley-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACs Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of

(56) References Cited

OTHER PUBLICATIONS

Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene—MnO2composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, Wiley-VCH Verlag GmbH & Co., pp. 1-43.
Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, Wiley-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive anergy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, Wiley-VCH Verlag GmbH & Co. KGaA, Weinheim, pp. 1-9.
Zhang, Zhongshen et al., "A New-Type Ordered Mesoporous Carbon/ Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," Nanoscale, vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCI Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/ $Fe_2O_3$ Composite As a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B.V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Reexamination Decision for Chinese Patent Application No. 201280070343.4, dated Aug. 31, 2020, 19 pages.

(56) References Cited

OTHER PUBLICATIONS

Examination Report for Taiwanese Patent Application No. 106111115, dated Aug. 25, 2020, 17 pages.
Author Unknown, "Sulfuric Acid—Density," The Engineering ToolBox, www.engineeringtoolbox.com/indsulfuric-acid-density-d_2163.html, accessed Oct. 2, 2020, 3 pages.
Non-Final Office Action for U.S. Appl. No. 15/630,758, dated Oct. 1, 2020, 14 pages.
Notice of Allowability for U.S. Appl. No. 16/223,869, dated Sep. 15, 2020, 5 pages.
Non-Final Office Action for U.S. Appl. No. 16/428,409, dated Oct. 1, 2020, 14 pages.
Notice of Allowance for U.S. Appl. No. 16/692,123, dated Oct. 21, 2020, 8 pages.
Second Office Action for Chinese Patent Application No. 201811438766.2, dated Oct. 28, 2020, 10 pages.
Notification of Reexamination for Chinese Patent Application No. 2015800725403, dated Oct. 12, 2020, 9 pages.
Office Action for Israeli Patent Application No. 252320, dated Sep. 17, 2020, 11 pages.
Examination Report for Australian Patent Application No. 2016378400, dated Sep. 22, 2020, 5 pages.
Examination Report for Taiwanese Patent Application No. 105142233, dated Sep. 25, 2020, 19 pages.
Examination Report for Australian Patent Application No. 2017209117, dated Oct. 5, 2020, 5 pages.
Examination Report for Taiwanese Patent Application No. 106109733, dated Oct. 20, 2020, 11 pages.
Non-Final Office Action for U.S. Appl. No. 16/791,504, dated Nov. 18, 2020, 16 pages.
Zhang, Luojiang, et al., "3D porous layered double hydroxides grown on graphene as advanced electrochemical pseudocapacitor materials," Journal of Materials Chemistry A, vol. 1, 2013, pp. 9046-9053.
Notice of Acceptance for Australian Patent Application No. 2019250120, dated Nov. 11, 2020, 3 pages.
Notification of Decision of Rejection for Japanese Patent Application No. 2017-526533, dated Nov. 17, 2020, 6 pages.
Official Notification for Eurasion Patent Application No. 20182199, dated Dec. 11, 2020, 6 pages.
Notification of the Second Office Action for Chinese Patent Application No. 2017800249783, dated Dec. 2, 2020, 9 pages.
Official Action for Eurasion Patent Application No. 201892118, dated Dec. 11, 2020, 6 pages.
Invitation to Pay Additional Fees and Partial Search for International Patent Application No. PCT/US2020/052618, dated Nov. 30, 2020, 2 pages.
Notice of Allowance for U.S. Appl. No. 15/612,405, dated Dec. 17, 2020, 8 pages.
Non-Final Office Action for U.S. Appl. No. 16/029,930, dated Jan. 6, 2021, 15 pages.
Final Office Action for U.S. Appl. No. 16/033,266, dated Jan. 6, 2021, 10 pages.

* cited by examiner

COMPOSITE GRAPHENE ENERGY STORAGE METHODS, DEVICES, AND SYSTEMS

CROSS-REFERENCE

This application claims the benefit of U.S. Provisional Application No. 62/906,844, filed Sep. 27, 2019, which is hereby incorporated herein by reference in its entirety.

BACKGROUND

The present disclosure is directed to carbon-based energy storage devices and methods of manufacture of the same. The worldwide market for electronics such as power tools, smartphones, grid stabilization devices, electric vehicles, and laptops is continually growing and evolving. Many such devices rely upon energy storage devices for portability and rechargeability. However, such electrical devices are currently limited by existing batteries and capacitors with low energy densities and power densities, short life cycles, and high recharge times.

SUMMARY

The present disclosure discloses a fast-charging hybrid battery to replace lithium-ion batteries in portable electronics and electric vehicles. The battery can be referred to as a $M^{2+}/M^{3+}$ hybrid battery. Hybrid batteries consistent with the present disclosure can deliver more than 250 watt hours per kilogram of energy, which is comparable with or superior to state-of-the-art lithium-ion batteries, yet they can be recharged in just a few minutes compared with the hours required for recharging lithium-ion batteries. Provided herein are fast-charging energy devices capable of replacing lithium-ion batteries in portable electronics and electric vehicles.

One aspect provided herein is an energy storage device comprising: a first electrode comprising: a graphene sheet; a layered double hydroxide coupled to the graphene sheet; a binder; a conductive additive; and a first current collector; a second electrode comprising a hydroxide, and a second current collector; a separator; and an electrolyte. In some embodiments, a percentage by mass or volume of the graphene sheet in the first electrode is at most about 5%. In some embodiments, the graphene sheet comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the graphene sheet comprises a nanosheet, a microsheet, a platelet, or any combination thereof. In some embodiments, the layered double hydroxide comprises a metallic layered double hydroxide comprising an aluminum-based layered double hydroxide, a barium-based layered double hydroxide, a bismuth-based layered double hydroxide, a cadmium-based layered double hydroxide, calcium-based layered double hydroxide, a chromium-based layered double hydroxide, cobalt-based layered double hydroxide, a copper-based layered double hydroxide, an indium-based layered double hydroxide, an iron-based layered double hydroxide, a lead-based layered double hydroxide, a manganese-based layered double hydroxide, a mercury-based layered double hydroxide, a nickel-based layered double hydroxide, a strontium-based layered double hydroxide, a tin-based layered double hydroxide, a zinc-based layered double hydroxide, or any combination thereof. In some embodiments, the layered double hydroxide comprises an $M^{2+}$ metal cation, an $M^{3+}$ metal cation, a hydroxide ion, an octahedral site with a trivalent metal cation, an octahedral site with a divalent metal cation, a water molecule, an anion, or any combination thereof. In some embodiments, the $M^{2+}$ metal cation comprises barium, cadmium, calcium, cobalt, copper (II), iron (II), lead (II), magnesium, mercury (I), mercury (II), nickel, strontium, tin, zinc, or any combination thereof. In some embodiments, the $M^{3+}$ metal cation comprises aluminum, bismuth, chromium (III), iron (III), or any combination thereof. In some embodiments, the anion comprises nitrate, sulfate, carbonate, chloride, bromide, or any combination thereof. In some embodiments, the binder comprises a polymeric binder. In some embodiments, the polymeric binder comprises polyvinylidene fluoride (PVDF), carboxymethyl cellulose (CMC), polyacrylic acid (PAA), polyethylene glycol (PEG), alginic acid (ALG or sodium alginate), polypyrrole, polyaniline, poly(3,4-ethylenedioxythiophene) (PEDOT), a sulfonated tetrafluoroethylene based fluoropolymer-copolymer (Nafion®), polytetrafluoroethylene (Teflon®), polydopamine (PD), polyvinylpyrrolidone (PVP), polyacrylonitrile (PAN), carbonyl β-cyclodextrin (C—B—CD), or any combination thereof. In some embodiments, the conductive additive comprises a zero-dimensional carbon additive, a one-dimensional carbon additive, a two-dimensional carbon additive, a three-dimensional carbon additive, or any combination thereof. In some embodiments, the zero-dimensional carbon additive comprises carbon black, acetylene black, or both. In some embodiments, the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the two-dimensional carbon additive comprises a nanosheet, a microsheet, a platelet, or any combination thereof. In some embodiments, the three-dimensional carbon additive comprises graphite, carbon foam, activated carbon, graphene foam, carbon aerogel, graphene aerogel, porous carbon, a buckminsterfullerene, an interconnected corrugated carbon-based network, or any combination thereof. In some embodiments, the energy storage device stores energy through both oxidation-reduction (redox) reactions and ion adsorption. In some embodiments, at least one of the first current collector and the second current collector comprises a foam, a foil, a mesh, an aerogel, or any combination thereof. In some embodiments, at least one of the first current collector and the second current collector comprises a copper-based current collector, a nickel-based current collector, a zinc-based current collector, a graphite-based current collector, a stainless steel-based current collector, a brass-based current collector, a bronze-based current collector, or any combination thereof. In some embodiments, a concentration by mass, by volume, or both of the graphene sheet in the first electrode is about 0.1% to about 10%. In some embodiments, a concentration by mass, by volume, or both of the layered double hydroxide in the first electrode is about 1% to about 80%. In some embodiments, a concentration by mass, by volume, or both of the binder in the first electrode is about 1% to about 20%.

In some embodiments, a concentration by mass, by volume, or both of the conductive additive in the first electrode is about 1% to about 30%. In some embodiments, the separator comprises a membrane separator, a cellulose separator, an organic polymeric separator, an inorganic polymer separator, a microporous separator, a woven separator, a non-woven separator, or any combination thereof. In some embodiments, the separator has a thickness of about 10 μm to about 30 μm. In some embodiments, the electrolyte comprises: a hydroxide; an additive; a stabilizer; a hydrogen evolution inhibitor; and a conductivity enhancer. In some embodiments, the electrolyte comprises: a hydroxide; an additive; a stabilizer; a hydrogen evolution inhibitor; a conductivity enhancer, or any combination thereof. In some embodiments, the hydroxide ion comprises aluminum hydroxide, barium hydroxide, benzyltrimethylammonium hydroxide, beryllium hydroxide, cadmium hydroxide, cesium hydroxide, calcium hydroxide, cerium(III) hydroxide, chromium acetate hydroxide, chromium(III) hydroxide, cobalt(II) hydroxide, cobalt(III) hydroxide, copper(I) hydroxide, copper(II) hydroxide, curium hydroxide, gallium (III) hydroxide, germanium(II) hydroxide, gold(III) hydroxide, indium(III) hydroxide, iron(II) hydroxide, iron(III) oxide-hydroxide, lanthanum hydroxide, lead(II) hydroxide, lead(IV) hydroxide, lithium hydroxide, magnesium hydroxide, manganese(II) hydroxide, mercury(II) hydroxide, metal hydroxide, nickel(II) hydroxide, potassium hydroxide, rubidium hydroxide, sodium hydroxide, strontium hydroxide, tetrabutylammonium hydroxide, tetramethylammonium hydroxide, thallium hydroxide, thallium(I) hydroxide, thallium(III) hydroxide, tin(II) hydroxide, uranyl hydroxide, zinc hydroxide, zirconium(IV) hydroxide, or any combination thereof. In some embodiments, the additive comprises calcium hydroxide, calcium titanate, calcium zincate, potassium fluoride, sodium phosphate tribasic, potassium phosphate, sodium fluoride, potassium borate, potassium carbonate, or any combination thereof. In some embodiments, the stabilizer comprises zinc oxide, zinc hydroxide, sodium zincate, potassium zincate, bismuth oxide, cadmium oxide, indium sulfate, lead oxide, a metallic zinc powder, or any combination thereof. In some embodiments, the hydrogen evolution inhibitor comprises bismuth oxide, cadmium oxide, a conductive ceramic, lead oxide, a metallic zinc powder antimony sulfate, gallium hydroxide, indium sulfate, lithium hydroxide, or any combination thereof. In some embodiments, the conductivity enhancer comprises a conductive ceramic. In some embodiments, the conductive ceramic comprises a dielectric ceramic, a piezoelectric ceramic, or a ferroelectric ceramic. In some embodiments, the conductive ceramic comprises lead zirconate titanate (PZT), barium titanate(BT), strontium titanate (ST), calcium titanate (CT), magnesium titanate (MT), calcium magnesium titanate (CMT), zinc titanate (ZT), lanthanum titanate (LT), and neodymium titanate (NT), barium zirconate (BZ), calcium zirconate (CZ), lead magnesium niobate (PMN), lead zinc niobate (PZN), lithium niobate (LN), barium stannate (BS), calcium stannate (CS), magnesium aluminium silicate, magnesium silicate, barium tantalate, titanium dioxide, niobium oxide, zirconia, quartz, silica, sapphire, beryllium oxide, zirconium tin titanate, Indium tin oxide (ITO), lanthanum-doped strontium titanate (SLT), yttrium-doped strontium titanate (SYT), yttria-stabilized zirconia (YSZ), gadolinium-doped ceria (GDC), lanthanum strontium gallate magnesite (LSGM), or any combination thereof. In some embodiments, a concentration by mass, by volume, or both by mass of the hydroxide within the electrolyte is about 22% to about 91%. In some embodiments, a concentration by mass, by volume, or both by mass of the additive within the electrolyte is about 5% to about 16%. In some embodiments, a concentration by mass, by volume, or both by mass of the stabilizer within the electrolyte is about 1% to about 5%. In some embodiments, a concentration by mass, by volume, or both by mass of the hydrogen evolution inhibitor within the electrolyte is about 1% to about 5%. In some embodiments, a concentration by mass, by volume, or both by mass of the conductivity enhancer within the electrolyte is about 1% to about 5%. In some embodiments, a concentration by volume of the hydroxide within the electrolyte is about 220 g/L to about 900 g/L. In some embodiments, a concentration by volume of the additive within the electrolyte is about 30 g/L to about 160 g/L. In some embodiments, a concentration by volume of the stabilizer within the electrolyte is about 10 g/L to about 40 g/L. In some embodiments, the energy storage device has a gravimetric energy density of about 200 Wh/kg to about 800 Wh/kg. In some embodiments, the energy storage device has a volumetric energy density of about 400 Wh/L to about 1,600 Wh/L. In some embodiments, the energy storage device has a gravimetric power density of about 2.5 kW/kg to about 12 kW/kg. In some embodiments, the energy storage device has an internal resistance of about 1 mOhm to about 60 mOhm. In some embodiments, the energy storage device has a charge capacity percentage after about 10 minutes of about 23% to about 90%. In some embodiments, the energy storage device has a charge capacity of about 45 mAh to about 5,000 mAh.

Another aspect provided herein is a method of forming an electrode comprising: forming a first dispersion comprising a three-dimensional carbon additive, a first precursor to trivalent ions, a precursor to divalent ions, and a first solvent; forming a second dispersion comprising a second solvent and a conductive additive comprising a zero-dimensional carbon additive, a one-dimensional carbon additive, a two-dimensional carbon additive, a three-dimensional carbon additive, or any combination thereof; adding the second dispersion to the first dispersion to form a third dispersion; adding a reducing agent to the third dispersion; heating the third dispersion; cooling the third dispersion; centrifuging the third dispersion with a third solvent; drying the third dispersion; and depositing the dried third dispersion and a binder onto a current collector. In some embodiments, the three-dimensional carbon additive comprises graphite, carbon foam, activated carbon, graphene foam, carbon aerogel, graphene aerogel, porous carbon, an interconnected corrugated carbon-based network, or any combination thereof. In some embodiments, the zero-dimensional carbon additive comprises carbon black, acetylene black, or both. In some embodiments, the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the two-dimensional carbon additive comprises a nanosheet, a microsheet, a platelet, or any combination thereof. In some embodiments, the first precursor to trivalent ions comprises a metal salt. In some embodiments, the first precursor to trivalent ions comprises aluminum nitrate, aluminum acetate, aluminum chloride, aluminum sulfate, aluminum carbonate, aluminum bromide, bismuth nitrate, bismuth acetate, bismuth chloride, bismuth sulfate, bismuth carbonate, bismuth bromide, chromium nitrate, chromium acetate, chromium chloride, chromium sulfate, chromium carbonate, chromium bromide, iron nitrate, iron acetate, iron chloride, iron sulfate, iron carbonate, iron bromide, or any combination thereof. In some embodiments, the first precursor to trivalent ions comprises a powder, a liquid, a paste, a gel, a dispersion, or any combination thereof. In some embodiments, the precursor to divalent ions comprises a metal salt. In some embodiments, the precursor to divalent ions comprises zinc nitrate, zinc sulfate, zinc carbonate, zinc chloride, zinc bromide, barium nitrate, barium sulfate, barium carbonate, barium chloride, barium bromide, cadmium nitrate, cadmium sulfate, cadmium carbonate, cadmium chloride, cadmium bromide, calcium nitrate, calcium sulfate, calcium carbonate, calcium chloride, calcium bromide, cobalt nitrate, cobalt sulfate, cobalt carbonate, cobalt chloride, cobalt bromide, copper nitrate, copper sulfate, copper carbonate, copper chloride, copper bromide, iron nitrate, iron sulfate, iron carbonate, iron chloride, iron bromide, lead nitrate, lead sulfate, lead carbonate, lead chloride, lead bromide, magnesium nitrate, magnesium sulfate, magnesium carbonate, magnesium chloride, magnesium bromide, mercury nitrate, mercury sulfate, mercury carbonate, mercury chloride, mercury bromide, nickel nitrate, nickel sulfate, nickel carbonate, nickel chloride, nickel bromide, strontium nitrate, strontium sulfate, strontium carbonate, strontium chloride, strontium bromide, tin nitrate, tin sulfate, tin carbonate, tin chloride, tin bromide, or any combination thereof. In some embodiments, the reducing agent comprises urea, or any combination thereof. In some embodiments, the binder comprises a polymeric binder. In some embodiments, the polymeric binder comprises polyvinylidene fluoride, carboxymethyl cellulose, polyacrylic acid, polyethylene glycol, alginic acid, polypyrrole, polyaniline, poly(3,4-ethylenedioxythiophene), a sulfonated tetrafluoroethylene-based fluoropolymer-copolymer (Nafion®), polytetrafluoroethylene (Teflon®), polydopamine, polyvinylpyrrolidone, polyacrylonitrile, carbonyl β-cyclodextrin, or any combination thereof. In some embodiments, the current collector comprises a foam, a foil, a mesh, an aerogel, or any combination thereof. In some embodiments, the current collector comprises a copper-based current collector, a nickel-based current collector, a zinc-based current collector, a graphite-based current collector, a stainless steel-based current collector, a brass-based current collector, a bronze-based current collector, or any combination thereof. In some embodiments, a concentration by mass of the three-dimensional carbon additive within the first dispersion is about 1% to about 5%. In some embodiments, a concentration by mass of the first precursor to trivalent ions within the first dispersion is about 2% to about 8%. In some embodiments, a concentration by mass of the precursor to divalent ions within the first dispersion is about 5% to about 20%. In some embodiments, a concentration by mass of the conductive additive within the second dispersion is about 1% to about 5%. In some embodiments, a concentration by mass of the reducing agent within the third dispersion is about 4% to about 14%. In some embodiments, a concentration by mass of the three-dimensional carbon additive within the third dispersion is about 1% to about 5%. In some embodiments, a concentration by mass of the first precursor to trivalent ions within the third dispersion is about 5% to about 20%. In some embodiments, a concentration by mass of the precursor to divalent ions within the third dispersion is about 12% to about 48%. In some embodiments, a concentration by mass of the conductive additive within the third dispersion is about 1% to about 5%. In some embodiments, a concentration by mass of the reducing agent within the third dispersion is about 9% to about 36%. In some embodiments, a concentration by mass of the binder within the electrode is about 1% to about 50%. In some embodiments, the first solvent comprises water, N-methyl-2-pyrrolidone, acetone, ethanol, isopropanol, or any combination thereof. In some embodiments, the second solvent comprises water, N-methyl-2-pyrrolidone, acetone, ethanol, isopropanol, or any combination thereof. In some embodiments, the third solvent comprises water, N-methyl-2-pyrrolidone, acetone, ethanol, isopropanol, or any combination thereof. In some embodiments, the first dispersion further comprises a second precursor to trivalent ions. In some embodiments, the second precursor to trivalent ions comprises a metal salt. In some embodiments, the second precursor to trivalent ions comprises aluminum nitrate, aluminum acetate, aluminum chloride, aluminum sulfate, aluminum carbonate, aluminum bromide, bismuth nitrate, bismuth acetate, bismuth chloride, bismuth sulfate, bismuth carbonate, bismuth bromide, chromium nitrate, chromium acetate, chromium chloride, chromium sulfate, chromium carbonate, chromium bromide, iron nitrate, iron acetate, iron chloride, iron sulfate, iron carbonate, iron bromide, or any combination thereof. In some embodiments, a concentration by mass of the second precursor to trivalent ions within the third dispersion is about 4% to about 16%. In some embodiments, forming the first dispersion occurs in a vessel that is at least partially enclosed. In some embodiments, forming the first dispersion comprises: mixing the three-dimensional carbon additive and the first solvent; mixing the first precursor to trivalent ions into the three-dimensional carbon additive and the first solvent; and mixing the precursor to divalent ions into the first precursor to trivalent ions, the three-dimensional carbon additive, and the first solvent. In some embodiments, mixing the three-dimensional carbon additive and the first solvent occurs over a period of time of about 5 minutes to about 20 minutes. In some embodiments, mixing the first precursor to trivalent ions into the three-dimensional carbon additive and the first solvent occurs over a period of time of about 5 minutes to about 20 minutes. In some embodiments, mixing the first precursor to trivalent ions into the three-dimensional carbon additive and the first solvent comprises mixing the precursor to trivalent ions into the three-dimensional carbon additive and the first solvent in two or more portions. In some embodiments, mixing the precursor to divalent ions into the first precursor to trivalent ions, the three-dimensional carbon additive, and the first solvent occurs over a period of time of about 1 minute to about 10 minutes. In some embodiments, heating the third dispersion comprises heating the third dispersion at a first temperature for a first time period, heating the third dispersion at a second temperature for a second time period, and heating the third dispersion at a third temperature for a third time period. In some embodiments, heating the third dispersion comprises heating the third dispersion in an autoclave. In some embodiments, autoclave comprises a Teflon-lined stainless steel autoclave. In some embodiments, the first temperature is about 10° C. to about 50° C. In some embodiments, the second temperature is about 90° C. to about 360° C. In some embodiments, the third temperature is about 90° C. to about 360° C. In some embodiments, the first time period is about 15 minutes to about 60 minutes. In some embodiments, the second time period is about 600 minutes to about 2,400 minutes. In some embodiments, the third time period is about 15 minutes to about 60 minutes.

In some embodiments, cooling the third dispersion comprises cooling the third dispersion at a temperature of about −60° C. to about −200° C. In some embodiments, cooling the third dispersion comprises cooling the third dispersion at a temperature of about −60° C. to about 200° C. In some embodiments, centrifuging the third dispersion with a third solvent comprises: centrifuging the third dispersion with a primary third solvent for one or more periods of time; decanting a supernatant from the third dispersion; centrifuging the third dispersion with a secondary third solvent for one or more periods of time; and decanting the supernatant from the third dispersion. In some embodiments, centrifuging the third dispersion with the primary third solvent for one or more periods of time comprises centrifuging the third dispersion with the primary third solvent for three periods of about 3 minutes each. In some embodiments, centrifuging the third dispersion with the secondary third solvent for one or more periods of time comprises centrifuging the third dispersion with the secondary third solvent for two periods of about 3 minutes each. In some embodiments, the primary third solvent comprises water, N-methyl-2-pyrrolidone, acetone, ethanol, isopropanol, or any combination thereof. In some embodiments, the secondary third solvent comprises water, N-methyl-2-pyrrolidone, acetone, ethanol, isopropanol, or any combination thereof. In some embodiments, drying the third dispersion comprises drying the third dispersion at a temperature of about 25° C. to about 100° C. In some embodiments, drying the third dispersion comprises drying the third dispersion at a temperature for a period of time of about 10 minutes to about 60 minutes. In some embodiments, depositing the dried third dispersion and a binder onto a current collector comprises roll coating, slot die coating, film coating, doctor blade coating, or any combination thereof. In some embodiments, depositing the dried third dispersion and a binder onto a current collector comprises applying a consistent coating thickness to achieve a target loading mass of active electrode materials per unit area. In some embodiments, the method further comprises cutting the third dispersion applied on the current collector. In some embodiments, the method further comprises adding one or more metal tabs to an edge of the current collector. In some embodiments, adding the one or more metal tabs to the edge of the current collector comprises ultrasonic welding. In some embodiments, the method is not performed in a dry room or a clean room.

Another aspect provided herein is a method of forming an energy storage device, the method comprising: forming a first electrode; forming a second electrode; and stacking the first electrode, a separator, and the second electrode to form a pouch cell. In some embodiments, the method further comprises sealing the pouch cell. In some embodiments, sealing the pouch cell is performed by a heat sealer, a vacuum sealer, or any combination thereof. In some embodiments, the method further comprises adding an electrolyte to the pouch cell. In some embodiments, the method further comprises allowing the pouch cell to rest for a period of time of about 1 minute to about 10 minutes. In some embodiments, the method further comprises vacuum sealing of the pouch cell. In some embodiments, the method further comprises performing a formation cycle of the pouch cell in open air and at ambient temperature. In some embodiments, the method further comprises cutting the pouch cell, degassing the pouch cell, and resealing the pouch cell. In some embodiments, the method is not performed in a dry room or a clean room.

Another aspect provided herein is an energy charging and discharging device configured for parallel charging and series discharging, the device comprising: a first energy storage device having a negative terminal and a positive terminal; a second energy storage device having a negative terminal and a positive terminal; a third energy storage device having a negative terminal and a positive terminal; a switch configured: in a first position to connect the negative terminal of the first energy storage device with the positive terminal of the third energy storage device and connect the positive terminal of the first energy storage device with the negative terminal of the second energy storage device; in a second position to connect the negative terminal of the first energy storage device with the negative terminal of the second energy storage device, connect the positive terminal of the first energy storage device with the positive terminal of the second energy storage device, and connect the negative terminal of the first energy storage device with the positive terminal of the second energy storage device and the positive terminal of the third energy storage device; wherein at least one of the first energy storage device, the second energy storage device, or the third energy storage device comprises an energy storage device comprising: a first electrode comprising: a graphene sheet; a layered double hydroxide coupled to the graphene sheet; a binder; a conductive additive; and a first current collector; and a second electrode comprising: a hydroxide; and a second current collector; a separator; and an electrolyte. In some embodiments, the switch comprises two or more switches. In some embodiments, the switch comprises a double-pull double-throw switch.

In another aspect, disclosed herein is an electrode comprising: a graphene sheet; a layered double hydroxide coupled to the graphene sheet; a binder; a conductive additive; and a current collector. In some embodiments, the graphene sheet comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the graphene sheet comprises a nanosheet, a microsheet, a platelet, or any combination thereof.

In some embodiments, the layered double hydroxide comprises a metallic layered double hydroxide comprising an aluminum-based layered double hydroxide, a barium-based layered double hydroxide, a bismuth-based layered double hydroxide, a cadmium-based layered double hydroxide, calcium-based layered double hydroxide, a chromium-based layered double hydroxide, cobalt-based layered double hydroxide, a copper-based layered double hydroxide, an indium-based layered double hydroxide, an iron-based layered double hydroxide, a lead-based layered double hydroxide, a manganese-based layered double hydroxide, a mercury-based layered double hydroxide, a nickel-based layered double hydroxide, a strontium-based layered double hydroxide, a tin-based layered double hydroxide, a zinc-based layered double hydroxide, or any combination thereof. In some embodiments, the layered double hydroxide comprises an $M^{2+}$ metal cation, an $M^{3+}$ metal cation, a hydroxide ion, an octahedral site with a trivalent metal cation, an octahedral site with a divalent metal cation, a water molecule, an anion, or any combination thereof. In some embodiments, the $M^{2+}$ metal cation comprises barium, cadmium, calcium, cobalt, copper (II), iron (II), lead (II), magnesium, mercury (I), mercury (II), nickel, strontium, tin, zinc, or any combination thereof. In some embodiments, the $M^{3+}$ metal cation comprises aluminum, bismuth, chromium (III), iron (III), or any combination thereof. In some embodiments, the anion comprises nitrate, sulfate, carbonate, chloride, bromide, or any combination thereof. In some embodiments, the binder comprises a polymeric binder. In some embodiments, the polymeric binder comprises polyvinylidene fluoride, carboxymethyl cellulose, polyacrylic acid, polyethylene glycol, alginic acid, polypyrrole, polyaniline, poly(3,4-ethylenedioxythiophene), a sulfonated tetrafluoroethylene-based fluoropolymer-copolymer (Nafion®, polytetrafluoroethylene (Teflon®, polydopamine, polyvinylpyrrolidone, polyacrylonitrile, carbonyl β-cyclodextrin, or any combination thereof. In some embodiments, the conductive additive comprises a zero-dimensional carbon additive, a one-dimensional carbon additive, a two-dimensional carbon additive, a three-dimensional carbon additive, or any combination thereof. In some embodiments, the zero-dimensional carbon additive comprises carbon black, acetylene black, or both. In some embodiments, the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the two-dimensional carbon additive comprises a nanosheet, a microsheet, a platelet, or any combination thereof. In some embodiments, the three-dimensional carbon additive comprises graphite, carbon foam, activated carbon, graphene foam, carbon aerogel, graphene aerogel, porous carbon, a buckminsterfullerene, an interconnected corrugated carbon-based network, or any combination thereof. In some embodiments, the current collector comprises a foam, a foil, a mesh, an aerogel, or any combination thereof. In some embodiments, the current collector comprises a copper-based current collector, a nickel-based current collector, a zinc-based current collector, a graphite-based current collector, a stainless steel-based current collector, a brass-based current collector, a bronze-based current collector, or any combination thereof. In some embodiments, a concentration by mass, by volume, or both of the graphene sheet in the first electrode is about 0.1% to about 10%. In some embodiments, a concentration by mass, by volume, or both of the layered double hydroxide in the first electrode is about 1% to about 80%. In some embodiments, a concentration by mass, by volume, or both of the binder in the first electrode is about 1% to about 20%. In some embodiments, a concentration by mass, by volume, or both of the conductive additive in the first electrode is about 1% to about 30%.

Another aspect provided herein is a method of fabricating battery electrodes comprising: providing electrode materials comprising: a layered double hydroxide composite; electrically conductive additives; and a polymer binder; mixing the electrode materials to form a slurry; providing an electrically conductive current collector substrate; cooling the slurry; centrifuging the slurry; drying the slurry; and applying the slurry to the electrically conductive current collector substrate to form an electrode. In some embodiments, the electrode materials include a conductive three-dimensional network of layered double hydroxide graphene composites. In some embodiments, the electrically conductive current collector substrate is zinc. In some embodiments, the method further includes stacking two electrodes separated by a battery electrode separator to form a pouch cell. In some embodiments, the pouch cell is fabricated in open air at an ambient temperature between 65° F. and 85° F. In some embodiments, a hybrid battery is constructed using the methods herein has an energy density from at least 250 Wh/kg to 425 Wh/kg and an energy density from about 600 Wh/L to 850 Wh/L. In some embodiments, a hybrid battery constructed using the methods herein has an energy density of from about 250 Wh/kg to 425 Wh/kg and a power density about 3.5 kW/kg to 5 kW/kg.

Those skilled in the art will appreciate the scope of the present disclosure and realize additional aspects thereof after reading the following detailed description in association with the accompanying drawings.

BRIEF DESCRIPTION OF THE DRAWINGS

The features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Energy storage devices, such as lithium-ion batteries, are widely used as energy storage devices in electronics. Although lithium-ion batteries exhibit high energy densities, such devices often exhibit low power densities, typically below 3 kW/kg, and high recharging times on the order of hours. Furthermore, lithium-ion batteries are flammable and suffer from induced ignition from overcharging and electrolyte breakdown. Such ignition is often caused by damage to the separator, which short circuits the battery. Separator damage may be induced by battery temperatures above its melting point or through impact. Furthermore, overcharging such lithium storage devices causes the lithium cobalt oxide therein to emit oxygen, which can react with the lithium cobalt oxide or the electrolyte, thereby increasing its resistance and generating sufficient heat to spark ignition. Additionally, overcharging lithium batteries breaks down and expands the organic molecules within the electrolyte, which can lead to explosion and leakage of the highly flammable electrolyte within.

As such, there is a long felt and unmet need for safe and powerful energy storage devices that are lightweight, structurally flexible, and exhibit high power densities, high energy densities, and extended cycle life spans. Furthermore, there is a current unmet need for electrode and electrolyte materials configured to store a large amount of energy in a short time and to slowly and controllably release the energy for use in an electronic device.

Comparison of Energy Storage Devices

Figure 1:
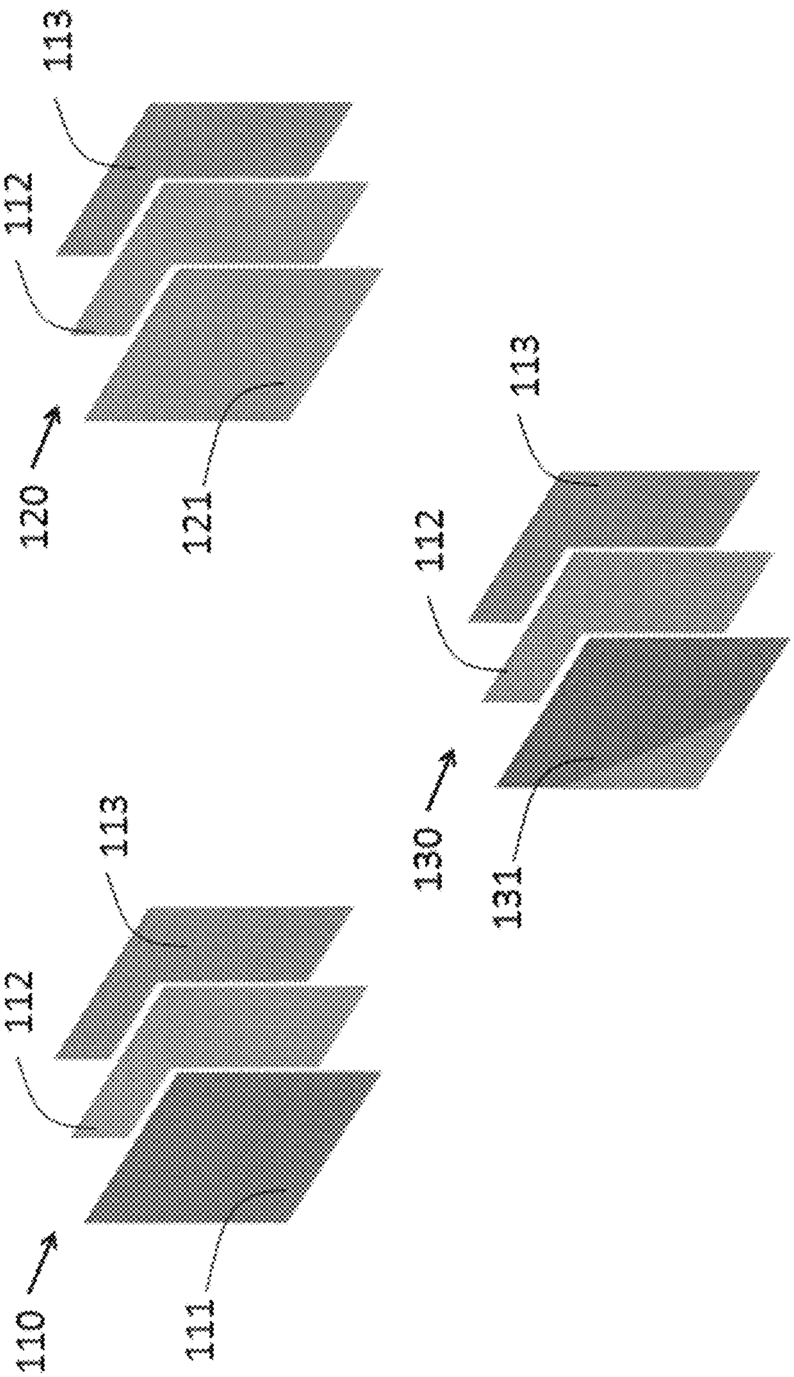
FIG. 1 shows an illustration of the components of a battery, a supercapacitor, and the energy storage device of the present disclosure, in accordance with an embodiment herein.

Provided herein, per FIG. 1, is a hybrid supercapacitor 130 that employs components of, and exhibits the characteristics of, both batteries 110 and supercapacitors 120. As shown, in some embodiments, the battery 110 comprises an oxidation-reduction (redox) active negative electrode 111, a separator 112, and a positive electrode 113. As shown, in some embodiments, the supercapacitor 120 comprises a surface charge storage negative electrode 121, a separator 112, and a positive electrode 113. Furthermore, as shown, the hybrid supercapacitor 130 comprises a hybrid negative electrode 131 comprising redox active materials and surface charge storage materials, a separator 112, and a positive electrode 113. In some embodiments, the hybrid supercapacitor 130 is termed a hybrid energy storage device, combining battery chemistry with a supercapacitor in a single device.

Figure 2:
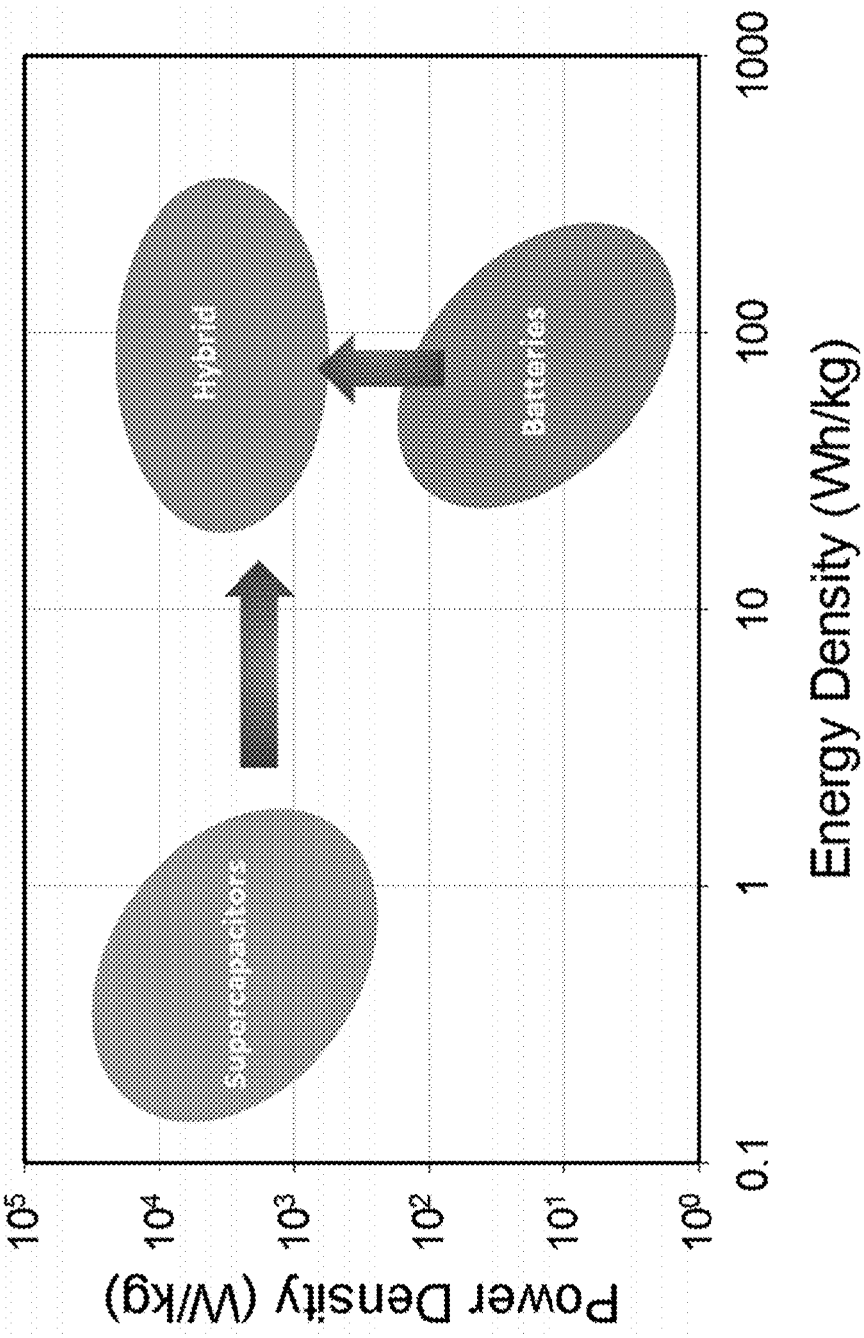
FIG. 2 shows a graph comparing the gravimetric power densities and gravimetric energy densities of supercapacitors, batteries, and the hybrid energy storage devices herein, in accordance with an embodiment herein.

FIG. 2 shows a graph comparing the gravimetric power densities and gravimetric energy densities of supercapacitors, batteries, and the hybrid energy storage devices herein.

Figure 3A:
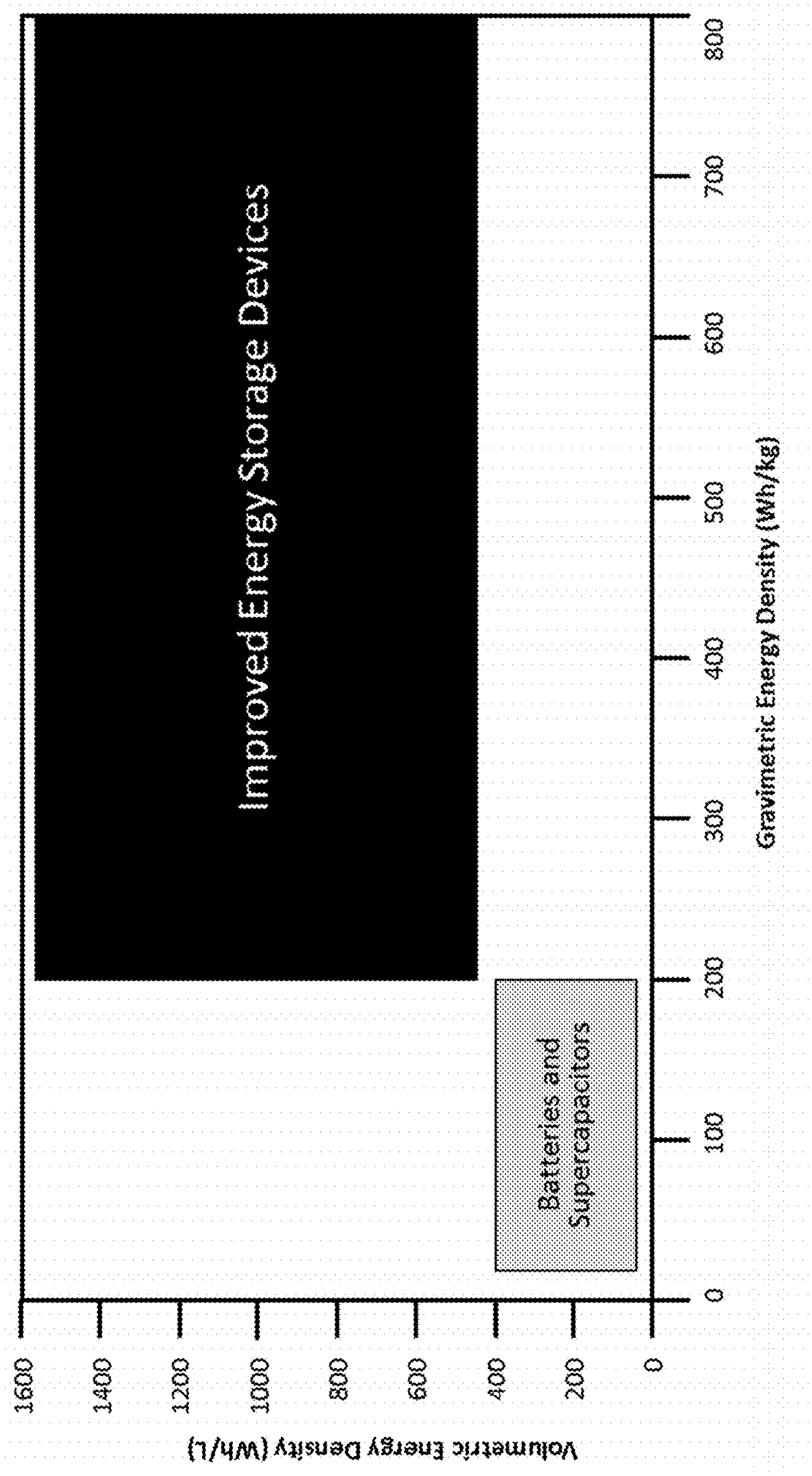
FIG. 3A shows a graph comparing the volumetric energy densities and gravimetric energy densities of supercapacitors, batteries, and the disclosed energy storage devices herein, in accordance with an embodiment herein.
Figure 3B:
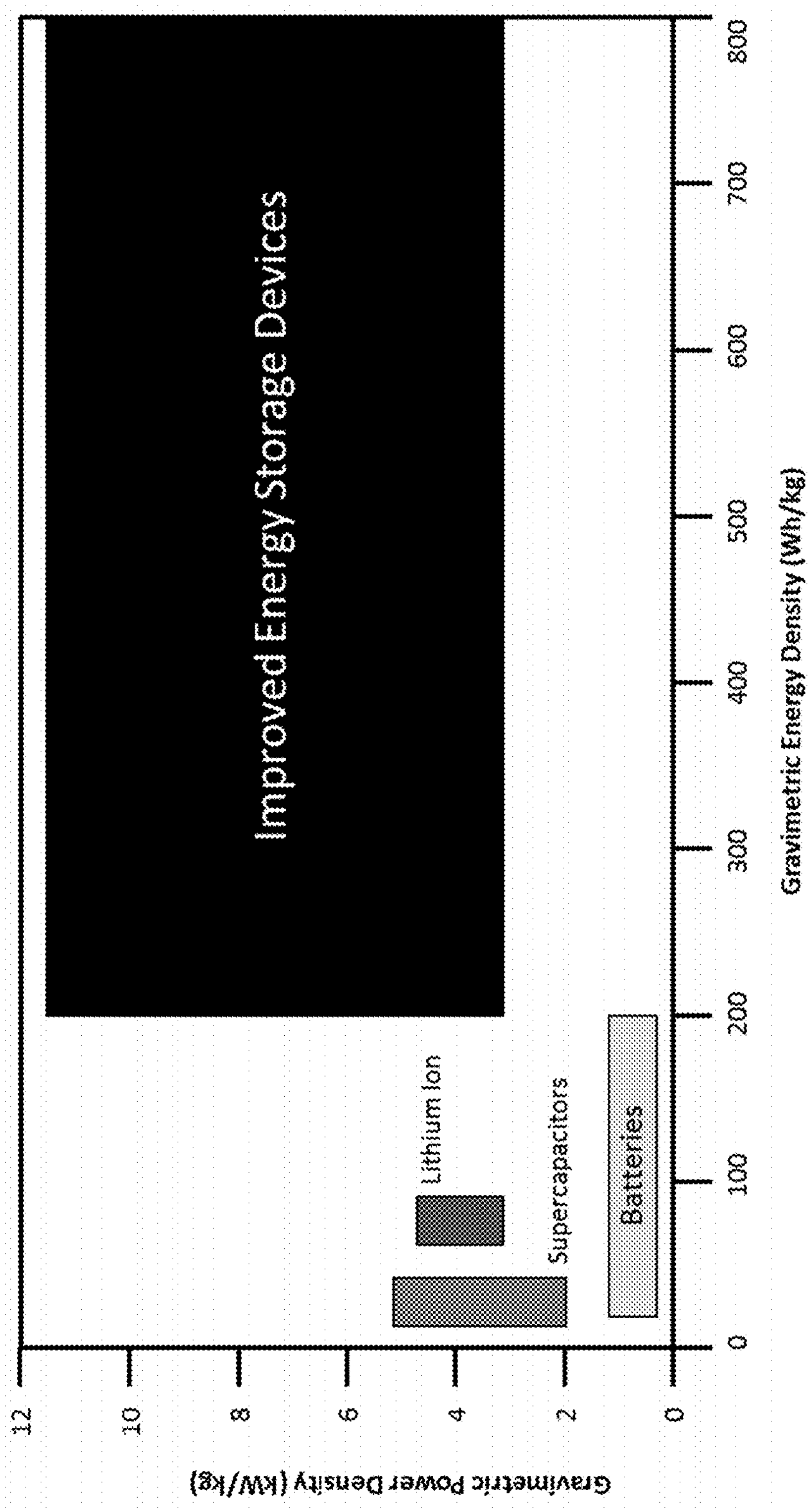
FIG. 3B shows a graph comparing the gravimetric power densities and gravimetric energy densities of supercapacitors, batteries, and the disclosed energy storage devices herein, in accordance with an embodiment herein.

FIG. 3A shows a graph comparing the volumetric energy densities and gravimetric energy densities of supercapacitors, batteries, and the hybrid energy storage devices herein. FIG. 3B shows a graph comparing the gravimetric power densities and gravimetric energy densities of supercapacitors, batteries, and the hybrid energy storage devices herein. Energy storage devices with higher gravimetric energy densities and volumetric energy densities store a greater amount of energy and power an electronic device for a greater amount of time. Gravimetric energy density is measured in units of energy/mass (e.g., watt-hours per kilogram [Wh/kg]). Volumetric energy density is measured in units of energy/volume (e.g., watt-hours per liter [Wh/L]). In some embodiments, the gravimetric energy density of an energy storage device is measured as a gravimetric energy density of an entire cell including non-active materials. In some embodiments, the gravimetric energy density of an energy storage device is measured as a gravimetric energy density of only active materials in the electrodes. Alternatively, in some embodiments, the gravimetric energy density of an energy storage device is measured by any standard means. In some embodiments, the volumetric energy density of an energy storage device is measured as a volumetric energy density of an entire cell including non-active materials. In some embodiments, the volumetric energy density of an energy storage device is measured as a volumetric energy density of only active materials. Alternatively, in some embodiments, the volumetric energy density of an energy storage device is measured by any standard means.

Energy storage devices with higher gravimetric power densities and volumetric power densities recharge faster. Gravimetric power density is measured in units of power/mass (e.g., watts per kilogram [W/kg]). Volumetric power density is measured in units of power/volume (e.g., watts per liter [W/L]). In some embodiments, the gravimetric power density of an energy storage device is measured as a gravimetric power density of an entire cell including non-active materials. In some embodiments, the gravimetric power density of an energy storage device is measured as a gravimetric power density of only active materials in the electrodes. Alternatively, in some embodiments, the gravimetric power density of an energy storage device is measured by any standard means. In some embodiments, the volumetric power density of an energy storage device is measured as a volumetric power density of an entire cell including non-active materials. In some embodiments, the volumetric power density of an energy storage device is measured as a volumetric power density of only active materials. In some embodiments, the power density, the energy density, or both of an energy storage device is measured as an average among multiple energy storage device samples. Alternatively, in some embodiments, the volumetric power density of an energy storage device is measured by any standard means.

As shown in FIG. 2, while supercapacitors have a high power densities (e.g., about 500 W/kg to about 50,000 W/kg) and are quickly charged, in some embodiments their low energy density (e.g., about 0.1 Wh/kg to about 2 Wh/kg) prevents such devices from being used in commercial electric devices. As shown, batteries have a low power density (e.g., about 1 W/kg to about 150 W/kg) and thus charge slowly but are capable of storing large quantities of energy through their high energy density (e.g., about 20 Wh/kg to about 200 Wh/kg). However, energy storage devices disclosed herein exhibit both high energy densities similar to current batteries and high power densities similar to current supercapacitors, thus enabling their fast charging capabilities.

As shown per FIGS. 3A and 3B, while the highest gravimetric energy density for current batteries is about 200 Wh/kg, for current supercapacitors is about 25 Wh/kg, and for current lithium-ion energy storage devices is about 100 Wh/kg, embodiments of the energy storage devices disclosed herein are capable of achieving gravimetric energy densities of up to about 800 Wh/kg. Furthermore, while the highest volumetric energy density for current battery storage devices is about 400 Wh/L, embodiments of the energy storage devices disclosed herein are capable of achieving volumetric energy densities of up to about 1,600 Wh/L. Additionally, while the highest gravimetric power density for current batteries is about 1 kW/kg, for current supercapacitors is about 5 kW/kg, and for current lithium-ion energy storage devices is about 4.5 kW/kg, whereas embodiments of the energy storage devices disclosed herein are capable of achieving volumetric power densities of up to about 12 kW/kg. Thus, the structures, elements, and methods disclosed herein are capable of producing energy storage devices with significantly improved volumetric energy densities, gravimetric energy densities, and gravimetric power densities.

As such, the energy storage devices disclosed herein are able to both recharge quickly and store large quantities of energy. Thus, due to their improved energy storage capabilities, the devices herein can be used in a broad range of applications including, for example, consumer electronics, military equipment, and transportation.

Energy Storage Devices

Provided herein are energy storage devices. In some embodiments, the energy storage devices herein are hybrid supercapacitors. In some embodiments, the energy storage devices herein comprise a first electrode, a second electrode, a separator, and an electrolyte. In some embodiments, the first electrode comprises a graphene sheet, a layered double hydroxide (LDH), a binder, a conductive additive, and a first current collector. In some embodiments, the second electrode comprises a hydroxide and a second current collector. In some embodiments, the energy storage devices herein stores charge electrostatically. In some embodiments, the energy storage devices herein stores charge electrochemically. In some embodiments, the energy storage devices herein stores charge electrostatically and electrochemically. The energy devices herein exhibit superior electrochemical performance and can be manufactured at large scales and at low cost.

FIGS. 4, 5, 6A, and 6B show illustrations of a first energy storage device 400, a second energy storage device 500, a third energy storage device 600A, and a fourth energy storage device 600B. In some embodiments, the first energy storage device 400, the second energy storage device 500, the third energy storage device 600A, and the fourth energy storage device 600B comprise supercapacitor-battery hybrid energy storage systems that employ electric double layers in a high surface area carbon material and electrochemical reactions within the LDH.

Figure 4:
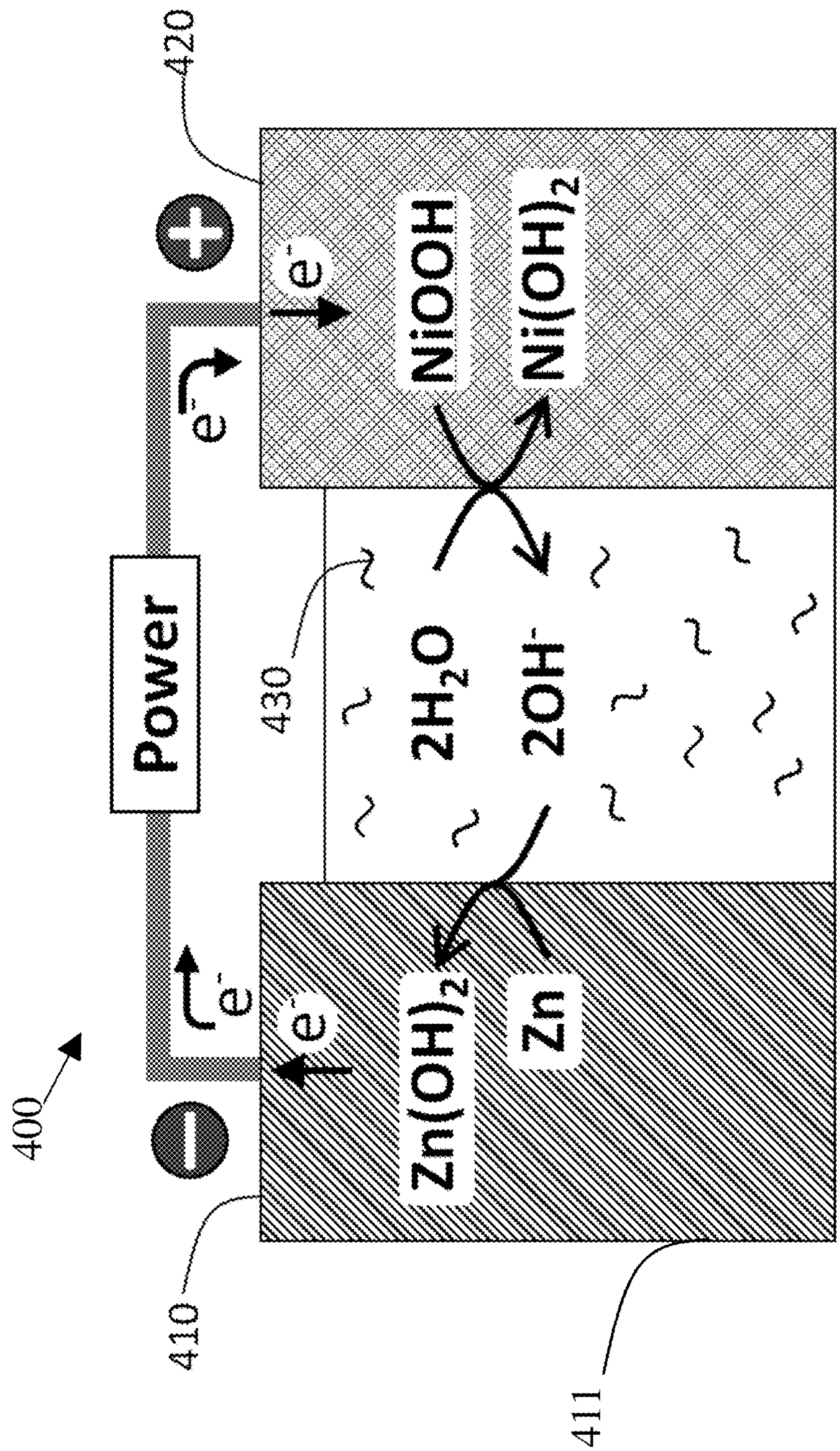
FIG. 4 shows a diagram of the components and chemical reactions in a first energy storage device, in accordance with an embodiment herein.

As shown in FIG. 4, the first energy storage device 400 comprises a primary first electrode 410, a second electrode 420, and an electrolyte 430. As shown, the primary first electrode 410 comprises a redox active material 411. Furthermore, as shown, the primary first electrode 410 is a negative electrode and the second electrode 420 is a positive electrode. Alternatively, the primary first electrode 410 is a positive electrode and the second electrode 420 is a negative electrode. In some embodiments, at least one of the primary first electrode 410 and the second electrode 420 comprises a current collector. In some embodiments, the first energy storage device 400 further comprises a separator. In some embodiments, the electrolyte 430 is absorbed within the separator. In some embodiments, the separator prevents contact between the primary first electrode 410 and the second electrode 420.

Figure 5:
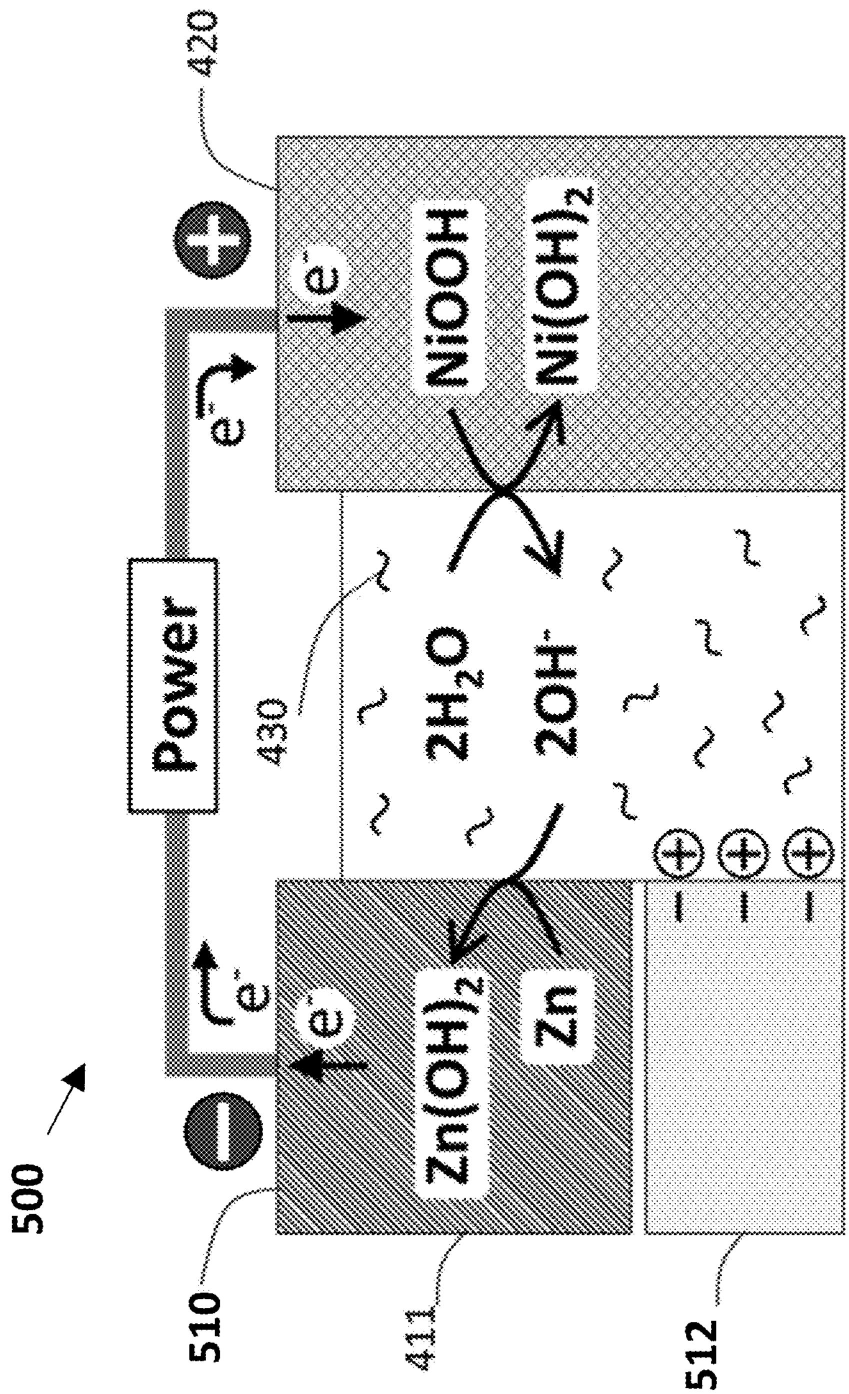
FIG. 5 shows a diagram of the components and chemical reactions in a second energy storage device, in accordance with an embodiment herein.

As shown in FIG. 5, the second energy storage device 500 comprises a secondary first electrode 510, a second electrode 420, and an electrolyte 430. In some embodiments, the secondary first electrode 510 is a hybrid electrode that acts as both a battery and a supercapacitor electrode. As shown, the secondary first electrode 510 is a negative electrode and the second electrode 420 is a positive electrode. Alternatively, the secondary first electrode 510 is a positive electrode and the second electrode 420 is a negative electrode. In some embodiments, the second energy storage device 500 further comprises a separator. In some embodiments, the electrolyte 430 is absorbed within the separator. In some embodiments, the separator prevents contact between the secondary first electrode 510 and the second electrode 420.

In some embodiments, the secondary first electrode 510 comprises a redox active material 411 and a capacitive material 512. As shown, a first portion of the secondary first electrode 510 comprises the redox active material 411, and a second portion of the secondary first electrode 510 comprises the capacitive material 512. As shown, the redox active material 411 and the capacitive material 512 of the secondary first electrode 510 of the second energy storage device 500 are connected in series. In some embodiments, at least one of the secondary first electrode 510 and the second electrode 420 comprises a current collector. In some embodiments, the first portion of the current collector of the secondary first electrode 510 is coated with the redox active material 411, and the second portion of the current collector is coated with the capacitive material 512. In some embodiments, the first portion of the current collector of the secondary first electrode 510 is coated with a slurry comprising the redox active material 411, and the second portion of the current collector is coated with a slurry comprising the capacitive material 512. As shown, the first portion having the redox active material 411 and the second portion having the capacitive material 512 are connected in series.

In some embodiments, the electrochemical performance of the second energy storage device 500 can be tuned by adjusting a ratio by mass, by volume, by surface area, or any combination thereof between the first portion and the second portion of the secondary first electrode 510. In some embodiments, the electrochemical performance of the second energy storage device 500 can be tuned by adjusting a ratio between the redox active material 411 and the capacitive material 512 of the secondary first electrode 510. In some embodiments, the energy density of the second energy storage device 500 can be tuned by adjusting a ratio by mass, by volume, by surface area, or any combination thereof between the first portion and the second portion of the secondary first electrode 510. In some embodiments, the energy density of the second energy storage device 500 can be tuned by adjusting a ratio between the redox active material 411 and the capacitive material 512 of the secondary first electrode 510. In some embodiments, the power density of the second energy storage device 500 can be tuned by adjusting a ratio by mass, by volume, by surface area, or any combination thereof between the first portion and the second portion of the secondary first electrode 510. In some embodiments, power density of the second energy storage device 500 can be tuned by adjusting a ratio between the redox active material 411 and the capacitive material 512 of the secondary first electrode 510. In some embodiments, the internal resistance of the second energy storage device 500 can be tuned by adjusting a ratio by mass, by volume, by surface area, or any combination thereof between the first portion and the second portion of the secondary first electrode 510. In some embodiments, internal resistance of the second energy storage device 500 can be tuned by adjusting a ratio between the redox active material 411 and the capacitive material 512 of the secondary first electrode 510. In some embodiments, the charging and/or discharging times of the second energy storage device 500 can be tuned by adjusting a ratio by mass, by volume, by surface area, or any combination thereof between the first portion and the second portion of the secondary first electrode 510. In some embodiments, charging and/or discharging times of the second energy storage device 500 can be tuned by adjusting a ratio between the redox active material 411 and the capacitive material 512 of the secondary first electrode 510.

In some embodiments, increasing the ratio between the first portion and the second portion of the secondary first electrode 510 increases the energy density of the second energy storage device 500. In some embodiments, decreasing the ratio between the first portion and the second portion of the secondary first electrode 510 decreases the energy density of the second energy storage device 500. In some embodiments, increasing the ratio between the redox active material 411 and the capacitive material 512 of the secondary first electrode 510 increases the energy density of the second energy storage device 500. In some embodiments, decreasing the ratio between the redox active material 411 and the capacitive material 512 of the secondary first electrode 510 decreases the energy density of the second energy storage device 500. In some embodiments, increasing the ratio between the first portion and the second portion of the secondary first electrode 510 decreases the power density of the second energy storage device 500. In some embodiments, decreasing the ratio between the first portion and the second portion of the secondary first electrode 510 increases the power density of the second energy storage device 500. In some embodiments, increasing the ratio between the redox active material 411 and the capacitive material 512 of the secondary first electrode 510 decreases the power density of the second energy storage device 500. In some embodiments, decreasing the ratio between the redox active material 411 and the capacitive material 512 of the secondary first electrode 510 increases the power density of the second energy storage device 500. In some embodiments, increasing the ratio between the first portion and the second portion of the secondary first electrode 510 decreases the internal resistance of the second energy storage device 500.

In some embodiments, decreasing the ratio between the first portion and the second portion of the secondary first electrode 510 increases the internal resistance of the second energy storage device 500. In some embodiments, increasing the ratio between the redox active material 411 and the capacitive material 512 of the secondary first electrode 510 decreases the internal resistance of the second energy storage device 500. In some embodiments, decreasing the ratio between the redox active material 411 and the capacitive material 512 of the secondary first electrode 510 increases the internal resistance of the second energy storage device 500. In some embodiments, increasing the ratio between the first portion and the second portion of the secondary first electrode 510 decreases the charging and/or discharging times of the second energy storage device 500. In some embodiments, decreasing the ratio between the first portion and the second portion of the secondary first electrode 510 increases the charging and/or discharging times of the second energy storage device 500. In some embodiments, increasing the ratio between the redox active material 411 and the capacitive material 512 decreases the charging and/or discharging times of the second energy storage device 500. In some embodiments, decreasing the ratio between the redox active material 411 and the capacitive material 512 increases the charging and/or discharging times of the second energy storage device 500.

Figure 6A:
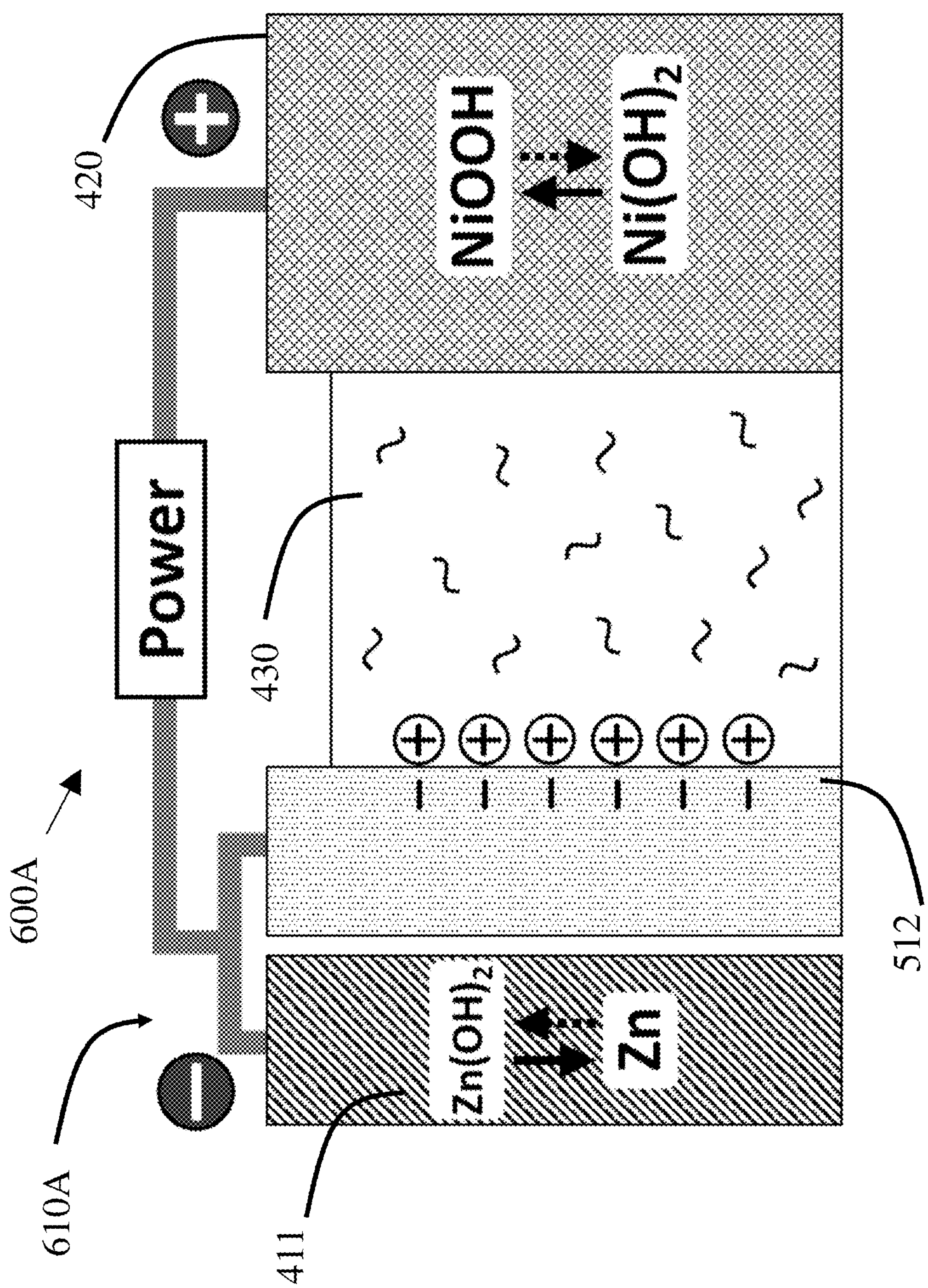
FIG. 6A shows a diagram of the components and chemical reactions in a third energy storage device, in accordance with an embodiment herein.

As shown in FIG. 6A, the third energy storage device 600A comprises a tertiary first electrode 610A, a second electrode 420, and an electrolyte 430. In some embodiments, the tertiary first electrode 610A is a hybrid electrode that acts as both a battery and a supercapacitor electrode. As shown, the tertiary first electrode 610A is a negative electrode and the second electrode 420 is a positive electrode. Alternatively, the tertiary first electrode 610A is a positive electrode and the second electrode 420 is a negative electrode. In some embodiments, the third energy storage device 600A further comprises a separator. In some embodiments, the electrolyte 430 is absorbed within the separator. In some embodiments, the separator prevents contact between the tertiary first electrode 610A and the second electrode 420.

In some embodiments, the tertiary first electrode 610A comprises a redox active material 411 and a capacitive material 512. As shown, a first portion of the tertiary first electrode 610A comprises the redox active material 411, and a second portion of the tertiary first electrode 610A comprises the capacitive material 512. As shown, the redox active material 411 and the capacitive material 512 of the tertiary first electrode 610A of the third energy storage device 600A are connected in parallel. In some embodiments, at least one of the tertiary first electrode 610A and the second electrode 420 comprises a current collector. In some embodiments, the first portion of the current collector of the tertiary first electrode 610A is coated with the redox active material 411, and the second portion of the current collector is coated with the capacitive material 512. In some embodiments, the first portion of the current collector of the tertiary first electrode 610A is coated with a slurry comprising the redox active material 411, and the second portion of the current collector is coated with a slurry comprising the capacitive material 512. As shown, the first portion having the redox active material 411 and the second portion having the capacitive material 512 are connected in parallel.

In some embodiments, the electrochemical performance of the third energy storage device 600A can be tuned by adjusting a ratio by mass, by volume, by surface area, or any combination thereof between the first portion and the second portion of the tertiary first electrode 610A. In some embodiments, the electrochemical performance of the third energy storage device 600A can be tuned by adjusting a ratio between the redox active material 411 and the capacitive material 512 of the tertiary first electrode 610A. In some embodiments, the energy density of the third energy storage device 600A can be tuned by adjusting a ratio by mass, by volume, by surface area, or any combination thereof between the first portion and the second portion of the tertiary first electrode 610A. In some embodiments, energy density of the third energy storage device 600A can be tuned by adjusting a ratio between the redox active material 411 and the capacitive material 512 of the tertiary first electrode 610A. In some embodiments, the power density of the third energy storage device 600A can be tuned by adjusting a ratio by mass, by volume, by surface area, or any combination thereof between the first portion and the second portion of the tertiary first electrode 610A. In some embodiments, power density of the third energy storage device 600A can be tuned by adjusting a ratio between the redox active material 411 and the capacitive material 512 of the tertiary first electrode 610A. In some embodiments, the internal resistance of the third energy storage device 600A can be tuned by adjusting a ratio by mass, by volume, by surface area, or any combination thereof between the first portion and the second portion of the tertiary first electrode 610A. In some embodiments, internal resistance of the third energy storage device 600A can be tuned by adjusting a ratio between the redox active material 411 and the capacitive material 512 of the tertiary first electrode 610A. In some embodiments, the charging and/or discharging times of the third energy storage device 600A can be tuned by adjusting a ratio by mass, by volume, by surface area, or any combination thereof between the first portion and the second portion of the tertiary first electrode 610A. In some embodiments, charging and/or discharging times of the third energy storage device 600A can be tuned by adjusting a ratio between the redox active material 411 and the capacitive material 512 of the tertiary first electrode 610A.

In some embodiments, increasing the ratio between the first portion and the second portion of the tertiary first electrode 610A increases the energy density of the third energy storage device 600A. In some embodiments, decreasing the ratio between the first portion and the second portion of the tertiary first electrode 610A decreases the energy density of the third energy storage device 600A. In some embodiments, increasing the ratio between the redox active material 411 and the capacitive material 512 of the tertiary first electrode 610A increases the energy density of the third energy storage device 600A. In some embodiments, decreasing the ratio between the redox active material 411 and the capacitive material 512 of the tertiary first electrode 610A decreases the energy density of the third energy storage device 600A. In some embodiments, increasing the ratio between the first portion and the second portion of the tertiary first electrode 610A decreases the power density of the third energy storage device 600A. In some embodiments, decreasing the ratio between the first portion and the second portion of the tertiary first electrode 610A increases the power density of the third energy storage device 600A. In some embodiments, increasing the ratio between the redox active material 411 and the capacitive material 512 of the tertiary first electrode 610A decreases the power density of the third energy storage device 600A. In some embodiments, decreasing the ratio between the redox active material 411 and the capacitive material 512 of the tertiary first electrode 610A increases the power density of the third energy storage device 600A. In some embodiments, increasing the ratio between the first portion and the second portion of the tertiary first electrode 610A decreases the internal resistance of the third energy storage device 600A. In some embodiments, decreasing the ratio between the first portion and the second portion of the tertiary first electrode 610A increases the internal resistance of the third energy storage device 600A. In some embodiments, increasing the ratio between the redox active material 411 and the capacitive material 512 of the tertiary first electrode 610A decreases the internal resistance of the third energy storage device 600A. In some embodiments, decreasing the ratio between the redox active material 411 and the capacitive material 512 of the tertiary first electrode 610A increases the internal resistance of the third energy storage device 600A. In some embodiments, increasing the ratio between the first portion and the second portion decreases the charging and/or discharging times of the third energy storage device 600A. In some embodiments, decreasing the ratio between the first portion and the second portion increases the charging and/or discharging times of the third energy storage device 600A. In some embodiments, increasing the ratio between the redox active material 411 and the capacitive material 512 decreases the charging and/or discharging times of the third energy storage device 600A. In some embodiments, decreasing the ratio between the redox active material 411 and the capacitive material 512 increases the charging and/or discharging times of the third energy storage device 600A.

Figure 6B:
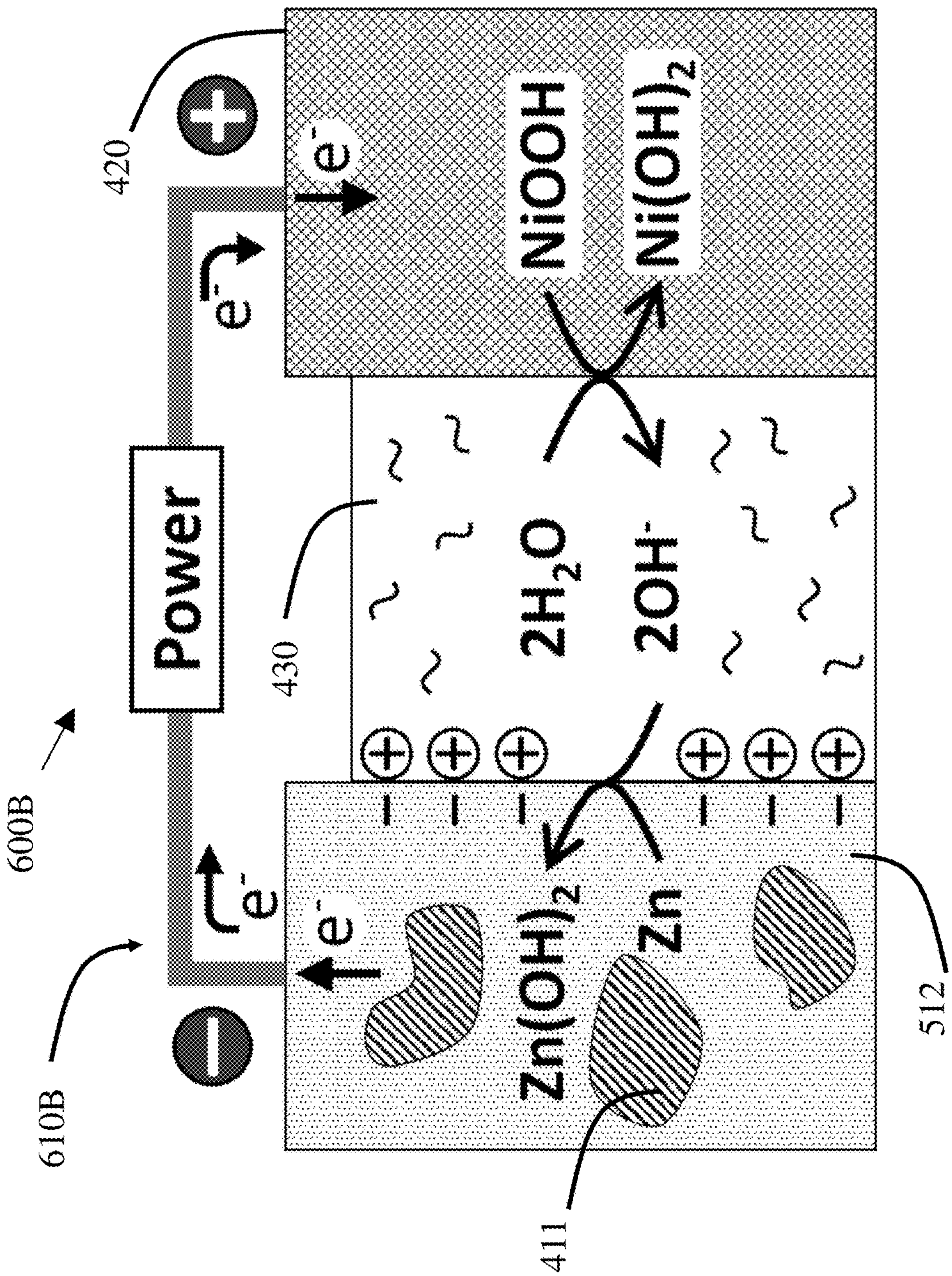
FIG. 6B shows a diagram of the components and chemical reactions in a fourth energy storage device, in accordance with an embodiment herein.
Figure 7A:
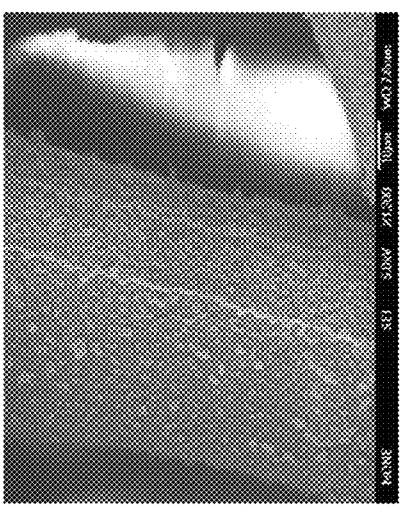
FIG. 7A shows a first scanning electron microscope (SEM) image of a nickel-cobalt layered double hydroxide (LDH) grown on a nickel foam substrate, in accordance with an embodiment herein.
Figure 7B:
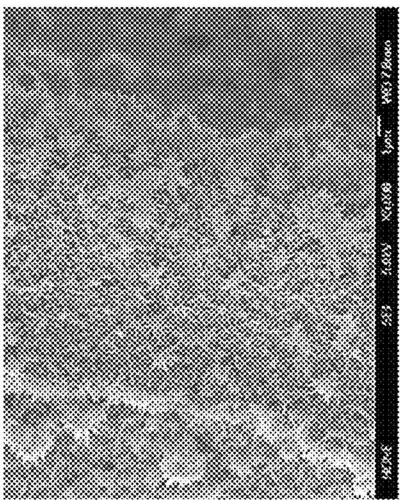
FIG. 7B shows a second SEM image of a nickel-cobalt LDH grown on a nickel foam substrate, in accordance with an embodiment herein.
Figure 7C:
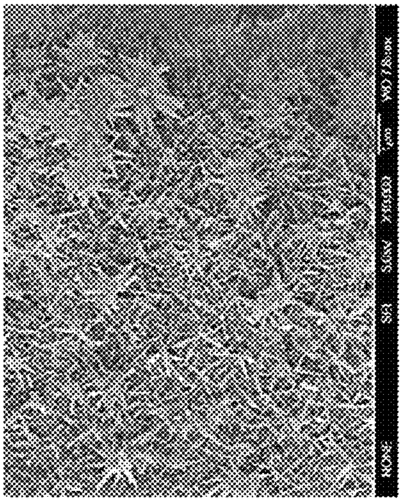
FIG. 7C shows a third SEM image of a nickel-cobalt LDH grown on a nickel foam substrate, in accordance with an embodiment herein.
Figure 7D:
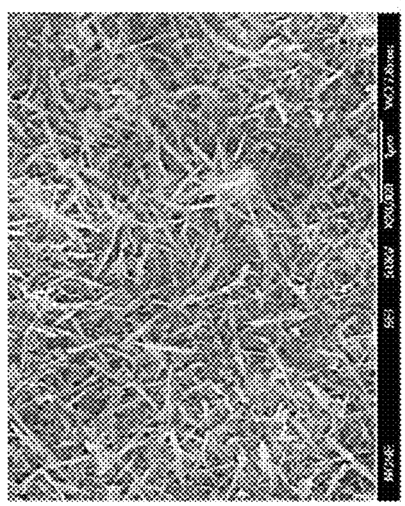
FIG. 7D shows a fourth SEM image of a nickel-cobalt LDH grown on a nickel foam substrate, in accordance with an embodiment herein.
Figure 7E:
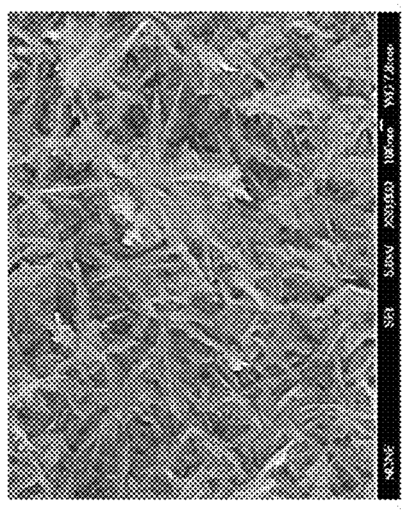
FIG. 7E shows a fifth SEM image of a nickel-cobalt LDH grown on a nickel foam, in accordance with an embodiment herein.
Figure 7F:
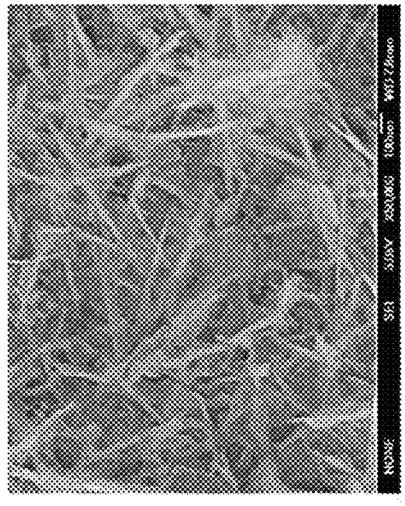
FIG. 7F shows a sixth SEM image of a nickel-cobalt LDH grown on a nickel foam substrate, in accordance with an embodiment herein.
Figure 8A:
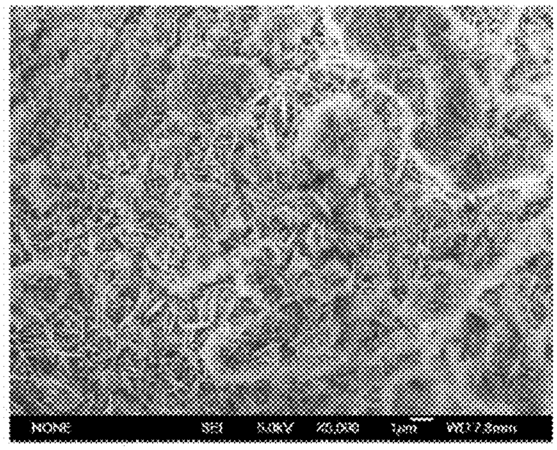
FIG. 8A shows a first SEM image of a nickel-cobalt LDH grown on a nickel foam substrate, in accordance with an embodiment herein.
Figure 8B:
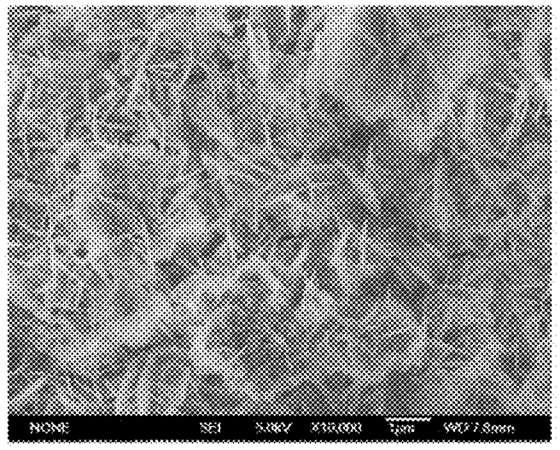
FIG. 8B shows a second SEM image of a nickel-cobalt LDH grown on a nickel foam, in accordance with an embodiment herein.
Figure 8C:
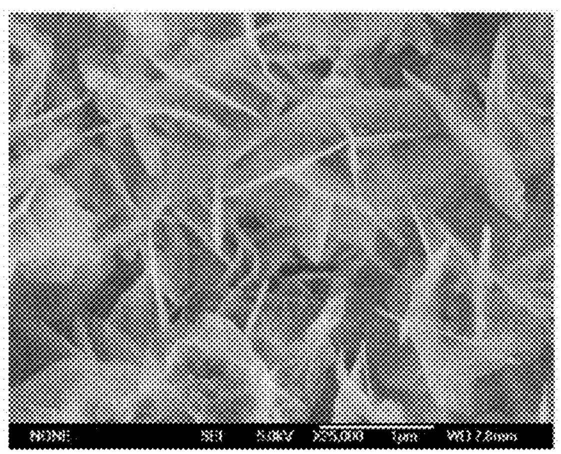
FIG. 8C shows a third SEM image of a nickel-cobalt LDH grown on a nickel foam substrate, in accordance with an embodiment herein.
Figure 8D:
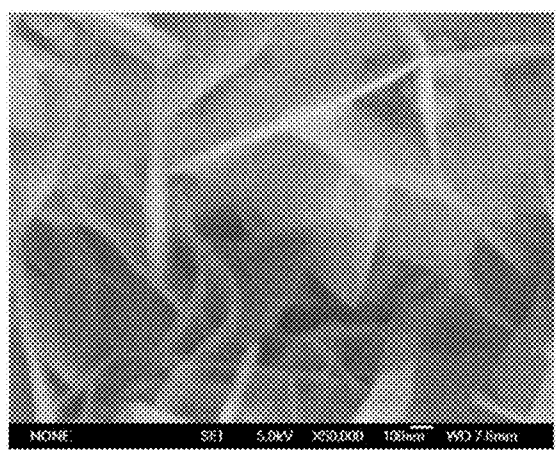
FIG. 8D shows a fourth SEM image of a nickel-cobalt LDH grown on a nickel foam substrate, in accordance with an embodiment herein.

As shown in FIG. 6B, a fourth energy storage device 600B comprises a quaternary first electrode 610B, a second electrode 420, and an electrolyte 430. In some embodiments, the quaternary first electrode 610B is a hybrid electrode that acts as both a battery and a supercapacitor electrode. As shown, the quaternary first electrode 610B is a negative electrode and the second electrode 420 is a positive electrode. Alternatively, the quaternary first electrode 610B is a positive electrode and the second electrode 420 is a negative electrode. In some embodiments, the fourth energy storage device 600B further comprises a separator. In some embodiments, the electrolyte 430 is absorbed within the separator. In some embodiments, the separator prevents contact between the quaternary electrode 610B and the second electrode 420.

In some embodiments, the quaternary first electrode 610B comprises a redox active material 411 and a capacitive material 512. As shown, a first portion of the quaternary first electrode 610B comprises the redox active material 411, and a second portion of the quaternary first electrode 610B comprises the capacitive material 512. As shown, the redox active material 411 and the capacitive material 512 of the quaternary first electrode 610B of the third energy storage device 600B are connected in parallel. In some embodiments, at least one of the quaternary first electrode 610B and the second electrode 420 comprises a current collector. In some embodiments, the first portion of the current collector of the quaternary first electrode 610B is coated with the redox active material 411, and the second portion of the current collector is coated with the capacitive material 512. As shown, the first portion having the redox active material 411 and the second portion having the capacitive material 512 are connected in parallel.

In some embodiments, the electrochemical performance of the fourth energy storage device 600B can be tuned by adjusting a ratio by mass, by volume, by surface area, or any combination thereof between the first portion and the second portion of the quaternary first electrode 610B. In some embodiments, the electrochemical performance of the fourth energy storage device 600B can be tuned by adjusting a ratio between the redox active material 411 and the capacitive material 512 of the quaternary first electrode 610B. In some embodiments, the energy density of the fourth energy storage device 600B can be tuned by adjusting a ratio by mass, by volume, by surface area, or any combination thereof between the first portion and the second portion of the quaternary first electrode 610B. In some embodiments, energy density of the fourth energy storage device 600B can be tuned by adjusting a ratio between the redox active material 411 and the capacitive material 512 of the quaternary first electrode 610B. In some embodiments, the power density of the fourth energy storage device 600B can be tuned by adjusting a ratio by mass, by volume, by surface area, or any combination thereof between the first portion and the second portion of the quaternary first electrode 610B. In some embodiments, power density of the fourth energy storage device 600B can be tuned by adjusting a ratio between the redox active material 411 and the capacitive material 512 of the quaternary first electrode 610B. In some embodiments, the internal resistance of the fourth energy storage device 600B can be tuned by adjusting a ratio by mass, by volume, by surface area, or any combination thereof between the first portion and the second portion of the quaternary first electrode 610B. In some embodiments, internal resistance of the fourth energy storage device 600B can be tuned by adjusting a ratio between the redox active material 411 and the capacitive material 512 of the quaternary first electrode 610B. In some embodiments, the charging and/or discharging times of the fourth energy storage device 600B can be tuned by adjusting a ratio by mass, by volume, by surface area, or any combination thereof between the first portion and the second portion of the quaternary first electrode 610B. In some embodiments, charging and/or discharging times of the fourth energy storage device 600B can be tuned by adjusting a ratio between the redox active material 411 and the capacitive material 512 of the quaternary first electrode 610B.

In some embodiments, increasing the ratio between the first portion and the second portion of the quaternary first electrode 610B increases the energy density of the fourth energy storage device 600B. In some embodiments, decreasing the ratio between the first portion and the second portion of the quaternary first electrode 610B decreases the energy density of the fourth energy storage device 600B. In some embodiments, increasing the ratio between the redox active material 411 and the capacitive material 512 of the quaternary first electrode 610B increases the energy density of the fourth energy storage device 600B. In some embodiments, decreasing the ratio between the redox active material 411 and the capacitive material 512 of the quaternary first electrode 610B decreases the energy density of the fourth energy storage device 600B. In some embodiments, increasing the ratio between the first portion and the second portion of the quaternary first electrode 610B decreases the power density of the fourth energy storage device 600B. In some embodiments, decreasing the ratio between the first portion and the second portion of the quaternary first electrode 610B increases the power density of the fourth energy storage device 600B. In some embodiments, increasing the ratio between the redox active material 411 and the capacitive material 512 of the quaternary first electrode 610B decreases the power density of the fourth energy storage device 600B. In some embodiments, decreasing the ratio between the redox active material 411 and the capacitive material 512 of the quaternary first electrode 610B increases the power density of the fourth energy storage device 600B. In some embodiments, increasing the ratio between the first portion and the second portion of the quaternary first electrode 610B decreases the internal resistance of the fourth energy storage device 600B. In some embodiments, decreasing the ratio between the first portion and the second portion of the quaternary first electrode 610B increases the internal resistance of the fourth energy storage device 600B. In some embodiments, increasing the ratio between the redox active material 411 and the capacitive material 512 of the quaternary first electrode 610B decreases the internal resistance of the fourth energy storage device 600B. In some embodiments, decreasing the ratio between the redox active material 411 and the capacitive material 512 of the quaternary first electrode 610B increases the internal resistance of the fourth energy storage device 600B. In some embodiments, increasing the ratio between the first portion and the second portion decreases the charging and/or discharging times of the fourth energy storage device 600B. In some embodiments, decreasing the ratio between the first portion and the second portion increases the charging and/or discharging times of the fourth energy storage device 600B. In some embodiments, increasing the ratio between the redox active material 411 and the capacitive material 512 decreases the charging and/or discharging times of the fourth energy storage device 600B. In some embodiments, decreasing the ratio between the redox active material 411 and the capacitive material 512 increases the charging and/or discharging times of the fourth energy storage device 600B.

As shown in FIGS. 5, 6A, and 6B, the redox active material 411 of at least one of the primary, secondary, tertiary, and quaternary first electrodes 410, 510, 610A, and 610B, respectively, comprises zinc hydroxide, wherein the zinc hydroxide converts to zinc during charging of the first, second, third, and fourth energy storage devices 400, 500, 600A, and 600B, respectively, and wherein the zinc converts to zinc hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises aluminum hydroxide, wherein the aluminum hydroxide converts to aluminum during charging of the first, second, third, and fourth energy storage devices 400, 500, 600A, and 600B, respectively, and wherein the aluminum converts to aluminum hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises barium hydroxide, wherein the barium hydroxide converts to barium during charging of the first, second, third, and fourth energy storage devices 400, 500, 600A, and 600B, respectively, and wherein the barium converts to barium hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises bismuth hydroxide, wherein the bismuth hydroxide converts to bismuth during charging of the first, second, third, and fourth energy storage devices 400, 500, 600A, and 600B, respectively, and wherein the bismuth converts to bismuth hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises cadmium hydroxide, wherein the cadmium hydroxide converts to cadmium during charging of the first, second, third, and fourth energy storage devices 400, 500, 600A, and 600B, respectively, and wherein the cadmium converts to cadmium hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises calcium hydroxide, wherein the calcium hydroxide converts to calcium during charging of the first, second, third, and fourth energy storage devices 400, 500, 600A, and 600B, respectively, and wherein the calcium converts to calcium hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises chromium hydroxide, wherein the chromium hydroxide converts to chromium during charging of the first, second, third, and fourth energy storage devices 400, 500, 600A, and 600B, respectively, and wherein the chromium converts to chromium hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises cobalt hydroxide, wherein the cobalt hydroxide converts to cobalt during charging of the first, second, third, and fourth energy storage devices 400, 500, 600A, and 600B, respectively, and wherein the cobalt converts to cobalt hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises copper hydroxide, wherein the copper hydroxide converts to copper during charging of the first, second, third, and fourth energy storage devices 400, 500, 600A, and 600B, respectively, and wherein the copper converts to copper hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises indium hydroxide, wherein the indium hydroxide converts to indium during charging of the first, second, third, and fourth energy storage devices 400, 500, 600A, and 600B, respectively, and wherein the indium converts to indium hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises iron hydroxide, wherein the iron hydroxide converts to iron during charging of the first, second, third, and fourth energy storage devices 400, 500, 600A, and 600B, respectively, and wherein the iron converts to iron hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises lead hydroxide, wherein the lead hydroxide converts to lead during charging of the first, second, third, and fourth energy storage devices 400, 500, 600A, and 600B, respectively, and wherein the lead converts to lead hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises manganese hydroxide, wherein the manganese hydroxide converts to manganese during charging of the first, second, third, and fourth energy storage devices 400, 500, 600A, and 600B, respectively, and wherein the manganese converts to manganese hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises mercury hydroxide, wherein the mercury hydroxide converts to mercury during charging of the first, second, third, and fourth energy storage devices 400, 500, 600A, and 600B, respectively, and wherein the mercury converts to mercury hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises nickel hydroxide, wherein the nickel hydroxide converts to nickel during charging of the first, second, third, and fourth energy storage devices 400, 500, 600A, and 600B, respectively, and wherein the nickel converts to nickel hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises strontium hydroxide, wherein the strontium hydroxide converts to strontium during charging of the first, second, third, and fourth energy storage devices 400, 500, 600A, and 600B, respectively, and wherein the strontium converts to strontium hydroxide during discharging of the first, second, third, and fourth energy storage devices 400, 500, 600A, and 600B, respectively. Alternatively, the redox active material 411 of at least one of the primary, secondary, tertiary, and quaternary first electrodes 410, 510, 610A, and 610B, respectively, comprises tin hydroxide, wherein the tin hydroxide converts to tin during charging of the first, second, third, and fourth energy storage devices 400, 500, 600A, and 600B, respectively, and wherein the tin converts to tin hydroxide during discharging of the first, second, third, and fourth energy storage devices 400, 500, 600A, and 600B, respectively. The specific chemical components and reactions of the primary, secondary, tertiary, and quaternary first electrodes 410, 510, 610A, and 610B, respectively, of the energy storage devices herein enable the high energy densities, high power densities, and fast charging times disclosed herein.

As shown, the capacitive material 512 of the second electrode 420 of the first, second, third, and fourth energy storage devices 400, 500, 600A, and 600B, respectively, comprises zinc hydroxide, wherein the zinc hydroxide converts to zinc oxide hydroxide during charging of the first, second, third, and fourth energy storage devices 400, 500, 600A, and 600B, respectively, and wherein the zinc oxide hydroxide converts to zinc hydroxide during discharging of the first, second, third, and fourth energy storage devices 400, 500, 600A, and 600B, respectively. Alternatively, the capacitive material 512 of the second electrode 420 comprises aluminum hydroxide, wherein the aluminum hydroxide converts to aluminum oxide hydroxide during charging of the first, second, third, and fourth energy storage devices 400, 500, 600A, and 600B, respectively, and wherein the aluminum oxide hydroxide converts to aluminum hydroxide during discharging of the first, second, third, and fourth energy storage devices 400, 500, 600A, and 600B, respectively. Alternatively, the capacitive material 512 of the second electrode 420 comprises barium hydroxide, wherein the barium hydroxide converts to barium oxide hydroxide during charging of the first, second, third, and fourth energy storage devices 400, 500, 600A, and 600B, respectively, and wherein the barium oxide hydroxide converts to barium hydroxide during discharging of the first, second, third, and fourth energy storage devices 400, 500, 600A, and 600B, respectively. Alternatively, the capacitive material 512 of the second electrode 420 comprises bismuth hydroxide, wherein the bismuth hydroxide converts to bismuth oxide hydroxide during charging of the first, second, third, and fourth energy storage devices 400, 500, 600A, and 600B, respectively, and wherein the bismuth oxide hydroxide converts to bismuth hydroxide during discharging of the first, second, third, and fourth energy storage devices 400, 500, 600A, and 600B, respectively. Alternatively, the capacitive material 512 of the second electrode 420 comprises cadmium hydroxide, wherein the cadmium hydroxide converts to cadmium oxide hydroxide during charging of the first, second, third, and fourth energy storage devices 400, 500, 600A, and 600B, respectively, and wherein the cadmium oxide hydroxide converts to cadmium hydroxide during discharging of the first, second, third, and fourth energy storage devices 400, 500, 600A, and 600B, respectively. Alternatively, the capacitive material 512 of the second electrode 420 comprises calcium hydroxide, wherein the calcium hydroxide converts to calcium oxide hydroxide during charging of the first, second, third, and fourth energy storage devices 400, 500, 600A, and 600B, respectively, and wherein the calcium oxide hydroxide converts to calcium hydroxide during discharging of the first, second, third, and fourth energy storage devices 400, 500, 600A, and 600B, respectively. Alternatively, the capacitive material 512 of the second electrode 420 comprises chromium hydroxide, wherein the chromium hydroxide converts to chromium oxide hydroxide during charging of the first, second, third, and fourth energy storage devices 400, 500, 600A, and 600B, respectively, and wherein the chromium oxide hydroxide converts to chromium hydroxide during discharging of the first, second, third, and fourth energy storage devices 400, 500, 600A, and 600B, respectively. Alternatively, the capacitive material 512 of the second electrode 420 comprises cobalt hydroxide, wherein the cobalt hydroxide converts to cobalt oxide hydroxide during charging of the first, second, third, and fourth energy storage devices 400, 500, 600A, and 600B, respectively, and wherein the cobalt oxide hydroxide converts to cobalt hydroxide during discharging of the first, second, third, and fourth energy storage devices 400, 500, 600A, and 600B, respectively. Alternatively, the capacitive material 512 of the second electrode 420 comprises copper hydroxide, wherein the copper hydroxide converts to copper oxide hydroxide during charging of the first, second, third, and fourth energy storage devices 400, 500, 600A, and 600B, respectively, and wherein the copper oxide hydroxide converts to copper hydroxide during discharging of the first, second, third, and fourth energy storage devices 400, 500, 600A, and 600B, respectively. Alternatively, the capacitive material 512 of the second electrode 420 comprises indium hydroxide, wherein the indium hydroxide converts to indium oxide hydroxide during charging of the first, second, third, and fourth energy storage devices 400, 500, 600A, and 600B, respectively, and wherein the indium oxide hydroxide converts to indium hydroxide during discharging of the first, second, third, and fourth energy storage devices 400, 500, 600A, and 600B, respectively. Alternatively, the capacitive material 512 of the second electrode 420 comprises iron hydroxide, wherein the iron hydroxide converts to iron oxide hydroxide during charging of the first, second, third, and fourth energy storage devices 400, 500, 600A, and 600B, respectively, and wherein the iron oxide hydroxide converts to iron hydroxide during discharging of the first, second, third, and fourth energy storage devices 400, 500, 600A, and 600B, respectively. Alternatively, the capacitive material 512 of the second electrode 420 comprises lead hydroxide, wherein the lead hydroxide converts to lead hydroxide oxide hydroxide during charging of the first, second, third, and fourth energy storage devices 400, 500, 600A, and 600B, respectively, and wherein the lead oxide hydroxide converts to lead hydroxide during discharging of the first, second, third, and fourth energy storage devices 400, 500, 600A, and 600B, respectively. Alternatively, the capacitive material 512 of the second electrode 420 comprises manganese hydroxide, wherein the manganese hydroxide converts to manganese oxide hydroxide during charging of the first, second, third, and fourth energy storage devices 400, 500, 600A, and 600B, respectively, and wherein the manganese oxide hydroxide converts to manganese hydroxide during discharging of the first, second, third, and fourth energy storage devices 400, 500, 600A, and 600B, respectively. Alternatively, the capacitive material 512 of the second electrode 420 comprises mercury hydroxide, wherein the mercury hydroxide converts to mercury oxide hydroxide during charging of the first, second, third, and fourth energy storage devices 400, 500, 600A, and 600B, respectively, and wherein the mercury oxide hydroxide converts to mercury hydroxide during discharging of the first, second, third, and fourth energy storage devices 400, 500, 600A, and 600B, respectively. Alternatively, the capacitive material 512 of the second electrode 420 comprises nickel hydroxide, wherein the nickel hydroxide converts to nickel oxide hydroxide during charging of the first, second, third, and fourth energy storage devices 400, 500, 600A, and 600B, respectively, and wherein the nickel oxide hydroxide converts to nickel hydroxide during discharging of the first, second, third, and fourth energy storage devices 400, 500, 600A, and 600B, respectively. Alternatively, the capacitive material 512 of the second electrode 420 comprises strontium hydroxide, wherein the strontium hydroxide converts to strontium oxide hydroxide during charging of the first, second, third, and fourth energy storage devices 400, 500, 600A, and 600B, respectively, and wherein the strontium oxide hydroxide converts to strontium hydroxide during discharging of the first, second, third, and fourth energy storage devices 400, 500, 600A, and 600B, respectively. Alternatively, the capacitive material 512 of the second electrode 420 comprises tin hydroxide, wherein the tin hydroxide converts to tin oxide hydroxide during charging of the first, second, third, and fourth energy storage devices 400, 500, 600A, and 600B, respectively, and wherein the tin oxide hydroxide converts to tin hydroxide during discharging of the first, second, third, and fourth energy storage devices 400, 500, 600A, and 600B, respectively.

Alternatively, per FIGS. 7A to 7F and 8A to 8D, the capacitive material 512 of the second electrode 420 comprises a nickel-cobalt LDH. The specific chemical components and reactions of the capacitive material 512 of the second electrode 420 of the energy storage devices disclosed herein enable the high energy densities, high power densities, and fast charging times disclosed herein.

In some embodiments, the primary, secondary, tertiary, and quaternary first electrodes 410, 510, 610A, and 610B, respectively, comprise the LDH coupled to the graphene sheet. In some embodiments, the LDH coupled to the graphene sheet is an LDH-graphene composite. In some embodiments, the redox active material 411 comprises the LDH coupled to the graphene sheet and/or a binder. In some embodiments, the LDH is bonded to the graphene sheet. In some embodiments, the LDH is not bonded to the graphene sheet. In some embodiments, LDH is bonded to the graphene sheet by a covalent bond, an ionic bond, a dipole-dipole interaction (e.g., a hydrogen bond), or any combination thereof. In some embodiments, the graphene sheet comprises a nanosheet, a microsheet, a platelet, or any combination thereof.

In some embodiments, the unexpectedly superior electrochemical performance, such as the reduced charging and discharging times, exhibited by the first, second, third, and fourth energy storage devices 400, 500, 600A, and 600B, respectively, herein is attributed to the composition by mass, by volume, or both of the graphene sheet within the primary, secondary, tertiary, and quaternary first electrodes 410, 510, 610A, and 610B, respectively, of below about 10%. The concentration by mass, by volume, or both of the graphene sheet of below about 10% enables the graphene to serve as a substrate for LDH growth but prevents the formation of a complete matrix that limits the density of the LDH-graphene composite. The unexpectedly superior electrochemical performance exhibited by the primary, secondary, tertiary, and quaternary first electrodes 410, 510, 610A, and 610B, respectively, is attributed to the composition by mass, by volume, or both of the graphene sheet of below about 10%. The concentration by mass, by volume, or both of the graphene sheet of below about 10% enables the graphene to serve as a substrate for LDH growth but does not form a complete matrix that limits the density of the LDH-graphene composite.

As shown, the electrolyte 430 comprises water, wherein the water converts to hydroxide during charging of the first, second, third, and fourth energy storage devices 400, 500, 600A, and 600B, respectively, and wherein the hydroxide converts to water during the discharging of the first, second, third, and fourth energy storage devices 400, 500, 600A, and 600B, respectively. In some embodiments, the electrolyte 430 comprises: a hydroxide, an additive, a stabilizer, a hydrogen evolution inhibitor, and a conductivity enhancer. In some embodiments, the electrolyte 430 comprises zinc oxide powder dissolved in an alkaline solution of 7.1 M potassium hydroxide in water.

In some embodiments, the electrolyte 430 comprises a hydroxide, an additive, a stabilizer, a hydrogen evolution inhibitor, and a conductivity enhancer. In some embodiments, the additive prevents corrosion of the active material. In some embodiments, the additive prevents corrosion of the primary, secondary, tertiary, and quaternary first electrodes 410, 510, 610A, and 610B, respectively.

In some embodiments, the stabilizer contributes to the redox reactions during energy storage and discharge. In some embodiments, the stabilizer prevents the dissolution of the first electrode. In some embodiments, the stabilizer is soluble in strong alkaline solutions. In some embodiments, the stabilizer comprises zinc oxide, which converts into zinc hydroxide or zincate during the redox reaction. In some embodiments, no or negligible net dissolution of zinc hydroxide into the electrolyte occurs.

In some embodiments, the separator comprises a membrane separator, a cellulose separator, an organic polymeric separator, an inorganic polymer separator, a microporous separator, a woven separator, a non-woven separator, or any combination thereof. In some embodiments, the separator has a bonding strength sufficient to withstand pressures and impacts without fracturing or separating from the electrode components. In some embodiments, the polymer has a melting point above ambient conditions. In some embodiments, the polymer has a melting point above 100° C.

In some embodiments, a ratio by mass or volume between the first portion and the second portion of the first electrode is about 0.1:1 to about 9:1. In some embodiments, a ratio by mass or volume between the first portion and the second portion of the first electrode is about 0.1:1 to about 0.2:1, about 0.1:1 to about 0.5:1, about 0.1:1 to about 1:1, about 0.1:1 to about 2:1, about 0.1:1 to about 3:1, about 0.1:1 to about 4:1, about 0.1:1 to about 5:1, about 0.1:1 to about 6:1, about 0.1:1 to about 7:1, about 0.1:1 to about 8:1, about 0.1:1 to about 9:1, about 0.2:1 to about 0.5:1, about 0.2:1 to about 1:1, about 0.2:1 to about 2:1, about 0.2:1 to about 3:1, about 0.2:1 to about 4:1, about 0.2:1 to about 5:1, about 0.2:1 to about 6:1, about 0.2:1 to about 7:1, about 0.2:1 to about 8:1, about 0.2:1 to about 9:1, about 0.5:1 to about 1:1, about 0.5:1 to about 2:1, about 0.5:1 to about 3:1, about 0.5:1 to about 4:1, about 0.5:1 to about 5:1, about 0.5:1 to about 6:1, about 0.5:1 to about 7:1, about 0.5:1 to about 8:1, about 0.5:1 to about 9:1, about 1:1 to about 2:1, about 1:1 to about 3:1, about 1:1 to about 4:1, about 1:1 to about 5:1, about 1:1 to about 6:1, about 1:1 to about 7:1, about 1:1 to about 8:1, about 1:1 to about 9:1, about 2:1 to about 3:1, about 2:1 to about 4:1, about 2:1 to about 5:1, about 2:1 to about 6:1, about 2:1 to about 7:1, about 2:1 to about 8:1, about 2:1 to about 9:1, about 3:1 to about 4:1, about 3:1 to about 5:1, about 3:1 to about 6:1, about 3:1 to about 7:1, about 3:1 to about 8:1, about 3:1 to about 9:1, about 4:1 to about 5:1, about 4:1 to about 6:1, about 4:1 to about 7:1, about 4:1 to about 8:1, about 4:1 to about 9:1, about 5:1 to about 6:1, about 5:1 to about 7:1, about 5:1 to about 8:1, about 5:1 to about 9:1, about 6:1 to about 7:1, about 6:1 to about 8:1, about 6:1 to about 9:1, about 7:1 to about 8:1, about 7:1 to about 9:1, or about 8:1 to about 9:1. In some embodiments, a ratio by mass or volume between the first portion and the second portion is about 0.1:1, about 0.2:1, about 0.5:1, about 1:1, about 2:1, about 3:1, about 4:1, about 5:1, about 6:1, about 7:1, about 8:1, or about 9:1. In some embodiments, a ratio by mass or volume between the first portion and the second portion of the first electrode is at least about 0.1:1, about 0.2:1, about 0.5:1, about 1:1, about 2:1, about 3:1, about 4:1, about 5:1, about 6:1, about 7:1, or about 8:1. In some embodiments, a ratio by mass or volume between the first portion and the second portion of the first electrode is at most about 0.2:1, about 0.5:1, about 1:1, about 2:1, about 3:1, about 4:1, about 5:1, about 6:1, about 7:1, about 8:1, or about 9:1.

In some embodiments, a ratio by mass or volume of the redox active material to the capacitive material is about 0.1:1 to about 9:1. In some embodiments, a ratio by mass or volume of the redox active material to the capacitive material is about 0.1:1 to about 0.2:1, about 0.1:1 to about 0.5:1, about 0.1:1 to about 1:1, about 0.1:1 to about 2:1, about 0.1:1 to about 3:1, about 0.1:1 to about 4:1, about 0.1:1 to about 5:1, about 0.1:1 to about 6:1, about 0.1:1 to about 7:1, about 0.1:1 to about 8:1, about 0.1:1 to about 9:1, about 0.2:1 to about 0.5:1, about 0.2:1 to about 1:1, about 0.2:1 to about 2:1, about 0.2:1 to about 3:1, about 0.2:1 to about 4:1, about 0.2:1 to about 5:1, about 0.2:1 to about 6:1, about 0.2:1 to about 7:1, about 0.2:1 to about 8:1, about 0.2:1 to about 9:1, about 0.5:1 to about 1:1, about 0.5:1 to about 2:1, about 0.5:1 to about 3:1, about 0.5:1 to about 4:1, about 0.5:1 to about 5:1, about 0.5:1 to about 6:1, about 0.5:1 to about 7:1, about 0.5:1 to about 8:1, about 0.5:1 to about 9:1, about 1:1 to about 2:1, about 1:1 to about 3:1, about 1:1 to about 4:1, about 1:1 to about 5:1, about 1:1 to about 6:1, about 1:1 to about 7:1, about 1:1 to about 8:1, about 1:1 to about 9:1, about 2:1 to about 3:1, about 2:1 to about 4:1, about 2:1 to about 5:1, about 2:1 to about 6:1, about 2:1 to about 7:1, about 2:1 to about 8:1, about 2:1 to about 9:1, about 3:1 to about 4:1, about 3:1 to about 5:1, about 3:1 to about 6:1, about 3:1 to about 7:1, about 3:1 to about 8:1, about 3:1 to about 9:1, about 4:1 to about 5:1, about 4:1 to about 6:1, about 4:1 to about 7:1, about 4:1 to about 8:1, about 4:1 to about 9:1, about 5:1 to about 6:1, about 5:1 to about 7:1, about 5:1 to about 8:1, about 5:1 to about 9:1, about 6:1 to about 7:1, about 6:1 to about 8:1, about 6:1 to about 9:1, about 7:1 to about 8:1, about 7:1 to about 9:1, or about 8:1 to about 9:1. In some embodiments, a ratio by mass or volume of the redox active material to the capacitive material is about 0.1:1, about 0.2:1, about 0.5:1, about 1:1, about 2:1, about 3:1, about 4:1, about 5:1, about 6:1, about 7:1, about 8:1, or about 9:1. In some embodiments a ratio by mass or volume of the redox active material to the capacitive material is at least about 0.1:1, about 0.2:1, about 0.5:1, about 1:1, about 2:1, about 3:1, about 4:1, about 5:1, about 6:1, about 7:1, or about 8:1. In some embodiments, a ratio by mass or volume of the redox active material to the capacitive material is at most about 0.2:1, about 0.5:1, about 1:1, about 2:1, about 3:1, about 4:1, about 5:1, about 6:1, about 7:1, about 8:1, or about 9:1.

In some embodiments, the separator has a thickness of about 10 μm (microns) to about 30 μm. In some embodiments, the separator has a thickness of about 10 μm to about 12 μm, about 10 μm to about 14 μm, about 10 μm to about 16 μm, about 10 μm to about 18 μm, about 10 μm to about 20 μm, about 10 μm to about 22 μm, about 10 μm to about 24 μm, about 10 μm to about 26 μm, about 10 μm to about 28 μm, about 10 μm to about 30 μm, about 12 μm to about 14 μm, about 12 μm to about 16 μm, about 12 μm to about 18 μm, about 12 μm to about 20 μm, about 12 μm to about 22 μm, about 12 μm to about 24 μm, about 12 μm to about 26 μm, about 12 μm to about 28 μm, about 12 μm to about 30 μm, about 14 μm to about 16 μm, about 14 μm to about 18 μm, about 14 μm to about 20 μm, about 14 μm to about 22 μm, about 14 μm to about 24 μm, about 14 μm to about 26 μm, about 14 μm to about 28 μm, about 14 μm to about 30 μm, about 16 μm to about 18 μm, about 16 μm to about 20 μm, about 16 μm to about 22 μm, about 16 μm to about 24 μm, about 16 μm to about 26 μm, about 16 μm to about 28 μm, about 16 μm to about 30 μm, about 18 μm to about 20 μm, about 18 μm to about 22 μm, about 18 μm to about 24 μm, about 18 μm to about 26 μm, about 18 μm to about 28 μm, about 18 μm to about 30 μm, about 20 μm to about 22 μm, about 20 μm to about 24 μm, about 20 μm to about 26 μm, about 20 μm to about 28 μm, about 20 μm to about 30 μm, about 22 μm to about 24 μm, about 22 μm to about 26 μm, about 22 μm to about 28 μm, about 22 μm to about 30 μm, about 24 μm to about 26 μm, about 24 μm to about 28 μm, about 24 μm to about 30 μm, about 26 μm to about 28 μm, about 26 μm to about 30 μm, or about 28 μm to about 30 μm. In some embodiments, the separator has a thickness of about 10 μm, about 12 μm, about 14 μm, about 16 μm, about 18 μm, about 20 μm, about 22 μm, about 24 μm, about 26 μm, about 28 μm, or about 30 μm. In some embodiments, the separator has a thickness of at least about 10 μm, about 12 μm, about 14 μm, about 16 μm, about 18 μm, about 20 μm, about 22 μm, about 24 μm, about 26 μm, or about 28 μm. In some embodiments, the separator has a thickness of at most about 12 μm, about 14 μm, about 16 μm, about 18 μm, about 20 μm, about 22 μm, about 24 μm, about 26 μm, about 28 μm, or about 30 μm.

First Electrodes

The electrodes herein exhibit superior electrochemical performance and can be manufactured at large scales and at low cost. In some embodiments, the first electrode is solid. In some embodiments, the first electrode is not a hydrogel.

Figure 9A:
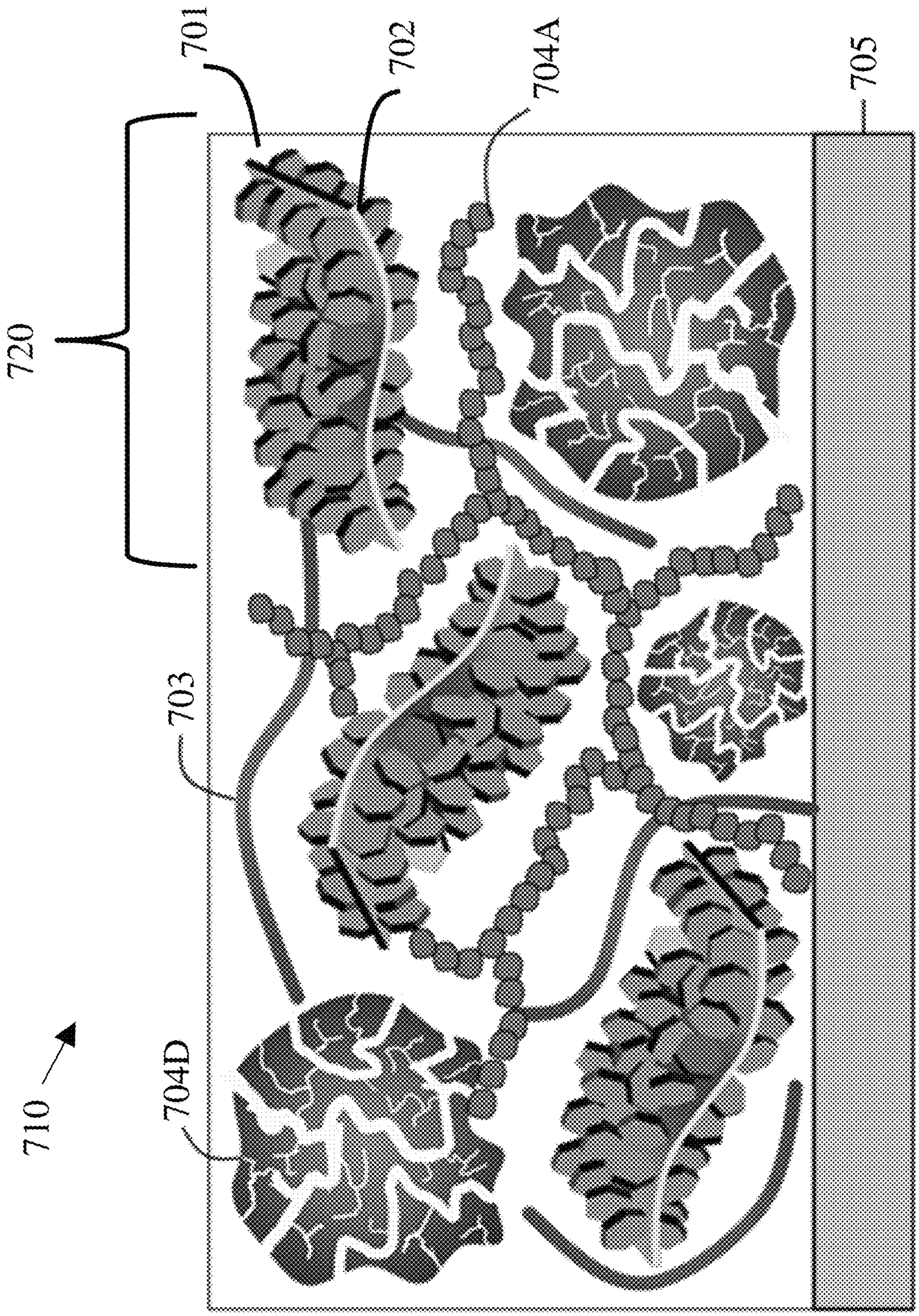
FIG. 9A shows a diagram of the components within a first electrode, in accordance with an embodiment herein.
Figure 9B:
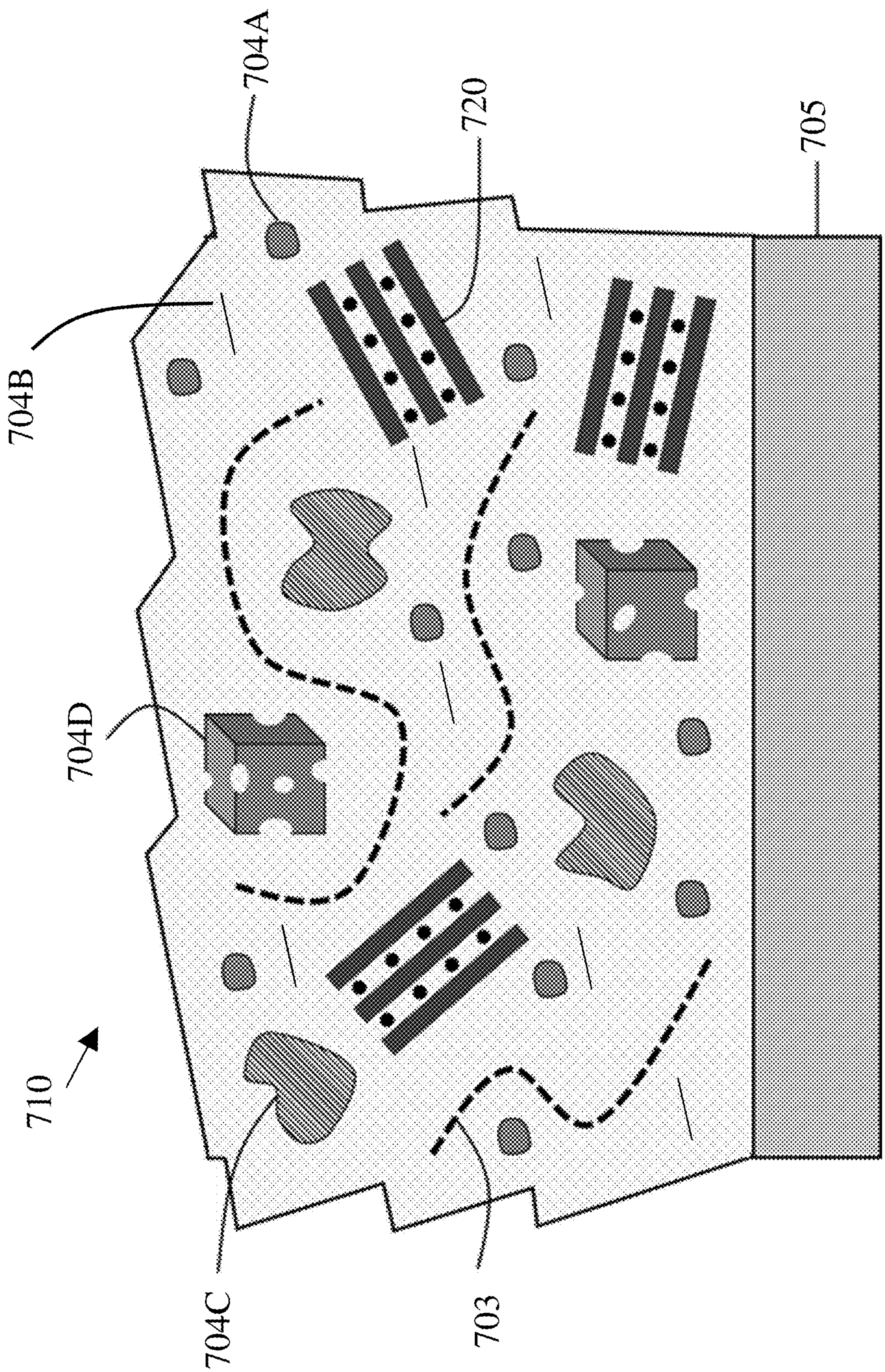
FIG. 9B shows another diagram of the components within a first electrode, in accordance with an embodiment herein.
Figure 10A:
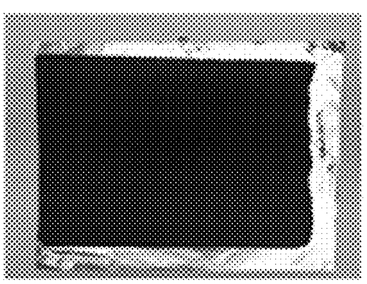
FIG. 10A shows a non-limiting example of a first anode comprising a copper foil current collector, in accordance with an embodiment herein.
Figure 10B:
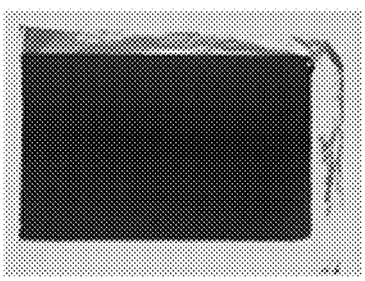
FIG. 10B shows a non-limiting example of a second anode comprising a copper foil current collector, in accordance with an embodiment herein.
Figure 10C:
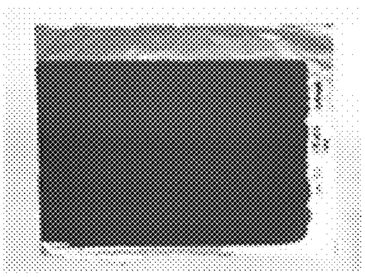
FIG. 10C shows a non-limiting example of a third anode comprising a copper foil current collector, in accordance with an embodiment herein.
Figure 10D:
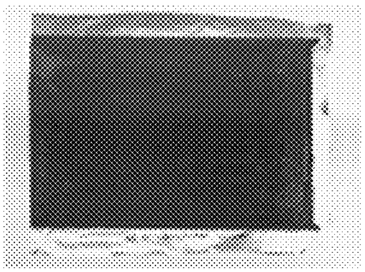
FIG. 10D shows a non-limiting example of a fourth anode comprising a copper foil current collector, in accordance with an embodiment herein.
Figure 10E:
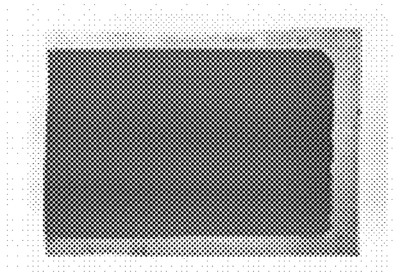
FIG. 10E shows a non-limiting example of a fifth anode comprising a copper and graphite foil current collector, in accordance with an embodiment herein.
Figure 10F:
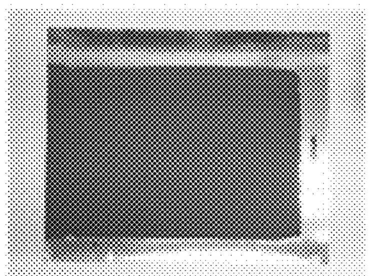
FIG. 10F shows a non-limiting example of a sixth anode comprising a zinc foil current collector, in accordance with an embodiment herein.
Figure 10G:
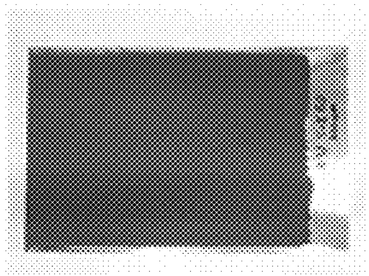
FIG. 10G shows a non-limiting example of a seventh anode comprising a zinc foil current collector, in accordance with an embodiment herein.
Figure 10H:
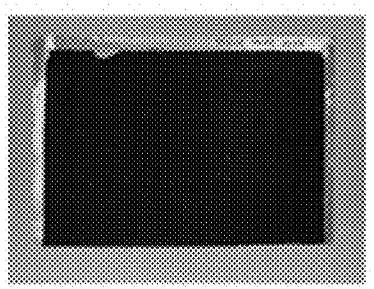
FIG. 10H shows a non-limiting example of a cathode comprising a nickel foil current collector, in accordance with an embodiment herein.

FIG. 9A shows a diagram of the individual components within an exemplary first electrode 710. As shown, the first electrode 710 comprises a graphene sheet 701, an LDH 702 coupled to the graphene sheet 701, a binder 703, a conductive additives 704A, 704D, and a current collector 705. FIG. 9B shows another diagram of the individual components within an exemplary first electrode 710. In some embodiments, the first electrode 710 stores energy through both redox reactions and ion adsorption. In some embodiments, the first electrode 710 stores charge through both the conductive additives 704A, 704D and within the LDH 702. In some embodiments, the first electrode 710 stores charge electrostatically through electric double layers on the surface of high surface area carbon, and electrochemically within the LDH 702. In some embodiments, the conductive additives 704A, 704D exhibit a high surface area.

In some embodiments, increasing the amount of LDH 702 increases the specific capacity for high energy density applications. In some embodiments, the first electrode 710 stores charge electrostatically through electric double layers on the surface of high surface area carbon and stores energy with electrochemical reactions through the LDH 702. In some embodiments, the LDH 702 provides a majority of the capacity of the first electrode 710. In some embodiments, the LDH 702 provides a majority of the battery-like energy storage of the first electrode 710. In some embodiments, zinc in the LDH is the chemically active material.

In some embodiments, the LDH 702 comprises an $M^{2+}$ metal cation, an $M^{3+}$ metal cation, a hydroxide ion, an octahedral site with a trivalent metal cation, an octahedral site with a divalent metal cation, a water molecule, an anion, or any combination thereof. In some embodiments, the $M^{2+}$ metal cation comprises barium, cadmium, calcium, cobalt, copper (II), iron (II), lead (II), magnesium, mercury (I), mercury (II), nickel, strontium, tin, zinc, or any combination thereof. In some embodiments, the $M^{3+}$ metal cation comprises aluminum, bismuth, chromium (III), iron (III), or any combination thereof. In some embodiments, the anion comprises nitrate, sulfate, carbonate, chloride, bromide, or any combination thereof. In some embodiments, the LDH 702 comprises a unique combination of divalent (e.g., zinc) and trivalent (e.g., bismuth) ions, both of which contribute to charge storage. In one example, the energy storage devices of the present disclosure comprise an LDH based on zinc ($Zn^{2+}$) and bismuth ($Bi^{3+}$).

In some embodiments, the LDH comprises divalent ions (e.g., zinc) and trivalent ions (e.g., bismuth), both of which contribute to energy storage. In some embodiments, the LDH enables electrostatic energy storage, electrochemical energy storage, or both. In some embodiments, the LDH comprises a chemically active material and a stabilizer to suppress hydrogen evolution.

In some embodiments, the LDH 702 comprises a metallic LDH comprising an aluminum-based LDH, a barium-based LDH, a bismuth-based LDH, a cadmium-based LDH, a calcium-based LDH, a chromium-based LDH, a cobalt-based LDH, a copper-based LDH, an indium-based LDH, an iron-based LDH, a lead-based LDH, a manganese-based LDH, a mercury-based LDH, a nickel-based LDH, a strontium-based LDH, a tin-based LDH, a zinc-based LDH, or any combination thereof.

In some embodiments, the graphene oxide sheets introduced during the LDH synthesis provide surfaces for LDH growth and are reduced to graphene sheets during the reaction, forming a conductive three-dimensional network of LDH-graphene composite 720. As shown in FIG. 9A, the LDH 702 is bonded to the graphene sheet 701 to form an LDH-graphene composite 720. In some embodiments, the bond comprises an ionic bond, a covalent bond, or a metallic bond. As shown in FIG. 9A, a single face or edge of the LDH 702 is coupled to the graphene sheet 701. Furthermore, as shown the LDH 702 is coupled to the graphene sheet 701 such that an axis of symmetry 702A (shown in FIG. 11B) of the LDH 702 is perpendicular to a basal plane of the graphene sheet 701. In some embodiments, the LDH 702 is not bonded to the graphene sheet 701. In some embodiments, the methods herein enable the bonding of the LDH 702 to the graphene sheet. In some embodiments, mixing the LDH 702 to the graphene is insufficient to bond the LDH 702 to the graphene. In some embodiments, the LDH 702 is bonded to a majority of the surface of the graphene. In some embodiments, the LDH 702 is bonded to only one side of the graphene.

In some embodiments, one or more graphene sheets 701 are introduced during the LDH 702 synthesis. In some embodiments, the one or more graphene sheets 701 provide surfaces for LDH 702 growth. In some embodiments, the one or more graphene sheets 701 are separated from each other. In some embodiments, the one or more graphene sheets 701 are not interconnected. In some embodiments, the one or more graphene sheets 701 do not form a matrix. In some embodiments, the graphene sheets 701 comprise graphene oxide sheets. In some embodiments, one or more graphene oxide sheets are reduced to graphene sheets 701 during the formation of the LDH 702. In some embodiments, the one or more graphene sheets 701 and LDH 702 form a conductive three-dimensional network. In some embodiments, a plurality of graphene sheets are arranged in layered configuration, wherein each layer is a graphene sheet.

In some embodiments, the graphene sheet is an excellent conductor of electricity and provides a substrate for the growth of LDH nanostructures. In some embodiments, graphene increases the surface area of the materials at the interface with the electrolyte. In some embodiments, the graphene further facilitates ion diffusion while also allowing free space to alleviate the volume changes of LDH during charge and discharge. In some embodiments, the graphene sheet comprises holey graphene, graphite nanoplatelets, thin layer graphite, carbon fibers, graphene fibers, carbon nanotubes, graphene nanoribbons, buckminsterfullerene, or any combination thereof. In some embodiments, the graphene sheet comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the graphene sheet comprises a plurality of graphene sheets. In some embodiments, the two-dimensional carbon additive comprises a nanosheet, a microsheet, a platelet, or any combination thereof. In some embodiments, the graphene sheet has a thickness of about 0.3 nm. In some embodiments, the graphene sheet has a thickness of at most about 0.3 nm.

In some embodiments, the unexpectedly superior electrochemical performance exhibited by the storage devices herein is attributed to the composition by mass, by volume, or both of the graphene sheet within the first electrode of below about 10%. The concentration by mass, by volume, or both of the graphene sheet of below about 10% enables the graphene to serve as a substrate for LDH growth but prevents the formation of a complete matrix that limits the density of the LDH-graphene composite 720. The unexpectedly superior electrochemical performance exhibited by the first electrode 710 is attributed to the composition by mass, by volume, or both of the graphene sheet 701 of below about 10%. The concentration by mass, by volume, or both of the graphene sheet 701 of below about 10% enables the graphene to serve as a substrate for LDH 702 growth but does not form a complete matrix that limits the density of the LDH-graphene composite 720.

In some embodiments, the basal plane of the graphene sheet 701 is the only face of the graphene sheet 701. In some embodiments, the graphene sheet 701 is a micro-scale graphene sheet 701. In some embodiments, the graphene sheet 701 is not a nano-scale graphene sheet 701. In some embodiments, the graphene sheet 701 is not a graphene flake or a graphene particle. In some embodiments, the graphene sheet 701 comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the graphene sheet comprises a nanosheet, a microsheet, a platelet, or any combination thereof. Graphene is an excellent conductor of electricity and is a great carrier for the growth of LDH nanostructures. In some embodiments, graphene increases accessibility of the electrolyte to the electrode. In some embodiments, graphene increases accessibility of the electrolyte to the electrode to provide a greater contact surface area with the electrolyte. In some embodiments, the increased accessibility facilitates ion diffusion while also allowing free space to alleviate the volume changes of LDH during charge and discharge.

In some embodiments, the binder 703 comprises a polymeric binder. In some embodiments, the polymeric binder comprises polyvinylidene fluoride, carboxymethyl cellulose, polyacrylic acid, polyethylene glycol, alginic acid, polypyrrole, polyaniline, poly(3,4-ethylenedioxythiophene), a sulfonated tetrafluoroethylene-based fluoropolymer-copolymer (Nafion®), polytetrafluoroethylene (Teflon®), polydopamine, polyvinylpyrrolidone, polyacrylonitrile, carbonyl β-cyclodextrin, or any combination thereof. In some embodiments, the binder 703 adheres the active and conductive materials to the current collector to allow flow of electrons from the external circuit to through electrode materials during charge and discharge of the energy storage device. In some embodiments, the binder 703 has a bonding strength sufficient to withstand pressures and effects without fracturing or separating from the current collector. In some embodiments, the binder 703 is a conductive polymer. In some embodiments, the binder 703 has a melting point above ambient conditions. In some embodiments, the polymer has a melting point above 100° C.

In some embodiments, the binder binds all components together and adheres them to the current collector. In some embodiments, the binder comprises a polymeric binder. In some embodiments, the polymeric binder comprises polyvinylidene fluoride, carboxymethyl cellulose, polyacrylic acid, polyethylene glycol, alginic acid, polypyrrole, polyaniline, poly(3,4-ethylenedioxythiophene), a sulfonated tetrafluoroethylene-based fluoropolymer-copolymer (Nafion®), polytetrafluoroethylene (Teflon®), polydopamine, polyvinylpyrrolidone, polyacrylonitrile, carbonyl β-cyclodextrin, or any combination thereof. In some embodiments, the binder adheres the components of the first electrode. In some embodiments, the binder adheres the components of the first electrode to the first current collector. In some embodiments, the binder adheres the graphene sheet, the LDH, and the conductive additive to the first current collector. In some embodiments, the polymeric binder has a bonding strength sufficient to withstand pressures and effects without fracturing or separating from the current collector. In some embodiments, the polymer is a conductive polymer. In some embodiments, the polymer has a melting point above ambient conditions. In some embodiments, the polymer has a melting point above 100° C.

In some embodiments, the conductive additives 704A, 704B, 704C, and 704D comprises a zero-dimensional carbon additive 704A, a one-dimensional carbon additive 704B, a two-dimensional carbon additive 704C, a three-dimensional carbon additive 704D, or any combination thereof. In some embodiments, the zero-dimensional carbon additive 704A comprises carbon black, acetylene black, or both. In some embodiments, the one-dimensional carbon additive 704B comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive 704C comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the two-dimensional carbon additive 704C comprises a nanosheet, a microsheet, a platelet, or any combination thereof. In some embodiments, the three-dimensional carbon additive 704D comprises graphite, carbon foam, activated carbon, graphene foam, carbon aerogel, graphene aerogel, porous carbon, a buckminsterfullerene, or an interconnected corrugated carbon-based network. In some embodiments, the three-dimensional conductive additive enables electrochemical capacitor-like energy storage and rapid charging and discharging. In some embodiments, the conductive additives 704A, 704B, 704C, and 704D provide an electron superhighway for the transport of charge to and from the current collector during charge and discharge.

In some embodiments, the conductive additives 704A, 704B, 704C, and 704D provide the electrochemical capacitor-like energy storage, which enables rapid charging/discharging of the first electrode 710. The carbon additives serve to increase the conductivity of the electrode. The ratio by mass or volume between the conductive additives 704A and 704D, which are high surface area carbon materials, can be tuned to alter and improve performance of the first electrode 710. In some embodiments, increasing the amount of the conductive additive improves the rate capability of the first electrode 710 for high-power applications.

In some embodiments, the conductive additive increases the conductivity of the electrode. In some embodiments, the ratio by mass or volume between the conductive additive and the LDH can be tuned to alter the performance of the electrodes and energy storage devices. In some embodiments, increasing the amount of the conductive additive improves the rate capability of the energy storage device for high-power applications. In some embodiments, the conductive additive provides an electron superhighway for the transport of charge from and to the current collector during charge and discharge. In some embodiments, the conductive additive comprises carbon black, acetylene black, carbon nanotubes, carbon fibers, graphite, graphene, or any combination thereof.

In some embodiments, the conductive additive comprises a zero-dimensional carbon additive, a one-dimensional carbon additive, a two-dimensional carbon additive, a three-dimensional carbon additive, or any combination thereof. In some embodiments, the zero-dimensional carbon additive comprises carbon black, acetylene black, or both. In some embodiments, the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the two-dimensional carbon additive comprises a nanosheet, a microsheet, a platelet, or any combination thereof. In some embodiments, the three-dimensional carbon additive comprises graphite, carbon foam, activated carbon, graphene foam, carbon aerogel, graphene aerogel, porous carbon, a buckminsterfullerene, an interconnected corrugated carbon-based network, or any combination thereof. In some embodiments, the conductive additive has thickness, height, width, or any combination thereof of at most about 3 nm, 5 nm, 10 nm, 15 nm, 20 nm, 25 nm, 30 nm, 35 nm, 40 nm, 45 nm, 50 nm, or more including increments therein.

In some embodiments, the current collector transports the charge from the external circuit to the battery materials during charge and discharge. In some embodiments, the current collector allows the flow of electrons from the external circuit to through electrode materials during charge and discharge processes. In some embodiments, the current collector is formed of tin, zinc, copper, graphite, nickel, stainless steel, brass, bronze, or any combination thereof. In some embodiments, the current collector is a foil, a plate, a mesh, or a foam. In some embodiments, the current collector stores charge electrostatically in electric double layers. In some embodiments, the current collector 705 comprises a foam, a foil, a mesh, an aerogel, or any combination thereof. In some embodiments, the current collector 705 comprises a copper-based current collector, a zinc-based current collector, a graphite-based current collector, a nickel-based current collector, a stainless steel-based current collector, a brass-based current collector, a bronze-based current collector, or any combination thereof. In some embodiments, the current collector transports the charge from the external circuit to the battery materials during charge and discharge.

FIGS. 10A to 10H show the finished anode and cathode electrodes with different compositions for the anode coated onto copper foils and graphite foil. Highest capacity and power performance were achieved by using zinc foils as the current collectors. Other shapes for the current collector are foil, mesh, grid, or foam.

In some embodiments, per FIGS. 10A to 10D, the current collector of the first electrode comprises a copper foil current collector. In some embodiments, per FIG. 10E, the current collector of the first electrode comprises a copper and graphite foil current collector. In some embodiments, per FIGS. 10F and 10G, the current collector of the first electrode comprises a zinc foil current collector. In some embodiments, per FIG. 10H, the current collector of the second electrode comprises a nickel foil current collector.

In some embodiments, a concentration by mass, by volume, or both of the graphene sheet in the first electrode is sufficiently less than about 10%, such that the first electrode does not form a hydrogel. In some embodiments, a concentration by mass, by volume, or both of the graphene sheet in the first electrode is about 0.1% to about 10%. In some embodiments, a concentration by mass, by volume, or both of the graphene sheet in the first electrode is about 0.1% to about 0.2%, about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 10%, about 0.2% to about 0.5%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7%, about 3% to about 8%, about 3% to about 10%, about 4% to about 5%, about 4% to about 6%, about 4% to about 7%, about 4% to about 8%, about 4% to about 10%, about 5% to about 6%, about 5% to about 7%, about 5% to about 8%, about 5% to about 10%, about 6% to about 7%, about 6% to about 8%, about 6% to about 10%, about 7% to about 8%, about 7% to about 10%, or about 8% to about 10%. In some embodiments, a concentration by mass, by volume, or both of the graphene sheet in the first electrode is about 0.1%, about 0.2%, about 0.5%, about 1%, about 2%, about 3%, about 4%, about 5%, about 6%, about 7%, about 8%, or about 10%. In some embodiments, a concentration by mass, by volume, or both of the graphene sheet in the first electrode is at least about 0.1%, about 0.2%, about 0.5%, about 1%, about 2%, about 3%, about 4%, about 5%, about 6%, about 7%, or about 8%. In some embodiments, a concentration by mass, by volume, or both of the graphene sheet in the first electrode is at most about 0.2%, about 0.5%, about 1%, about 2%, about 3%, about 4%, about 5%, about 6%, about 7%, about 8%, or about 10%.

In some embodiments, a concentration by mass, by volume, or both of the LDH in the first electrode is about 1% to about 80%. In some embodiments, a concentration by mass, by volume, or both of the LDH in the first electrode is about 1% to about 5%, about 1% to about 10%, about 1% to about 20%, about 1% to about 30%, about 1% to about 40%, about 1% to about 50%, about 1% to about 60%, about 1% to about 70%, about 1% to about 80%, about 5% to about 10%, about 5% to about 20%, about 5% to about 30%, about 5% to about 40%, about 5% to about 50%, about 5% to about 60%, about 5% to about 70%, about 5% to about 80%, about 10% to about 20%, about 10% to about 30%, about 10% to about 40%, about 10% to about 50%, about 10% to about 60%, about 10% to about 70%, about 10% to about 80%, about 20% to about 30%, about 20% to about 40%, about 20% to about 50%, about 20% to about 60%, about 20% to about 70%, about 20% to about 80%, about 30% to about 40%, about 30% to about 50%, about 30% to about 60%, about 30% to about 70%, about 30% to about 80%, about 40% to about 50%, about 40% to about 60%, about 40% to about 70%, about 40% to about 80%, about 50% to about 60%, about 50% to about 70%, about 50% to about 80%, about 60% to about 70%, about 60% to about 80%, or about 70% to about 80%. In some embodiments, a concentration by mass, by volume, or both of the LDH in the first electrode is about 1%, about 5%, about 10%, about 20%, about 30%, about 40%, about 50%, about 60%, about 70%, or about 80%. In some embodiments, a concentration by mass, by volume, or both of the LDH in the first electrode is at least about 1%, about 5%, about 10%, about 20%, about 30%, about 40%, about 50%, about 60%, or about 70%. In some embodiments, a concentration by mass, by volume, or both of the LDH in the first electrode is at most about 5%, about 10%, about 20%, about 30%, about 40%, about 50%, about 60%, about 70%, or about 80%.

In some embodiments, a concentration by mass, by volume, or both of the binder in the first electrode is about 1% to about 20%. In some embodiments, a concentration by mass, by volume, or both of the binder in the first electrode is about 1% to about 2%, about 1% to about 5%, about 1% to about 8%, about 1% to about 10%, about 1% to about 12%, about 1% to about 14%, about 1% to about 16%, about 1% to about 18%, about 1% to about 20%, about 2% to about 5%, about 2% to about 8%, about 2% to about 10%, about 2% to about 12%, about 2% to about 14%, about 2% to about 16%, about 2% to about 18%, about 2% to about 20%, about 5% to about 8%, about 5% to about 10%, about 5% to about 12%, about 5% to about 14%, about 5% to about 16%, about 5% to about 18%, about 5% to about 20%, about 8% to about 10%, about 8% to about 12%, about 8% to about 14%, about 8% to about 16%, about 8% to about 18%, about 8% to about 20%, about 10% to about 12%, about 10% to about 14%, about 10% to about 16%, about 10% to about 18%, about 10% to about 20%, about 12% to about 14%, about 12% to about 16%, about 12% to about 18%, about 12% to about 20%, about 14% to about 16%, about 14% to about 18%, about 14% to about 20%, about 16% to about 18%, about 16% to about 20%, or about 18% to about 20%. In some embodiments, a concentration by mass, by volume, or both of the binder in the first electrode is about 1%, about 2%, about 5%, about 8%, about 10%, about 12%, about 14%, about 16%, about 18%, or about 20%. In some embodiments, a concentration by mass, by volume, or both of the binder in the first electrode is at least about 1%, about 2%, about 5%, about 8%, about 10%, about 12%, about 14%, about 16%, or about 18%. In some embodiments, a concentration by mass, by volume, or both of the binder in the first electrode is at most about 2%, about 5%, about 8%, about 10%, about 12%, about 14%, about 16%, about 18%, or about 20%.

In some embodiments, a concentration by mass, by volume, or both of the conductive additive in the first electrode is about 1% to about 30%. In some embodiments, a concentration by mass, by volume, or both of the conductive additive in the first electrode is about 1% to about 2%, about 1% to about 5%, about 1% to about 10%, about 1% to about 14%, about 1% to about 18%, about 1% to about 22%, about 1% to about 26%, about 1% to about 30%, about 2% to about 5%, about 2% to about 10%, about 2% to about 14%, about 2% to about 18%, about 2% to about 22%, about 2% to about 26%, about 2% to about 30%, about 5% to about 10%, about 5% to about 14%, about 5% to about 18%, about 5% to about 22%, about 5% to about 26%, about 5% to about 30%, about 10% to about 14%, about 10% to about 18%, about 10% to about 22%, about 10% to about 26%, about 10% to about 30%, about 14% to about 18%, about 14% to about 22%, about 14% to about 26%, about 14% to about 30%, about 18% to about 22%, about 18% to about 26%, about 18% to about 30%, about 22% to about 26%, about 22% to about 30%, or about 26% to about 30%. In some embodiments, a concentration by mass, by volume, or both of the conductive additive in the first electrode is about 1%, about 2%, about 5%, about 10%, about 14%, about 18%, about 22%, about 26%, or about 30%. In some embodiments, a concentration by mass, by volume, or both of the conductive additive in the first electrode is at least about 1%, about 2%, about 5%, about 10%, about 14%, about 18%, about 22%, or about 26%. In some embodiments, a concentration by mass, by volume, or both of the conductive additive in the first electrode is at most about 2%, about 5%, about 10%, about 14%, about 18%, about 22%, about 26%, or about 30%.

In some embodiments, the plurality of graphene sheets comprises about 5 layers to about 1,000,000,000 layers. In some embodiments, the plurality of graphene sheets comprises about 5 layers to about 10 layers, about 5 layers to about 100 layers, about 5 layers to about 1,000 layers, about 5 layers to about 10,000 layers, about 5 layers to about 100,000 layers, about 5 layers to about 1,000,000 layers, about 5 layers to about 10,000,000 layers, about 5 layers to about 100,000,000 layers, about 5 layers to about 1,000,000,000 layers, about 10 layers to about 100 layers, about 10 layers to about 1,000 layers, about 10 layers to about 10,000 layers, about 10 layers to about 100,000 layers, about 10 layers to about 1,000,000 layers, about 10 layers to about 10,000,000 layers, about 10 layers to about 100,000,000 layers, about 10 layers to about 1,000,000,000 layers, about 100 layers to about 1,000 layers, about 100 layers to about 10,000 layers, about 100 layers to about 100,000 layers, about 100 layers to about 1,000,000 layers, about 100 layers to about 10,000,000 layers, about 100 layers to about 100,000,000 layers, about 100 layers to about 1,000,000,000 layers, about 1,000 layers to about 10,000 layers, about 1,000 layers to about 100,000 layers, about 1,000 layers to about 1,000,000 layers, about 1,000 layers to about 10,000,000 layers, about 1,000 layers to about 100,000,000 layers, about 1,000 layers to about 1,000,000,000 layers, about 10,000 layers to about 100,000 layers, about 10,000 layers to about 1,000,000 layers, about 10,000 layers to about 10,000,000 layers, about 10,000 layers to about 100,000,000 layers, about 10,000 layers to about 1,000,000,000 layers, about 100,000 layers to about 1,000,000 layers, about 100,000 layers to about 10,000,000 layers, about 100,000 layers to about 100,000,000 layers, about 100,000 layers to about 1,000,000,000 layers, about 1,000,000 layers to about 10,000,000 layers, about 1,000,000 layers to about 100,000,000 layers, about 1,000,000 layers to about 1,000,000,000 layers, about 10,000,000 layers to about 100,000,000 layers, about 10,000,000 layers to about 1,000,000,000 layers, or about 100,000,000 layers to about 1,000,000,000 layers. In some embodiments, the plurality of graphene sheets comprises about 5 layers, about 10 layers, about 100 layers, about 1,000 layers, about 10,000 layers, about 100,000 layers, about 1,000,000 layers, about 10,000,000 layers, about 100,000,000 layers, or about 1,000,000,000 layers. In some embodiments, the plurality of graphene sheets comprises at least about 5 layers, about 10 layers, about 100 layers, about 1,000 layers, about 10,000 layers, about 100,000 layers, about 1,000,000 layers, about 10,000,000 layers, or about 100,000,000 layers. In some embodiments, the plurality of graphene sheets comprises at most about 10 layers, about 100 layers, about 1,000 layers, about 10,000 layers, about 100,000 layers, about 1,000,000 layers, about 10,000,000 layers, about 100,000,000 layers, or about 1,000,000,000 layers.

Layered Double Hydroxides

In some embodiments, the quantity of LDH in the electrodes can be used to tune the performance of the electrodes and energy storage devices. In some embodiments, increasing the amount of LDH increases the specific capacity for high energy density applications.

In some embodiments, the LDH is bonded to a graphene sheet. In some embodiments, the concentration by mass, by volume, or both of the graphene sheet of below about 10% enables the graphene to serve as a substrate for LDH growth but does not form a complete matrix that limits the density of the LDH-graphene composite 720. In some embodiments, the LDH is a nanofiber, a nanoplatelet, a nanoflower, a nanodot, a nanoparticle, or any combination thereof. In some embodiments, the LDH is a powder, a bulk material, a slurry, a paste, or a dispersion. In some embodiments, the LDH is synthesized as a powder that can be easily processed into slurries or pastes for large-scale electrode manufacturing.

Figure 11A:
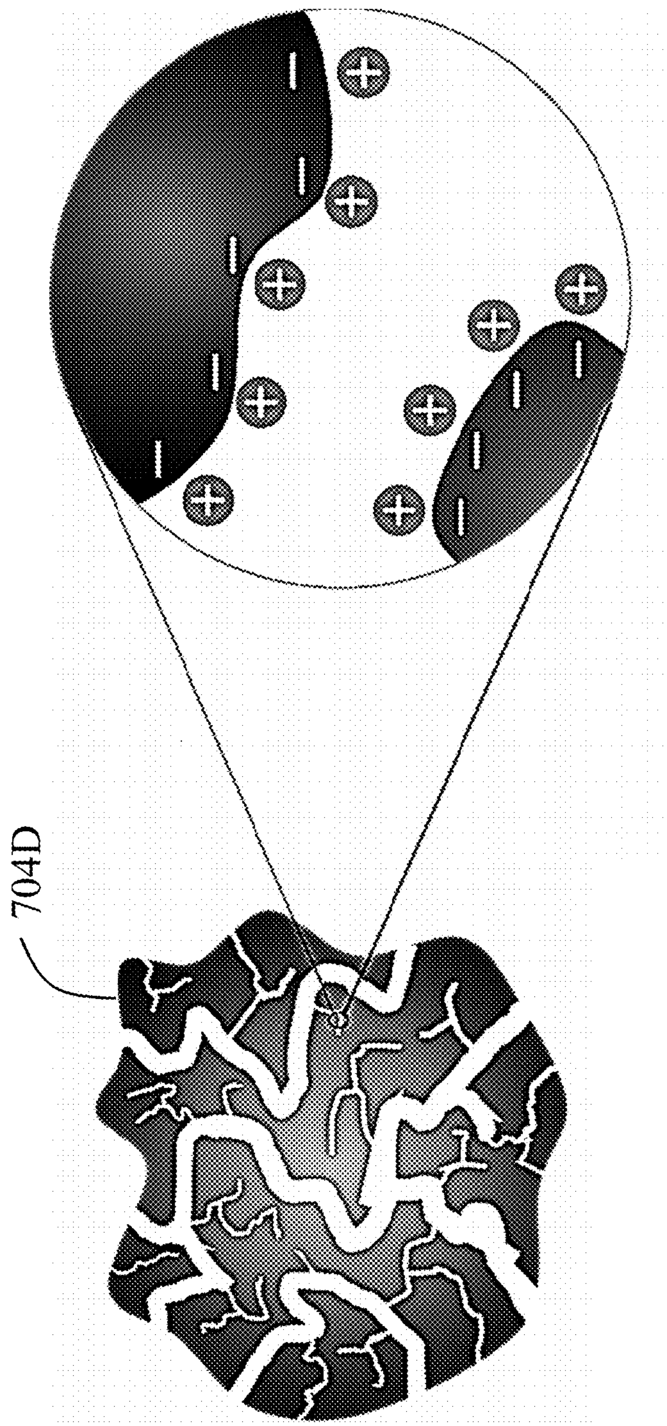
FIG. 11A shows a diagram of the charge storage within a three-dimensional carbon additive, in accordance with an embodiment herein.
Figure 11B:
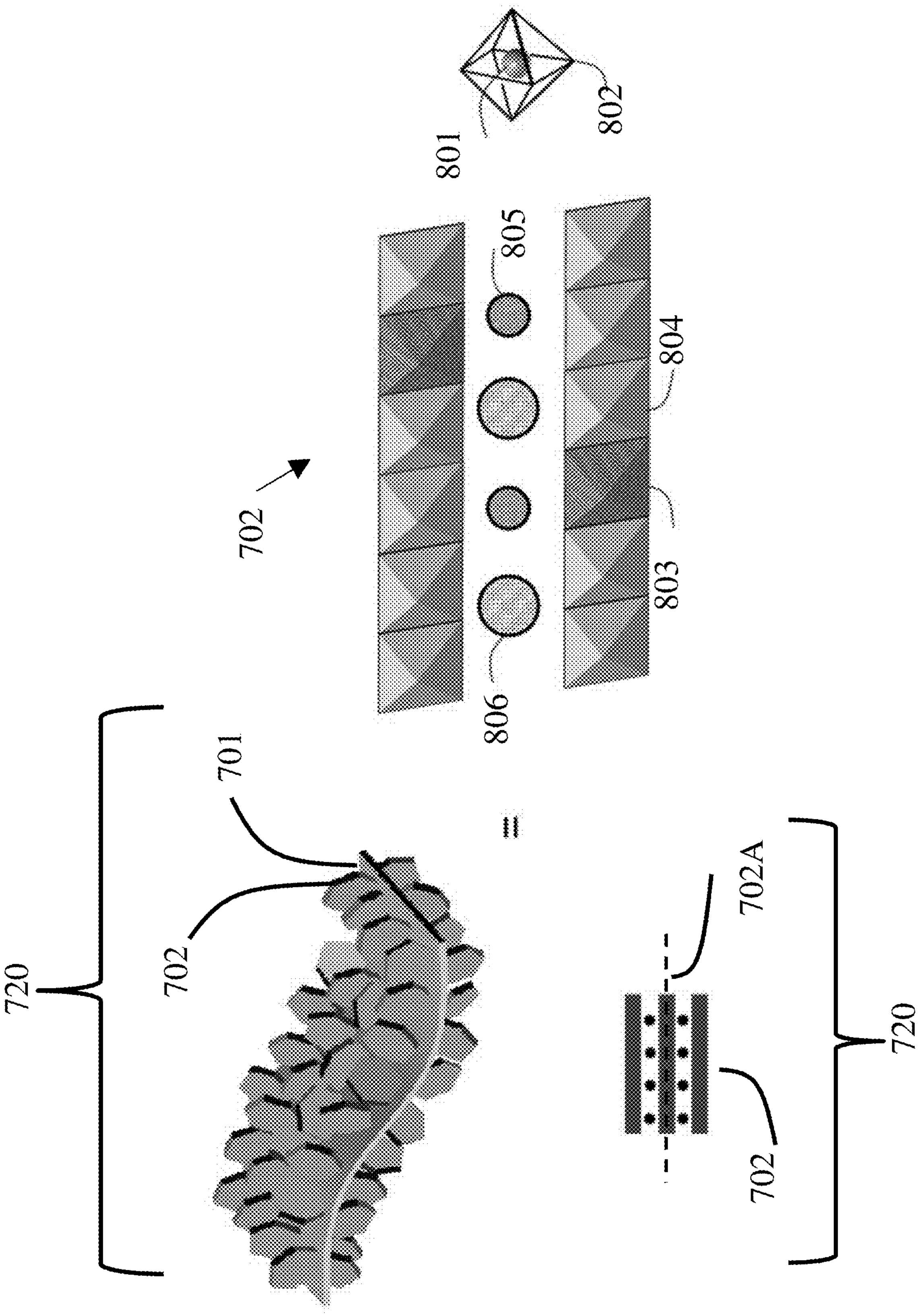
FIG. 11B shows a diagram of the components within an LDH, in accordance with an embodiment herein.

FIG. 11A shows the charge storage mechanisms in the three-dimensional carbon additive of a first electrode. This storage mechanism can be utilized in supercapacitor-battery hybrid energy storage system with electric double layers in the high surface area carbon material and electrochemical reactions within the LDH. FIG. 11B also illustrates how charge can be stored on the microscopic scale for both the high surface area carbon and LDH.

In some embodiments, LDHs enable electrochemical storage in the first electrode. FIG. 11B shows a diagram of an LDH-graphene composite 720 and a LDH 702. An LDH 702 is an ionic solid characterized by a layered structure with the generic layer sequence [AcB Z AcB], where c represents layers of metal cations, wherein A and B represent layers of hydroxide ($HO^-$) anions, and wherein Z represents layers of other anions and neutral molecules. In some embodiments, the LDH 702 comprises a metal cation 801, a hydroxide ion 802, a first octahedral site with trivalent metal cations 803, a second octahedral site with divalent metal cations 804, a water molecule 805, an anion ($A^-$) 806, or any combination thereof. In some embodiments, the axis of symmetry 702A of the LDH 702 intersects the trivalent metal cation 803, the second octahedral site with divalent metal cations 804, or both.

The general formula of LDH 702 is:

$$[M^{2+}_{1-x}M^{3+}_{x}(OH)_2]^{x+}(A^{m-})_{x/m}.nH_2O$$

wherein $M^{2+}$ is a bivalent cation, $M^{3+}$ is a trivalent cation, and A is a counter anion with negative charge (m). In some embodiments, the LDH 702 has an octahedral structure, in which metal cations are accommodated in the centers of the edge-sharing octahedral, and wherein each cation contains six $OH^-$ ions that are pointed towards the corners and form infinite sheets. In some embodiments, the $M^{2+}$ and $M^{3+}$ cations are distributed in a uniform manner in the structural hydroxide layers of the LDH. In some embodiments, the LDH comprises a zinc-bismuth LDH, a bismuth hydroxide LDH, a ferric hydroxide LDH, a nickel hydroxide LDH, a nickel-cobalt LDH, or any combination thereof.

In the octahedral structure, the metal cations are accommodated in the centers of the edge-sharing octahedral. In some embodiments, each cation contains six $OH^-$ ions that are pointed towards the corners and form infinite sheets. One of the important structural characteristics of LDH materials is that the $M^{2+}$ and $M^{3+}$ cations are distributed in a uniform manner in the hydroxide layers.

In some embodiments, the metal cation 801 comprises an $M^{2+}$ metal cation, an $M^{3+}$ metal, or both. In some embodiments, the $M^{2+}$ metal cation comprises barium, cadmium, calcium, cobalt, copper (II), iron (II), lead (II), magnesium, mercury (I), mercury (II), nickel, strontium, tin, zinc, or any combination thereof. In some embodiments, the $M^{3+}$ metal cation comprises aluminum, bismuth, chromium (III), iron (III), or any combination thereof.

In some embodiments, the hydroxide ion 802 comprises aluminum hydroxide, ammonium hydroxide, arsenic hydroxide, barium hydroxide, beryllium hydroxide, bismuth (III) hydroxide, boron hydroxide, cadmium hydroxide, calcium hydroxide, cerium(III) hydroxide, cesium hydroxide, chromium(II) hydroxide, chromium(III) hydroxide, chromium(V) hydroxide, chromium(VI) hydroxide, cobalt(II) hydroxide, cobalt(III) hydroxide, copper(I) hydroxide, copper(II) hydroxide, gallium(II) hydroxide, gallium(III) hydroxide, gold(I) hydroxide, gold(III) hydroxide, indium(I) hydroxide, indium(II) hydroxide, indium(III) hydroxide, iridium(III) hydroxide, iron(II) hydroxide, iron(III) hydroxide, lanthanum hydroxide, lead(II) hydroxide, lead(IV) hydroxide, lithium hydroxide, magnesium hydroxide, manganese(II) hydroxide, manganese(III) hydroxide, manganese(IV) hydroxide, manganese(VII) hydroxide, mercury(I) hydroxide, mercury(II) hydroxide, molybdenum hydroxide, neodymium hydroxide, nickel oxo-hydroxide, nickel(II) hydroxide, nickel(III) hydroxide, niobium hydroxide, osmium(IV) hydroxide, palladium(II) hydroxide, palladium(IV) hydroxide, platinum(II) hydroxide, platinum(IV) hydroxide, plutonium(IV) hydroxide, potassium hydroxide, radium hydroxide, rubidium hydroxide, ruthenium(III) hydroxide, scandium hydroxide, silicon hydroxide, silver hydroxide, sodium hydroxide, strontium hydroxide, tantalum(V) hydroxide, technetium(II) hydroxide, tetramethylammonium hydroxide, thallium(I) hydroxide, thallium(III) hydroxide, thorium hydroxide, tin(II) hydroxide, tin(IV) hydroxide, titanium(II) hydroxide, titanium(III) hydroxide, titanium(IV) hydroxide, tungsten(II) hydroxide, uranyl hydroxide, vanadium(II) hydroxide, vanadium(III) hydroxide, vanadium(V) hydroxide, ytterbium hydroxide, yttrium hydroxide, zinc hydroxide, zirconium hydroxide. In some embodiments, the hydroxide ion 802 comprises cobalt(II) hydroxide. In some embodiments, the hydroxide ion 802 comprises cobalt(III) hydroxide. In some embodiments, the hydroxide ion 802 comprises copper(I) hydroxide. In some embodiments, the hydroxide ion 802 comprises copper(II) hydroxide. In some embodiments, the hydroxide ion 802 comprises nickel(II) hydroxide. In some embodiments, the hydroxide ion 802 comprises nickel(III) hydroxide.

In some embodiments, the hydroxide ion 802 comprises hydroxide nanoparticles, hydroxide nanopowder, hydroxide nanoflowers, hydroxide nanoflakes, hydroxide nanodots, hydroxide nanorods, hydroxide nanochains, hydroxide nanofibers, hydroxide nanoparticles, hydroxide nanoplatelets, hydroxide nanoribbons, hydroxide nanorings, hydroxide nanosheets, or a combination thereof. In some embodiments, the anion 806 comprises nitrate, sulfate, carbonate, chloride, bromide, or any combination thereof.

FIGS. 12A to 12D show scanning electron microscope (SEM) images, having a magnification of ×20,000, ×20,000, ×30,000, and ×40,000, respectively, of the microscopic structure of a non-limiting example of a zinc-bismuth (Zn—Bi) LDH/graphene composite comprising about 5% rGO and a Zn—Bi atomic ratio of 1:1. As shown therein, the LDH/graphene composite comprises agglomerated LDH/graphene nanoplates, loose LDH/graphene nanoplates, or both. As shown, the LDH/graphene nanoplates have a width or length of about 100 nm to about 3,000 nm. As shown, the LDH/graphene nanoplates have a thickness of about 10 nm to about 300 nm. As shown, the LDH/graphene nanoplates have an aspect ratio of about 1:1 to about 10:1. As shown, the graphene sheets act as nuclei for the growth of LDH nanoplates, wherein the about 1% graphene is not visible and is completely covered by the LDH. In some embodiments, per FIG. 12E, the LDH comprises domains of activated carbon (big chunks) and LDH (nanoplates). FIG. 12F shows an SEM image of the microscopic structure of agglomerated carbon black on the surface of the electrode at a magnification of ×35,000.

Figure 13A:
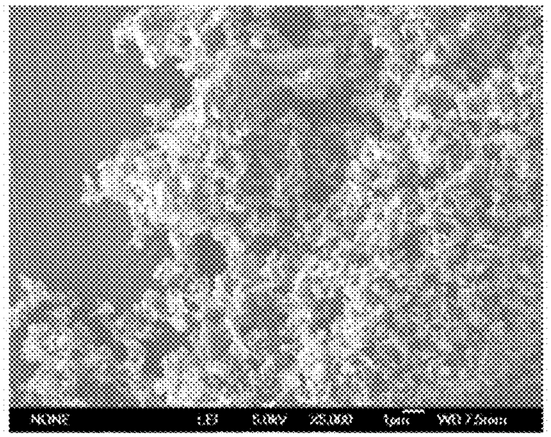
FIG. 13A shows a 5000×-magnification SEM image of a zinc bismuth LDH, in accordance with an embodiment herein.
Figure 13B:
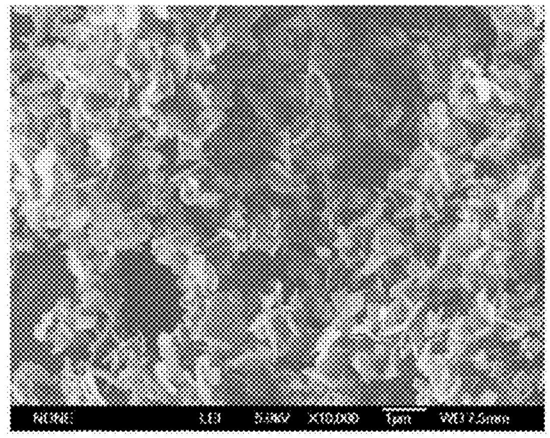
FIG. 13B shows a 10,000×-magnification SEM image of a zinc bismuth LDH, in accordance with an embodiment herein.
Figure 13C:
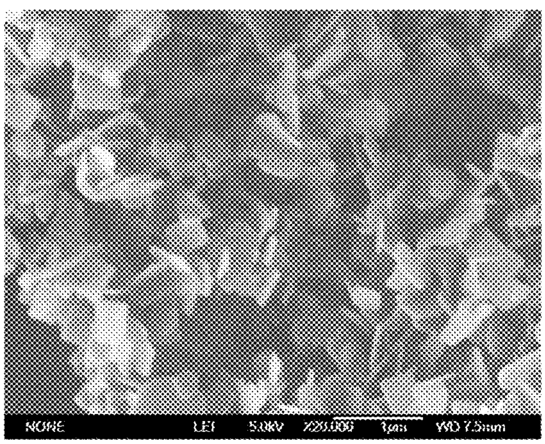
FIG. 13C shows a 20,000×-magnification SEM image of a zinc bismuth LDH, in accordance with an embodiment herein.
Figure 13D:
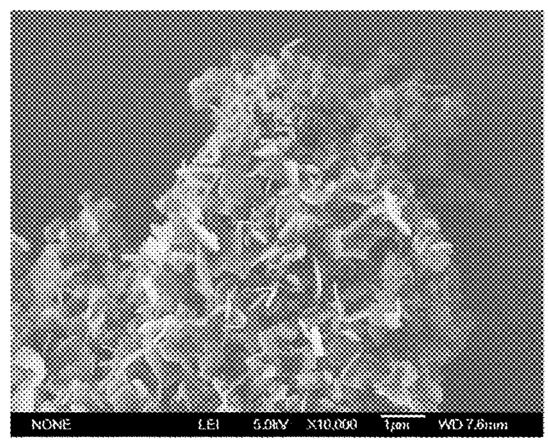
FIG. 13D shows a 10,000×-magnification SEM image of a zinc bismuth LDH, in accordance with an embodiment herein.
Figure 13E:
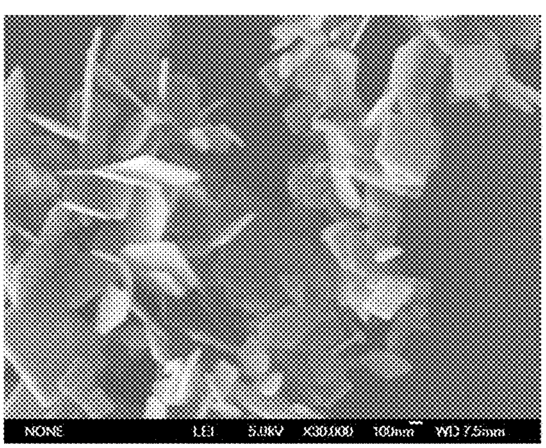
FIG. 13E shows a 30,000×-magnification SEM image of a zinc bismuth LDH, in accordance with an embodiment herein.
Figure 13F:
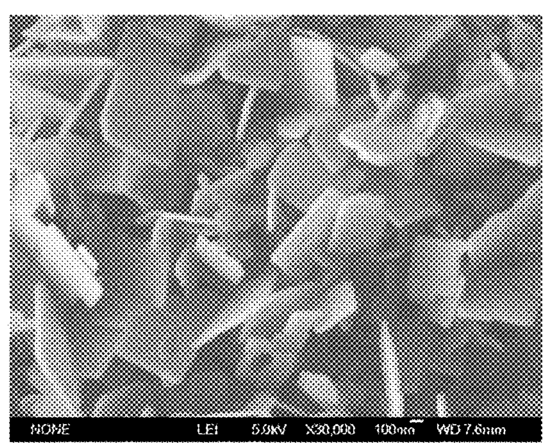
FIG. 13F shows a 30,000×-magnification SEM image of a zinc bismuth LDH, in accordance with an embodiment herein.
Figure 14A:
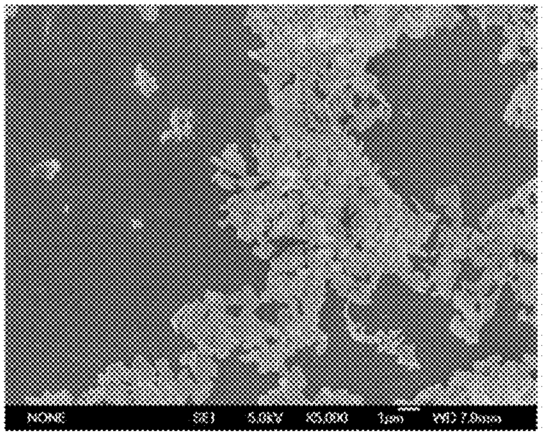
FIG. 14A shows a 5000×-magnification SEM image of a bismuth hydroxide LDH, in accordance with an embodiment herein.
Figure 14B:
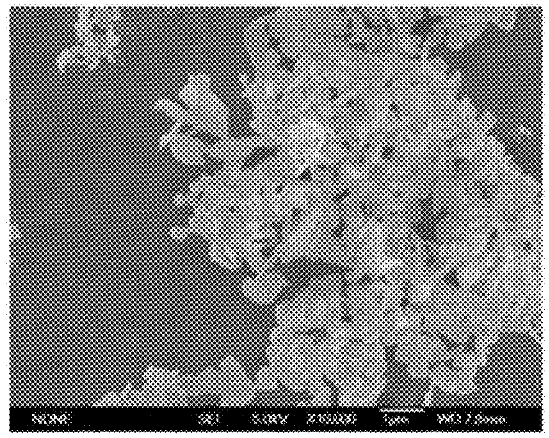
FIG. 14B shows a 10,000×-magnification SEM image of a bismuth hydroxide LDH, in accordance with an embodiment herein.
Figure 14C:
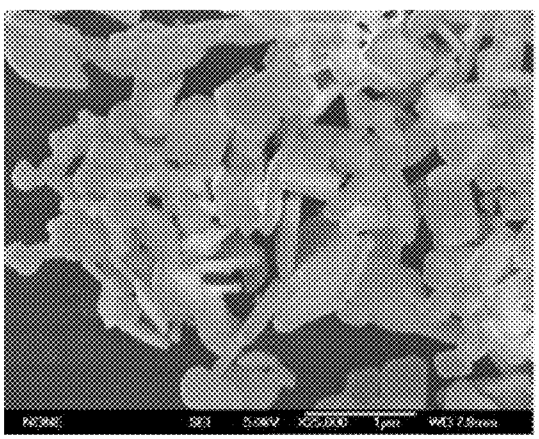
FIG. 14C shows a 25,000×-magnification SEM image of a bismuth hydroxide LDH, in accordance with an embodiment herein.
Figure 14D:
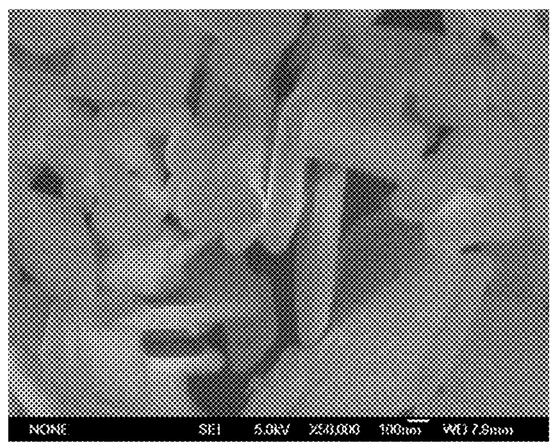
FIG. 14D shows a 50,000×-magnification SEM image of a bismuth hydroxide LDH, in accordance with an embodiment herein.
Figure 14E:
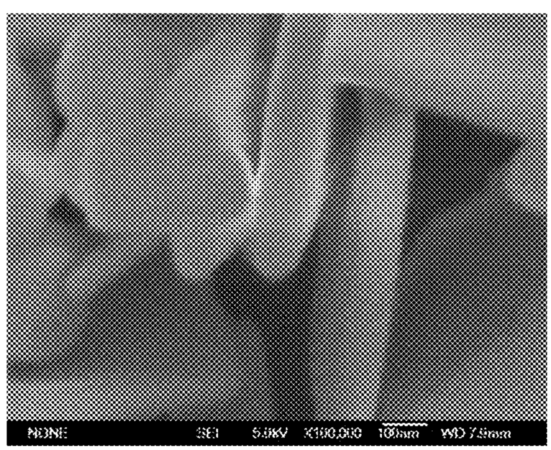
FIG. 14E shows a 100,000×-magnification SEM image of a bismuth hydroxide LDH, in accordance with an embodiment herein.

FIGS. 13A to 13D show SEM images of a non-limiting example of a Zn—Bi LDH having a Zn:Bi ratio of about 4:1 and without graphene sheets at a magnifications of ×5,000, ×10,000, ×20,000, and ×30,000, respectively. FIGS. 13E and 13F show SEM images of a non-limiting example of a Zn—Bi LDH having a Zn:Bi ratio of about 2:1 and without graphene sheets at a magnifications of ×10,000, and ×30,000, respectively. As shown therein, the LDH comprises agglomerated LDH flakes, loose LDH flakes, or both. Furthermore, as shown, the LDH flakes have a length or width of about 50 nm to about 1,000 nm. As shown, the LDH flakes have a thickness of about 10 nm to about 100 nm. As shown, the LDH/graphene flakes have an aspect ratio of about 3:1 to about 12:1. Furthermore, as shown, the absence or presence of the graphene sheets does not affect the morphology of the LDH.

FIGS. 14A to 14E show SEM images with magnifications of ×5,000, ×10,000, ×25,000, ×50,000, and ×100,000, respectively, of a bismuth hydroxide ($Bi(OH)_3$) LDH having a 1:1 bismuth/LDH atomic ratio. As shown, the non-limiting example of a $Bi(OH)_3$ forms lamellar nanoplates similar to the LDH. As such, the high content of bismuth in the LDH of FIGS. 14A to 14E improves nanoplate formation, while $Zn^{2+}$ intercalates into the sites of $Bi(OH)_3$ to form the LDH. As shown therein, the bismuth hydroxide LDH comprises agglomerated bismuth hydroxide LDH nanoplates, loose bismuth hydroxide LDH nanoplates, or both. Furthermore, as shown, the bismuth hydroxide LDH nanoplates have a length or width of about 50 nm to about 1,000 nm. As shown, the bismuth hydroxide LDH nanoplates have a thickness of about 50 nm to about 500 nm. As shown, the LDH/graphene nanoplates have an aspect ratio of about 1:1 to about 5:1.

Figure 15A:
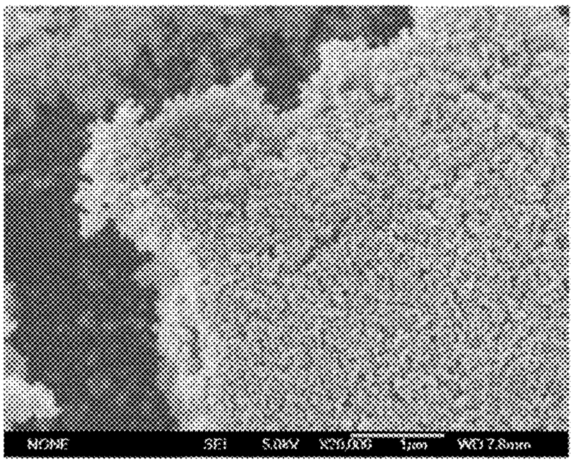
FIG. 15A shows a 20,000×-magnification SEM image of a ferric hydroxide LDH, in accordance with an embodiment herein.
Figure 15B:
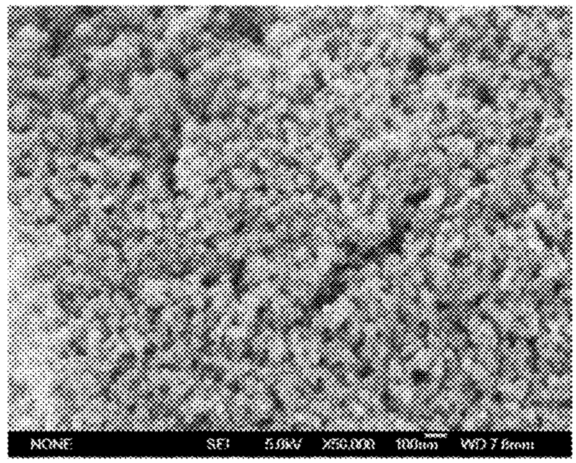
FIG. 15B shows a 50,000×-magnification SEM image of a ferric hydroxide LDH, in accordance with an embodiment herein.
Figure 15C:
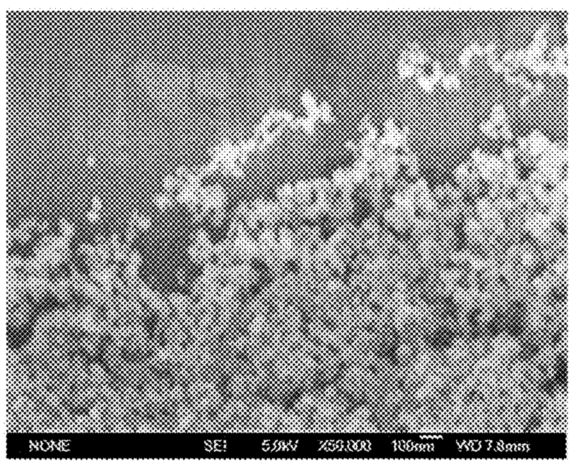
FIG. 15C shows a 50,000×-magnification SEM image of a ferric hydroxide LDH, in accordance with an embodiment herein.
Figure 16A:
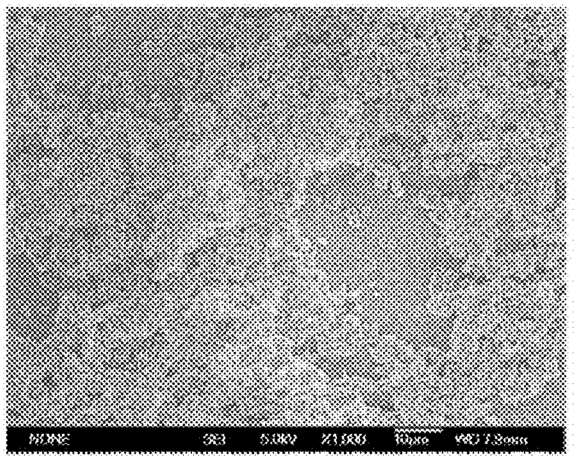
FIG. 16A shows a 1000×-magnification SEM image of a zinc hydroxide LDH, in accordance with an embodiment herein.
Figure 16B:
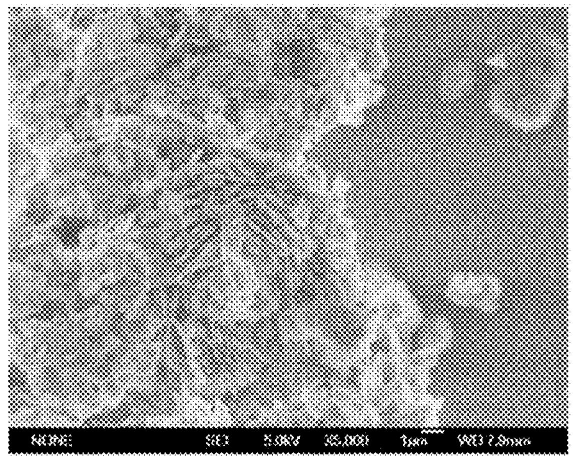
FIG. 16B shows a 5000×-magnification SEM image of a zinc hydroxide LDH, in accordance with an embodiment herein.
Figure 16C:
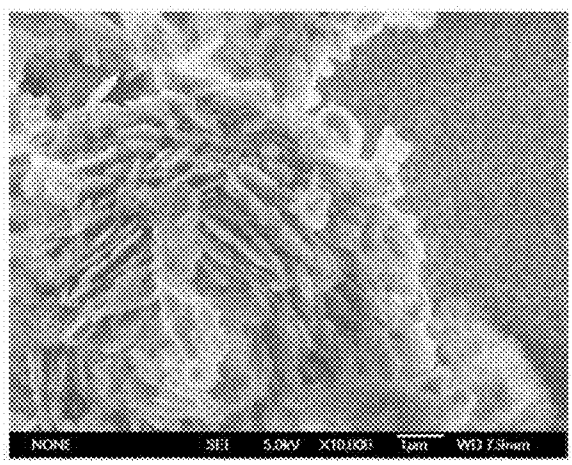
FIG. 16C shows a 10,000×-magnification SEM image of a zinc hydroxide LDH, in accordance with an embodiment herein.
Figure 16D:
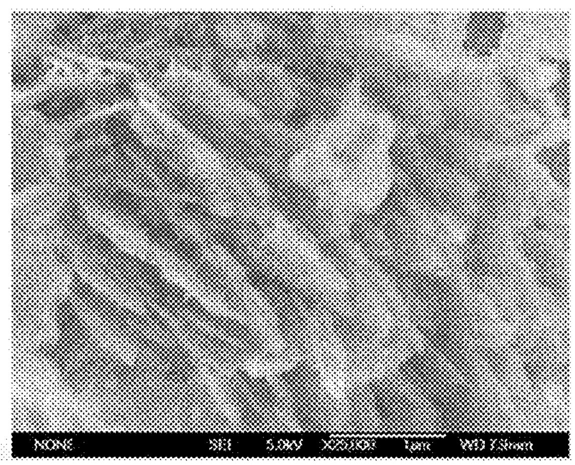
FIG. 16D shows a 25,000×-magnification SEM image of a zinc hydroxide LDH, in accordance with an embodiment herein.

FIGS. 15A to 15C show SEM images of a ferric hydroxide LDH, having a magnification of ×20,000, ×50,000, and ×50,000, respectively. As shown therein, the ferric hydroxide LDH comprises agglomerated ferric hydroxide LDH nanotubes and/or nanogranulars, loose ferric hydroxide LDH nanotubes and/or nanogranulars, or both. Furthermore, as shown, the ferric hydroxide LDH nanotubes and/or nanogranulars have a length, width, or thickness of about 5 nm to about 100 nm. As shown, the LDH/graphene nanotubes and/or nanogranulars have an aspect ratio of about 1:2 to about 2:1.

FIGS. 16A to 16D show SEM images of a zinc hydroxide LDH, having a magnification of ×1,000, ×5,000, ×10,000, and ×25,000, respectively. As shown therein, the zinc hydroxide LDH comprises agglomerated zinc hydroxide LDH nanosheets, loose zinc hydroxide LDH nanosheets, or both. Furthermore, as shown, the zinc hydroxide LDH nanosheets have a length or width of about 250 nm to about 3,000 nm. As shown, the zinc hydroxide LDH nanosheets have a thickness of about 1 nm to about 100 nm. As shown, the LDH/graphene flakes have an aspect ratio of about 100:1 to about 500:1.

Figure 17A:
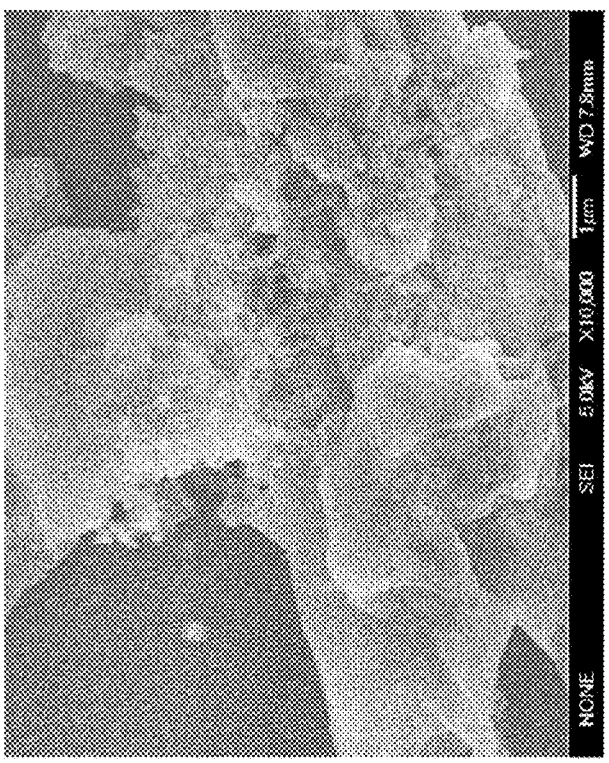
FIG. 17A shows a 10,000×-magnification SEM image of a nickel hydroxide LDH, in accordance with an embodiment herein.
Figure 17B:
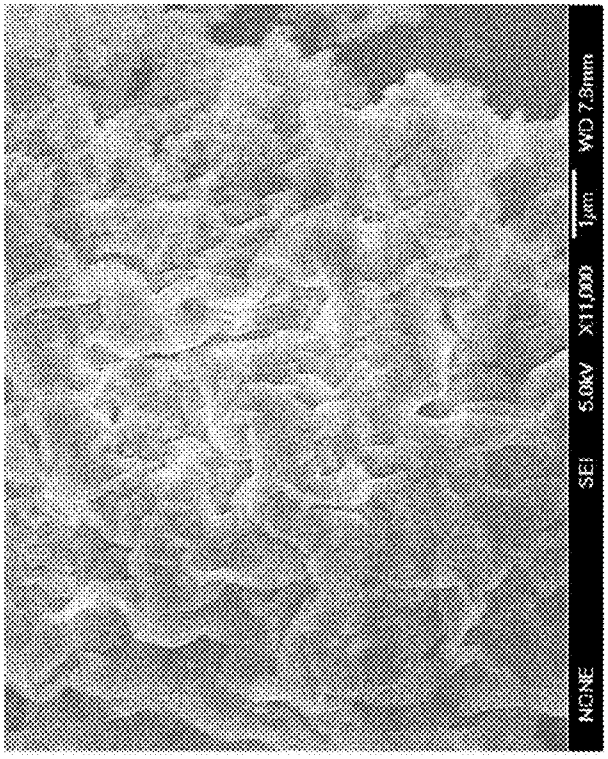
FIG. 17B shows an 11,000×-magnification SEM image of a nickel hydroxide LDH, in accordance with an embodiment herein.

FIGS. 17A and 17B show SEM images of a nickel hydroxide LDH, having a magnification of ×10,000 and ×11,000, respectively. As shown therein, the nickel hydroxide LDH comprises agglomerated nickel hydroxide LDH globules, loose nickel hydroxide LDH globules, or both lacking distinctive nanostructures.

Figure 18A:
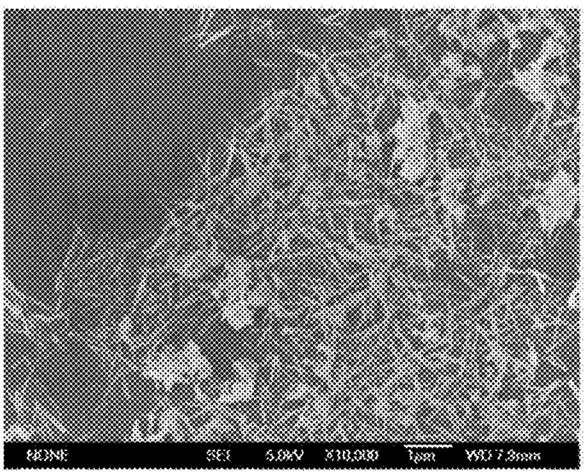
FIG. 18A shows a 10,000×-magnification SEM image of a nickel-cobalt LDH powder, in accordance with an embodiment herein.
Figure 18B:
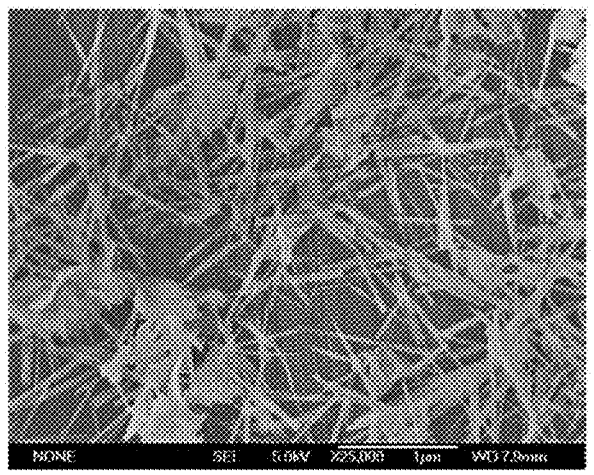
FIG. 18B shows a 25,000×-magnification SEM image of a nickel-cobalt LDH powder, in accordance with an embodiment herein.
Figure 18C:
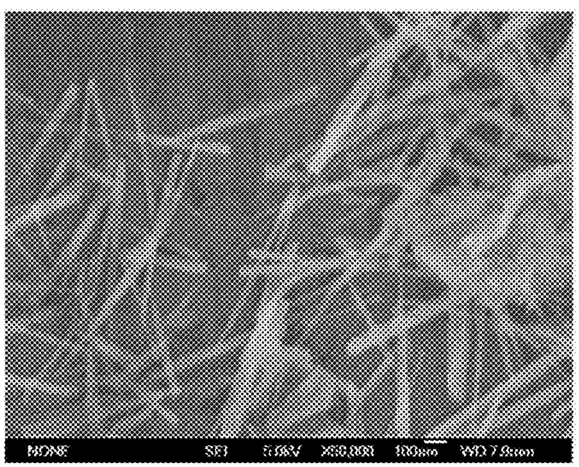
FIG. 18C shows a 50,000×-magnification SEM image of a nickel-cobalt LDH powder, in accordance with an embodiment herein.

FIGS. 18A to 18C show SEM images of a nickel-cobalt LDH powder, having a magnification of ×10,000, ×25,000, and ×50,000, respectively. As shown therein, the nickel-cobalt LDH comprises agglomerated nickel-cobalt LDH nanoribbons, loose nickel-cobalt LDH nanoribbons, or both. Furthermore, as shown, nickel-cobalt LDH nanoribbons have a thickness or width of about 10 nm to about 200 nm. As shown, the nickel-cobalt LDH nanoribbons have a length of about 500 nm to about 2,000 nm. As shown, the LDH/graphene nanoribbons have an aspect ratio of about 25:1 to about 500:1.

FIGS. 7A to 7F show SEM images of a nickel-cobalt LDH hydrothermally grown on a nickel foam substrate, having a magnification of ×1,200, ×5,000, ×10,000, ×20,000, ×30,000, and ×50,000, respectively. In some embodiments, the nickel-cobalt LDH grown on a nickel foam substrate is used as a positive electrode of an energy storage device herein. As shown therein, the nickel-cobalt LDH comprises agglomerated nickel-cobalt LDH shards, loose nickel-cobalt LDH shards, or both. Furthermore, as shown, nickel-cobalt LDH flakes have a thickness or width of about 0.1 μm to about 2 nm. As shown, the nickel-cobalt LDH flakes have a length of about 1 nm to about 200 nm. As shown, the nickel-cobalt LDH flakes have an aspect ratio of about 10:1 to about 100:1.

FIGS. 8A to 8D show SEM images of a nickel-cobalt LDH hydrothermally grown on a nickel foam substrate, having a magnification of ×5,000, ×10,000, ×25,000, and ×50,000, respectively. In some embodiments, the nickel-cobalt LDH grown on a nickel foam substrate is used as a positive electrode of an energy storage device herein. As shown therein, the nickel-cobalt LDH comprises agglomerated nickel-cobalt LDH shards, loose nickel-cobalt LDH shards, or both. Furthermore, as shown the nickel-cobalt LDH flakes have a thickness or width of about 0.1 μm to about 4 nm. As shown, the nickel-cobalt LDH flakes have a length of about 10 nm to about 200 nm. As shown, the nickel-cobalt LDH flakes have an aspect ratio of about 10:1 to about 50:1.

Electrolytes

In some embodiments, various electrolytes can be used in the energy storage devices herein. In some embodiments, per FIGS. 4, 5, and 6A and 6B, the electrolyte 430 comprises water, wherein the water converts to hydroxide during charging of the first, second, third, and fourth energy storage devices 400, 500, 600A, and 600B, respectively, and wherein the hydroxide converts to water during the discharging of the first, second, third, and fourth energy storage devices 400, 500, 600A, and 600B, respectively. In some embodiments, the composition of the electrolyte 430 of the first, second, third, and fourth energy storage devices 400, 500, 600A, and 600B, respectively, individually or in combination with the specific compositions of the primary, secondary, tertiary, and quaternary first electrodes 410, 510, 610A, and 610B, respectively, and the second electrode 420, enable the high energy densities, high power densities, and fast charging times disclosed herein.

In some embodiments, the electrolyte 430 comprises: a hydroxide, an additive, a stabilizer, a hydrogen evolution inhibitor, and a conductivity enhancer. In some embodiments, the electrolyte 430 comprises zinc oxide powder dissolved in an alkaline solution of 7.1 M potassium hydroxide in water.

Hydrogen evolution reaction is the production of hydrogen through the process of water electrolysis, which causes the desorption of molecules from the surface of an electrode of one of a first, second, third, and fourth energy storage devices 400, 500, 600A, and 600B, respectively. As such, in some embodiments, at least one of the additive, the stabilizer, and the hydrogen evolution inhibitor reduces and/or inhibits the evolution of hydrogen gas on the surface of the electrode of one of a first, second, third, and fourth energy storage devices 400, 500, 600A, and 600B, respectively. In some embodiments, at least one of the additive, the stabilizer, and the hydrogen evolution inhibitor prevents and/or reduces the decomposition of the electrolyte 430, the primary, secondary, tertiary, and quaternary first electrodes 410, 510, 610A, and 610B, respectively, and the second electrode 420. In some embodiments, at least one of the additive, the stabilizer, and the hydrogen evolution inhibitor prevents and/or reduces the decomposition of the electrolyte 430, the primary, secondary, tertiary, and quaternary first electrodes 410, 510, 610A, and 610B, respectively, and the second electrode 420 during charging, discharging, or both. In some embodiments, such decomposition prevention/reduction increases the discharge capacity of the first, second, third, and fourth energy storage devices 400, 500, 600A, and 600B, respectively, herein. In some embodiments, at least one of the additive, the stabilizer, and the hydrogen evolution inhibitor inhibit the active materials in the primary, secondary, tertiary, and quaternary first electrodes 410, 510, 610A, and 610B, respectively, the second electrode 420, or both from dissolving into the electrolyte 430. In some embodiments, at least one of the additive, the stabilizer, and the hydrogen evolution inhibitor inhibit the active materials in the primary, secondary, tertiary, and quaternary first electrodes 410, 510, 610A, and 610B, respectively, the second electrode 420, or both from dissolving into the electrolyte 430 during charging, discharging, or both. In some embodiments, at least one of the additive, the stabilizer, and the hydrogen evolution inhibitor enables zero net decomposition or dissolution of the primary, secondary, tertiary, and quaternary first electrodes 410, 510, 610A, and 610B, respectively, the second electrode 420, or both. In some embodiments, such dissolution prevention/reduction increases the discharge capacity of the first, second, third, and fourth energy storage devices 400, 500, 600A, and 600B, respectively, herein.

Furthermore, dendrite formation on the primary, secondary, tertiary, and quaternary first electrodes 410, 510, 610A, and 610B, respectively, the second electrode 420, or both during hydrogen evolution is detrimental to the stability of the first, second, third, and fourth energy storage devices 400, 500, 600A, and 600B, respectively. Such sharp dendrites puncture components of the first, second, third, and fourth energy storage devices 400, 500, 600A, and 600B, respectively, such as the separators and current collectors. As such, in some embodiments, at least one of the additive and the hydrogen evolution inhibitor reduces and/or inhibits the formation of dendrites on the primary, secondary, tertiary, and quaternary first electrodes 410, 510, 610A, and 610B, respectively, the second electrode 420, or both. In some embodiments, the reduced/inhibited dendrite formation enables the first, second, third, and fourth energy storage devices 400, 500, 600A, and 600B, respectively, with increased stability and performance over a number of charging and discharging cycles.

In some embodiments, the stabilizer contributes to the redox reactions during charging and discharging of the first, second, third, and fourth energy storage devices 400, 500, 600A, and 600B, respectively, herein. In some embodiments, the stabilizer suppresses hydrogen evolution during charging and discharging of the first, second, third, and fourth energy storage devices 400, 500, 600A, and 600B, respectively, herein. In some embodiments, the stabilizer is soluble in strong alkaline solutions. In one embodiment, the stabilizer comprises zinc oxide which converts into hydroxide or zincate during the redox reaction. In another embodiment, the stabilizer comprises bismuth. In some embodiments, the conductivity enhancer increases a conductivity of the primary, secondary, tertiary, and quaternary first electrodes 410, 510, 610A, and 610B, respectively, the second electrode 420, or both.

In some embodiments, the hydroxide ion comprises aluminum hydroxide, barium hydroxide, benzyltrimethylammonium hydroxide, beryllium hydroxide, cadmium hydroxide, cesium hydroxide, calcium hydroxide, cerium(III) hydroxide, chromium acetate hydroxide, chromium(III) hydroxide, cobalt(II) hydroxide, cobalt(III) hydroxide, copper(I) hydroxide, copper(II) hydroxide, curium hydroxide, gallium(III) hydroxide, germanium(II) hydroxide, gold(III) hydroxide, indium(III) hydroxide, iron(II) hydroxide, iron (III) oxide-hydroxide, lanthanum hydroxide, lead(II) hydroxide, lead(IV) hydroxide, lithium hydroxide, magnesium hydroxide, manganese(II) hydroxide, mercury(II) hydroxide, metal hydroxide, nickel(II) hydroxide, potassium hydroxide, rubidium hydroxide, sodium hydroxide, strontium hydroxide, tetrabutylammonium hydroxide, tetramethylammonium hydroxide, thallium hydroxide, thallium(I) hydroxide, thallium(III) hydroxide, tin(II) hydroxide, uranyl hydroxide, zinc hydroxide, zirconium(IV) hydroxide, or any combination thereof.

In some embodiments, the additive comprises calcium hydroxide, calcium titanate, calcium zincate, potassium fluoride, sodium phosphate tribasic, potassium phosphate, sodium fluoride, potassium borate, potassium carbonate, or any combination thereof.

In some embodiments, the stabilizer comprises an electrochemical couple of the electrode. In some embodiments, the stabilizer comprises zinc oxide, zinc hydroxide, sodium zincate, potassium zincate, bismuth oxide, cadmium oxide, indium sulfate, lead oxide, a metallic zinc powder, or any combination thereof.

In some embodiments, the hydrogen evolution inhibitor comprises bismuth oxide, cadmium oxide, a conductive ceramic, lead oxide, a metallic zinc powder, antimony sulfate, gallium hydroxide, indium sulfate, lithium hydroxide, or any combination thereof.

In some embodiments, the conductivity enhancer comprises a conductive ceramic. In some embodiments, the conductive ceramic comprises a dielectric ceramic, a piezoelectric ceramic, or a ferroelectric ceramic. In some embodiments, the conductive ceramic comprises lead zirconate titanate, barium titanate, strontium titanate, calcium titanate, magnesium titanate, calcium magnesium titanate, zinc titanate, lanthanum titanate, and neodymium titanate, barium zirconate, calcium zirconate, lead magnesium niobate, lead zinc niobate, lithium niobate, barium stannate, calcium stannate, magnesium aluminum silicate, magnesium silicate, barium tantalate, titanium dioxide, niobium oxide, zirconia, quartz, silica, sapphire, beryllium oxide, zirconium tin titanate, indium tin oxide, lanthanum-doped strontium titanate, yttrium-doped strontium titanate, yttria-stabilized zirconia, gadolinium-doped ceria, lanthanum strontium gallate magnesite, or any combination thereof.

In some embodiments, a concentration by mass of the hydroxide within the electrolyte is about 22% to about 91%. In some embodiments, a concentration by mass of the hydroxide within the electrolyte is about 22% to about 25%, about 22% to about 30%, about 22% to about 35%, about 22% to about 40%, about 22% to about 45%, about 22% to about 50%, about 22% to about 55%, about 22% to about 60%, about 22% to about 70%, about 22% to about 80%, about 22% to about 91%, about 25% to about 30%, about 25% to about 35%, about 25% to about 40%, about 25% to about 45%, about 25% to about 50%, about 25% to about 55%, about 25% to about 60%, about 25% to about 70%, about 25% to about 80%, about 25% to about 91%, about 30% to about 35%, about 30% to about 40%, about 30% to about 45%, about 30% to about 50%, about 30% to about 55%, about 30% to about 60%, about 30% to about 70%, about 30% to about 80%, about 30% to about 91%, about 35% to about 40%, about 35% to about 45%, about 35% to about 50%, about 35% to about 55%, about 35% to about 60%, about 35% to about 70%, about 35% to about 80%, about 35% to about 91%, about 40% to about 45%, about 40% to about 50%, about 40% to about 55%, about 40% to about 60%, about 40% to about 70%, about 40% to about 80%, about 40% to about 91%, about 45% to about 50%, about 45% to about 55%, about 45% to about 60%, about 45% to about 70%, about 45% to about 80%, about 45% to about 91%, about 50% to about 55%, about 50% to about 60%, about 50% to about 70%, about 50% to about 80%, about 50% to about 91%, about 55% to about 60%, about 55% to about 70%, about 55% to about 80%, about 55% to about 91%, about 60% to about 70%, about 60% to about 80%, about 60% to about 91%, about 70% to about 80%, about 70% to about 91%, or about 80% to about 91%. In some embodiments, a concentration by mass of the hydroxide within the electrolyte is about 22%, about 25%, about 30%, about 35%, about 40%, about 45%, about 50%, about 55%, about 60%, about 70%, about 80%, or about 91%. In some embodiments, a concentration by mass of the hydroxide within the electrolyte is at least about 22%, about 25%, about 30%, about 35%, about 40%, about 45%, about 50%, about 55%, about 60%, about 70%, or about 80%. In some embodiments, a concentration by mass of the hydroxide within the electrolyte is at most about 25%, about 30%, about 35%, about 40%, about 45%, about 50%, about 55%, about 60%, about 70%, about 80%, or about 91%.

In some embodiments, a concentration by mass of the additive within the electrolyte is about 5% to about 16%. In some embodiments, a concentration by mass of the additive within the electrolyte is about 5% to about 6%, about 5% to about 7%, about 5% to about 8%, about 5% to about 9%, about 5% to about 10%, about 5% to about 11%, about 5% to about 12%, about 5% to about 13%, about 5% to about 14%, about 5% to about 15%, about 5% to about 16%, about 6% to about 7%, about 6% to about 8%, about 6% to about 9%, about 6% to about 10%, about 6% to about 11%, about 6% to about 12%, about 6% to about 13%, about 6% to about 14%, about 6% to about 15%, about 6% to about 16%, about 7% to about 8%, about 7% to about 9%, about 7% to about 10%, about 7% to about 11%, about 7% to about 12%, about 7% to about 13%, about 7% to about 14%, about 7% to about 15%, about 7% to about 16%, about 8% to about 9%, about 8% to about 10%, about 8% to about 11%, about 8% to about 12%, about 8% to about 13%, about 8% to about 14%, about 8% to about 15%, about 8% to about 16%, about 9% to about 10%, about 9% to about 11%, about 9% to about 12%, about 9% to about 13%, about 9% to about 14%, about 9% to about 15%, about 9% to about 16%, about 10% to about 11%, about 10% to about 12%, about 10% to about 13%, about 10% to about 14%, about 10% to about 15%, about 10% to about 16%, about 11% to about 12%, about 11% to about 13%, about 11% to about 14%, about 11% to about 15%, about 11% to about 16%, about 12% to about 13%, about 12% to about 14%, about 12% to about 15%, about 12% to about 16%, about 13% to about 14%, about 13% to about 15%, about 13% to about 16%, about 14% to about 15%, about 14% to about 16%, or about 15% to about 16%. In some embodiments, a concentration by mass of the additive within the electrolyte is about 5%, about 6%, about 7%, about 8%, about 9%, about 10%, about 11%, about 12%, about 13%, about 14%, about 15%, or about 16%. In some embodiments, a concentration by mass of the additive within the electrolyte is at least about 5%, about 6%, about 7%, about 8%, about 9%, about 10%, about 11%, about 12%, about 13%, about 14%, or about 15%. In some embodiments, a concentration by mass of the additive within the electrolyte is at most about 6%, about 7%, about 8%, about 9%, about 10%, about 11%, about 12%, about 13%, about 14%, about 15%, or about 16%.

In some embodiments, a concentration by mass of the stabilizer within the electrolyte is about 1% to about 5%. In some embodiments, a concentration by mass of the stabilizer within the electrolyte is about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%. In some embodiments, a concentration by mass of the stabilizer within the electrolyte is about 1%, about 1.5%, about 2%, about 2.5%, about 3%, about 3.5%, about 4%, about 4.5%, or about 5%. In some embodiments, a concentration by mass of the stabilizer within the electrolyte is at least about 1%, about 1.5%, about 2%, about 2.5%, about 3%, about 3.5%, about 4%, or about 4.5%. In some embodiments, a concentration by mass of the stabilizer within the electrolyte is at most about 1.5%, about 2%, about 2.5%, about 3%, about 3.5%, about 4%, about 4.5%, or about 5%.

In some embodiments, a concentration by mass of the hydrogen evolution inhibitor within the electrolyte is about 1% to about 5%. In some embodiments, a concentration by mass of the hydrogen evolution inhibitor within the electrolyte is about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%. In some embodiments, a concentration by mass of the hydrogen evolution inhibitor within the electrolyte is about 1%, about 1.5%, about 2%, about 2.5%, about 3%, about 3.5%, about 4%, about 4.5%, or about 5%. In some embodiments, a concentration by mass of the hydrogen evolution inhibitor within the electrolyte is at least about 1%, about 1.5%, about 2%, about 2.5%, about 3%, about 3.5%, about 4%, or about 4.5%. In some embodiments, a concentration by mass of the hydrogen evolution inhibitor within the electrolyte is at most about 1.5%, about 2%, about 2.5%, about 3%, about 3.5%, about 4%, about 4.5%, or about 5%.

In some embodiments, a concentration by mass of the conductivity enhancer within the electrolyte is about 1% to about 5%. In some embodiments, a concentration by mass of the conductivity enhancer within the electrolyte is about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%. In some embodiments, a concentration by mass of the conductivity enhancer within the electrolyte is about 1%, about 1.5%, about 2%, about 2.5%, about 3%, about 3.5%, about 4%, about 4.5%, or about 5%. In some embodiments, a concentration by mass of the conductivity enhancer within the electrolyte is at least about 1%, about 1.5%, about 2%, about 2.5%, about 3%, about 3.5%, about 4%, or about 4.5%. In some embodiments, a concentration by mass of the conductivity enhancer within the electrolyte is at most about 1.5%, about 2%, about 2.5%, about 3%, about 3.5%, about 4%, about 4.5%, or about 5%.

In some embodiments, a concentration by volume of the hydroxide within the electrolyte is about 220 g/L to about 900 g/L. In some embodiments, a concentration by volume of the hydroxide within the electrolyte is about 220 g/L to about 250 g/L, about 220 g/L to about 300 g/L, about 220 g/L to about 350 g/L, about 220 g/L to about 400 g/L, about 220 g/L to about 450 g/L, about 220 g/L to about 500 g/L, about 220 g/L to about 550 g/L, about 220 g/L to about 600 g/L, about 220 g/L to about 700 g/L, about 220 g/L to about 800 g/L, about 220 g/L to about 900 g/L, about 250 g/L to about 300 g/L, about 250 g/L to about 350 g/L, about 250 g/L to about 400 g/L, about 250 g/L to about 450 g/L, about 250 g/L to about 500 g/L, about 250 g/L to about 550 g/L, about 250 g/L to about 600 g/L, about 250 g/L to about 700 g/L, about 250 g/L to about 800 g/L, about 250 g/L to about 900 g/L, about 300 g/L to about 350 g/L, about 300 g/L to about 400 g/L, about 300 g/L to about 450 g/L, about 300 g/L to about 500 g/L, about 300 g/L to about 550 g/L, about 300 g/L to about 600 g/L, about 300 g/L to about 700 g/L, about 300 g/L to about 800 g/L, about 300 g/L to about 900 g/L, about 350 g/L to about 400 g/L, about 350 g/L to about 450 g/L, about 350 g/L to about 500 g/L, about 350 g/L to about 550 g/L, about 350 g/L to about 600 g/L, about 350 g/L to about 700 g/L, about 350 g/L to about 800 g/L, about 350 g/L to about 900 g/L, about 400 g/L to about 450 g/L, about 400 g/L to about 500 g/L, about 400 g/L to about 550 g/L, about 400 g/L to about 600 g/L, about 400 g/L to about 700 g/L, about 400 g/L to about 800 g/L, about 400 g/L to about 900 g/L, about 450 g/L to about 500 g/L, about 450 g/L to about 550 g/L, about 450 g/L to about 600 g/L, about 450 g/L to about 700 g/L, about 450 g/L to about 800 g/L, about 450 g/L to about 900 g/L, about 500 g/L to about 550 g/L, about 500 g/L to about 600 g/L, about 500 g/L to about 700 g/L, about 500 g/L to about 800 g/L, about 500 g/L to about 900 g/L, about 550 g/L to about 600 g/L, about 550 g/L to about 700 g/L, about 550 g/L to about 800 g/L, about 550 g/L to about 900 g/L, about 600 g/L to about 700 g/L, about 600 g/L to about 800 g/L, about 600 g/L to about 900 g/L, about 700 g/L to about 800 g/L, about 700 g/L to about 900 g/L, or about 800 g/L to about 900 g/L. In some embodiments, a concentration by volume of the hydroxide within the electrolyte is about 220 g/L, about 250 g/L, about 300 g/L, about 350 g/L, about 400 g/L, about 450 g/L, about 500 g/L, about 550 g/L, about 600 g/L, about 700 g/L, about 800 g/L, or about 900 g/L. In some embodiments, a concentration by volume of the hydroxide within the electrolyte is at least about 220 g/L, about 250 g/L, about 300 g/L, about 350 g/L, about 400 g/L, about 450 g/L, about 500 g/L, about 550 g/L, about 600 g/L, about 700 g/L, or about 800 g/L. In some embodiments, a concentration by volume of the hydroxide within the electrolyte is at most about 250 g/L, about 300 g/L, about 350 g/L, about 400 g/L, about 450 g/L, about 500 g/L, about 550 g/L, about 600 g/L, about 700 g/L, about 800 g/L, or about 900 g/L.

In some embodiments, a concentration by volume of the additive within the electrolyte is about 30 g/L to about 160 g/L. In some embodiments, a concentration by volume of the additive within the electrolyte is about 30 g/L to about 40 g/L, about 30 g/L to about 50 g/L, about 30 g/L to about 60 g/L, about 30 g/L to about 70 g/L, about 30 g/L to about 80 g/L, about 30 g/L to about 90 g/L, about 30 g/L to about 100 g/L, about 30 g/L to about 120 g/L, about 30 g/L to about 140 g/L, about 30 g/L to about 160 g/L, about 40 g/L to about 50 g/L, about 40 g/L to about 60 g/L, about 40 g/L to about 70 g/L, about 40 g/L to about 80 g/L, about 40 g/L to about 90 g/L, about 40 g/L to about 100 g/L, about 40 g/L to about 120 g/L, about 40 g/L to about 140 g/L, about 40 g/L to about 160 g/L, about 50 g/L to about 60 g/L, about 50 g/L to about 70 g/L, about 50 g/L to about 80 g/L, about 50 g/L to about 90 g/L, about 50 g/L to about 100 g/L, about 50 g/L to about 120 g/L, about 50 g/L to about 140 g/L, about 50 g/L to about 160 g/L, about 60 g/L to about 70 g/L, about 60 g/L to about 80 g/L, about 60 g/L to about 90 g/L, about 60 g/L to about 100 g/L, about 60 g/L to about 120 g/L, about 60 g/L to about 140 g/L, about 60 g/L to about 160 g/L, about 70 g/L to about 80 g/L, about 70 g/L to about 90 g/L, about 70 g/L to about 100 g/L, about 70 g/L to about 120 g/L, about 70 g/L to about 140 g/L, about 70 g/L to about 160 g/L, about 80 g/L to about 90 g/L, about 80 g/L to about 100 g/L, about 80 g/L to about 120 g/L, about 80 g/L to about 140 g/L, about 80 g/L to about 160 g/L, about 90 g/L to about 100 g/L, about 90 g/L to about 120 g/L, about 90 g/L to about 140 g/L, about 90 g/L to about 160 g/L, about 100 g/L to about 120 g/L, about 100 g/L to about 140 g/L, about 100 g/L to about 160 g/L, about 120 g/L to about 140 g/L, about 120 g/L to about 160 g/L, or about 140 g/L to about 160 g/L. In some embodiments, a concentration by volume of the additive within the electrolyte is about 30 g/L, about 40 g/L, about 50 g/L, about 60 g/L, about 70 g/L, about 80 g/L, about 90 g/L, about 100 g/L, about 120 g/L, about 140 g/L, or about 160 g/L. In some embodiments, a concentration by volume of the additive within the electrolyte is at least about 30 g/L, about 40 g/L, about 50 g/L, about 60 g/L, about 70 g/L, about 80 g/L, about 90 g/L, about 100 g/L, about 120 g/L, or about 140 g/L. In some embodiments, a concentration by volume of the additive within the electrolyte is at most about 40 g/L, about 50 g/L, about 60 g/L, about 70 g/L, about 80 g/L, about 90 g/L, about 100 g/L, about 120 g/L, about 140 g/L, or about 160 g/L.

In some embodiments, a concentration by volume of the stabilizer within the electrolyte is about 10 g/L to about 40 g/L. In some embodiments, a concentration by volume of the stabilizer within the electrolyte is about 10 g/L to about 12 g/L, about 10 g/L to about 14 g/L, about 10 g/L to about 16 g/L, about 10 g/L to about 18 g/L, about 10 g/L to about 20 g/L, about 10 g/L to about 24 g/L, about 10 g/L to about 28 g/L, about 10 g/L to about 32 g/L, about 10 g/L to about 36 g/L, about 10 g/L to about 40 g/L, about 12 g/L to about 14 g/L, about 12 g/L to about 16 g/L, about 12 g/L to about 18 g/L, about 12 g/L to about 20 g/L, about 12 g/L to about 24 g/L, about 12 g/L to about 28 g/L, about 12 g/L to about 32 g/L, about 12 g/L to about 36 g/L, about 12 g/L to about 40 g/L, about 14 g/L to about 16 g/L, about 14 g/L to about 18 g/L, about 14 g/L to about 20 g/L, about 14 g/L to about 24 g/L, about 14 g/L to about 28 g/L, about 14 g/L to about 32 g/L, about 14 g/L to about 36 g/L, about 14 g/L to about 40 g/L, about 16 g/L to about 18 g/L, about 16 g/L to about 20 g/L, about 16 g/L to about 24 g/L, about 16 g/L to about 28 g/L, about 16 g/L to about 32 g/L, about 16 g/L to about 36 g/L, about 16 g/L to about 40 g/L, about 18 g/L to about 20 g/L, about 18 g/L to about 24 g/L, about 18 g/L to about 28 g/L, about 18 g/L to about 32 g/L, about 18 g/L to about 36 g/L, about 18 g/L to about 40 g/L, about 20 g/L to about 24 g/L, about 20 g/L to about 28 g/L, about 20 g/L to about 32 g/L, about 20 g/L to about 36 g/L, about 20 g/L to about 40 g/L, about 24 g/L to about 28 g/L, about 24 g/L to about 32 g/L, about 24 g/L to about 36 g/L, about 24 g/L to about 40 g/L, about 28 g/L to about 32 g/L, about 28 g/L to about 36 g/L, about 28 g/L to about 40 g/L, about 32 g/L to about 36 g/L, about 32 g/L to about 40 g/L, or about 36 g/L to about 40 g/L. In some embodiments, a concentration by volume of the stabilizer within the electrolyte is about 10 g/L, about 12 g/L, about 14 g/L, about 16 g/L, about 18 g/L, about 20 g/L, about 24 g/L, about 28 g/L, about 32 g/L, about 36 g/L, or about 40 g/L. In some embodiments, a concentration by volume of the stabilizer within the electrolyte is at least about 10 g/L, about 12 g/L, about 14 g/L, about 16 g/L, about 18 g/L, about 20 g/L, about 24 g/L, about 28 g/L, about 32 g/L, or about 36 g/L. In some embodiments, a concentration by volume of the stabilizer within the electrolyte is at most about 12 g/L, about 14 g/L, about 16 g/L, about 18 g/L, about 20 g/L, about 24 g/L, about 28 g/L, about 32 g/L, about 36 g/L, or about 40 g/L.

Methods of Forming Electrodes

Provided herein are methods of forming an electrode. In some embodiments, the method comprises ambient pressure synthesis. In some embodiments, the methods herein are performed at ambient temperatures, ambient pressures, or both. In some embodiments, the low/ambient temperatures and pressures used by the methods herein enable the formation of electrodes at a large scales and reduced costs. In some embodiments, the methods herein do not comprise hydrothermal synthesis. In some embodiments, the methods herein are not performed in a dry room. In some embodiments, the methods herein are not performed in a clean room. In some embodiments, the electrodes made by the methods herein store energy through both redox reactions and ion adsorption.

In some embodiments, the method of forming the electrode comprises: forming a first dispersion comprising a three-dimensional carbon additive, a first precursor to trivalent ions, a precursor to divalent ions, and a first solvent; forming a second dispersion comprising a second solvent and a conductive additive; adding the second dispersion to the first dispersion to form a third dispersion; adding a reducing agent to the third dispersion; heating the third dispersion; cooling the third dispersion; centrifuging the third dispersion with a third solvent; drying the third dispersion; and depositing the dried third dispersion and a binder onto a current collector.

In some embodiments, heating the third dispersion comprises heating the third dispersion at a first temperature for a first time period, heating the third dispersion at a second temperature for a second time period, and heating the third dispersion at a third temperature for a third time period. In some embodiments, heating the third dispersion comprises heating the third dispersion in an autoclave. In some embodiments, forming the first dispersion occurs in a vessel that is at least partially enclosed. In some embodiments, autoclave comprises a Teflon®-lined stainless steel autoclave.

In some embodiments, at least one of the first temperature, the second temperature, and the third temperature are at ambient temperatures. In some embodiments, at least one of the first temperature, the second temperature, and the third temperature are within about 1° C., 2° C., 3° C., 4° C., 5° C., 6° C., 7° C., 8° C., 9° C., 10° C., 15° C., 20° C., or more, including increments therein of ambient temperatures. In some embodiments, the reduced proximity of at least one of the first temperature, the second temperature, and the third temperature to ambient temperatures improved production, efficiency, and scaling.

In some embodiments, at least one of the mixing of the three-dimensional carbon additive and the first solvent, the mixing of the first precursor to trivalent ions into the three-dimensional carbon additive and the first solvent, and the mixing of the precursor to divalent ions into the first precursor to trivalent ions, the three-dimensional carbon additive, and the first solvent reduces a particle size of the components within the first dispersion. In some embodiments, at least one of the mixing of the three-dimensional carbon additive and the first solvent, the mixing of the first precursor to trivalent ions into the three-dimensional carbon additive and the first solvent, and the mixing of the precursor to divalent ions into the first precursor to trivalent ions, the three-dimensional carbon additive, and the first solvent breaks down any agglomerations within the first dispersion. In some embodiments, mixing the first precursor to trivalent ions into the three-dimensional carbon additive and the first solvent comprises mixing the first precursor to trivalent ions into the three-dimensional carbon additive and the first solvent in two or more portions. In some embodiments, forming the first dispersion comprises: mixing the three-dimensional carbon additive and the first solvent, mixing the first precursor to trivalent ions into the three-dimensional carbon additive and the first solvent, and mixing the precursor to divalent ions into the first precursor to trivalent ions, the three-dimensional carbon additive, and the first solvent. In some embodiments, at least one of the reduced particle size and reduced agglomeration in the first dispersion enables regular consistent coating of a current collector to form the first electrode, the second electrode, or both.

In some embodiments, the conductive additive comprises a zero-dimensional carbon additive, a one-dimensional carbon additive, a two-dimensional carbon additive, a three-dimensional carbon additive, or any combination thereof. In some embodiments, the zero-dimensional carbon additive comprises carbon black, acetylene black, or both. In some embodiments, the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the two-dimensional carbon additive comprises a nanosheet, a microsheet, a platelet, or any combination thereof.

In some embodiments, the electrode formed by the methods herein is solid. In some embodiments, the electrode formed by the methods herein is semi-solid. In some embodiments, the electrode formed by the methods herein is not a hydrogel. In some embodiments, the low concentration of the two-dimensional carbon additive used in the methods herein forms an electrode that is solid or semi-solid, while maintaining the superior electrochemical properties of the electrode. In some embodiments, the low concentration of the two-dimensional carbon additive used in the methods herein forms an electrode that is not a hydrogel, while maintaining the superior electrochemical properties of the electrode. In some embodiments, solid, non-hydrogel, electrodes are more easily manufactured and formed into large area battery electrodes on high scales and at reduced costs. As such, the specific method steps and components herein enable the low-cost, high-scale production of electrodes with increased energy storage capabilities.

In some embodiments, the conductive additive comprises a two-dimensional carbon additive comprising one or more graphene oxide (GO) sheets. In some embodiments, the reducing agent reduces the GO sheet to form a graphene sheet. In some embodiments, the GO sheet provides a surface for LDH growth. In some embodiments, the methods herein form an electrode wherein the LDH coupled is to the graphene sheet. In some embodiments, the methods herein form an LDH bonded to the graphene sheet. In some embodiments, the LDH bonded to the graphene sheet is an LDH-graphene composite.

In some embodiments, the reducing agent is any chemical that hydrolyzes at a temperature at or above the first temperature. In some embodiments, heating the third dispersion to the first temperature hydrolyzes the reducing agent, which hydrolyzes the third dispersion. In some embodiments, the hydrolyzation of the third dispersion maintains a pH of the third dispersion. In some embodiments, hydrolyzation of the third dispersion maintains the pH of the third dispersion in the alkaline region. In some embodiments, a pH of the third dispersion in the alkaline region enables the formation of the LDH. In some embodiments, hydrolyzation of the third dispersion enables co-deposition of the M(II) and M(III) cations on the GO sheet with increased homogeneity. In some embodiments, during hydrolyzation, the zinc and bismuth ions co-precipitate out of the solution, forming the LDH. Furthermore, in some embodiments the hydrolyzing of the GO also changes the morphology of the LDH/rGO and improves the electrochemical performances of the composite material. Furthermore, in some embodiments the hydrolyzing of the GO changes the morphology of the LDH/rGO to form nanoplatelets.

In some embodiments, centrifuging the third dispersion with a third solvent comprises: centrifuging the third dispersion with a primary third solvent for one or more periods of time; decanting a supernatant from the third dispersion; centrifuging the third dispersion with a secondary third solvent for one or more periods of time; and decanting the supernatant from the third dispersion. In some embodiments, centrifuging the third dispersion with the primary third solvent for one or more periods of time comprises centrifuging the third dispersion with the primary third solvent for three periods of about three minutes each. In some embodiments, centrifuging the third dispersion with the secondary third solvent for one or more periods of time comprises centrifuging the third dispersion with the secondary third solvent for two periods of about three minutes each. In some embodiments, the primary third solvent comprises water, N-methyl-2-pyrrolidone, acetone, ethanol, isopropanol, or any combination thereof. In some embodiments, the secondary third solvent comprises water, N-methyl-2-pyrrolidone, acetone, ethanol, isopropanol, or any combination thereof.

Figure 19:
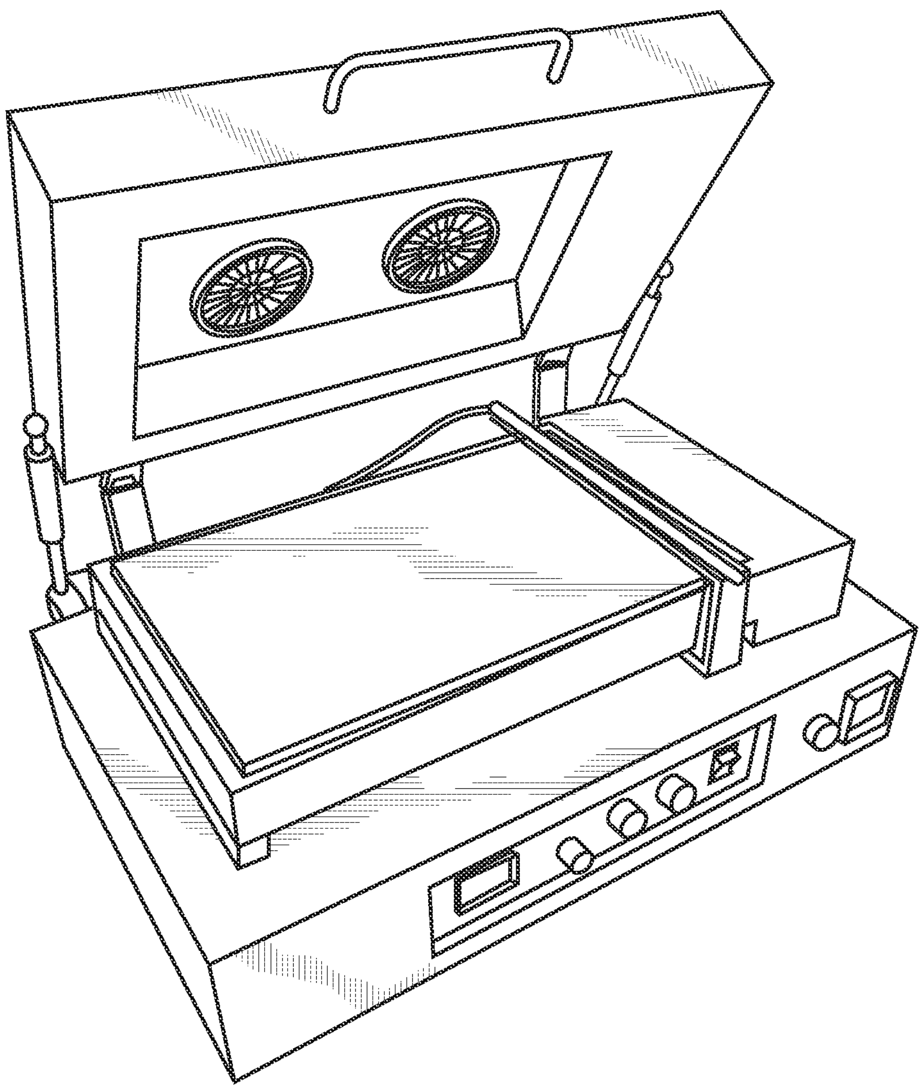
FIG. 19 shows an apparatus for substrate coating, in accordance with an embodiment herein.

In some embodiments, depositing the third dispersion onto the current collector comprises roll coating, slot die coating, film coating, doctor blade coating, or any combination thereof. In some embodiments, depositing the third dispersion onto the current collector comprises applying a consistent coating thickness to achieve a target loading mass of active electrode materials per unit area. FIG. 19 shows an apparatus for depositing the dried third dispersion and the binder onto the current collector.

Figure 20:
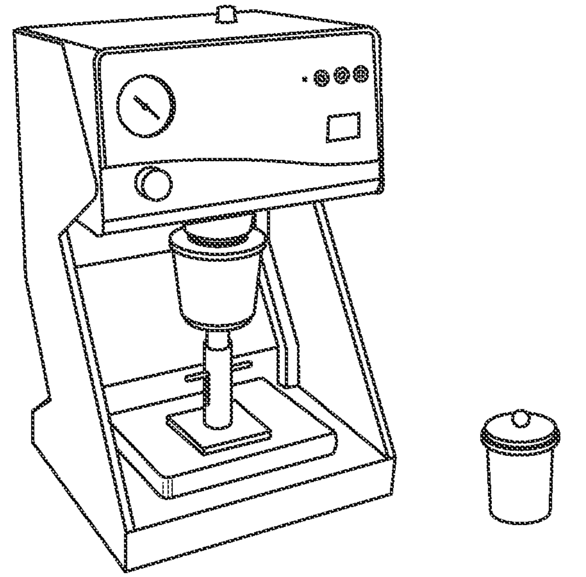
FIG. 20 shows an apparatus for slurry mixing, in accordance with an embodiment herein.
Figure 21:
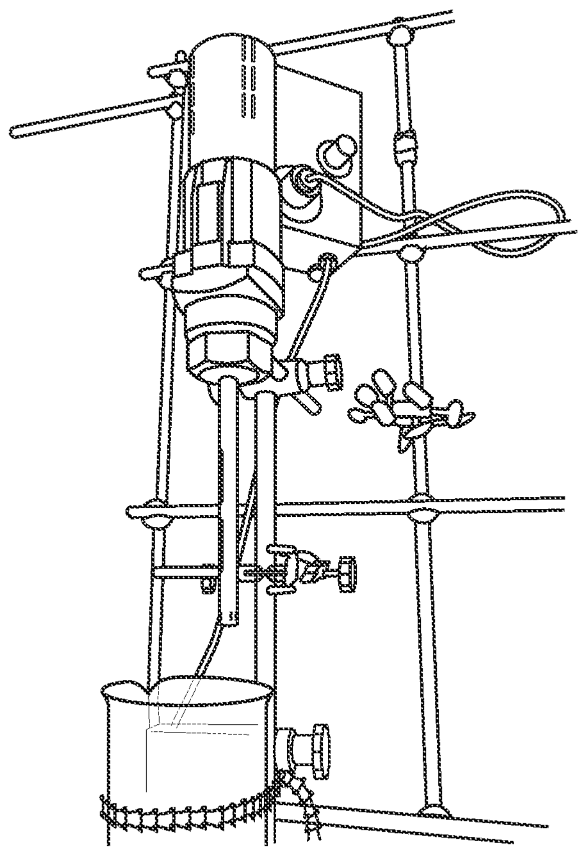
FIG. 21 shows an apparatus for shear mixing, in accordance with an embodiment herein.

FIG. 20 shows an apparatus for mixing at least one of the three-dimensional carbon additive and the first solvent, the mixing of the first precursor to trivalent ions into the three-dimensional carbon additive and the first solvent, and the mixing of the precursor to divalent ions into the first precursor to trivalent ions, the three-dimensional carbon additive, and the first solvent. FIG. 21 shows an apparatus for shear mixing of the at least one of the three-dimensional carbon additive and the first solvent, the mixing of the first precursor to trivalent ions into the three-dimensional carbon additive and the first solvent, and the mixing of the precursor to divalent ions into the first precursor to trivalent ions, the three-dimensional carbon additive, and the first solvent.

Figure 22:
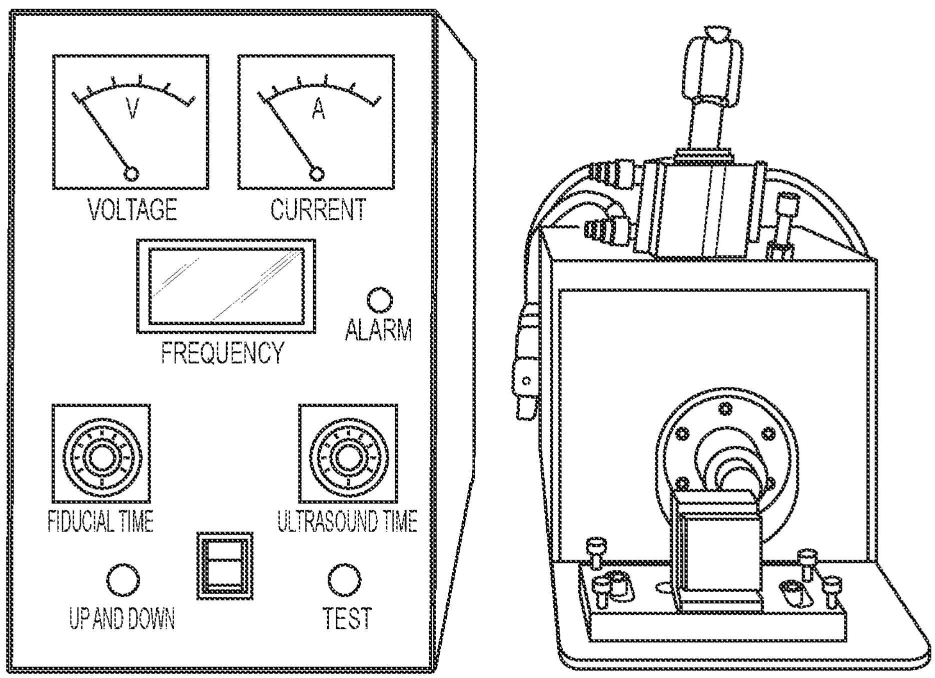
FIG. 22 shows an apparatus for cell welding, in accordance with an embodiment herein.
Figure 23C:
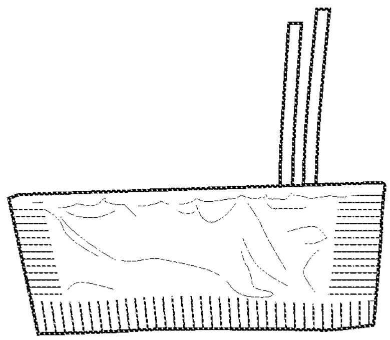
FIG. 23C shows an image of a cell packaging for holding the energy storage device and an electrolyte, in accordance with an embodiment herein.
Figure 23B:
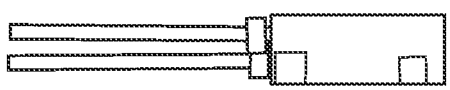
FIG. 23B shows an image of an assembled energy storage device, in accordance with an embodiment herein.
Figure 23A:
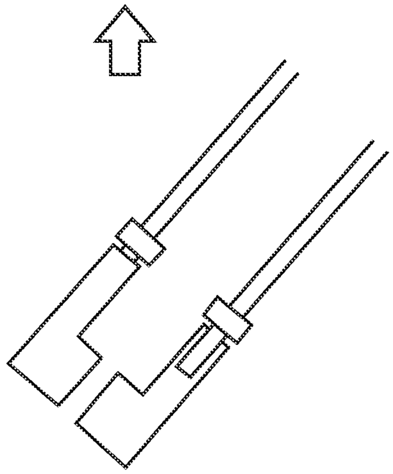
FIG. 23A shows an image of metal tabs ultrasonically welded on electrodes, in accordance with an embodiment herein.

In some embodiments, the method further comprises cutting the third dispersion applied on the current collector. In some embodiments, the method further comprises adding one or more metal tabs to an edge of the current collector. In some embodiments, adding the one or more metal tabs to the edge of the current collector comprises ultrasonic welding. FIG. 22 shows an apparatus for ultrasonic cell welding. FIG. 23A shows an image of metal tabs ultrasonically welded on current collector. FIG. 23B shows an image of an assembled energy storage device. FIG. 23C shows an image of a cell packaging for holding the energy storage device and an electrolyte.

In some embodiments, per FIGS. 10A to 10D, the current collector comprises a copper foil current collector. In some embodiments, per FIG. 10E, the current collector comprises a copper and graphite foil current collector. In some embodiments, per FIGS. 10F and 10G, the current collector comprises a zinc foil current collector. In some embodiments, per FIG. 10H, the current collector comprises a nickel foil current collector.

In some embodiments, the three-dimensional carbon additive comprises graphite, carbon foam, activated carbon, graphene foam, carbon aerogel, graphene aerogel, porous carbon, a buckminsterfullerene, an interconnected corrugated carbon-based network, or any combination thereof. In some embodiments, the first precursor to trivalent ions comprises a metal salt. In some embodiments, the first precursor to trivalent ions comprises aluminum nitrate, aluminum acetate, aluminum chloride, aluminum sulfate, aluminum carbonate, aluminum bromide, bismuth nitrate, bismuth acetate, bismuth chloride, bismuth sulfate, bismuth carbonate, bismuth bromide, chromium nitrate, chromium acetate, chromium chloride, chromium sulfate, chromium carbonate, chromium bromide, iron nitrate, iron acetate, iron chloride, iron sulfate, iron carbonate, iron bromide, or any combination thereof. In some embodiments, the first precursor to trivalent ions comprises a powder, a liquid, a paste, a gel, a dispersion, or any combination thereof. In some embodiments, the precursor to divalent ions comprises a metal salt. In some embodiments, the precursor to divalent ions comprises zinc nitrate, zinc sulfate, zinc carbonate, zinc chloride, zinc bromide, barium nitrate, barium sulfate, barium carbonate, barium chloride, barium bromide, cadmium nitrate, cadmium sulfate, cadmium carbonate, cadmium chloride, cadmium bromide, calcium nitrate, calcium sulfate, calcium carbonate, calcium chloride, calcium bromide, cobalt nitrate, cobalt sulfate, cobalt carbonate, cobalt chloride, cobalt bromide, copper nitrate, copper sulfate, copper carbonate, copper chloride, copper bromide, iron nitrate, iron sulfate, iron carbonate, iron chloride, iron bromide, lead nitrate, lead sulfate, lead carbonate, lead chloride, lead bromide, magnesium nitrate, magnesium sulfate, magnesium carbonate, magnesium chloride, magnesium bromide, mercury nitrate, mercury sulfate, mercury carbonate, mercury chloride, mercury bromide, nickel nitrate, nickel sulfate, nickel carbonate, nickel chloride, nickel bromide, strontium nitrate, strontium sulfate, strontium carbonate, strontium chloride, strontium bromide, tin nitrate, tin sulfate, tin carbonate, tin chloride, tin bromide, or any combination thereof. In some embodiments, the zero-dimensional carbon additive comprises carbon black, acetylene black, or both. In some embodiments, the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof. In some embodiments, the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof. In some embodiments, the three-dimensional carbon additive comprises graphite, carbon foam, activated carbon, graphene foam, carbon aerogel, graphene aerogel, porous carbon, a buckminsterfullerene, an interconnected corrugated carbon-based network, or any combination thereof. In some embodiments, at least one of the first current collector and the second current collector comprises a foam, a foil, a mesh, an aerogel, or any combination thereof. In some embodiments, at least one of the first current collector and the second current collector comprises a copper-based current collector, a nickel-based current collector, a zinc-based current collector, a graphite-based current collector, a stainless steel-based current collector, a brass-based current collector, a bronze-based current collector, or any combination thereof. In some embodiments, the reducing agent comprises urea. In some embodiments, the binder comprises a polymeric binder. In some embodiments, the polymeric binder comprises polyvinylidene fluoride, carboxymethyl cellulose, polyacrylic acid, polyethylene glycol, alginic acid (sodium alginate), polypyrrole, polyaniline, poly(3,4-ethylenedioxythiophene), a sulfonated tetrafluoroethylene-based fluoropolymer-copolymer (Nafion®), polytetrafluoroethylene (Teflon®), polydopamine, polyvinylpyrrolidone, polyacrylonitrile, carbonyl β-cyclodextrin, or any combination thereof.

In some embodiments, a concentration by mass of the three-dimensional carbon additive within the third dispersion is about 1% to about 5%. In some embodiments, a concentration by mass of the three-dimensional carbon additive within the third dispersion is about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%. In some embodiments, a concentration by mass of the three-dimensional carbon additive within the third dispersion is about 1%, about 1.5%, about 2%, about 2.5%, about 3%, about 3.5%, about 4%, about 4.5%, or about 5%. In some embodiments, a concentration by mass of the three-dimensional carbon additive within the third dispersion is at least about 1%, about 1.5%, about 2%, about 2.5%, about 3%, about 3.5%, about 4%, or about 4.5%. In some embodiments, a concentration by mass of the three-dimensional carbon additive within the third dispersion is at most about 1.5%, about 2%, about 2.5%, about 3%, about 3.5%, about 4%, about 4.5%, or about 5%.

In some embodiments, a concentration by mass of the first precursor to trivalent ions within the third dispersion is about 5% to about 20%. In some embodiments, a concentration by mass of the first precursor to trivalent ions within the third dispersion is about 5% to about 6%, about 5% to about 7%, about 5% to about 8%, about 5% to about 9%, about 5% to about 10%, about 5% to about 12%, about 5% to about 14%, about 5% to about 16%, about 5% to about 18%, about 5% to about 20%, about 6% to about 7%, about 6% to about 8%, about 6% to about 9%, about 6% to about 10%, about 6% to about 12%, about 6% to about 14%, about 6% to about 16%, about 6% to about 18%, about 6% to about 20%, about 7% to about 8%, about 7% to about 9%, about 7% to about 10%, about 7% to about 12%, about 7% to about 14%, about 7% to about 16%, about 7% to about 18%, about 7% to about 20%, about 8% to about 9%, about 8% to about 10%, about 8% to about 12%, about 8% to about 14%, about 8% to about 16%, about 8% to about 18%, about 8% to about 20%, about 9% to about 10%, about 9% to about 12%, about 9% to about 14%, about 9% to about 16%, about 9% to about 18%, about 9% to about 20%, about 10% to about 12%, about 10% to about 14%, about 10% to about 16%, about 10% to about 18%, about 10% to about 20%, about 12% to about 14%, about 12% to about 16%, about 12% to about 18%, about 12% to about 20%, about 14% to about 16%, about 14% to about 18%, about 14% to about 20%, about 16% to about 18%, about 16% to about 20%, or about 18% to about 20%. In some embodiments, a concentration by mass of the first precursor to trivalent ions within the third dispersion is about 5%, about 6%, about 7%, about 8%, about 9%, about 10%, about 12%, about 14%, about 16%, about 18%, or about 20%. In some embodiments, a concentration by mass of the first precursor to trivalent ions within the third dispersion is at least about 5%, about 6%, about 7%, about 8%, about 9%, about 10%, about 12%, about 14%, about 16%, or about 18%. In some embodiments, a concentration by mass of the first precursor to trivalent ions within the third dispersion is at most about 6%, about 7%, about 8%, about 9%, about 10%, about 12%, about 14%, about 16%, about 18%, or about 20%.

In some embodiments, a concentration by mass of the precursor to divalent ions within the third dispersion is about 12% to about 48%. In some embodiments, a concentration by mass of the precursor to divalent ions within the third dispersion is about 12% to about 16%, about 12% to about 20%, about 12% to about 24%, about 12% to about 28%, about 12% to about 32%, about 12% to about 36%, about 12% to about 40%, about 12% to about 44%, about 12% to about 48%, about 16% to about 20%, about 16% to about 24%, about 16% to about 28%, about 16% to about 32%, about 16% to about 36%, about 16% to about 40%, about 16% to about 44%, about 16% to about 48%, about 20% to about 24%, about 20% to about 28%, about 20% to about 32%, about 20% to about 36%, about 20% to about 40%, about 20% to about 44%, about 20% to about 48%, about 24% to about 28%, about 24% to about 32%, about 24% to about 36%, about 24% to about 40%, about 24% to about 44%, about 24% to about 48%, about 28% to about 32%, about 28% to about 36%, about 28% to about 40%, about 28% to about 44%, about 28% to about 48%, about 32% to about 36%, about 32% to about 40%, about 32% to about 44%, about 32% to about 48%, about 36% to about 40%, about 36% to about 44%, about 36% to about 48%, about 40% to about 44%, about 40% to about 48%, or about 44% to about 48%. In some embodiments, a concentration by mass of the precursor to divalent ions within the third dispersion is about 12%, about 16%, about 20%, about 24%, about 28%, about 32%, about 36%, about 40%, about 44%, or about 48%. In some embodiments, a concentration by mass of the precursor to divalent ions within the third dispersion is at least about 12%, about 16%, about 20%, about 24%, about 28%, about 32%, about 36%, about 40%, or about 44%. In some embodiments, a concentration by mass of the precursor to divalent ions within the third dispersion is at most about 16%, about 20%, about 24%, about 28%, about 32%, about 36%, about 40%, about 44%, or about 48%.

In some embodiments, a concentration by mass of the conductive additive within the third dispersion is about 1% to about 5%. In some embodiments, a concentration by mass of the conductive additive within the third dispersion is about 1% to about 1.5%, about 1% to about 2%, about 1% to about 2.5%, about 1% to about 3%, about 1% to about 3.5%, about 1% to about 4%, about 1% to about 4.5%, about 1% to about 5%, about 1.5% to about 2%, about 1.5% to about 2.5%, about 1.5% to about 3%, about 1.5% to about 3.5%, about 1.5% to about 4%, about 1.5% to about 4.5%, about 1.5% to about 5%, about 2% to about 2.5%, about 2% to about 3%, about 2% to about 3.5%, about 2% to about 4%, about 2% to about 4.5%, about 2% to about 5%, about 2.5% to about 3%, about 2.5% to about 3.5%, about 2.5% to about 4%, about 2.5% to about 4.5%, about 2.5% to about 5%, about 3% to about 3.5%, about 3% to about 4%, about 3% to about 4.5%, about 3% to about 5%, about 3.5% to about 4%, about 3.5% to about 4.5%, about 3.5% to about 5%, about 4% to about 4.5%, about 4% to about 5%, or about 4.5% to about 5%. In some embodiments, a concentration by mass of the conductive additive within the third dispersion is about 1%, about 1.5%, about 2%, about 2.5%, about 3%, about 3.5%, about 4%, about 4.5%, or about 5%. In some embodiments, a concentration by mass of the conductive additive within the third dispersion is at least about 1%, about 1.5%, about 2%, about 2.5%, about 3%, about 3.5%, about 4%, or about 4.5%. In some embodiments, a concentration by mass of the conductive additive within the third dispersion is at most about 1.5%, about 2%, about 2.5%, about 3%, about 3.5%, about 4%, about 4.5%, or about 5%.

In some embodiments, a concentration by mass of the reducing agent within the third dispersion is about 9% to about 36%. In some embodiments, a concentration by mass of the reducing agent within the third dispersion is about 9% to about 10%, about 9% to about 12%, about 9% to about 14%, about 9% to about 16%, about 9% to about 18%, about 9% to about 20%, about 9% to about 24%, about 9% to about 28%, about 9% to about 32%, about 9% to about 36%, about 10% to about 12%, about 10% to about 14%, about 10% to about 16%, about 10% to about 18%, about 10% to about 20%, about 10% to about 24%, about 10% to about 28%, about 10% to about 32%, about 10% to about 36%, about 12% to about 14%, about 12% to about 16%, about 12% to about 18%, about 12% to about 20%, about 12% to about 24%, about 12% to about 28%, about 12% to about 32%, about 12% to about 36%, about 14% to about 16%, about 14% to about 18%, about 14% to about 20%, about 14% to about 24%, about 14% to about 28%, about 14% to about 32%, about 14% to about 36%, about 16% to about 18%, about 16% to about 20%, about 16% to about 24%, about 16% to about 28%, about 16% to about 32%, about 16% to about 36%, about 18% to about 20%, about 18% to about 24%, about 18% to about 28%, about 18% to about 32%, about 18% to about 36%, about 20% to about 24%, about 20% to about 28%, about 20% to about 32%, about 20% to about 36%, about 24% to about 28%, about 24% to about 32%, about 24% to about 36%, about 28% to about 32%, about 28% to about 36%, or about 32% to about 36%. In some embodiments, a concentration by mass of the reducing agent within the third dispersion is about 9%, about 10%, about 12%, about 14%, about 16%, about 18%, about 20%, about 24%, about 28%, about 32%, or about 36%. In some embodiments, a concentration by mass of the reducing agent within the third dispersion is at least about 9%, about 10%, about 12%, about 14%, about 16%, about 18%, about 20%, about 24%, about 28%, or about 32%. In some embodiments, a concentration by mass of the reducing agent within the third dispersion is at most about 10%, about 12%, about 14%, about 16%, about 18%, about 20%, about 24%, about 28%, about 32%, or about 36%.

In some embodiments, a concentration by mass of the binder within the electrode is about 1% to about 50%. In some embodiments, a concentration by mass of the binder within the electrode is about 1% to about 5%, about 1% to about 10%, about 1% to about 15%, about 1% to about 20%, about 1% to about 25%, about 1% to about 30%, about 1% to about 35%, about 1% to about 40%, about 1% to about 45%, about 1% to about 50%, about 5% to about 10%, about 5% to about 15%, about 5% to about 20%, about 5% to about 25%, about 5% to about 30%, about 5% to about 35%, about 5% to about 40%, about 5% to about 45%, about 5% to about 50%, about 10% to about 15%, about 10% to about 20%, about 10% to about 25%, about 10% to about 30%, about 10% to about 35%, about 10% to about 40%, about 10% to about 45%, about 10% to about 50%, about 15% to about 20%, about 15% to about 25%, about 15% to about 30%, about 15% to about 35%, about 15% to about 40%, about 15% to about 45%, about 15% to about 50%, about 20% to about 25%, about 20% to about 30%, about 20% to about 35%, about 20% to about 40%, about 20% to about 45%, about 20% to about 50%, about 25% to about 30%, about 25% to about 35%, about 25% to about 40%, about 25% to about 45%, about 25% to about 50%, about 30% to about 35%, about 30% to about 40%, about 30% to about 45%, about 30% to about 50%, about 35% to about 40%, about 35% to about 45%, about 35% to about 50%, about 40% to about 45%, about 40% to about 50%, or about 45% to about 50%. In some embodiments, a concentration by mass of the binder within the electrode is about 1%, about 5%, about 10%, about 15%, about 20%, about 25%, about 30%, about 35%, about 40%, about 45%, or about 50%. In some embodiments, a concentration by mass of the binder within the electrode is at least about 1%, about 5%, about 10%, about 15%, about 20%, about 25%, about 30%, about 35%, about 40%, or about 45%. In some embodiments, a concentration by mass of the binder within the electrode is at most about 5%, about 10%, about 15%, about 20%, about 25%, about 30%, about 35%, about 40%, about 45%, or about 50%.

In some embodiments, the first solvent comprises water, N-methyl-2-pyrrolidone, acetone, ethanol, isopropanol, or any combination thereof. In some embodiments, the second solvent comprises water, N-methyl-2-pyrrolidone, acetone, ethanol, isopropanol, or any combination thereof. In some embodiments, the third solvent comprises water, N-methyl-2-pyrrolidone, acetone, ethanol, isopropanol, or any combination thereof.

In some embodiments, the first dispersion further comprises a second precursor to trivalent ions. In some embodiments, the second precursor to trivalent ions comprises a metal salt. In some embodiments, the second precursor to trivalent ions comprises aluminum nitrate, aluminum acetate, aluminum chloride, aluminum sulfate, aluminum carbonate, aluminum bromide, bismuth nitrate, bismuth acetate, bismuth chloride, bismuth sulfate, bismuth carbonate, bismuth bromide, chromium nitrate, chromium acetate, chromium chloride, chromium sulfate, chromium carbonate, chromium bromide, iron nitrate, iron acetate, iron chloride, iron sulfate, iron carbonate, iron bromide, or any combination thereof. In some embodiments, the first dispersion does not comprise the second precursor to trivalent ions.

In some embodiments, a concentration by mass of the second precursor to trivalent ions within the third dispersion is about 4% to about 16%. In some embodiments, a concentration by mass of the second precursor to trivalent ions within the third dispersion is about 4% to about 5%, about 4% to about 6%, about 4% to about 7%, about 4% to about 8%, about 4% to about 9%, about 4% to about 10%, about 4% to about 11%, about 4% to about 12%, about 4% to about 13%, about 4% to about 14%, about 4% to about 16%, about 5% to about 6%, about 5% to about 7%, about 5% to about 8%, about 5% to about 9%, about 5% to about 10%, about 5% to about 11%, about 5% to about 12%, about 5% to about 13%, about 5% to about 14%, about 5% to about 16%, about 6% to about 7%, about 6% to about 8%, about 6% to about 9%, about 6% to about 10%, about 6% to about 11%, about 6% to about 12%, about 6% to about 13%, about 6% to about 14%, about 6% to about 16%, about 7% to about 8%, about 7% to about 9%, about 7% to about 10%, about 7% to about 11%, about 7% to about 12%, about 7% to about 13%, about 7% to about 14%, about 7% to about 16%, about 8% to about 9%, about 8% to about 10%, about 8% to about 11%, about 8% to about 12%, about 8% to about 13%, about 8% to about 14%, about 8% to about 16%, about 9% to about 10%, about 9% to about 11%, about 9% to about 12%, about 9% to about 13%, about 9% to about 14%, about 9% to about 16%, about 10% to about 11%, about 10% to about 12%, about 10% to about 13%, about 10% to about 14%, about 10% to about 16%, about 11% to about 12%, about 11% to about 13%, about 11% to about 14%, about 11% to about 16%, about 12% to about 13%, about 12% to about 14%, about 12% to about 16%, about 13% to about 14%, about 13% to about 16%, or about 14% to about 16%. In some embodiments, a concentration by mass of the second precursor to trivalent ions within the third dispersion is about 4%, about 5%, about 6%, about 7%, about 8%, about 9%, about 10%, about 11%, about 12%, about 13%, about 14%, or about 16%. In some embodiments, a concentration by mass of the second precursor to trivalent ions within the third dispersion is at least about 4%, about 5%, about 6%, about 7%, about 8%, about 9%, about 10%, about 11%, about 12%, about 13%, or about 14%. In some embodiments, a concentration by mass of the second precursor to trivalent ions within the third dispersion is at most about 5%, about 6%, about 7%, about 8%, about 9%, about 10%, about 11%, about 12%, about 13%, about 14%, or about 16%.

In some embodiments, mixing the three-dimensional carbon additive and the first solvent occurs over a period of time of about 5 minutes to about 20 minutes. In some embodiments, mixing the three-dimensional carbon additive and the first solvent occurs over a period of time of about 5 minutes to about 6 minutes, about 5 minutes to about 7 minutes, about 5 minutes to about 8 minutes, about 5 minutes to about 9 minutes, about 5 minutes to about 10 minutes, about 5 minutes to about 12 minutes, about 5 minutes to about 14 minutes, about 5 minutes to about 16 minutes, about 5 minutes to about 18 minutes, about 5 minutes to about 20 minutes, about 6 minutes to about 7 minutes, about 6 minutes to about 8 minutes, about 6 minutes to about 9 minutes, about 6 minutes to about 10 minutes, about 6 minutes to about 12 minutes, about 6 minutes to about 14 minutes, about 6 minutes to about 16 minutes, about 6 minutes to about 18 minutes, about 6 minutes to about 20 minutes, about 7 minutes to about 8 minutes, about 7 minutes to about 9 minutes, about 7 minutes to about 10 minutes, about 7 minutes to about 12 minutes, about 7 minutes to about 14 minutes, about 7 minutes to about 16 minutes, about 7 minutes to about 18 minutes, about 7 minutes to about 20 minutes, about 8 minutes to about 9 minutes, about 8 minutes to about 10 minutes, about 8 minutes to about 12 minutes, about 8 minutes to about 14 minutes, about 8 minutes to about 16 minutes, about 8 minutes to about 18 minutes, about 8 minutes to about 20 minutes, about 9 minutes to about 10 minutes, about 9 minutes to about 12 minutes, about 9 minutes to about 14 minutes, about 9 minutes to about 16 minutes, about 9 minutes to about 18 minutes, about 9 minutes to about 20 minutes, about 10 minutes to about 12 minutes, about 10 minutes to about 14 minutes, about 10 minutes to about 16 minutes, about 10 minutes to about 18 minutes, about 10 minutes to about 20 minutes, about 12 minutes to about 14 minutes, about 12 minutes to about 16 minutes, about 12 minutes to about 18 minutes, about 12 minutes to about 20 minutes, about 14 minutes to about 16 minutes, about 14 minutes to about 18 minutes, about 14 minutes to about 20 minutes, about 16 minutes to about 18 minutes, about 16 minutes to about 20 minutes, or about 18 minutes to about 20 minutes. In some embodiments, mixing the three-dimensional carbon additive and the first solvent occurs over a period of time of about 5 minutes, about 6 minutes, about 7 minutes, about 8 minutes, about 9 minutes, about 10 minutes, about 12 minutes, about 14 minutes, about 16 minutes, about 18 minutes, or about 20 minutes. In some embodiments, mixing the three-dimensional carbon additive and the first solvent occurs over a period of time of at least about 5 minutes, about 6 minutes, about 7 minutes, about 8 minutes, about 9 minutes, about 10 minutes, about 12 minutes, about 14 minutes, about 16 minutes, or about 18 minutes. In some embodiments, mixing the three-dimensional carbon additive and the first solvent occurs over a period of time of at most about 6 minutes, about 7 minutes, about 8 minutes, about 9 minutes, about 10 minutes, about 12 minutes, about 14 minutes, about 16 minutes, about 18 minutes, or about 20 minutes.

In some embodiments, mixing the precursor to divalent ions into the first precursor to trivalent ions, the three-dimensional carbon additive, and the first solvent occurs over a period of time of about 1 minute to about 10 minutes. In some embodiments, mixing the precursor to divalent ions into the first precursor to trivalent ions, the three-dimensional carbon additive and the first solvent occurs over a period of time of about 1 minute to about 2 minutes, about 1 minute to about 3 minutes, about 1 minute to about 4 minutes, about 1 minute to about 5 minutes, about 1 minute to about 6 minutes, about 1 minute to about 7 minutes, about 1 minute to about 8 minutes, about 1 minute to about 9 minutes, about 1 minute to about 10 minutes, about 2 minutes to about 3 minutes, about 2 minutes to about 4 minutes, about 2 minutes to about 5 minutes, about 2 minutes to about 6 minutes, about 2 minutes to about 7 minutes, about 2 minutes to about 8 minutes, about 2 minutes to about 9 minutes, about 2 minutes to about 10 minutes, about 3 minutes to about 4 minutes, about 3 minutes to about 5 minutes, about 3 minutes to about 6 minutes, about 3 minutes to about 7 minutes, about 3 minutes to about 8 minutes, about 3 minutes to about 9 minutes, about 3 minutes to about 10 minutes, about 4 minutes to about 5 minutes, about 4 minutes to about 6 minutes, about 4 minutes to about 7 minutes, about 4 minutes to about 8 minutes, about 4 minutes to about 9 minutes, about 4 minutes to about 10 minutes, about 5 minutes to about 6 minutes, about 5 minutes to about 7 minutes, about 5 minutes to about 8 minutes, about 5 minutes to about 9 minutes, about 5 minutes to about 10 minutes, about 6 minutes to about 7 minutes, about 6 minutes to about 8 minutes, about 6 minutes to about 9 minutes, about 6 minutes to about 10 minutes, about 7 minutes to about 8 minutes, about 7 minutes to about 9 minutes, about 7 minutes to about 10 minutes, about 8 minutes to about 9 minutes, about 8 minutes to about 10 minutes, or about 9 minutes to about 10 minutes. In some embodiments, mixing the precursor to divalent ions into the first precursor to trivalent ions, the three-dimensional carbon additive and the first solvent occurs over a period of time of about 1 minute, about 2 minutes, about 3 minutes, about 4 minutes, about 5 minutes, about 6 minutes, about 7 minutes, about 8 minutes, about 9 minutes, or about 10 minutes. In some embodiments, mixing the precursor to divalent ions into the first precursor to trivalent ions, the three-dimensional carbon additive, and the first solvent occurs over a period of time of at least about 1 minute, about 2 minutes, about 3 minutes, about 4 minutes, about 5 minutes, about 6 minutes, about 7 minutes, about 8 minutes, or about 9 minutes. In some embodiments, mixing the precursor to divalent ions into the first precursor to trivalent ions, the three-dimensional carbon additive, and the first solvent occurs over a period of time of at most about 2 minutes, about 3 minutes, about 4 minutes, about 5 minutes, about 6 minutes, about 7 minutes, about 8 minutes, about 9 minutes, or about 10 minutes.

In some embodiments, mixing the first precursor to trivalent ions into the three-dimensional carbon additive and the first solvent occurs over a period of time of about 5 minutes to about 20 minutes. In some embodiments, mixing the first precursor to trivalent ions into the three-dimensional carbon additive and the first solvent occurs over a period of time of about 5 minutes to about 6 minutes, about 5 minutes to about 7 minutes, about 5 minutes to about 8 minutes, about 5 minutes to about 9 minutes, about 5 minutes to about 10 minutes, about 5 minutes to about 12 minutes, about 5 minutes to about 14 minutes, about 5 minutes to about 16 minutes, about 5 minutes to about 18 minutes, about 5 minutes to about 20 minutes, about 6 minutes to about 7 minutes, about 6 minutes to about 8 minutes, about 6 minutes to about 9 minutes, about 6 minutes to about 10 minutes, about 6 minutes to about 12 minutes, about 6 minutes to about 14 minutes, about 6 minutes to about 16 minutes, about 6 minutes to about 18 minutes, about 6 minutes to about 20 minutes, about 7 minutes to about 8 minutes, about 7 minutes to about 9 minutes, about 7 minutes to about 10 minutes, about 7 minutes to about 12 minutes, about 7 minutes to about 14 minutes, about 7 minutes to about 16 minutes, about 7 minutes to about 18 minutes, about 7 minutes to about 20 minutes, about 8 minutes to about 9 minutes, about 8 minutes to about 10 minutes, about 8 minutes to about 12 minutes, about 8 minutes to about 14 minutes, about 8 minutes to about 16 minutes, about 8 minutes to about 18 minutes, about 8 minutes to about 20 minutes, about 9 minutes to about 10 minutes, about 9 minutes to about 12 minutes, about 9 minutes to about 14 minutes, about 9 minutes to about 16 minutes, about 9 minutes to about 18 minutes, about 9 minutes to about 20 minutes, about 10 minutes to about 12 minutes, about 10 minutes to about 14 minutes, about 10 minutes to about 16 minutes, about 10 minutes to about 18 minutes, about 10 minutes to about 20 minutes, about 12 minutes to about 14 minutes, about 12 minutes to about 16 minutes, about 12 minutes to about 18 minutes, about 12 minutes to about 20 minutes, about 14 minutes to about 16 minutes, about 14 minutes to about 18 minutes, about 14 minutes to about 20 minutes, about 16 minutes to about 18 minutes, about 16 minutes to about 20 minutes, or about 18 minutes to about 20 minutes. In some embodiments, mixing the first precursor to trivalent ions into the three-dimensional carbon additive and the first solvent occurs over a period of time of about 5 minutes, about 6 minutes, about 7 minutes, about 8 minutes, about 9 minutes, about 10 minutes, about 12 minutes, about 14 minutes, about 16 minutes, about 18 minutes, or about 20 minutes. In some embodiments, mixing the first precursor to trivalent ions into the three-dimensional carbon additive and the first solvent occurs over a period of time of at least about 5 minutes, about 6 minutes, about 7 minutes, about 8 minutes, about 9 minutes, about 10 minutes, about 12 minutes, about 14 minutes, about 16 minutes, or about 18 minutes. In some embodiments, mixing the first precursor to trivalent ions into the three-dimensional carbon additive and the first solvent occurs over a period of time of at most about 6 minutes, about 7 minutes, about 8 minutes, about 9 minutes, about 10 minutes, about 12 minutes, about 14 minutes, about 16 minutes, about 18 minutes, or about 20 minutes.

In some embodiments, the first temperature is about 10° C. to about 50° C. In some embodiments, the first temperature is about 10° C. to about 15° C., about 10° C. to about 20° C., about 10° C. to about 25° C., about 10° C. to about 30° C., about 10° C. to about 35° C., about 10° C. to about 40° C., about 10° C. to about 45° C., about 10° C. to about 50° C., about 15° C. to about 20° C., about 15° C. to about 25° C., about 15° C. to about 30° C., about 15° C. to about 35° C., about 15° C. to about 40° C., about 15° C. to about 45° C., about 15° C. to about 50° C., about 20° C. to about 25° C., about 20° C. to about 30° C., about 20° C. to about 35° C., about 20° C. to about 40° C., about 20° C. to about 45° C., about 20° C. to about 50° C., about 25° C. to about 30° C., about 25° C. to about 35° C., about 25° C. to about 40° C., about 25° C. to about 45° C., about 25° C. to about 50° C., about 30° C. to about 35° C., about 30° C. to about 40° C., about 30° C. to about 45° C., about 30° C. to about 50° C., about 35° C. to about 40° C., about 35° C. to about 45° C., about 35° C. to about 50° C., about 40° C. to about 45° C., about 40° C. to about 50° C., or about 45° C. to about 50° C. In some embodiments, the first temperature is about 10° C., about 15° C., about 20° C., about 25° C., about 30° C., about 35° C., about 40° C., about 45° C., or about 50° C. In some embodiments, the first temperature is at least about 10° C., about 15° C., about 20° C., about 25° C., about 30° C., about 35° C., about 40° C., or about 45° C. In some embodiments, the first temperature is at most about 15° C., about 20° C., about 25° C., about 30° C., about 35° C., about 40° C., about 45° C., or about 50° C.

In some embodiments, the second temperature is about 10° C. to about 50° C. In some embodiments, the second temperature is about 10° C. to about 15° C., about 10° C. to about 20° C., about 10° C. to about 25° C., about 10° C. to about 30° C., about 10° C. to about 35° C., about 10° C. to about 40° C., about 10° C. to about 45° C., about 10° C. to about 50° C., about 15° C. to about 20° C., about 15° C. to about 25° C., about 15° C. to about 30° C., about 15° C. to about 35° C., about 15° C. to about 40° C., about 15° C. to about 45° C., about 15° C. to about 50° C., about 20° C. to about 25° C., about 20° C. to about 30° C., about 20° C. to about 35° C., about 20° C. to about 40° C., about 20° C. to about 45° C., about 20° C. to about 50° C., about 25° C. to about 30° C., about 25° C. to about 35° C., about 25° C. to about 40° C., about 25° C. to about 45° C., about 25° C. to about 50° C., about 30° C. to about 35° C., about 30° C. to about 40° C., about 30° C. to about 45° C., about 30° C. to about 50° C., about 35° C. to about 40° C., about 35° C. to about 45° C., about 35° C. to about 50° C., about 40° C. to about 45° C., about 40° C. to about 50° C., or about 45° C. to about 50° C. In some embodiments, the second temperature is about 10° C., about 15° C., about 20° C., about 25° C., about 30° C., about 35° C., about 40° C., about 45° C., or about 50° C. In some embodiments, the second temperature is at least about 10° C., about 15° C., about 20° C., about 25° C., about 30° C., about 35° C., about 40° C., or about 45° C. In some embodiments, the second temperature is at most about 15° C., about 20° C., about 25° C., about 30° C., about 35° C., about 40° C., about 45° C., or about 50° C.

In some embodiments, the third temperature is about 90° C. to about 360° C. In some embodiments, the third temperature is about 90° C. to about 120° C., about 90° C. to about 150° C., about 90° C. to about 180° C., about 90° C. to about 210° C., about 90° C. to about 250° C., about 90° C. to about 290° C., about 90° C. to about 330° C., about 90° C. to about 360° C., about 120° C. to about 150° C., about 120° C. to about 180° C., about 120° C. to about 210° C., about 120° C. to about 250° C., about 120° C. to about 290° C., about 120° C. to about 330° C., about 120° C. to about 360° C., about 150° C. to about 180° C., about 150° C. to about 210° C., about 150° C. to about 250° C., about 150° C. to about 290° C., about 150° C. to about 330° C., about 150° C. to about 360° C., about 180° C. to about 210° C., about 180° C. to about 250° C., about 180° C. to about 290° C., about 180° C. to about 330° C., about 180° C. to about 360° C., about 210° C. to about 250° C., about 210° C. to about 290° C., about 210° C. to about 330° C., about 210° C. to about 360° C., about 250° C. to about 290° C., about 250° C. to about 330° C., about 250° C. to about 360° C., about 290° C. to about 330° C., about 290° C. to about 360° C., or about 330° C. to about 360° C. In some embodiments, the third temperature is about 90° C., about 120° C., about 150° C., about 180° C., about 210° C., about 250° C., about 290° C., about 330° C., or about 360° C. In some embodiments, the third temperature is at least about 90° C., about 120° C., about 150° C., about 180° C., about 210° C., about 250° C., about 290° C., or about 330° C. In some embodiments, the third temperature is at most about 120° C., about 150° C., about 180° C., about 210° C., about 250° C., about 290° C., about 330° C., or about 360° C.

In some embodiments, the first time period is about 15 minutes to about 60 minutes. In some embodiments, the first time period is about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes. In some embodiments, the first time period is about 15 minutes, about 20 minutes, about 25 minutes, about 30 minutes, about 35 minutes, about 40 minutes, about 45 minutes, about 50 minutes, about 55 minutes, or about 60 minutes. In some embodiments, the first time period is at least about 15 minutes, about 20 minutes, about 25 minutes, about 30 minutes, about 35 minutes, about 40 minutes, about 45 minutes, about 50 minutes, or about 55 minutes. In some embodiments, the first time period is at most about 20 minutes, about 25 minutes, about 30 minutes, about 35 minutes, about 40 minutes, about 45 minutes, about 50 minutes, about 55 minutes, or about 60 minutes.

In some embodiments, the second time period is about 600 minutes to about 2,400 minutes. In some embodiments, the second time period is about 600 minutes to about 800 minutes, about 600 minutes to about 1,000 minutes, about 600 minutes to about 1,200 minutes, about 600 minutes to about 1,400 minutes, about 600 minutes to about 1,600 minutes, about 600 minutes to about 1,800 minutes, about 600 minutes to about 2,000 minutes, about 600 minutes to about 2,200 minutes, about 600 minutes to about 2,400 minutes, about 800 minutes to about 1,000 minutes, about 800 minutes to about 1,200 minutes, about 800 minutes to about 1,400 minutes, about 800 minutes to about 1,600 minutes, about 800 minutes to about 1,800 minutes, about 800 minutes to about 2,000 minutes, about 800 minutes to about 2,200 minutes, about 800 minutes to about 2,400 minutes, about 1,000 minutes to about 1,200 minutes, about 1,000 minutes to about 1,400 minutes, about 1,000 minutes to about 1,600 minutes, about 1,000 minutes to about 1,800 minutes, about 1,000 minutes to about 2,000 minutes, about 1,000 minutes to about 2,200 minutes, about 1,000 minutes to about 2,400 minutes, about 1,200 minutes to about 1,400 minutes, about 1,200 minutes to about 1,600 minutes, about 1,200 minutes to about 1,800 minutes, about 1,200 minutes to about 2,000 minutes, about 1,200 minutes to about 2,200 minutes, about 1,200 minutes to about 2,400 minutes, about 1,400 minutes to about 1,600 minutes, about 1,400 minutes to about 1,800 minutes, about 1,400 minutes to about 2,000 minutes, about 1,400 minutes to about 2,200 minutes, about 1,400 minutes to about 2,400 minutes, about 1,600 minutes to about 1,800 minutes, about 1,600 minutes to about 2,000 minutes, about 1,600 minutes to about 2,200 minutes, about 1,600 minutes to about 2,400 minutes, about 1,800 minutes to about 2,000 minutes, about 1,800 minutes to about 2,200 minutes, about 1,800 minutes to about 2,400 minutes, about 2,000 minutes to about 2,200 minutes, about 2,000 minutes to about 2,400 minutes, or about 2,200 minutes to about 2,400 minutes. In some embodiments, the second time period is about 600 minutes, about 800 minutes, about 1,000 minutes, about 1,200 minutes, about 1,400 minutes, about 1,600 minutes, about 1,800 minutes, about 2,000 minutes, about 2,200 minutes, or about 2,400 minutes. In some embodiments, the second time period is at least about 600 minutes, about 800 minutes, about 1,000 minutes, about 1,200 minutes, about 1,400 minutes, about 1,600 minutes, about 1,800 minutes, about 2,000 minutes, or about 2,200 minutes. In some embodiments, the second time period is at most about 800 minutes, about 1,000 minutes, about 1,200 minutes, about 1,400 minutes, about 1,600 minutes, about 1,800 minutes, about 2,000 minutes, about 2,200 minutes, or about 2,400 minutes.

In some embodiments, the third time period is about 15 minutes to about 60 minutes. In some embodiments, the third time period is about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes. In some embodiments, the third time period is about 15 minutes, about 20 minutes, about 25 minutes, about 30 minutes, about 35 minutes, about 40 minutes, about 45 minutes, about 50 minutes, about 55 minutes, or about 60 minutes. In some embodiments, the third time period is at least about 15 minutes, about 20 minutes, about 25 minutes, about 30 minutes, about 35 minutes, about 40 minutes, about 45 minutes, about 50 minutes, or about 55 minutes. In some embodiments, the third time period is at most about 20 minutes, about 25 minutes, about 30 minutes, about 35 minutes, about 40 minutes, about 45 minutes, about 50 minutes, about 55 minutes, or about 60 minutes.

In some embodiments, cooling the third dispersion comprises cooling the third dispersion at a temperature of about −200° C. to about −60° C. In some embodiments, cooling the third dispersion comprises cooling the third dispersion at a temperature of about −60° C. to about −70° C., about −60° C. to about −80° C., about −60° C. to about −100° C., about −60° C. to about −120° C., about −60° C. to about −140° C., about −60° C. to about −160° C., about −60° C. to about −180° C., about −60° C. to about −200° C., about −70° C. to about −80° C., about −70° C. to about −100° C., about −70° C. to about −120° C., about −70° C. to about −140° C., about −70° C. to about −160° C., about −70° C. to about −180° C., about −70° C. to about −200° C., about −80° C. to about −100° C., about −80° C. to about −120° C., about −80° C. to about −140° C., about −80° C. to about −160° C., about −80° C. to about −180° C., about −80° C. to about −200° C., about −100° C. to about −120° C., about −100° C. to about −140° C., about −100° C. to about −160° C., about −100° C. to about −180° C., about −100° C. to about −200° C., about −120° C. to about −140° C., about −120° C. to about −160° C., about −120° C. to about −180° C., about −120° C. to about −200° C., about −140° C. to about −160° C., about −140° C. to about −180° C., about −140° C. to about −200° C., about −160° C. to about −180° C., about −160° C. to about −200° C., or about −180° C. to about −200° C. In some embodiments, cooling the third dispersion comprises cooling the third dispersion at a temperature of about −60° C., about −70° C., about −80° C., about −100° C., about −120° C., about −140° C., about −160° C., about −180° C., or about −200° C. In some embodiments, cooling the third dispersion comprises cooling the third dispersion at a temperature of at least about −60° C., about −70° C., about −80° C., about −100° C., about −120° C., about −140° C., about −160° C., or about −180° C. In some embodiments, cooling the third dispersion comprises cooling the third dispersion at a temperature of at most about −70° C., about −80° C., about −100° C., about −120° C., about −140° C., about −160° C., about −180° C., or about −200° C.

In some embodiments, drying the third dispersion comprises drying the third dispersion at a temperature of about 25° C. to about 100° C. In some embodiments, drying the third dispersion comprises drying the third dispersion at a temperature of about 25° C. to about 30° C., about 25° C. to about 35° C., about 25° C. to about 40° C., about 25° C. to about 45° C., about 25° C. to about 50° C., about 25° C. to about 55° C., about 25° C. to about 60° C., about 25° C. to about 70° C., about 25° C. to about 80° C., about 25° C. to about 90° C., about 25° C. to about 100° C., about 30° C. to about 35° C., about 30° C. to about 40° C., about 30° C. to about 45° C., about 30° C. to about 50° C., about 30° C. to about 55° C., about 30° C. to about 60° C., about 30° C. to about 70° C., about 30° C. to about 80° C., about 30° C. to about 90° C., about 30° C. to about 100° C., about 35° C. to about 40° C., about 35° C. to about 45° C., about 35° C. to about 50° C., about 35° C. to about 55° C., about 35° C. to about 60° C., about 35° C. to about 70° C., about 35° C. to about 80° C., about 35° C. to about 90° C., about 35° C. to about 100° C., about 40° C. to about 45° C., about 40° C. to about 50° C., about 40° C. to about 55° C., about 40° C. to about 60° C., about 40° C. to about 70° C., about 40° C. to about 80° C., about 40° C. to about 90° C., about 40° C. to about 100° C., about 45° C. to about 50° C., about 45° C. to about 55° C., about 45° C. to about 60° C., about 45° C. to about 70° C., about 45° C. to about 80° C., about 45° C. to about 90° C., about 45° C. to about 100° C., about 50° C. to about 55° C., about 50° C. to about 60° C., about 50° C. to about 70° C., about 50° C. to about 80° C., about 50° C. to about 90° C., about 50° C. to about 100° C., about 55° C. to about 60° C., about 55° C. to about 70° C., about 55° C. to about 80° C., about 55° C. to about 90° C., about 55° C. to about 100° C., about 60° C. to about 70° C., about 60° C. to about 80° C., about 60° C. to about 90° C., about 60° C. to about 100° C., about 70° C. to about 80° C., about 70° C. to about 90° C., about 70° C. to about 100° C., about 80° C. to about 90° C., about 80° C. to about 100° C., or about 90° C. to about 100° C. In some embodiments, drying the third dispersion comprises drying the third dispersion at a temperature of about 25° C., about 30° C., about 35° C., about 40° C., about 45° C., about 50° C., about 55° C., about 60° C., about 70° C., about 80° C., about 90° C., or about 100° C. In some embodiments, drying the third dispersion comprises drying the third dispersion at a temperature of at least about 25° C., about 30° C., about 35° C., about 40° C., about 45° C., about 50° C., about 55° C., about 60° C., about 70° C., about 80° C., or about 90° C. In some embodiments, drying the third dispersion comprises drying the third dispersion at a temperature of at most about 30° C., about 35° C., about 40° C., about 45° C., about 50° C., about 55° C., about 60° C., about 70° C., about 80° C., about 90° C., or about 100° C.

In some embodiments, drying the third dispersion comprises drying the third dispersion at a temperature for a period of time of about 10 minutes to about 60 minutes. In some embodiments, drying the third dispersion comprises drying the third dispersion at a temperature for a period of time of about 10 minutes to about 15 minutes, about 10 minutes to about 20 minutes, about 10 minutes to about 25 minutes, about 10 minutes to about 30 minutes, about 10 minutes to about 35 minutes, about 10 minutes to about 40 minutes, about 10 minutes to about 45 minutes, about 10 minutes to about 50 minutes, about 10 minutes to about 55 minutes, about 10 minutes to about 60 minutes, about 15 minutes to about 20 minutes, about 15 minutes to about 25 minutes, about 15 minutes to about 30 minutes, about 15 minutes to about 35 minutes, about 15 minutes to about 40 minutes, about 15 minutes to about 45 minutes, about 15 minutes to about 50 minutes, about 15 minutes to about 55 minutes, about 15 minutes to about 60 minutes, about 20 minutes to about 25 minutes, about 20 minutes to about 30 minutes, about 20 minutes to about 35 minutes, about 20 minutes to about 40 minutes, about 20 minutes to about 45 minutes, about 20 minutes to about 50 minutes, about 20 minutes to about 55 minutes, about 20 minutes to about 60 minutes, about 25 minutes to about 30 minutes, about 25 minutes to about 35 minutes, about 25 minutes to about 40 minutes, about 25 minutes to about 45 minutes, about 25 minutes to about 50 minutes, about 25 minutes to about 55 minutes, about 25 minutes to about 60 minutes, about 30 minutes to about 35 minutes, about 30 minutes to about 40 minutes, about 30 minutes to about 45 minutes, about 30 minutes to about 50 minutes, about 30 minutes to about 55 minutes, about 30 minutes to about 60 minutes, about 35 minutes to about 40 minutes, about 35 minutes to about 45 minutes, about 35 minutes to about 50 minutes, about 35 minutes to about 55 minutes, about 35 minutes to about 60 minutes, about 40 minutes to about 45 minutes, about 40 minutes to about 50 minutes, about 40 minutes to about 55 minutes, about 40 minutes to about 60 minutes, about 45 minutes to about 50 minutes, about 45 minutes to about 55 minutes, about 45 minutes to about 60 minutes, about 50 minutes to about 55 minutes, about 50 minutes to about 60 minutes, or about 55 minutes to about 60 minutes. In some embodiments, drying the third dispersion comprises drying the third dispersion at a temperature for a period of time of about 10 minutes, about 15 minutes, about 20 minutes, about 25 minutes, about 30 minutes, about 35 minutes, about 40 minutes, about 45 minutes, about 50 minutes, about 55 minutes, or about 60 minutes. In some embodiments, drying the third dispersion comprises drying the third dispersion at a temperature for a period of time of at least about 10 minutes, about 15 minutes, about 20 minutes, about 25 minutes, about 30 minutes, about 35 minutes, about 40 minutes, about 45 minutes, about 50 minutes, or about 55 minutes. In some embodiments, drying the third dispersion comprises drying the third dispersion at a temperature for a period of time of at most about 15 minutes, about 20 minutes, about 25 minutes, about 30 minutes, about 35 minutes, about 40 minutes, about 45 minutes, about 50 minutes, about 55 minutes, or about 60 minutes.

In another embodiment the method of forming an electrode comprises forming a first dispersion comprising a first quantity of a reducing agent, a first precursor to trivalent ions, a precursor to divalent ions, a first solvent, and a conductive additive comprising at least one of a zero-dimensional carbon additive, a one-dimensional carbon additive, a two-dimensional carbon additive, or a three-dimensional carbon additive; heating the first dispersion while adding a second quantity of the reducing agent to the first dispersion; cooling the first dispersion; filtering the first dispersion; rinsing the first dispersion; drying the first dispersion; and depositing the dried first dispersion and a binder onto a current collector. In some embodiments, heating the first dispersion while adding the second quantity of the reducing agent to the first dispersion occurs while stirring the first dispersion. In some embodiments, heating the first dispersion occurs at a temperature that is close to the ambient temperature for improved production efficiency and scaling. In some embodiments, the first dispersion is cooled to room temperature. In some embodiments, the method further comprises breaking up the rinsed first dispersion before the drying of the first dispersion. In some embodiments, a pH of the first dispersion before the addition of the second quantity of the reducing agent is below a pH required to precipitate the LDH out of the first dispersion. In some embodiments, at least one of the reducing agent, the first precursor to trivalent ions, the precursor to divalent ions, and the conductive additive are dispersed in the first solvent before the formation of the first dispersion. In some embodiments, the drying of the first dispersion occurs in an oven.

In some embodiments, adding a second quantity of the reducing agent to the first dispersion occurs over a period of time of about 8 hours to about 40 hours. In some embodiments, adding a second quantity of the reducing agent to the first dispersion occurs over a period of time of about 8 hours to about 12 hours, about 8 hours to about 16 hours, about 8 hours to about 20 hours, about 8 hours to about 24 hours, about 8 hours to about 28 hours, about 8 hours to about 32 hours, about 8 hours to about 36 hours, about 8 hours to about 40 hours, about 12 hours to about 16 hours, about 12 hours to about 20 hours, about 12 hours to about 24 hours, about 12 hours to about 28 hours, about 12 hours to about 32 hours, about 12 hours to about 36 hours, about 12 hours to about 40 hours, about 16 hours to about 20 hours, about 16 hours to about 24 hours, about 16 hours to about 28 hours, about 16 hours to about 32 hours, about 16 hours to about 36 hours, about 16 hours to about 40 hours, about 20 hours to about 24 hours, about 20 hours to about 28 hours, about 20 hours to about 32 hours, about 20 hours to about 36 hours, about 20 hours to about 40 hours, about 24 hours to about 28 hours, about 24 hours to about 32 hours, about 24 hours to about 36 hours, about 24 hours to about 40 hours, about 28 hours to about 32 hours, about 28 hours to about 36 hours, about 28 hours to about 40 hours, about 32 hours to about 36 hours, about 32 hours to about 40 hours, or about 36 hours to about 40 hours. In some embodiments, adding a second quantity of the reducing agent to the first dispersion occurs over a period of time of about 8 hours, about 12 hours, about 16 hours, about 20 hours, about 24 hours, about 28 hours, about 32 hours, about 36 hours, or about 40 hours. In some embodiments, adding a second quantity of the reducing agent to the first dispersion occurs over a period of time of at least about 8 hours, about 12 hours, about 16 hours, about 20 hours, about 24 hours, about 28 hours, about 32 hours, or about 36 hours. In some embodiments, adding a second quantity of the reducing agent to the first dispersion occurs over a period of time of at most about 12 hours, about 16 hours, about 20 hours, about 24 hours, about 28 hours, about 32 hours, about 36 hours, or about 40 hours.

In some embodiments, heating the first dispersion while adding the second quantity of the reducing agent to the first dispersion occurs until the first dispersion has a pH of about 7 to about 9. In some embodiments, heating the first dispersion while adding the second quantity of the reducing agent to the first dispersion occurs until the first dispersion has a pH of about 7 to about 7.25, about 7 to about 7.5, about 7 to about 7.75, about 7 to about 8, about 7 to about 8.25, about 7 to about 8.5, about 7 to about 8.75, about 7 to about 9, about 7.25 to about 7.5, about 7.25 to about 7.75, about 7.25 to about 8, about 7.25 to about 8.25, about 7.25 to about 8.5, about 7.25 to about 8.75, about 7.25 to about 9, about 7.5 to about 7.75, about 7.5 to about 8, about 7.5 to about 8.25, about 7.5 to about 8.5, about 7.5 to about 8.75, about 7.5 to about 9, about 7.75 to about 8, about 7.75 to about 8.25, about 7.75 to about 8.5, about 7.75 to about 8.75, about 7.75 to about 9, about 8 to about 8.25, about 8 to about 8.5, about 8 to about 8.75, about 8 to about 9, about 8.25 to about 8.5, about 8.25 to about 8.75, about 8.25 to about 9, about 8.5 to about 8.75, about 8.5 to about 9, or about 8.75 to about 9. In some embodiments, heating the first dispersion while adding the second quantity of the reducing agent to the first dispersion occurs until the first dispersion has a pH of about 7, about 7.25, about 7.5, about 7.75, about 8, about 8.25, about 8.5, about 8.75, or about 9. In some embodiments, heating the first dispersion while adding the second quantity of the reducing agent to the first dispersion occurs until the first dispersion has a pH of at least about 7, about 7.25, about 7.5, about 7.75, about 8, about 8.25, about 8.5, or about 8.75. In some embodiments, heating the first dispersion while adding the second quantity of the reducing agent to the first dispersion occurs until the first dispersion has a pH of at most about 7.25, about 7.5, about 7.75, about 8, about 8.25, about 8.5, about 8.75, or about 9.

In some embodiments, heating the first dispersion while adding the second quantity of the reducing agent to the first dispersion occurs until the first dispersion has a temperature of about 80° C. to about 120° C. In some embodiments, heating the first dispersion while adding the second quantity of the reducing agent to the first dispersion occurs until the first dispersion has a temperature of about 80° C. to about 85° C., about 80° C. to about 90° C., about 80° C. to about 95° C., about 80° C. to about 100° C., about 80° C. to about 105° C., about 80° C. to about 110° C., about 80° C. to about 115° C., about 80° C. to about 120° C., about 85° C. to about 90° C., about 85° C. to about 95° C., about 85° C. to about 100° C., about 85° C. to about 105° C., about 85° C. to about 110° C., about 85° C. to about 115° C., about 85° C. to about 120° C., about 90° C. to about 95° C., about 90° C. to about 100° C., about 90° C. to about 105° C., about 90° C. to about 110° C., about 90° C. to about 115° C., about 90° C. to about 120° C., about 95° C. to about 100° C., about 95° C. to about 105° C., about 95° C. to about 110° C., about 95° C. to about 115° C., about 95° C. to about 120° C., about 100° C. to about 105° C., about 100° C. to about 110° C., about 100° C. to about 115° C., about 100° C. to about 120° C., about 105° C. to about 110° C., about 105° C. to about 115° C., about 105° C. to about 120° C., about 110° C. to about 115° C., about 110° C. to about 120° C., or about 115° C. to about 120° C. In some embodiments, heating the first dispersion while adding the second quantity of the reducing agent to the first dispersion occurs until the first dispersion has a temperature of about 80° C., about 85° C., about 90° C., about 95° C., about 100° C., about 105° C., about 110° C., about 115° C., or about 120° C. In some embodiments, heating the first dispersion while adding the second quantity of the reducing agent to the first dispersion occurs until the first dispersion has a temperature of at least about 80° C., about 85° C., about 90° C., about 95° C., about 100° C., about 105° C., about 110° C., or about 115° C. In some embodiments, heating the first dispersion while adding the second quantity of the reducing agent to the first dispersion occurs until the first dispersion has a temperature of at most about 85° C., about 90° C., about 95° C., about 100° C., about 105° C., about 110° C., about 115° C., or about 120° C.

In some embodiments, the first dispersion is dried at a temperature of about 50° C. to about 90° C. In some embodiments, the first dispersion is dried at a temperature of about 50° C. to about 55° C., about 50° C. to about 60° C., about 50° C. to about 65° C., about 50° C. to about 70° C., about 50° C. to about 78° C., about 50° C. to about 80° C., about 50° C. to about 85° C., about 50° C. to about 90° C., about 55° C. to about 60° C., about 55° C. to about 65° C., about 55° C. to about 70° C., about 55° C. to about 78° C., about 55° C. to about 80° C., about 55° C. to about 85° C., about 55° C. to about 90° C., about 60° C. to about 65° C., about 60° C. to about 70° C., about 60° C. to about 78° C., about 60° C. to about 80° C., about 60° C. to about 85° C., about 60° C. to about 90° C., about 65° C. to about 70° C., about 65° C. to about 78° C., about 65° C. to about 80° C., about 65° C. to about 85° C., about 65° C. to about 90° C., about 70° C. to about 78° C., about 70° C. to about 80° C., about 70° C. to about 85° C., about 70° C. to about 90° C., about 78° C. to about 80° C., about 78° C. to about 85° C., about 78° C. to about 90° C., about 80° C. to about 85° C., about 80° C. to about 90° C., or about 85° C. to about 90° C. In some embodiments, the first dispersion is dried at a temperature of about 50° C., about 55° C., about 60° C., about 65° C., about 70° C., about 78° C., about 80° C., about 85° C., or about 90° C. In some embodiments, the first dispersion is dried at a temperature of at least about 50° C., about 55° C., about 60° C., about 65° C., about 70° C., about 78° C., about 80° C., or about 85° C. In some embodiments, the first dispersion is dried at a temperature of at most about 55° C., about 60° C., about 65° C., about 70° C., about 78° C., about 80° C., about 85° C., or about 90° C.

Pouch Cells and Methods of Manufacture

Another aspect provided herein is a method of forming an energy storage device. In some embodiments, the method comprises: forming a first electrode and forming a second electrode; and stacking the first electrode, a separator, and the second electrode to form a pouch cell. In some embodiments, the method is not performed in a dry room or a clean room. Another aspect provided herein is a method of forming a cylindrical energy storage device, the method comprising: forming a first electrode and forming a second electrode; stacking the first electrode, a separator, and the second electrode; wrapping the first electrode, the separator, and the second electrode into a spiral and inserting the spiral in a casing to form a cylindrical cell. Another aspect provided herein is a method of forming a button cell energy storage device, the method comprising: forming a first electrode and forming a second electrode; stacking the first electrode, a separator, and the second electrode; inserting the stacked first electrode, the separator, and the second electrode in a casing to form a button cell.

In some embodiments, the separator has a thickness of about 10 microns to about 80 microns. In one example the separator is a TF 3040 separator. In some embodiments, the separator prevents contact between the first electrode and the second electrode. In some embodiments, the separator absorbs and maintains at least a portion of the electrolyte.

In some embodiments, the method further comprises sealing the pouch cell. In some embodiments, sealing the pouch cell is performed by a heat sealer, a vacuum sealer, or any combination thereof. In some embodiments, the sealing the pouch cell prevents leakage of the electrolyte within. In some embodiments, the method further comprises adding an electrolyte to the pouch cell. In some embodiments, the method further comprises adding an electrolyte to the pouch cell through a hole in the pouch cell. In some embodiments, the electrolyte is a solid electrolyte, a liquid electrolyte, a gel electrolyte, or any combination thereof.

In some embodiments, the method further comprises performing a formation cycle of the pouch cell. In some embodiments, the formation cycle is performed in open air, at ambient temperature, or both. In some embodiments, the formation cycle comprises charging and discharging the pouch cell. In some embodiments, the formation cycle comprises charging and discharging the pouch cell 1, 2, 3, 4, or more times. In some embodiments during the formation cycle, the electrolyte releases a gas during the charging and discharging cycles. As such, in some embodiments, the method further comprises degassing the pouch cell. In some embodiments, the method further comprises sealing the pouch cell. In some embodiments, the method further comprises allowing the pouch cell to rest.

Figure 24:
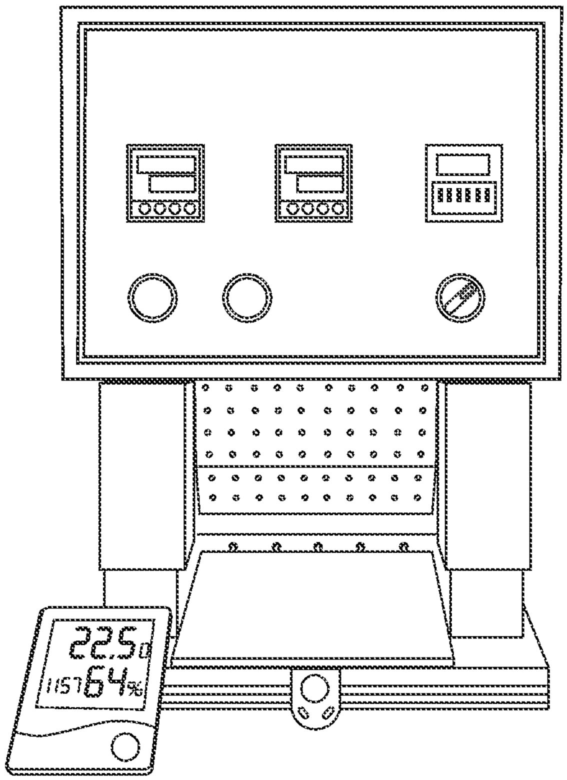
FIG. 24 shows an apparatus for cell sealing, in accordance with an embodiment herein.
Figure 25:
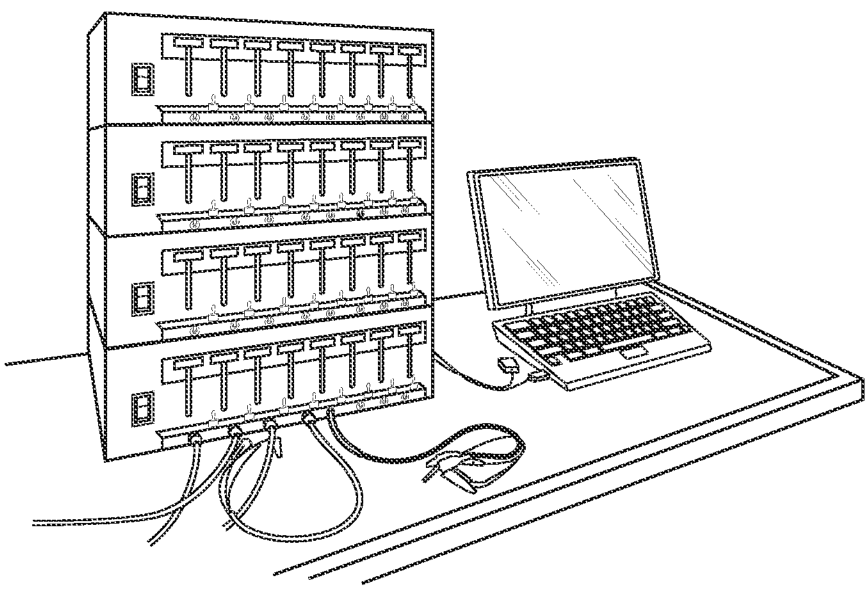
FIG. 25 shows an apparatus for cell testing, in accordance with an embodiment herein.

In some embodiments, the method further comprises cutting the pouch cell, degassing the pouch cell, and resealing the pouch cell. FIG. 24 shows an apparatus for cell sealing. In some embodiments, the method further comprises testing an electrochemical property of the pouch cell. FIG. 25 shows an apparatus for pouch cell testing.

FIG. 23C shows an image of a cell packaging for holding the energy storage devices herein and an electrolyte. As shown, the cell packaging comprises a bag. In some embodiments, the bag comprises a metallic bag. In some embodiments, the bag comprises an aluminum bag. Alternatively, the bag comprises a plastic bag, a ceramic bag, or any combination thereof. In some embodiments, the bag contains the electrodes the separator, and the electrolyte.

Figure 26:
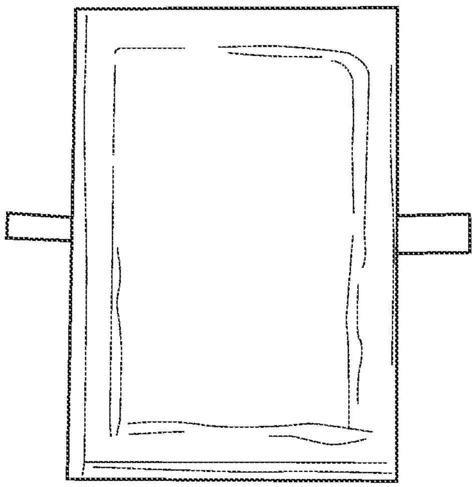
FIG. 26 shows an image of an energy storage device described herein, in accordance with an embodiment herein.
Figure 27:
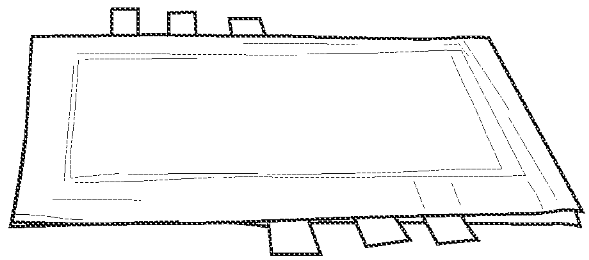
FIG. 27 shows a side view image of a stack of three energy storage devices, in accordance with an embodiment herein.
Figure 28:
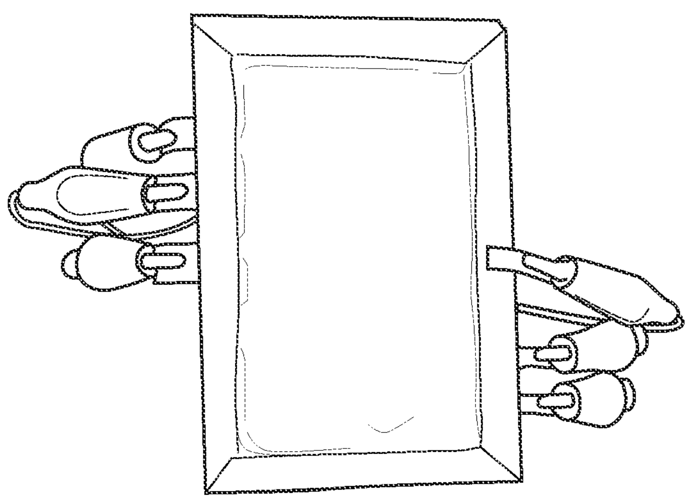
FIG. 28 shows a back view image of an energy storage device described herein, in accordance with an embodiment herein.
Figure 29A:
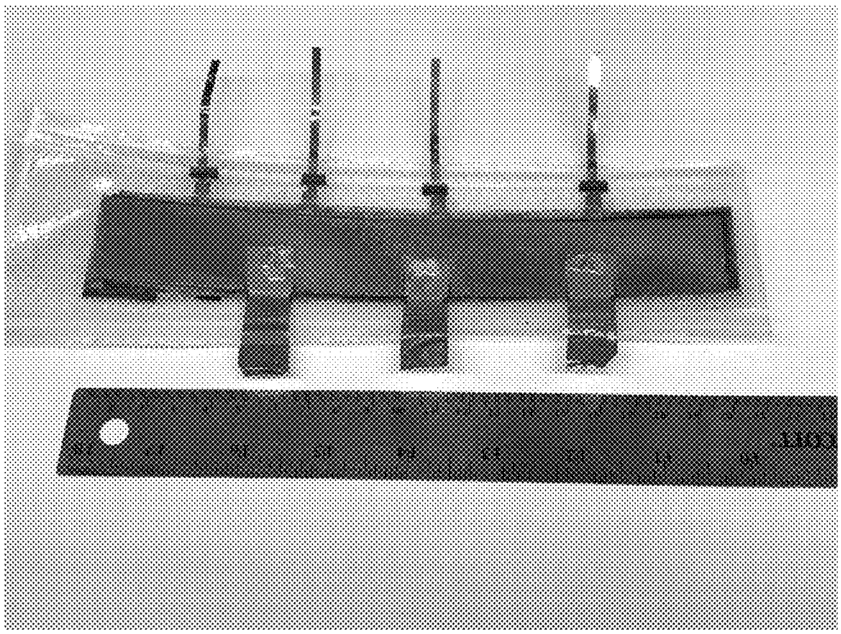
FIG. 29A shows a first image of an energy storage device described herein with a ruler for scale, in accordance with an embodiment herein.
Figure 29B:
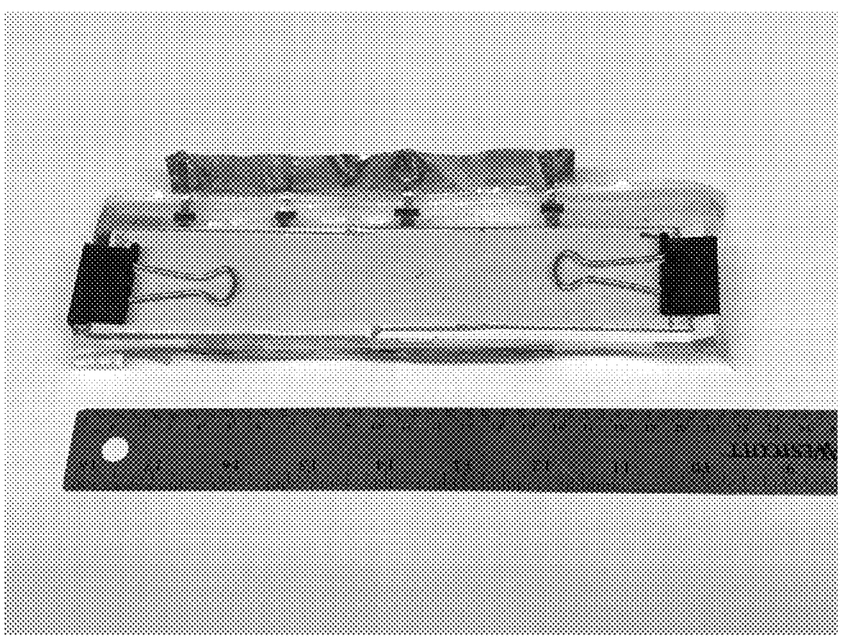
FIG. 29B shows a second image of an energy storage device described herein with a ruler for scale, in accordance with an embodiment herein.
Figure 30A:
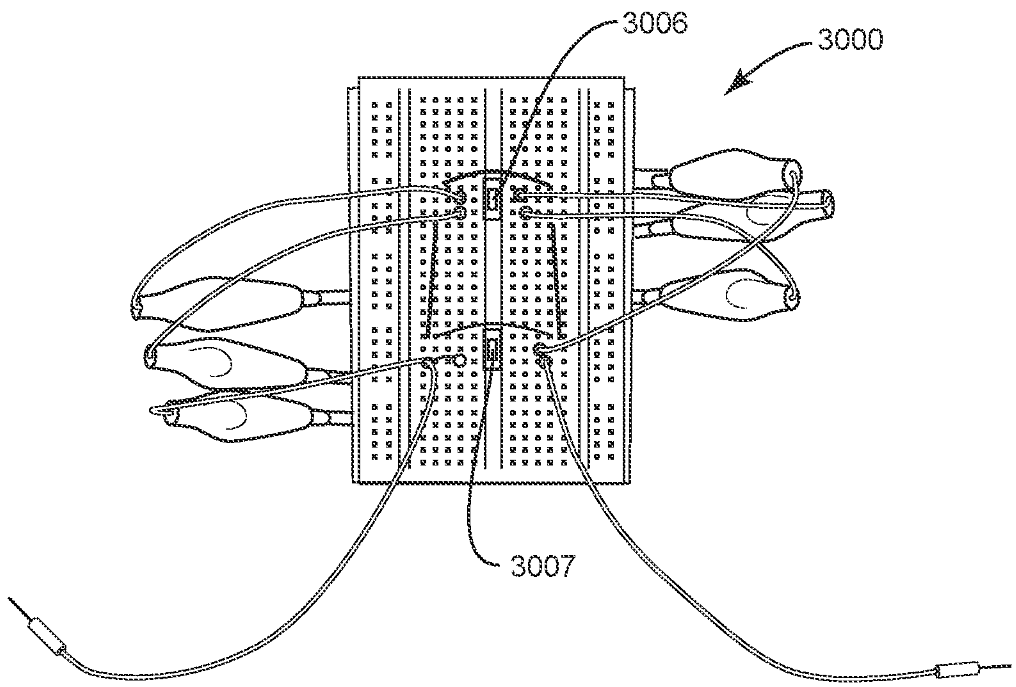
FIG. 30A shows a first image of the charge and discharge circuit using the energy storage device, in accordance with an embodiment herein.
Figure 30B:
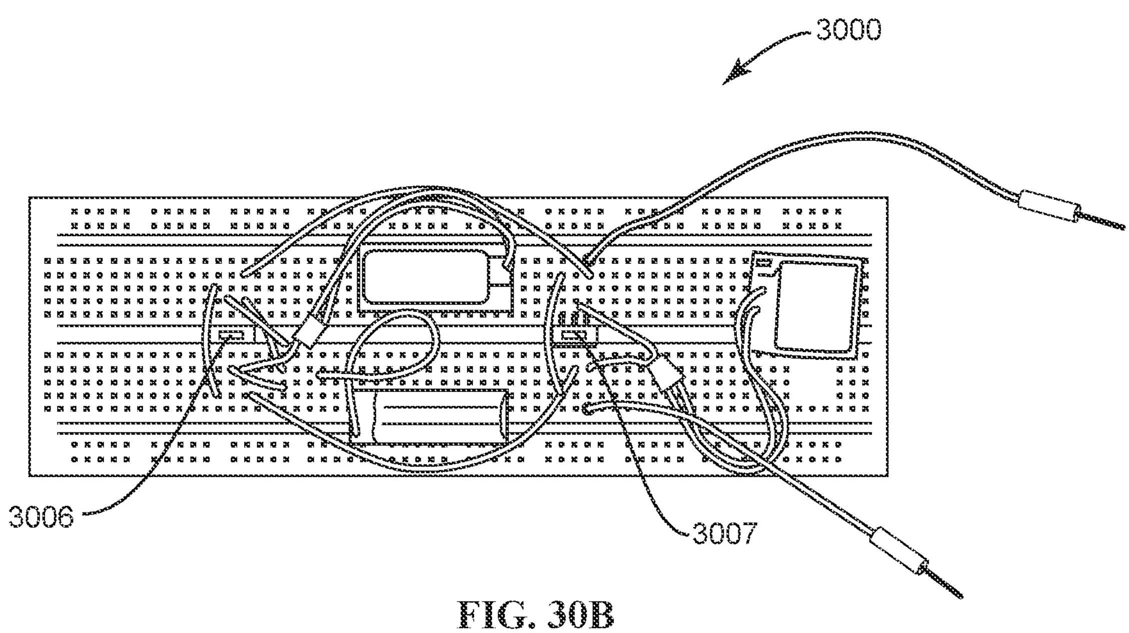
FIG. 30B shows a second image of the charge and discharge circuit using the energy storage device, in accordance with an embodiment herein.
Figure 31A:
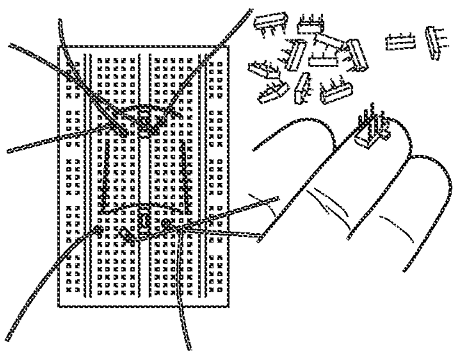
FIG. 31A shows a first image of the components of the charge and discharge circuit using the energy storage device, in accordance with an embodiment herein.
Figure 31B:
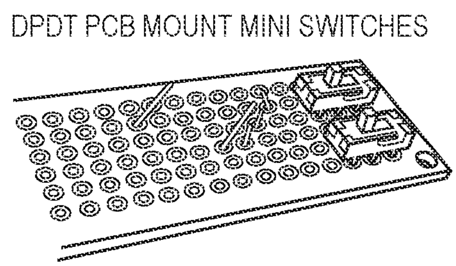
FIG. 31B shows a second image of the components of the charge and discharge circuit using the energy storage device, in accordance with an embodiment herein.
Figure 31C:
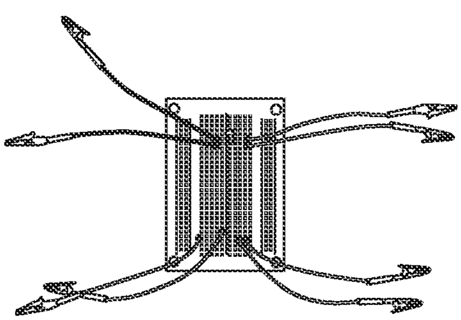
FIG. 31C shows a third image of the components of the charge and discharge circuit using the energy storage device, in accordance with an embodiment herein.
Figure 31D:
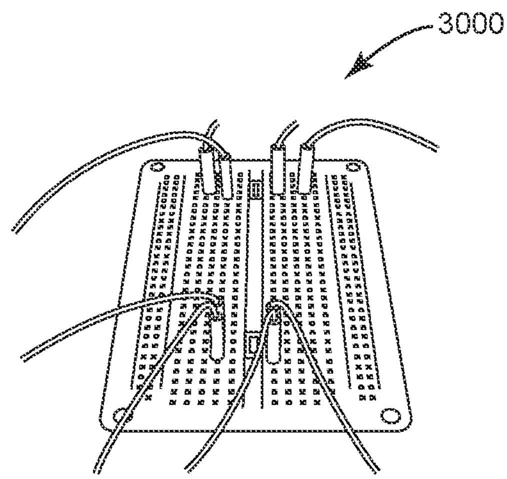
FIG. 31D shows a fourth image of the components of the charge and discharge circuit using the energy storage device, in accordance with an embodiment herein.

FIGS. 26, 27, 28, and 29A and 29B show images of a non-limiting example of an energy storage device described herein. FIG. 26 shows an image of an energy storage device described herein. FIG. 27 shows a side view image of a stack of three energy storage devices. FIG. 28 shows a back view image of an energy storage device described herein. FIGS. 29A and 29B show images of an energy storage device described herein with a ruler for scale.

In some embodiments, the method further comprises allowing the pouch cell to rest for a period of time of about 1 minute to about 10 minutes. In some embodiments, the method further comprises allowing the pouch cell to rest for a period of time of about 1 minute to about 2 minutes, about 1 minute to about 3 minutes, about 1 minute to about 4 minutes, about 1 minute to about 5 minutes, about 1 minute to about 6 minutes, about 1 minute to about 7 minutes, about 1 minute to about 8 minutes, about 1 minute to about 9 minutes, about 1 minute to about 10 minutes, about 2 minutes to about 3 minutes, about 2 minutes to about 4 minutes, about 2 minutes to about 5 minutes, about 2 minutes to about 6 minutes, about 2 minutes to about 7 minutes, about 2 minutes to about 8 minutes, about 2 minutes to about 9 minutes, about 2 minutes to about 10 minutes, about 3 minutes to about 4 minutes, about 3 minutes to about 5 minutes, about 3 minutes to about 6 minutes, about 3 minutes to about 7 minutes, about 3 minutes to about 8 minutes, about 3 minutes to about 9 minutes, about 3 minutes to about 10 minutes, about 4 minutes to about 5 minutes, about 4 minutes to about 6 minutes, about 4 minutes to about 7 minutes, about 4 minutes to about 8 minutes, about 4 minutes to about 9 minutes, about 4 minutes to about 10 minutes, about 5 minutes to about 6 minutes, about 5 minutes to about 7 minutes, about 5 minutes to about 8 minutes, about 5 minutes to about 9 minutes, about 5 minutes to about 10 minutes, about 6 minutes to about 7 minutes, about 6 minutes to about 8 minutes, about 6 minutes to about 9 minutes, about 6 minutes to about 10 minutes, about 7 minutes to about 8 minutes, about 7 minutes to about 9 minutes, about 7 minutes to about 10 minutes, about 8 minutes to about 9 minutes, about 8 minutes to about 10 minutes, or about 9 minutes to about 10 minutes. In some embodiments, the method further comprises allowing the pouch cell to rest for a period of time of about 1 minute, about 2 minutes, about 3 minutes, about 4 minutes, about 5 minutes, about 6 minutes, about 7 minutes, about 8 minutes, about 9 minutes, or about 10 minutes. In some embodiments, the method further comprises allowing the pouch cell to rest for a period of time of at least about 1 minute, about 2 minutes, about 3 minutes, about 4 minutes, about 5 minutes, about 6 minutes, about 7 minutes, about 8 minutes, or about 9 minutes. In some embodiments, the method further comprises allowing the pouch cell to rest for a period of time of at most about 2 minutes, about 3 minutes, about 4 minutes, about 5 minutes, about 6 minutes, about 7 minutes, about 8 minutes, about 9 minutes, or about 10 minutes.

Charge and Discharge Circuits

An electric circuit switch has been designed to switch between serial and parallel connections for multiple energy storage devices, for example, three energy storage devices. In some embodiments, the batteries are designed to be charged in parallel to minimize the charging and times and improve charging characteristics. Once the battery pack is charged, a switch can be switched from three-cells-in-parallel to three-cells-in-series for powering a recent-generation cellular telephone. FIG. 28 shows the three energy storage devices connected to the switch.

The circuit switch can be made of two dual-pole double-throw toggle switches, three energy storage devices, and a number of wires, as shown in FIGS. 30A and 30B and 31A to 31D. The wires can be connected to the energy storage device. As this is a relatively simple circuit, the footprint of the switch can be quite small, moving from a relatively large circuit board to a medium-sized one and finally to a mini printed circuit board. However, with more advanced printed circuit board-making techniques, the footprint of this switch can be scaled down such that it can be integrated into the battery pack, similar to the size of the protection circuits on lithium-ion batteries.

In some embodiments, the energy storage devices herein have a nominal operating voltage of about 1.73 V. Thus, per FIG. 32, three energy storage devices having this voltage can be connected in series in order to power a mobile phone. However, in some embodiments, optimal charging speeds are achieved when the three energy storage devices are connected in parallel. In some embodiments, the circuits herein charge and discharge 3, 4, 5, 6, 7, 8, 9, 10, 12, 14, 16, 18, 20, or more energy storage devices, including increments therein.

Figure 33A:
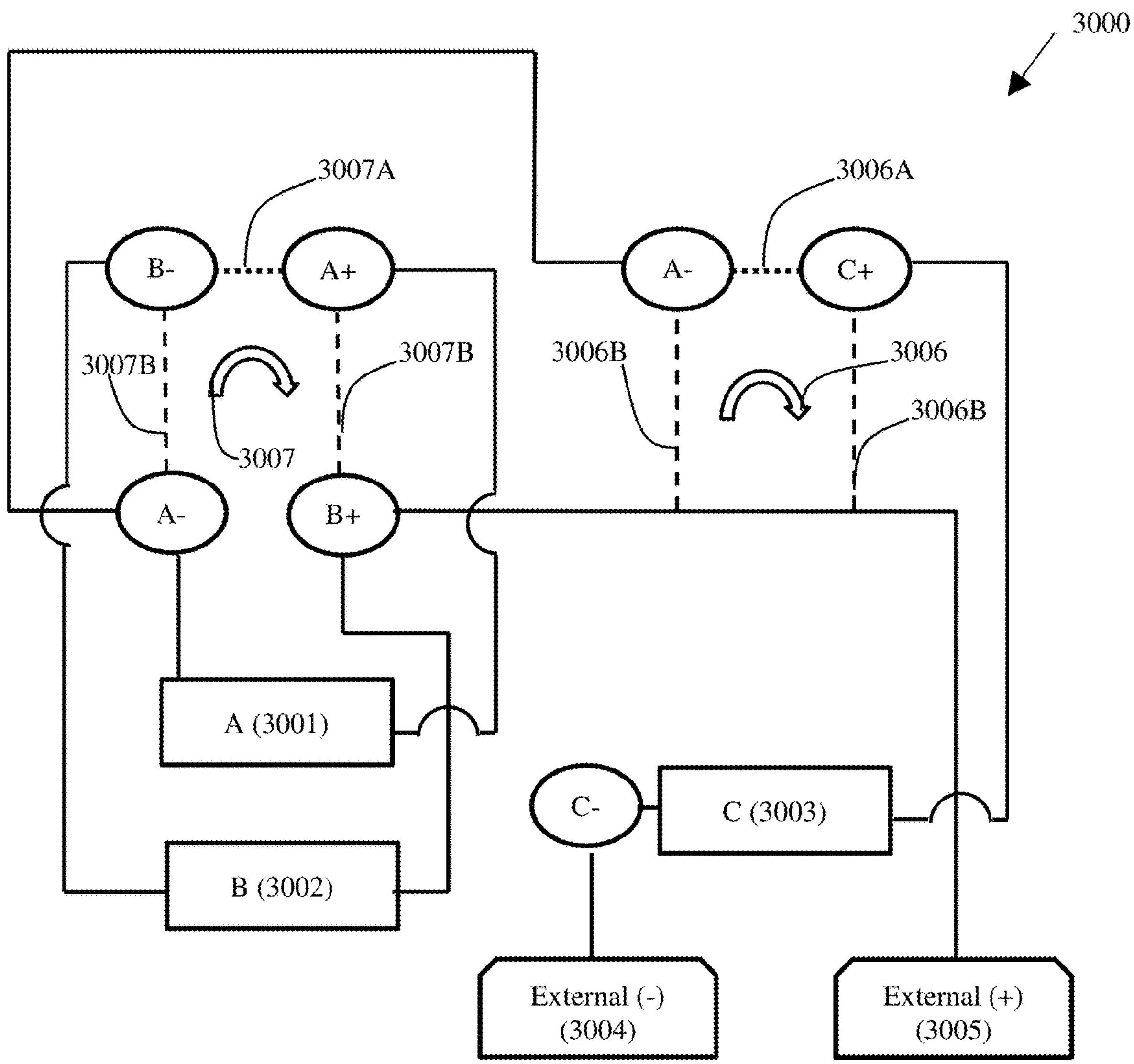
FIG. 33A shows a diagram of a charge and discharge circuit using the energy storage device, in accordance with an embodiment herein.

As such, FIG. 33A shows a diagram of a non-limiting example of a circuit 3000 configured to charge the energy storage devices in parallel and discharge the energy storage devices in series. As shown the circuit 3000 comprises a first energy storage device 3001, a second energy storage device 3002, a third energy storage device 3003, a negative external terminal 3004, a positive external terminal 3005, a first switch 3006, and a second switch 3007. In some embodiments, at least one of the first switch 3006 and the second switch 3007 comprise a double-pole double-throw switch, wherein the first switch 3006 toggles between connecting a primary first portion of the circuit 3006A and connecting a secondary first portion of the circuit 3006B, and wherein the second switch 3007 toggles between connecting a primary second portion of the circuit 3007A and connecting a secondary second portion of the circuit 3007B. In some embodiments, the first switch 3006 and the second switch 3007 are simultaneously toggled to simultaneously enable the connection of the primary first portion of the circuit 3006A and the primary second portion of the circuit 3007A and to disable the secondary first portion of the circuit 3006B and the secondary second portion of the circuit 3007B. In some embodiments, the first switch 3006 and the second switch 3007 are simultaneously toggled to simultaneously disable the connection of the primary first portion of the circuit 3006A and the primary second portion of the circuit 3007A and to enable the secondary first portion of the circuit 3006B and the secondary second portion of the circuit 3007B.

In some embodiments, the first switch 3006 and the second switch 3007 are sequentially toggled to enable the connection of the primary first portion of the circuit 3006A and the primary second portion of the circuit 3007A and to disable the secondary first portion of the circuit 3006B and the secondary second portion of the circuit 3007B. In some embodiments, the first switch 3006 and the second switch 3007 are sequentially toggled to disable the connection of the primary first portion of the circuit 3006A and the primary second portion of the circuit 3007A and to enable the secondary first portion of the circuit 3006B and the secondary second portion of the circuit 3007B. In some embodiments, the second switch 3007 and the first switch 3006 are sequentially toggled to enable the connection of the primary first portion of the circuit 3006A and the primary second portion of the circuit 3007A and to disable the secondary first portion of the circuit 3006B and the secondary second portion of the circuit 3007B. In some embodiments, the second switch 3007 and the first switch 3006 are sequentially toggled to disable the connection of the primary first portion of the circuit 3006A and the primary second portion of the circuit 3007A and to enable the secondary first portion of the circuit 3006B and the secondary second portion of the circuit 3007B.

Figure 33B:
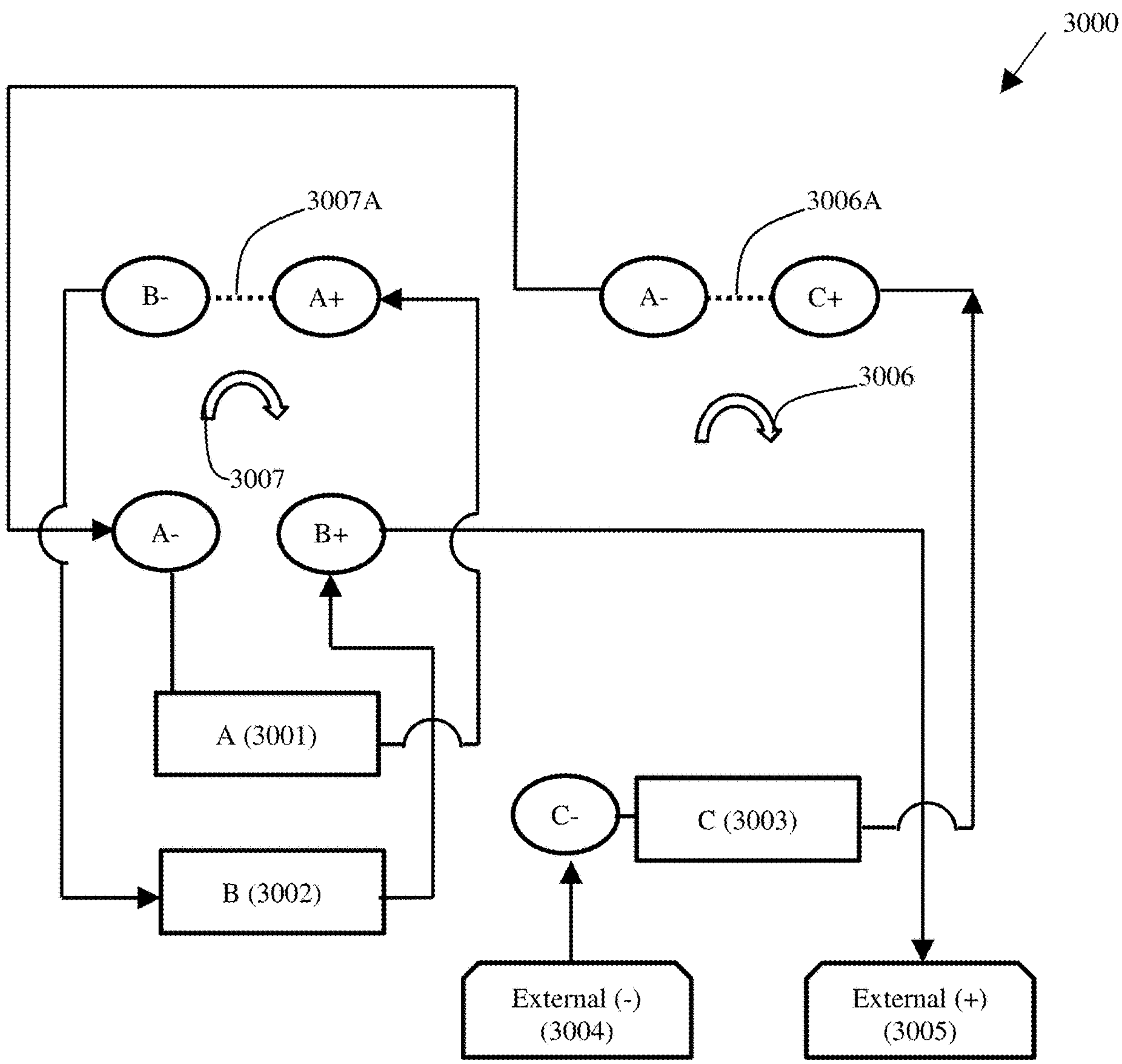
FIG. 33B shows a diagram of a charge and discharge circuit using the energy storage device during discharging, in accordance with an embodiment herein.

As such, during discharge, per FIG. 33B, when the first switch 3006 is toggled such that the primary first portion of the circuit 3006A is connected and when the second switch 3007 is toggled such that the primary second portion of the circuit 3007A is connected, power flows from the negative external terminal 3004 through the third energy storage device 3003 via its negative terminal, through the first portion of the circuit 3006A and through the first energy storage device 3001 via its negative terminal, through the second energy storage device 3002 via its negative terminal and to the positive external terminal 3005 to discharge the first, second, and third energy storage devices 3001, 3002, and 3003, respectively, in series.

Figure 33C:
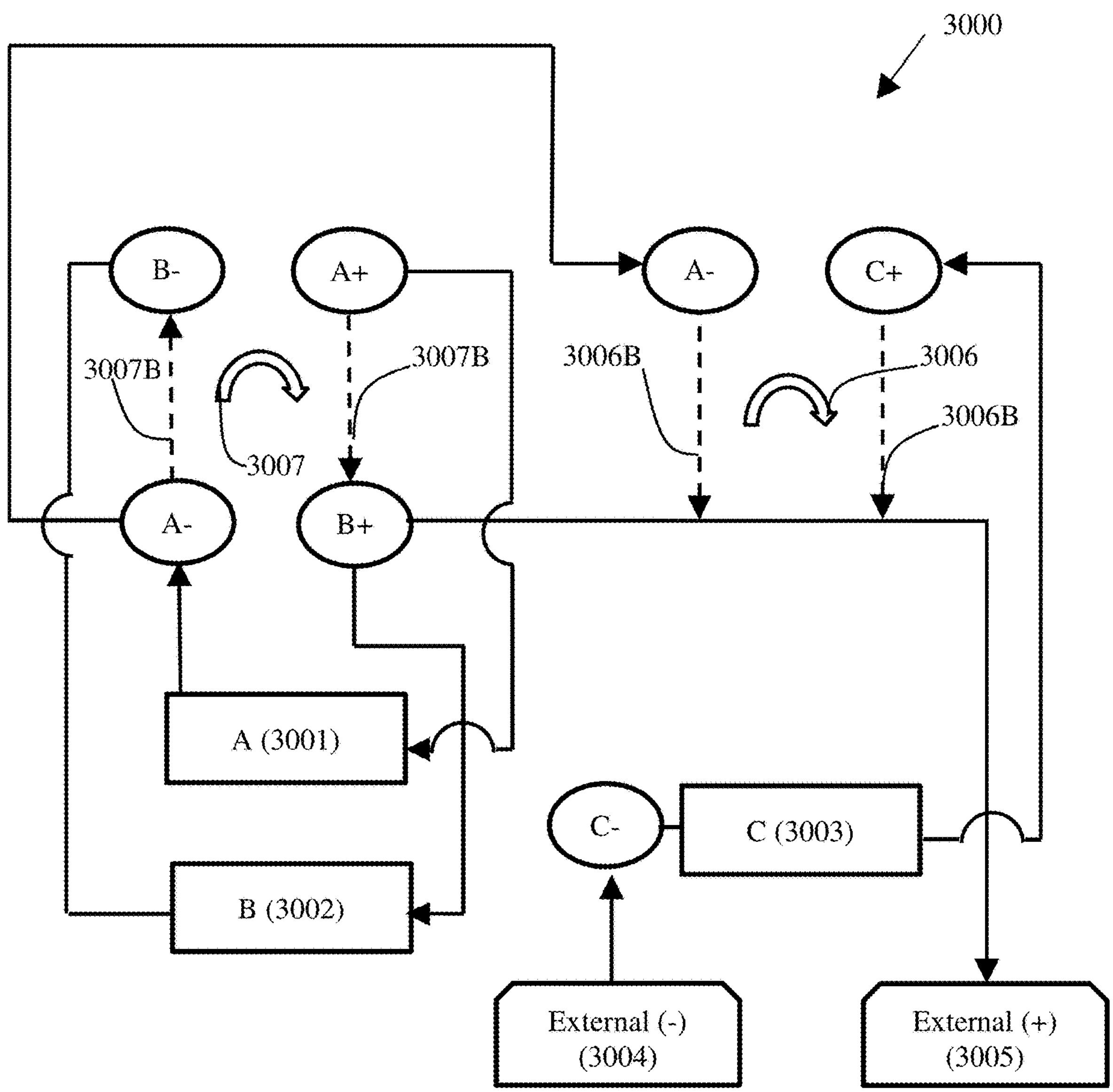
FIG. 33C shows a diagram of a charge and discharge circuit using the energy storage device during charging, in accordance with an embodiment herein.

As such, during charging, per FIG. 33C, when the first switch 3006 is toggled such that the secondary first portion of the circuit 3006B is connected and when the second switch 3007 is toggled such that the secondary second portion of the circuit 3007B is connected, power flows from the negative external terminal 3004 and simultaneously through the first, second, and third energy storage devices 3001, 3002, and 3003, respectively, via their respective negative terminals.

Figure 32:
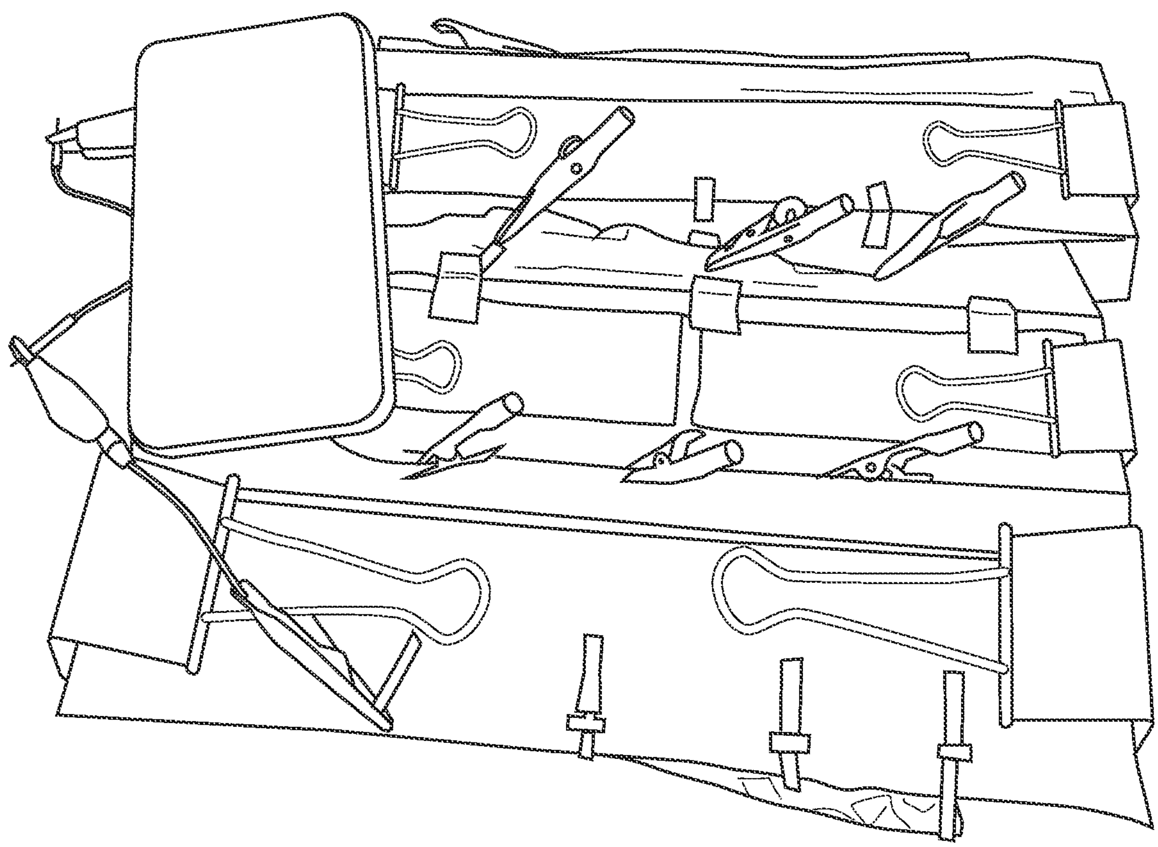
FIG. 32 shows an image of an array of cells powering a phone, in accordance with an embodiment herein.

FIGS. 30A and 30B and 31A to 31D show images of an example of the circuit 3000 configured to charge the energy storage devices in parallel and discharge the energy storage devices in series, wherein the circuit 3000 comprises a first switch 3006 and a second switch 3007. FIG. 32 shows an image of an array of cells powering a phone. As shown, a footprint of the circuits of FIGS. 30A and 30B and 31A can be reduced by replacing the breadboard with a printed circuit board. In some embodiments, the circuit 3000 is integrated into the energy storage device. In some embodiments, the circuit 3000 is integrated into an electronic device being charged by, or charging, the energy storage device.

Figure 34:
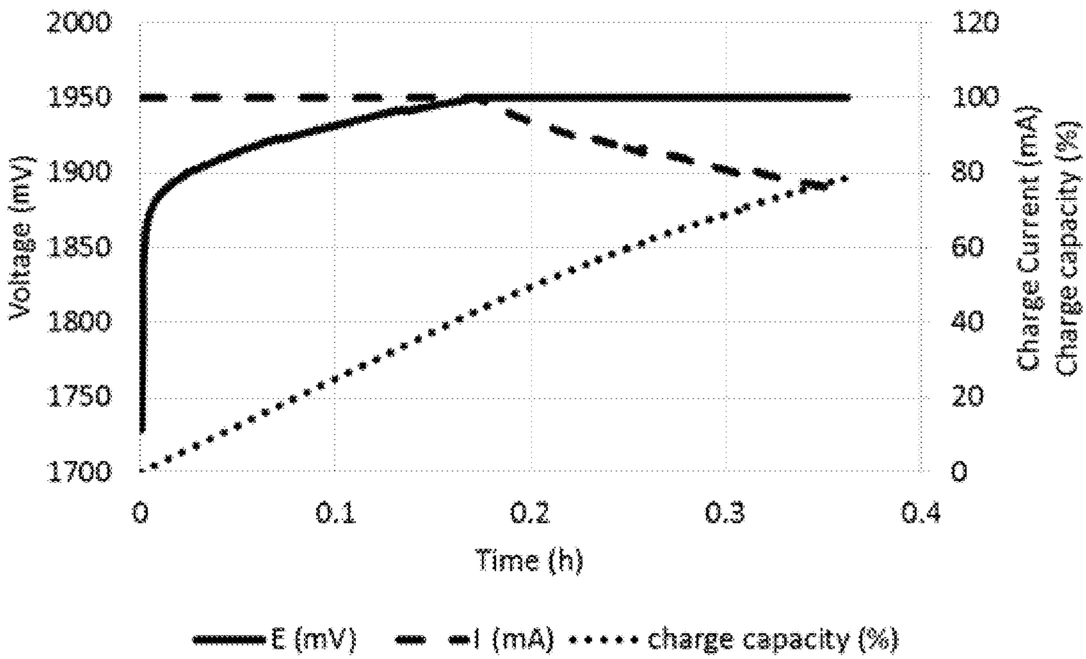
FIG. 34 shows a charge graph of an energy storage device described herein, in accordance with an embodiment herein.
Figure 35:
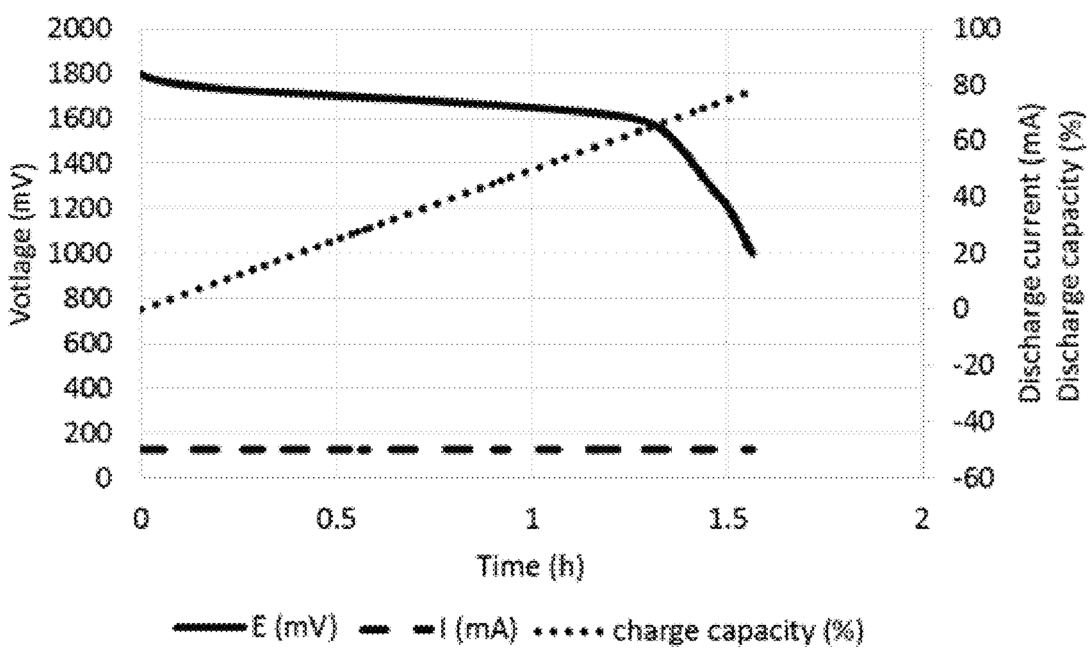
FIG. 35 shows a discharge graph of an energy storage device described herein, in accordance with an embodiment herein.
Figure 36:
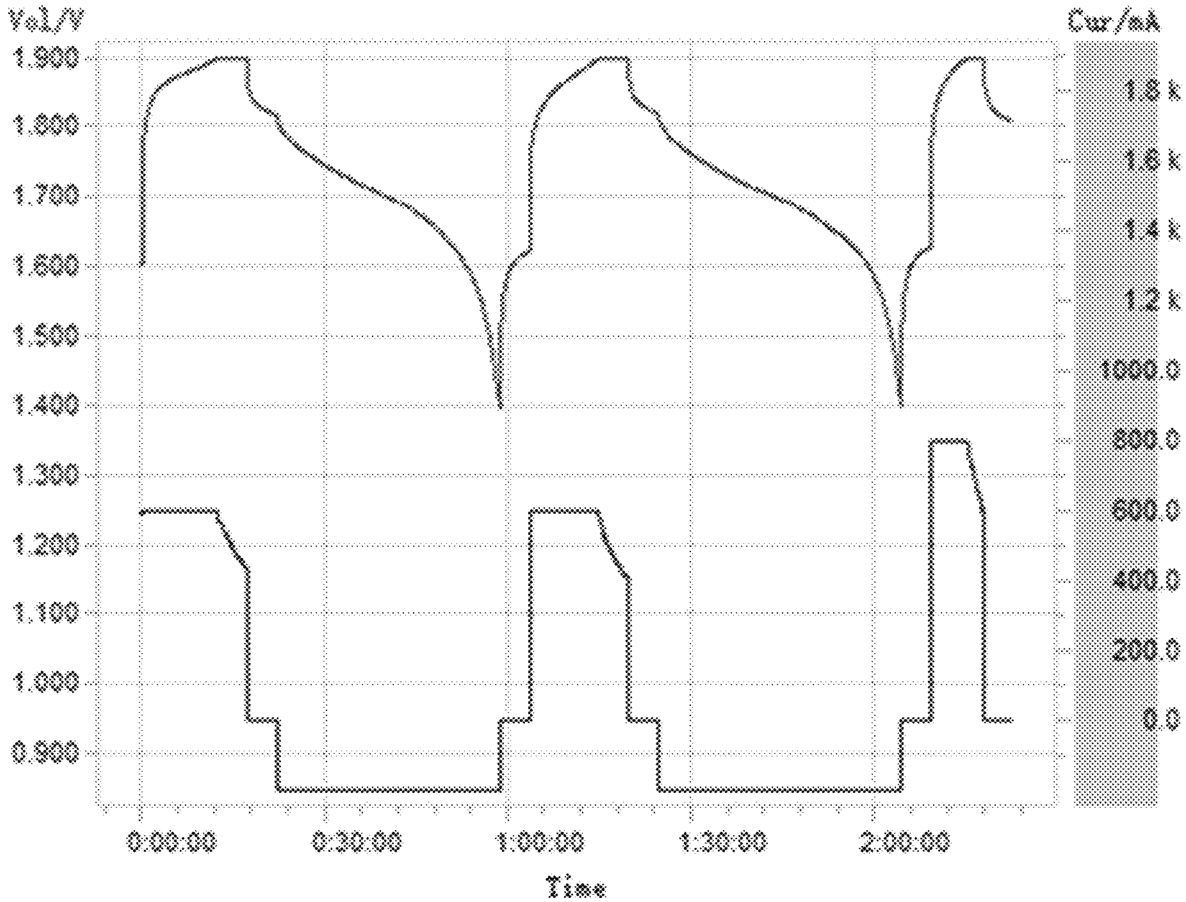
FIG. 36 shows a charge/discharge graph of an energy storage device described herein, in accordance with an embodiment herein.

FIGS. 34 and 35 show charge and discharge graphs of an energy storage device described herein, respectively. As shown in FIG. 34, the charging protocol comprises a constant current rapid charging to highest charging voltage of about 1.9 V, followed by a constant voltage trickle charging at the highest charging voltage until the current drops down to a certain minimum threshold. As shown in FIG. 35, the discharge protocol comprises a constant current discharging, at various charge (C) rates, until the cell voltage drops down to a minimum threshold of about 1 V to about 1.4 V. FIG. 36 shows a charge/discharge graph of an energy storage device described herein.

Characterization of the Energy Storage Devices

FIGS. 12A, 12B, 12C, and 12D show typical SEM images of a zinc-bismuth LDH/reduced graphene oxide (Zn—Bi LDH/rGO) composite. This composite has about 5% rGO and a Zn—Bi atomic ratio of 1:1. The LDH is grown on the rGO sheets and assumes a nanoplate morphology, from hundreds of nanometers to a couple of micrometers long and hundreds of nanometers wide (50-100 nm thick). Zinc-bismuth LDH has also been synthesized and tested without graphene nanosheets. FIGS. 13A to 13D show images of a Zn—Bi LDH with Zn:Bi=4:1 (no rGO). In addition, different ratios for the Zn/Bi were tested: The Zn—Bi atomic ratio is 2:1 (no rGO). The morphology of the LDH does not seem to be affected by the absence or presence of rGO, as shown in FIGS. 13E and 13F.

The SEM images of the Zn—Bi LDH of FIGS. 13A to 13D and FIGS. 13E and 13F were obtained, the nanoplate morphology was examined, and the $Zn(OH)_2$ and $Bi(OH)_3$ were synthesized separately using similar hydrothermal methods to see what the origin of the morphology was. The SEM images indicate that the $Bi(OH)_3$ forms nanoplates similar to the LDH, while the $Zn(OH)_2$ forms more of the large lamellar structures. The morphology study suggests that $Zn^{2+}$ likely goes into $Bi(OH)_3$. So, the high content of bismuth in the LDH (1:1 atomic ratio) likely helps with the nanoplate formation, and the $Zn^{2+}$ goes into the sites of $Bi(OH)_3$ to form the LDH.

FIGS. 14A to 14E show SEM images of pure $Bi(OH)_3$. The morphology of the $Bi(OH)_3$ is very similar to that of the LDH, suggesting that the $Bi(OH)_3$ forms the main structure, while the $Zn^{2+}$ intercalates into the sites of the $Bi^{3+}$ during the LDH formation. FIGS. 16A to 16D show images of a $Zn(OH)_2$ sample synthesized using a hydrothermal method. The morphology of the $Zn(OH)_2$ is nanosheets. FIGS. 15A to 15C show images of a $Fe(OH)_3$ sample synthesized using the hydrothermal method of the present disclosure. The morphology of the $Fe(OH)_3$ is nanotubular/nanogranular. Synthesis of $Ni(OH)_2$ was also attempted using the hydrothermal method, as shown in FIGS. 17A and 17B. The powder was grass green, a very typical color of $Ni(OH)_2$. Positive electrode materials were synthesized using the method of the present disclosure. FIGS. 18A to 18C show SEM images of a potential candidate, nickel-cobalt (Ni—Co) LDH. The LDH assumes a nanoribbon morphology.

The Ni—Co LDH was hydrothermally grown directly on nickel foam substrates, and the resulting electrodes can be used as positive electrodes. FIGS. 7A to 7F show SEM images of these electrodes. In addition, Ni—Fe LDH, another potential cathode candidate, was hydrothermally grown directly on nickel foam substrates, and the resulting electrodes can be used as positive electrodes. FIGS. 8A to 8D show SEM images of these electrodes.

Figure 12A:
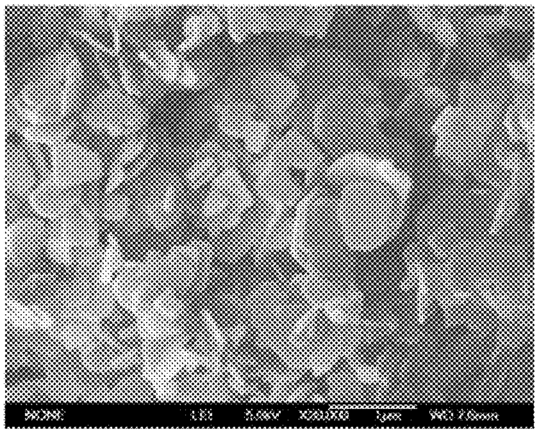
FIG. 12A shows a 20,000×-magnification SEM image of the microscopic structure of an LDH/graphene composite, in accordance with an embodiment herein.
Figure 12B:
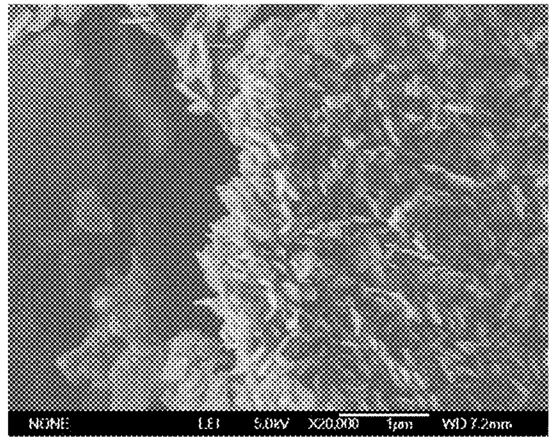
FIG. 12B shows a 20,000×-magnification SEM image of the microscopic structure of an LDH/graphene composite, in accordance with an embodiment herein.
Figure 12C:
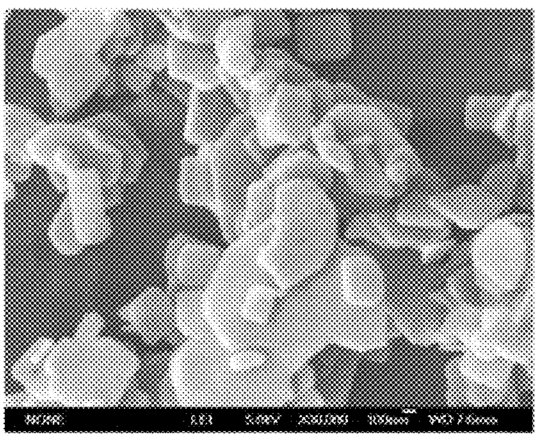
FIG. 12C shows a 30,000×-magnification SEM image of the microscopic structure of an LDH/graphene composite, in accordance with an embodiment herein.
Figure 12D:
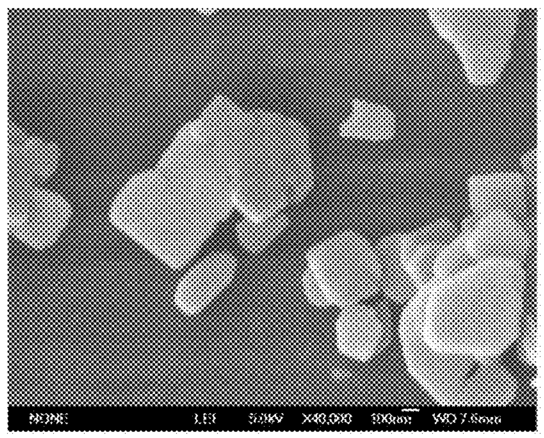
FIG. 12D shows a 40,000×-magnification SEM image of the microscopic structure of an LDH/graphene composite, in accordance with an embodiment herein.
Figure 12E:
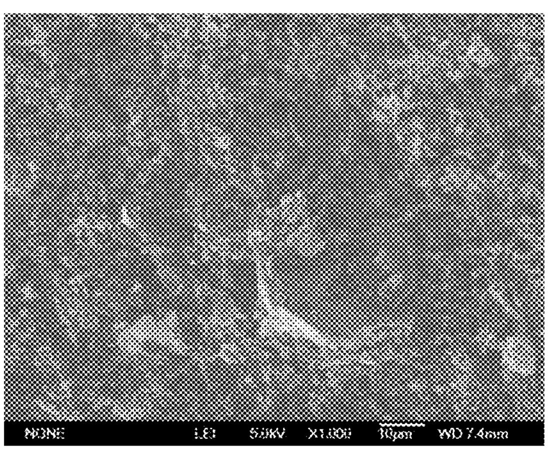
FIG. 12E shows a 1000×-magnification SEM image of the microscopic structure of an LDH/graphene composite, in accordance with an embodiment herein.
Figure 12F:
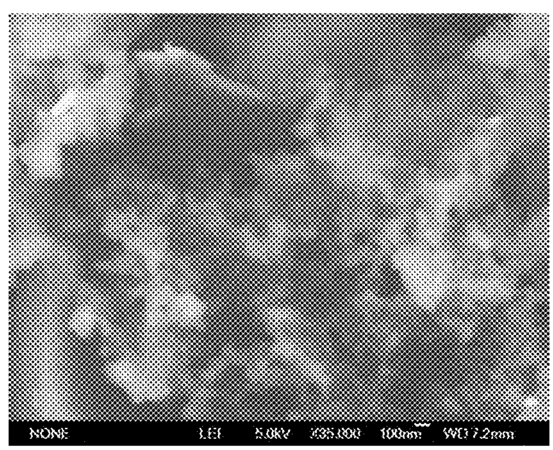
FIG. 12F shows a SEM image of the microscopic structure of carbon black, in accordance with an embodiment herein.

The images of FIGS. 12B and 12E show SEM images showing the morphology of an anode. Domains of activated carbon (big chunks) and LDH (nanoplates) are clearly visible in the image. The image of FIG. 12E is an SEM image of the LDH/graphene composite. Graphene acts as nuclei for the growth of LDH nanoplates. The graphene sheets are not visible because there is only about 1% graphene in this composite, and the graphene is likely completely covered by the LDH, but the LDH nanoplates are clearly visible. FIG. 12F is an enlarged image showing agglomerated carbon black on the surface of an electrode.

FIG. 32 shows a recent-generation cellular telephone powered by a lithium-ion battery. FIG. 25 shows the battery analyzer that was used to charge the energy storage devices. The image on the right shows an internal resistance meter to measure the internal resistance of the cells. Due to the aqueous electrolyte and the chemistry used in certain embodiments of the energy storage devices disclosed herein, the nominal operating voltage of the cells is about 1.73 V, which requires three cells connected in series to power a recent-generation cellular telephone.

Figure 37:
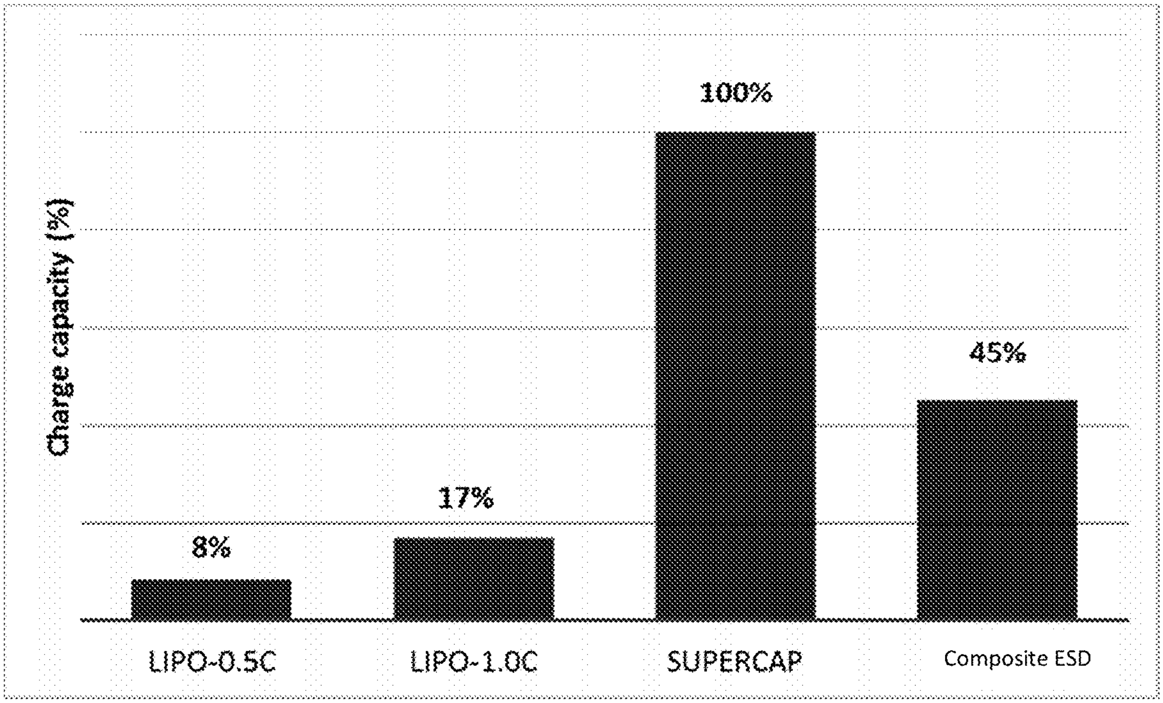
FIG. 37 shows a graph comparing the charge capacity percentages of a lithium-ion polymer (LIPO) battery at a charge rate of 0.5C, a LIPO battery at a charge rate of 1C, a supercapacitor, and an energy storage device described herein, in accordance with an embodiment herein.
Figure 38:
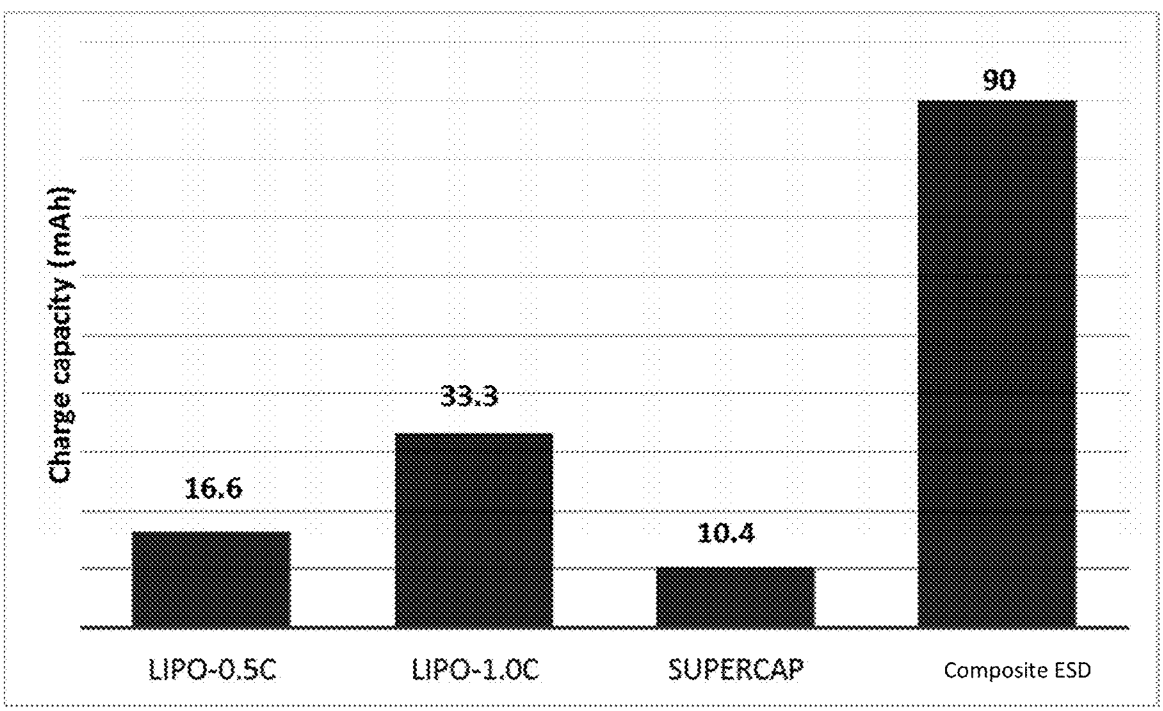
FIG. 38 shows a graph comparing the charge capacities of a LIPO battery at a charge rate of 0.5C, a LIPO battery at a charge rate of 1C, a supercapacitor, and an energy storage device described herein, in accordance with an embodiment herein.

The charge capacity of three energy storage device types are compared per FIGS. 37 and 38. All energy storage devices therein were charged for about 10 minutes. As shown, the corresponding charge capacity is represented by the percent state of charge and milliampere-hour charge capacity. As displayed, for a lithium-ion polymer battery charged at 0.5C and 1.0C, faster charging leads to battery degradation.

To compare the fast-charging capability of three different energy storage systems (lithium-ion polymer battery, supercapacitor, and the energy storage device of the present disclosure), all three energy storage devices were charged for 10 minutes, whereas the lithium-ion polymer was charged at two different rates. In terms of relative charge capacity, at 0.5C, the lithium-ion polymer reached about 8% of its rated capacity; at 1C, it was charged to about 17%. The supercapacitor was fully charged (100%) after 10 minutes of charging. The energy storage device was charged to about 45% its rated capacity. However, if the absolute capacity after 10 minutes of charging is compared, the supercapacitor, due to its small capacity, only stored 10.4 mAh of charge. The lithium-ion polymer stored 16.6 and 33.3 mAh at 0.5C and 1C rates, respectively. In comparison, the energy storage device was able to store 90 mAh during the 10 minutes of charging, a much higher capacity than that of the supercapacitor and the lithium-ion polymer battery.

Figure 39:
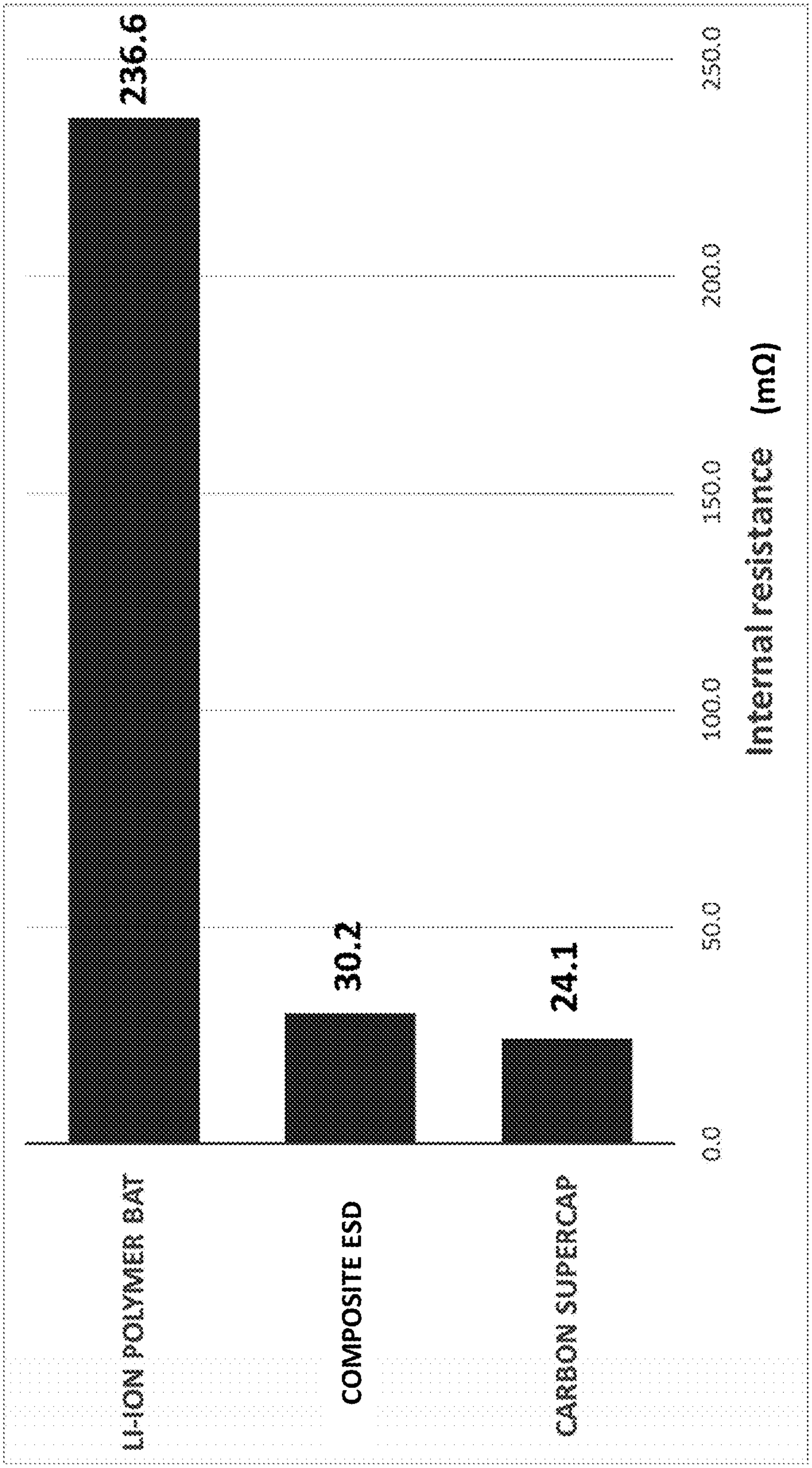
FIG. 39 shows a graph comparing the internal resistance of a LIPO battery, a supercapacitor, and an energy storage device described herein, in accordance with an embodiment herein.

The equivalent series resistance (ESR) of the lithium-ion polymer batteries and supercapacitors of similar electrode area is about 236.6 mOhm and about 24.1 mOhm, respectively. The energy storage device of the same electrode area exhibits an ESR of about 30.2 mOhm, much closer to that of the supercapacitor than that of the lithium-ion polymer battery. These results corroborate the claim that the energy storage device combines the high capacity of the lithium-ion polymer battery and the lower ESR of the supercapacitor, as shown in FIG. 39.

An example of a charging profile of an energy storage device described herein and a typical discharging profile are shown in FIGS. 34 and 35. The charging protocol involves two steps, similar to that of the lithium-ion polymer battery: a constant current rapid charging to the highest charging voltage (1.9 V to 1.95 V), followed by a constant voltage trickle charging at the highest charging voltage until the current drops down to a certain minimum threshold. The discharge protocol for the energy storage device involves constant current discharging (at various C rates) until the cell voltage drops down to a minimum threshold (1.0 V to 1.4 V).

The Ragone plot of FIG. 2 compares the energy density and power density of the energy storage device of the present disclosure with that of traditional batteries and supercapacitors. Unlike traditional energy storage devices, the energy storage device demonstrates both high energy and high power. Note that the higher the energy density, the longer the battery can run the phone, and the higher the power density, the faster the battery can recharge.

The plot of FIG. 3A shows the calculated gravimetric energy density versus volume energy density of various energy storage systems. The energy storage devices of the present disclosure demonstrate both high volumetric and gravimetric energy density. The Ragone plot of FIG. 3B shows the relationship between energy density and power density of various energy storage devices. The unmodified and modified energy storage devices of the present disclosure not only demonstrate close to commercial supercapacitor power densities but also exhibit higher energy densities than conventional batteries.

Figure 40:
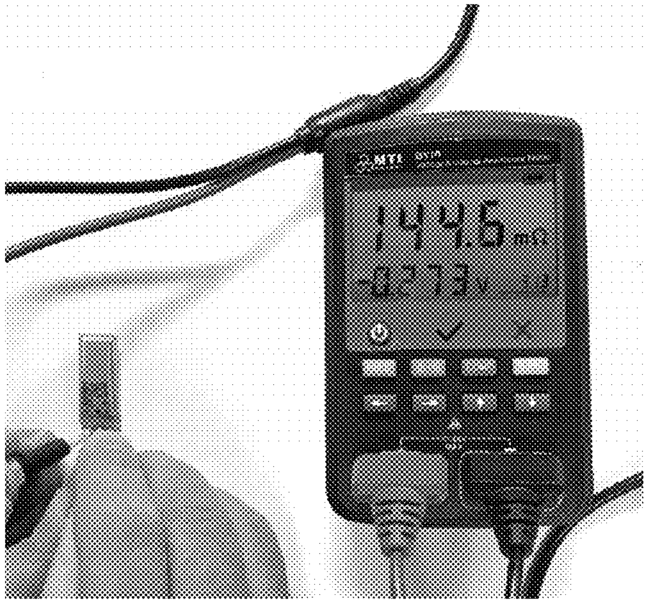
FIG. 40 shows an image of a multimeter for testing the resistance of an energy storage device described herein, in accordance with an embodiment herein.
Figure 41:
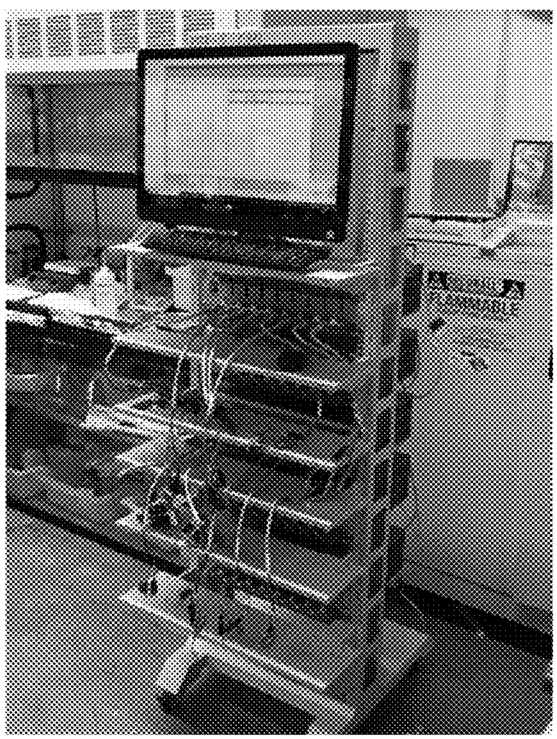
FIG. 41 shows an image of an apparatus for testing the charge speed of an energy storage device described herein, in accordance with an embodiment herein.

FIG. 40 shows an image of a multimeter for testing the resistance of an energy storage device described herein. Alternatively, any other electrical device can be used to test the resistance of the energy storage device including but not limited to a potentiometer and a resistometer. FIG. 41 shows an image of an apparatus for testing the charge speed of an energy storage device described herein.

Energy Storage Device Performance

The high energy densities and power densities exhibited by the storage devices herein were unexpectedly high given the composition by mass, by volume, or both of the graphene sheet of below about 10%. The concentration by mass, by volume, or both of the graphene sheet of below about 10% enables the graphene to serve as a substrate for LDH growth but does not form a complete matrix that limits the density of the LDH-graphene composite.

Furthermore, the ratio by mass or volume between the of the conductive additive, such as the high surface area carbon materials, and the LDH can be tuned to alter and improve performance of the electrodes and energy storage devices. In some embodiments, increasing the amount of the conductive additive improves the rate capability of the energy storage device for high power applications. In some embodiments, increasing the amount of LDH increases the specific capacity for high energy density applications.

Energy storage devices with a higher gravimetric energy densities and volumetric energy densities store a greater amount of energy and power an electronic device for a greater amount of time. Gravimetric energy density is measured in units of energy/mass (e.g., watt-hours per kilogram [Wh/kg]). Volumetric energy density is measured in units of energy/volume (e.g., watt-hours per liter [Wh/L]). In some embodiments, the gravimetric energy density of an energy storage device is measured as a gravimetric energy density of an entire cell including non-active materials. In some embodiments, the gravimetric energy density of an energy storage device is measured as a gravimetric energy density of only active materials. Alternatively, in some embodiments, the gravimetric energy density of an energy storage device is measured by any standard means. In some embodiments, the volumetric energy density of an energy storage device is measured as a volumetric energy density of an entire cell including non-active materials. In some embodiments, the volumetric energy density of an energy storage device is measured as a volumetric energy density of only active materials. Alternatively, in some embodiments, the volumetric energy density of an energy storage device is measured by any standard means.

Energy storage devices with a higher gravimetric power densities and volumetric power densities recharge faster. Gravimetric power density is measured in units of power/mass (e.g., watts per kilogram [W/kg]). Volumetric power density is measured in units of power/volume (e.g., watts per liter [W/L]). In some embodiments, the gravimetric power density of an energy storage device is measured as a gravimetric power density of an entire cell including non-active materials. In some embodiments, the gravimetric power density of an energy storage device is measured as a gravimetric power density of only active materials. Alternatively, in some embodiments, the gravimetric power density of an energy storage device is measured by any standard means. In some embodiments, the volumetric power density of an energy storage device is measured as a volumetric power density of an entire cell including non-active materials. In some embodiments, the volumetric power density of an energy storage device is measured as a volumetric power density of only active materials. Alternatively, in some embodiments, the volumetric power density of an energy storage device is measured by any standard means.

FIG. 37 shows a graph comparing the charge capacity percentages of a lithium-ion polymer (LIPO) battery at a charge rate of 0.5C, a LIPO battery at a charge rate of 1C, a supercapacitor, and an energy storage device described herein. As shown therein, the LIPO battery at a charge rate of 0.5C, the LIPO battery at a charge rate of 1C, the supercapacitor, and an energy storage device described herein have charge capacities of 8%, 17%, 100%, and 45%, respectively. In some embodiments, the low internal resistance of the energy storage devices herein enables greater charge capacities at the same charge than commercial LIPO batteries.

FIG. 38 shows a graph comparing the charge capacities of a LIPO battery at a charge rate of 0.5C, a LIPO battery at a charge rate of 1C, a supercapacitor, and an energy storage device described herein charged for about 10 minutes. As shown therein, the LIPO battery at a charge rate of 0.5C, the LIPO battery at a charge rate of 1C, the supercapacitor, and an energy storage device described herein have charge capacities of 16.6 mAh, 33.3 mAh, 10.4 mAh, and 90 mAh, respectively. Furthermore, as shown therein, for the LiPO battery charged at 0.5C and 1.0C, faster charging leads to battery degradation. Such battery degradation is often due to the large internal resistance of commercial LIPO batteries.

FIG. 39 shows a graph comparing the internal resistance of a LIPO battery, a supercapacitor, and an energy storage device described herein. As shown therein, the LIPO battery, an energy storage device described herein, and the supercapacitor have internal resistances of 236.6, 30.2, and 24.1 milliohms, respectively.

In some embodiments, the energy storage devices herein have an internal resistance of less than the internal resistance of a commercially available LIPO battery by a factor of 2, 3, 4, 5, 6, 7, 8, 9, 10, or more. In some embodiments, due to their low internal resistance, the energy storage devices herein can be charged at higher currents and at faster charging rates than commercially available LIPO batteries. While the internal resistance of commercial LIPO batteries limits their charge rates to 1C, the low internal resistance of the energy storage devices herein enables charge rates of at least about 1.5C, 2C, 3C, 4C, 5C, 6C, 7C, 8C, 9C, 10C, or more, including increments therein. In some instances, the energy storage devices disclosed herein can be charged at a charge rate above 1C. By contrast, commercial LIPO batteries have a higher internal resistance that prevents them from being safely charged at above 1C.

In some embodiments, the energy storage device has a charge rate of about 1C to about 10C. In some embodiments, the energy storage device has a charge rate of about 1C to about 2C, about 1C to about 3C, about 1C to about 4C, about 1C to about 5C, about 1C to about 6C, about 1C to about 7C, about 1C to about 8C, about 1C to about 9C, about 1C to about 10C, about 2C to about 3C, about 2C to about 4C, about 2C to about 5C, about 2C to about 6C, about 2C to about 7C, about 2C to about 8C, about 2C to about 9C, about 2C to about 10C, about 3C to about 4C, about 3C to about 5C, about 3C to about 6C, about 3C to about 7C, about 3C to about 8C, about 3C to about 9C, about 3C to about 10C, about 4C to about 5C, about 4C to about 6C, about 4C to about 7C, about 4C to about 8C, about 4C to about 9C, about 4C to about 10C, about 5C to about 6C, about 5C to about 7C, about 5C to about 8C, about 5C to about 9C, about 5C to about 10C, about 6C to about 7C, about 6C to about 8C, about 6C to about 9C, about 6C to about 10C, about 7C to about 8C, about 7C to about 9C, about 7C to about 10C, about 8C to about 9C, about 8C to about 10C, or about 9C to about 10C. In some embodiments, the energy storage device has a charge rate of about 1C, about 2C, about 3C, about 4C, about 5C, about 6C, about 7C, about 8C, about 9C, or about 10C. In some embodiments, the energy storage device has a charge rate of at least about 1C, about 2C, about 3C, about 4C, about 5C, about 6C, about 7C, about 8C, or about 9C. In some embodiments, the energy storage device has a charge rate of at most about 2C, about 3C, about 4C, about 5C, about 6C, about 7C, about 8C, about 9C, or about 10C.

In some embodiments, the energy storage device has an internal resistance of about 12 milliohms to about 38 milliohms. In some embodiments, the energy storage device has an internal resistance of about 12 milliohms to about 14 milliohms, about 12 milliohms to about 16 milliohms, about 12 milliohms to about 18 milliohms, about 12 milliohms to about 20 milliohms, about 12 milliohms to about 22 milliohms, about 12 milliohms to about 24 milliohms, about 12 milliohms to about 26 milliohms, about 12 milliohms to about 28 milliohms, about 12 milliohms to about 30 milliohms, about 12 milliohms to about 34 milliohms, about 12 milliohms to about 38 milliohms, about 14 milliohms to about 16 milliohms, about 14 milliohms to about 18 milliohms, about 14 milliohms to about 20 milliohms, about 14 milliohms to about 22 milliohms, about 14 milliohms to about 24 milliohms, about 14 milliohms to about 26 milliohms, about 14 milliohms to about 28 milliohms, about 14 milliohms to about 30 milliohms, about 14 milliohms to about 34 milliohms, about 14 milliohms to about 38 milliohms, about 16 milliohms to about 18 milliohms, about 16 milliohms to about 20 milliohms, about 16 milliohms to about 22 milliohms, about 16 milliohms to about 24 milliohms, about 16 milliohms to about 26 milliohms, about 16 milliohms to about 28 milliohms, about 16 milliohms to about 30 milliohms, about 16 milliohms to about 34 milliohms, about 16 milliohms to about 38 milliohms, about 18 milliohms to about 20 milliohms, about 18 milliohms to about 22 milliohms, about 18 milliohms to about 24 milliohms, about 18 milliohms to about 26 milliohms, about 18 milliohms to about 28 milliohms, about 18 milliohms to about 30 milliohms, about 18 milliohms to about 34 milliohms, about 18 milliohms to about 38 milliohms, about 20 milliohms to about 22 milliohms, about 20 milliohms to about 24 milliohms, about 20 milliohms to about 26 milliohms, about 20 milliohms to about 28 milliohms, about 20 milliohms to about 30 milliohms, about 20 milliohms to about 34 milliohms, about 20 milliohms to about 38 milliohms, about 22 milliohms to about 24 milliohms, about 22 milliohms to about 26 milliohms, about 22 milliohms to about 28 milliohms, about 22 milliohms to about 30 milliohms, about 22 milliohms to about 34 milliohms, about 22 milliohms to about 38 milliohms, about 24 milliohms to about 26 milliohms, about 24 milliohms to about 28 milliohms, about 24 milliohms to about 30 milliohms, about 24 milliohms to about 34 milliohms, about 24 milliohms to about 38 milliohms, about 26 milliohms to about 28 milliohms, about 26 milliohms to about 30 milliohms, about 26 milliohms to about 34 milliohms, about 26 milliohms to about 38 milliohms, about 28 milliohms to about 30 milliohms, about 28 milliohms to about 34 milliohms, about 28 milliohms to about 38 milliohms, about 30 milliohms to about 34 milliohms, about 30 milliohms to about 38 milliohms, or about 34 milliohms to about 38 milliohms. In some embodiments, the energy storage device has an internal resistance of about 12 milliohms, about 14 milliohms, about 16 milliohms, about 18 milliohms, about 20 milliohms, about 22 milliohms, about 24 milliohms, about 26 milliohms, about 28 milliohms, about 30 milliohms, about 34 milliohms, or about 38 milliohms. In some embodiments, the energy storage device has an internal resistance of at least about 12 milliohms, about 14 milliohms, about 16 milliohms, about 18 milliohms, about 20 milliohms, about 22 milliohms, about 24 milliohms, about 26 milliohms, about 28 milliohms, about 30 milliohms, or about 34 milliohms. In some embodiments, the energy storage device has an internal resistance of at most about 14 milliohms, about 16 milliohms, about 18 milliohms, about 20 milliohms, about 22 milliohms, about 24 milliohms, about 26 milliohms, about 28 milliohms, about 30 milliohms, about 34 milliohms, or about 38 milliohms.

In some embodiments, the energy storage device has a gravimetric energy density of about 200 Wh/kg to about 800 Wh/kg. In some embodiments, the energy storage device has a gravimetric energy density of about 200 Wh/kg to about 250 Wh/kg, about 200 Wh/kg to about 300 Wh/kg, about 200 Wh/kg to about 350 Wh/kg, about 200 Wh/kg to about 400 Wh/kg, about 200 Wh/kg to about 450 Wh/kg, about 200 Wh/kg to about 500 Wh/kg, about 200 Wh/kg to about 550 Wh/kg, about 200 Wh/kg to about 600 Wh/kg, about 200 Wh/kg to about 650 Wh/kg, about 200 Wh/kg to about 700 Wh/kg, about 200 Wh/kg to about 800 Wh/kg, about 250 Wh/kg to about 300 Wh/kg, about 250 Wh/kg to about 350 Wh/kg, about 250 Wh/kg to about 400 Wh/kg, about 250 Wh/kg to about 450 Wh/kg, about 250 Wh/kg to about 500 Wh/kg, about 250 Wh/kg to about 550 Wh/kg, about 250 Wh/kg to about 600 Wh/kg, about 250 Wh/kg to about 650 Wh/kg, about 250 Wh/kg to about 700 Wh/kg, about 250 Wh/kg to about 800 Wh/kg, about 300 Wh/kg to about 350 Wh/kg, about 300 Wh/kg to about 400 Wh/kg, about 300 Wh/kg to about 450 Wh/kg, about 300 Wh/kg to about 500 Wh/kg, about 300 Wh/kg to about 550 Wh/kg, about 300 Wh/kg to about 600 Wh/kg, about 300 Wh/kg to about 650 Wh/kg, about 300 Wh/kg to about 700 Wh/kg, about 300 Wh/kg to about 800 Wh/kg, about 350 Wh/kg to about 400 Wh/kg, about 350 Wh/kg to about 450 Wh/kg, about 350 Wh/kg to about 500 Wh/kg, about 350 Wh/kg to about 550 Wh/kg, about 350 Wh/kg to about 600 Wh/kg, about 350 Wh/kg to about 650 Wh/kg, about 350 Wh/kg to about 700 Wh/kg, about 350 Wh/kg to about 800 Wh/kg, about 400 Wh/kg to about 450 Wh/kg, about 400 Wh/kg to about 500 Wh/kg, about 400 Wh/kg to about 550 Wh/kg, about 400 Wh/kg to about 600 Wh/kg, about 400 Wh/kg to about 650 Wh/kg, about 400 Wh/kg to about 700 Wh/kg, about 400 Wh/kg to about 800 Wh/kg, about 450 Wh/kg to about 500 Wh/kg, about 450 Wh/kg to about 550 Wh/kg, about 450 Wh/kg to about 600 Wh/kg, about 450 Wh/kg to about 650 Wh/kg, about 450 Wh/kg to about 700 Wh/kg, about 450 Wh/kg to about 800 Wh/kg, about 500 Wh/kg to about 550 Wh/kg, about 500 Wh/kg to about 600 Wh/kg, about 500 Wh/kg to about 650 Wh/kg, about 500 Wh/kg to about 700 Wh/kg, about 500 Wh/kg to about 800 Wh/kg, about 550 Wh/kg to about 600 Wh/kg, about 550 Wh/kg to about 650 Wh/kg, about 550 Wh/kg to about 700 Wh/kg, about 550 Wh/kg to about 800 Wh/kg, about 600 Wh/kg to about 650 Wh/kg, about 600 Wh/kg to about 700 Wh/kg, about 600 Wh/kg to about 800 Wh/kg, about 650 Wh/kg to about 700 Wh/kg, about 650 Wh/kg to about 800 Wh/kg, or about 700 Wh/kg to about 800 Wh/kg. In some embodiments, the energy storage device has a gravimetric energy density of about 200 Wh/kg, about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, about 700 Wh/kg, or about 800 Wh/kg. In some embodiments, the energy storage device has a gravimetric energy density of at least about 200 Wh/kg, about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, or about 700 Wh/kg. In some embodiments, the energy storage device has a gravimetric energy density of at most about 250 Wh/kg, about 300 Wh/kg, about 350 Wh/kg, about 400 Wh/kg, about 450 Wh/kg, about 500 Wh/kg, about 550 Wh/kg, about 600 Wh/kg, about 650 Wh/kg, about 700 Wh/kg, or about 800 Wh/kg.

In some embodiments, the energy storage device has a volumetric energy density of about 400 Wh/L to about 1,600 Wh/L. In some embodiments, the energy storage device has a volumetric energy density of about 400 Wh/L to about 500 Wh/L, about 400 Wh/L to about 600 Wh/L, about 400 Wh/L to about 700 Wh/L, about 400 Wh/L to about 800 Wh/L, about 400 Wh/L to about 900 Wh/L, about 400 Wh/L to about 1,000 Wh/L, about 400 Wh/L to about 1,100 Wh/L, about 400 Wh/L to about 1,200 Wh/L, about 400 Wh/L to about 1,300 Wh/L, about 400 Wh/L to about 1,400 Wh/L, about 400 Wh/L to about 1,600 Wh/L, about 500 Wh/L to about 600 Wh/L, about 500 Wh/L to about 700 Wh/L, about 500 Wh/L to about 800 Wh/L, about 500 Wh/L to about 900 Wh/L, about 500 Wh/L to about 1,000 Wh/L, about 500 Wh/L to about 1,100 Wh/L, about 500 Wh/L to about 1,200 Wh/L, about 500 Wh/L to about 1,300 Wh/L, about 500 Wh/L to about 1,400 Wh/L, about 500 Wh/L to about 1,600 Wh/L, about 600 Wh/L to about 700 Wh/L, about 600 Wh/L to about 800 Wh/L, about 600 Wh/L to about 900 Wh/L, about 600 Wh/L to about 1,000 Wh/L, about 600 Wh/L to about 1,100 Wh/L, about 600 Wh/L to about 1,200 Wh/L, about 600 Wh/L to about 1,300 Wh/L, about 600 Wh/L to about 1,400 Wh/L, about 600 Wh/L to about 1,600 Wh/L, about 700 Wh/L to about 800 Wh/L, about 700 Wh/L to about 900 Wh/L, about 700 Wh/L to about 1,000 Wh/L, about 700 Wh/L to about 1,100 Wh/L, about 700 Wh/L to about 1,200 Wh/L, about 700 Wh/L to about 1,300 Wh/L, about 700 Wh/L to about 1,400 Wh/L, about 700 Wh/L to about 1,600 Wh/L, about 800 Wh/L to about 900 Wh/L, about 800 Wh/L to about 1,000 Wh/L, about 800 Wh/L to about 1,100 Wh/L, about 800 Wh/L to about 1,200 Wh/L, about 800 Wh/L to about 1,300 Wh/L, about 800 Wh/L to about 1,400 Wh/L, about 800 Wh/L to about 1,600 Wh/L, about 900 Wh/L to about 1,000 Wh/L, about 900 Wh/L to about 1,100 Wh/L, about 900 Wh/L to about 1,200 Wh/L, about 900 Wh/L to about 1,300 Wh/L, about 900 Wh/L to about 1,400 Wh/L, about 900 Wh/L to about 1,600 Wh/L, about 1,000 Wh/L to about 1,100 Wh/L, about 1,000 Wh/L to about 1,200 Wh/L, about 1,000 Wh/L to about 1,300 Wh/L, about 1,000 Wh/L to about 1,400 Wh/L, about 1,000 Wh/L to about 1,600 Wh/L, about 1,100 Wh/L to about 1,200 Wh/L, about 1,100 Wh/L to about 1,300 Wh/L, about 1,100 Wh/L to about 1,400 Wh/L, about 1,100 Wh/L to about 1,600 Wh/L, about 1,200 Wh/L to about 1,300 Wh/L, about 1,200 Wh/L to about 1,400 Wh/L, about 1,200 Wh/L to about 1,600 Wh/L, about 1,300 Wh/L to about 1,400 Wh/L, about 1,300 Wh/L to about 1,600 Wh/L, or about 1,400 Wh/L to about 1,600 Wh/L. In some embodiments, the energy storage device has a volumetric energy density of about 400 Wh/L, about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, about 1,400 Wh/L, or about 1,600 Wh/L. In some embodiments, the energy storage device has a volumetric energy density of at least about 400 Wh/L, about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, or about 1,400 Wh/L. In some embodiments, the energy storage device has a volumetric energy density of at most about 500 Wh/L, about 600 Wh/L, about 700 Wh/L, about 800 Wh/L, about 900 Wh/L, about 1,000 Wh/L, about 1,100 Wh/L, about 1,200 Wh/L, about 1,300 Wh/L, about 1,400 Wh/L, or about 1,600 Wh/L.

In some embodiments, the energy storage device has a gravimetric power density of about 2.5 kW/kg to about 12 kW/kg. In some embodiments, gravimetric power density is a measurement of power stored measured in units of power/mass (e.g., watt-hours per kilogram [W/kg]). In some embodiments, the gravimetric power density of a power storage device is measured as a power density of an entire cell (including non-active materials), or as a power density of only the active materials. In some embodiments, the energy storage device has a gravimetric power density of about 2.5 kW/kg to about 5 kW/kg, about 2.5 kW/kg to about 6 kW/kg, about 2.5 kW/kg to about 7 kW/kg, about 2.5 kW/kg to about 8 kW/kg, about 2.5 kW/kg to about 9 kW/kg, about 2.5 kW/kg to about 10 kW/kg, about 2.5 kW/kg to about 11 kW/kg, about 2.5 kW/kg to about 12 kW/kg, about 5 kW/kg to about 6 kW/kg, about 5 kW/kg to about 7 kW/kg, about 5 kW/kg to about 8 kW/kg, about 5 kW/kg to about 9 kW/kg, about 5 kW/kg to about 10 kW/kg, about 5 kW/kg to about 11 kW/kg, about 5 kW/kg to about 12 kW/kg, about 6 kW/kg to about 7 kW/kg, about 6 kW/kg to about 8 kW/kg, about 6 kW/kg to about 9 kW/kg, about 6 kW/kg to about 10 kW/kg, about 6 kW/kg to about 11 kW/kg, about 6 kW/kg to about 12 kW/kg, about 7 kW/kg to about 8 kW/kg, about 7 kW/kg to about 9 kW/kg, about 7 kW/kg to about 10 kW/kg, about 7 kW/kg to about 11 kW/kg, about 7 kW/kg to about 12 kW/kg, about 8 kW/kg to about 9 kW/kg, about 8 kW/kg to about 10 kW/kg, about 8 kW/kg to about 11 kW/kg, about 8 kW/kg to about 12 kW/kg, about 9 kW/kg to about 10 kW/kg, about 9 kW/kg to about 11 kW/kg, about 9 kW/kg to about 12 kW/kg, about 10 kW/kg to about 11 kW/kg, about 10 kW/kg to about 12 kW/kg, or about 11 kW/kg to about 12 kW/kg. In some embodiments, the energy storage device has a gravimetric power density of about 2.5 kW/kg, about 5 kW/kg, about 6 kW/kg, about 7 kW/kg, about 8 kW/kg, about 9 kW/kg, about 10 kW/kg, about 11 kW/kg, or about 12 kW/kg. In some embodiments, the energy storage device has a gravimetric power density of at least about 2.5 kW/kg, about 5 kW/kg, about 6 kW/kg, about 7 kW/kg, about 8 kW/kg, about 9 kW/kg, about 10 kW/kg, or about 11 kW/kg. In some embodiments, the energy storage device has a gravimetric power density of at most about 5 kW/kg, about 6 kW/kg, about 7 kW/kg, about 8 kW/kg, about 9 kW/kg, about 10 kW/kg, about 11 kW/kg, or about 12 kW/kg.

In some embodiments, the energy storage device has an internal resistance of about 1 mOhm to about 60 mOhm. In some embodiments, the energy storage device has an internal resistance of about 1 mOhm to about 2 mOhm, about 1 mOhm to about 5 mOhm, about 1 mOhm to about 10 mOhm, about 1 mOhm to about 20 mOhm, about 1 mOhm to about 30 mOhm, about 1 mOhm to about 40 mOhm, about 1 mOhm to about 50 mOhm, about 1 mOhm to about 60 mOhm, about 2 mOhm to about 5 mOhm, about 2 mOhm to about 10 mOhm, about 2 mOhm to about 20 mOhm, about 2 mOhm to about 30 mOhm, about 2 mOhm to about 40 mOhm, about 2 mOhm to about 50 mOhm, about 2 mOhm to about 60 mOhm, about 5 mOhm to about 10 mOhm, about 5 mOhm to about 20 mOhm, about 5 mOhm to about 30 mOhm, about 5 mOhm to about 40 mOhm, about 5 mOhm to about 50 mOhm, about 5 mOhm to about 60 mOhm, about 10 mOhm to about 20 mOhm, about 10 mOhm to about 30 mOhm, about 10 mOhm to about 40 mOhm, about 10 mOhm to about 50 mOhm, about 10 mOhm to about 60 mOhm, about 20 mOhm to about 30 mOhm, about 20 mOhm to about 40 mOhm, about 20 mOhm to about 50 mOhm, about 20 mOhm to about 60 mOhm, about 30 mOhm to about 40 mOhm, about 30 mOhm to about 50 mOhm, about 30 mOhm to about 60 mOhm, about 40 mOhm to about 50 mOhm, about 40 mOhm to about 60 mOhm, or about 50 mOhm to about 60 mOhm. In some embodiments, the energy storage device has an internal resistance of about 1 mOhm, about 2 mOhm, about 5 mOhm, about 10 mOhm, about 20 mOhm, about 30 mOhm, about 40 mOhm, about 50 mOhm, or about 60 mOhm. In some embodiments, the energy storage device has an internal resistance of at least about 1 mOhm, about 2 mOhm, about 5 mOhm, about 10 mOhm, about 20 mOhm, about 30 mOhm, about 40 mOhm, or about 50 mOhm. In some embodiments, the energy storage device has an internal resistance of at most about 2 mOhm, about 5 mOhm, about 10 mOhm, about 20 mOhm, about 30 mOhm, about 40 mOhm, about 50 mOhm, or about 60 mOhm.

In some embodiments, the energy storage device has a charge capacity percentage after about 10 minutes of about 23% to about 90%. In some embodiments, the energy storage device has a charge capacity percentage after about 10 minutes of about 23% to about 25%, about 23% to about 30%, about 23% to about 35%, about 23% to about 40%, about 23% to about 45%, about 23% to about 50%, about 23% to about 55%, about 23% to about 60%, about 23% to about 70%, about 23% to about 80%, about 23% to about 90%, about 25% to about 30%, about 25% to about 35%, about 25% to about 40%, about 25% to about 45%, about 25% to about 50%, about 25% to about 55%, about 25% to about 60%, about 25% to about 70%, about 25% to about 80%, about 25% to about 90%, about 30% to about 35%, about 30% to about 40%, about 30% to about 45%, about 30% to about 50%, about 30% to about 55%, about 30% to about 60%, about 30% to about 70%, about 30% to about 80%, about 30% to about 90%, about 35% to about 40%, about 35% to about 45%, about 35% to about 50%, about 35% to about 55%, about 35% to about 60%, about 35% to about 70%, about 35% to about 80%, about 35% to about 90%, about 40% to about 45%, about 40% to about 50%, about 40% to about 55%, about 40% to about 60%, about 40% to about 70%, about 40% to about 80%, about 40% to about 90%, about 45% to about 50%, about 45% to about 55%, about 45% to about 60%, about 45% to about 70%, about 45% to about 80%, about 45% to about 90%, about 50% to about 55%, about 50% to about 60%, about 50% to about 70%, about 50% to about 80%, about 50% to about 90%, about 55% to about 60%, about 55% to about 70%, about 55% to about 80%, about 55% to about 90%, about 60% to about 70%, about 60% to about 80%, about 60% to about 90%, about 70% to about 80%, about 70% to about 90%, or about 80% to about 90%. In some embodiments, the energy storage device has a charge capacity percentage after about 10 minutes of about 23%, about 25%, about 30%, about 35%, about 40%, about 45%, about 50%, about 55%, about 60%, about 70%, about 80%, or about 90%. In some embodiments, the energy storage device has a charge capacity percentage after about 10 minutes of at least about 23%, about 25%, about 30%, about 35%, about 40%, about 45%, about 50%, about 55%, about 60%, about 70%, or about 80%. In some embodiments, the energy storage device has a charge capacity percentage after about 10 minutes of at most about 25%, about 30%, about 35%, about 40%, about 45%, about 50%, about 55%, about 60%, about 70%, about 80%, or about 90%.

In some embodiments, the energy storage device has a charge capacity of about 45 mAh to about 5,000 mAh. In some embodiments, the energy storage device has a charge capacity of about 45 mAh to about 100 mAh, about 45 mAh to about 250 mAh, about 45 mAh to about 500 mAh, about 45 mAh to about 750 mAh, about 45 mAh to about 1,000 mAh, about 45 mAh to about 2,000 mAh, about 45 mAh to about 3,000 mAh, about 45 mAh to about 4,000 mAh, about 45 mAh to about 5,000 mAh, about 100 mAh to about 250 mAh, about 100 mAh to about 500 mAh, about 100 mAh to about 750 mAh, about 100 mAh to about 1,000 mAh, about 100 mAh to about 2,000 mAh, about 100 mAh to about 3,000 mAh, about 100 mAh to about 4,000 mAh, about 100 mAh to about 5,000 mAh, about 250 mAh to about 500 mAh, about 250 mAh to about 750 mAh, about 250 mAh to about 1,000 mAh, about 250 mAh to about 2,000 mAh, about 250 mAh to about 3,000 mAh, about 250 mAh to about 4,000 mAh, about 250 mAh to about 5,000 mAh, about 500 mAh to about 750 mAh, about 500 mAh to about 1,000 mAh, about 500 mAh to about 2,000 mAh, about 500 mAh to about 3,000 mAh, about 500 mAh to about 4,000 mAh, about 500 mAh to about 5,000 mAh, about 750 mAh to about 1,000 mAh, about 750 mAh to about 2,000 mAh, about 750 mAh to about 3,000 mAh, about 750 mAh to about 4,000 mAh, about 750 mAh to about 5,000 mAh, about 1,000 mAh to about 2,000 mAh, about 1,000 mAh to about 3,000 mAh, about 1,000 mAh to about 4,000 mAh, about 1,000 mAh to about 5,000 mAh, about 2,000 mAh to about 3,000 mAh, about 2,000 mAh to about 4,000 mAh, about 2,000 mAh to about 5,000 mAh, about 3,000 mAh to about 4,000 mAh, about 3,000 mAh to about 5,000 mAh, or about 4,000 mAh to about 5,000 mAh. In some embodiments, the energy storage device has a charge capacity of about 45 mAh, about 100 mAh, about 250 mAh, about 500 mAh, about 750 mAh, about 1,000 mAh, about 2,000 mAh, about 3,000 mAh, about 4,000 mAh, or about 5,000 mAh. In some embodiments, the energy storage device has a charge capacity of at least about 45 mAh, about 100 mAh, about 250 mAh, about 500 mAh, about 750 mAh, about 1,000 mAh, about 2,000 mAh, about 3,000 mAh, or about 4,000 mAh. In some embodiments, the energy storage device has a charge capacity of at most about 100 mAh, about 250 mAh, about 500 mAh, about 750 mAh, about 1,000 mAh, about 2,000 mAh, about 3,000 mAh, about 4,000 mAh, or about 5,000 mAh.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by 10%, 5%, or 1%, including increments therein.

As used herein, the term "about" in reference to a percentage refers to an amount that is greater than or less than the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", and "A, B, and/or C" means A alone, B alone, C alone, A and B together, A and C together, B and C together, or A, B, and C together.

As used herein, the term "atomic ratio" refers to a measure of the ratio of atoms of one kind to another kind.

As used herein, the term "active material specific" refers to a property based solely on the active materials of the electrode or the energy storage device, not including any casing materials.

As used herein, the term "aspect ratio" refers to a ratio between a width and a thickness, a ratio between a length and a thickness or both.

As used herein, the term "cell specific" refers to a property based on the entirety of an electrode or energy storage device, including any casing materials.

As used herein, the term "charge capacity" refers to a value equal to the amount of time required to charge an energy storage device multiplied by the number of amperes (current) required to charge the energy storage device in the time required to charge the energy storage device. In some embodiments, charge capacity is measured in milliamperehours (mAh).

As used herein, the term "charge capacity percentage" refers to a percentage of a charge of an energy storage device at a certain charge rate and after a certain amount of time. In some embodiments, 200 mAh is represented as a 100% state of charge, whereas 0 mAh is equivalent to 0% state of charge.

As used herein, the term "charge-discharge lifetime" refers to the number of charge and discharge cycles at which the rated capacity of an energy storage reduces by about 80%.

As used herein, the term "charge rate" and "discharge rate" refer to a measure of the rate at which a battery is charged or discharged relative to its capacity defined as the charge or discharge current divided by the capacity of an energy storage device to store an electrical charge.

As used herein, the term "clean room" refers to an area designed to maintain extremely low levels of particulates, such as dust, airborne organisms, or vaporized particles. In some embodiments, the clean room has a class of ISO 1, ISO 2, ISO 3, ISO 4, ISO 5, ISO 6, ISO 7, ISO 8, or ISO 9.

As used herein, the term "dry room" refers to an area designed to maintain temperatures from +20° C. to +40° C., humidities to less than 1%, supply air dew points of at least −60° C., or any combination thereof.

As used herein, the term "equivalent series resistance," (ESR) refers to an approximation of the resistance of an energy storage device as a combination of ideal capacitors and inductors in series with a resistor. ESR is generally measured in ohms at a frequency of about 120 Hz to about 100 kHz.

As used herein, the term "freeze-drying," also known as lyophilisation, lyophilization, or cryodesiccation, refers to a dehydration process of freezing the material and reducing the surrounding pressure to allow a frozen fluid in the material to sublime directly from the solid phase to the gas phase.

As used herein, the term "gravimetric energy density" refers to a measurement of energy stored measured in units of energy/mass (e.g., watt-hours per kilogram). In some embodiments, the gravimetric energy density of an energy storage device is measured as an energy density of an entire cell (including non-active materials) or as an energy density of only the active materials.

As used herein, the term "gravimetric power density" refers to a measurement of power stored measured in units of power/mass (e.g., watts per kilogram). In some embodiments, the gravimetric power density of a power storage device is measured as a power density of an entire cell (including non-active materials) or as a power density of only the active materials.

As used herein, the term "volumetric energy density" refers to a measurement of energy stored measured in units of energy/volume (e.g., watt-hours per liter). In some embodiments, the volumetric energy density of an energy storage device is measured as an energy density of an entire cell (including non-active materials) or as an energy density of only the active materials.

As used herein, the term "volumetric power density" refers to a measurement of power stored measured in units of power/volume (e.g., watts per liter). In some embodiments, the volumetric power density of a power storage device is measured as a power density of an entire cell (including non-active materials) or as a power density of only the active materials.

As used herein, the term "internal resistance" or "internal impedance" refers to a difference between a measured voltage output and a no-load voltage of an energy storage device.

As used herein, the term "interconnected corrugated carbon-based network" or "ICCN" refers to a conjugated carbon network comprising a plurality of expanded and interconnected carbon layers comprising one or more corrugated carbon sheets that are one atom thick. For example, an ICCN can include multiple corrugated carbon sheets in which each carbon sheet is one atom thick.

As used herein, the term "lamellar" refers to a form of a thin plate or sheet.

As used herein, the term "length" refers to an average length, a maximum length, or a minimum length.

As used herein, the term "nanogranulars" refers to a nanoscale granule.

As used herein, the term "thickness" refers to an average thickness, a maximum thickness, or a minimum thickness.

As used herein, the term "ratio" refers to a quantitative relation between two quantities of substances, wherein the quantitative relation can be based on mass, volume, or both.

As used herein, the term "supernatant" refers to a liquid that lies above a sediment or precipitate.

As used herein, the term "width" refers to an average width, a maximum width, or a minimum width.

As used herein, the term "3D" refers to three-dimensional.

As used herein, the term "GO" refers to graphene oxide.

As used herein, the term "rGO" refers to reduced graphene oxide.

As used herein, the term "GA" refers to a graphene aerogel.

As used herein, the term "3DGA" refers to a three-dimensional graphene aerogel.

As used herein, the term "LDH" refers to layered double hydroxide. In some embodiments, an LDH is a class of ionic solids characterized by a layered structure with the generic layer sequence $[AcBZAcB]_n$, where c represents layers of metal cations, A and B are layers of hydroxide $(HO^-)$ anions, and Z represents layers of other anions and neutral molecules.

EXAMPLES

Method of Forming Electrodes

In one example, an electrode of the current disclosure is formed by the following steps:

Step 1: The electrode materials including the LDH composite with conductive additives and a polymer binder are mixed to form a slurry with a proper rheology.

Step 2: To ensure the successful preparation of the slurry, the particle size distribution is maintained to a minimum. A high shear mixer is used to break down any agglomerations that may cause irregular coating.

Step 3: The slurry is applied onto the current collector via roll coating or via slot die coating. The wet coating thickness should be adjusted to achieve the target loading mass of active electrode materials per unit area of the anode and cathode electrode.

Step 4: The electrodes are cut to size; whereafter, a single metal tab is applied onto the edges of the current collector through ultrasonic welding to connect the electrode to the battery terminal. In high-power cells, multiple metal tabs may be applied onto the edges of the current collector to carry the higher currents.

Step 5: The two electrodes (anode and cathode) are stacked together with a separator that keeps them apart to form a pouch cell. A heat sealer is used to thermally seal the electrode feedthrough in place. Only one side is left open for electrolyte filling and vacuum sealing. After the electrolyte is added, the cell is allowed to rest for a few minutes to achieve proper wetting of the electrodes before the final vacuum sealing of the cell. Unlike lithium-ion polymer batteries, no dry room or clean operations are required for the assembly of the energy storage devices disclosed herein.

Step 6: The cell is put through formation cycles in the open air at ambient temperature. After the formation is finished, the cell is cut open, degassed, and resealed.

Charging and Discharging

The present disclosure relates to a composition for an anode of a hybrid battery that can store more charge and, importantly, is compatible with current fabrication process protocols used in the production of lithium-ion polymer batteries.

A prototype 200 milliampere-hour (mAh) energy storage device was used as a power source for a recent-generation cellular telephone, and the results were compared with a similarly sized lithium-ion polymer battery and a carbon supercapacitor. In one example, the fast-charging capability of energy storage devices was demonstrated as follows: The energy storage device was pre-charged and used to run a recent-generation cellular telephones. The functionality of the energy storage device was demonstrated by making a phone call and by watching a video on YouTube. Additionally, the fast-charging capability of the energy storage device was demonstrated by starting from a fully discharged state of charge of around zero, as confirmed by open circuit voltage and milliampere-hour measurements. During charging of the prototype energy device herein, the capacity (milliampere-hours) was monitored on a battery analyzer. The capacity is an indication of the state of charge of a battery, with for example 200 mAh being 100% state of charge (fully charged) and 0 mAh being equivalent to 0% state of charge. The performance of prototype energy storage device was compared with a commercial-grade lithium-ion polymer battery with similar capacity (about 200 mAh) and with a supercapacitor of similar size.

After charging the three energy storage devices for 5 to 10 minutes, the prototype energy storage device ran the recent-generation cellular telephone for over 18 minutes, whereas the lithium-ion polymer battery and the supercapacitor could only run the recent-generation cellular telephone for a few seconds. While, in some embodiments, the supercapacitor demonstrated the fastest charging times, corresponding to a higher power density, the supercapacitor was only capable of running the recent-generation cellular phone for a fraction of a minute. The commercial-grade lithium-ion polymer battery, on the other hand, which is limited by slow chemical reactions, charged slowly. By contrast, the prototype energy storage device of the present disclosure recharged quickly while at the same time providing enough current to run the cellular phone for a longer period. This outstanding performance demonstrates the high energy density and fast-charging capabilities of the energy storage devices disclosed herein.

Charge Capacity

To compare the fast-charging capability of three different energy storage systems (lithium-ion polymer battery, supercapacitor, and a prototype energy storage device per the disclosure herein), all three were charged for 10 minutes; the lithium-ion polymer was charged at two different rates. In terms of relative charge capacity, at 0.5C, the lithium-ion polymer reached about 8% of its rated capacity at 1C, it was charged to about 17%. The supercapacitor was fully charged (100%) after 10 minutes of charging. The energy storage device was charged to about 45% of its rated capacity. However, if the absolute capacity after 10 minutes of charging is compared, the supercapacitor, due to its small capacity, only stored 10.4 mAh of charge. The lithium-ion polymer stored 16.6 and 33.3 mAh at 0.5C and 1C rates, respectively. In comparison, the energy storage device was able to store 90 mAh during the 10 minutes of charging, a much higher capacity than that of the supercapacitor and the lithium-ion polymer battery.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. An energy storage device comprising: (a) a first electrode comprising: (i) a graphene sheet wherein a percentage by mass or volume of the graphene sheet in the first electrode is above 0.1% to about 5%; (ii) a layered double hydroxide coupled to the graphene sheet; (iii) a binder; (iv) a conductive additive; and (v) a first current collector; (b) a second electrode comprising: (i) a hydroxide; and (ii) a second current collector; (c) a separator; and (d) an electrolyte.

2. The energy storage device of claim 1, wherein the layered double hydroxide comprises an $M^{2+}$ metal cation, an $M^{3+}$ metal cation, a hydroxide ion, an octahedral site with a trivalent metal cation, an octahedral site with a divalent metal cation, a water molecule, an anion, or any combination thereof.

3. The energy storage device of claim 2, wherein the $M^{2+}$ metal cation comprises barium, cadmium, calcium, cobalt, copper (II), iron (II), lead (II), magnesium, mercury (I), mercury (II), nickel, strontium, tin, zinc, or any combination thereof.

4. The energy storage device of claim 2, wherein the $M^{3+}$ metal cation comprises aluminum, bismuth, chromium (III), iron (III), or any combination thereof.

5. The energy storage device of claim 2, wherein the anion comprises nitrate, sulfate, carbonate, chloride, bromide, or any combination thereof.

6. The energy storage device of claim 1, wherein the binder comprises a polymeric binder.

7. The energy storage device of claim 1, wherein the conductive additive comprises a zero-dimensional carbon additive, a one-dimensional carbon additive, a two-dimensional carbon additive, a three-dimensional carbon additive, or any combination thereof.

8. The energy storage device of claim 7, wherein the zero-dimensional carbon additive comprises carbon black, acetylene black, or both.

9. The energy storage device of claim 7, wherein the one-dimensional carbon additive comprises a carbon fiber, an activated carbon fiber, a carbon nanotube, an activated carbon nanotube, a carbon nanoplatelet, an activated carbon nanoplatelet, a carbon nanoribbon, an activated carbon nanoribbon, or any combination thereof.

10. The energy storage device of claim 7, wherein at least one of the graphene sheet and the two-dimensional carbon additive comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof.

11. The energy storage device of claim 7, wherein the three-dimensional carbon additive comprises graphite, carbon foam, activated carbon, graphene foam, carbon aerogel, graphene aerogel, porous carbon, a buckminsterfullerene, an interconnected corrugated carbon-based network, or any combination thereof.

12. The energy storage device of claim 1, wherein the energy storage device stores energy through both redox reactions and ion adsorption.

13. The energy storage device of claim 1, wherein the electrolyte comprises:

(a) a hydroxide;

(b) an additive;

(c) a stabilizer;

(d) a hydrogen evolution inhibitor; and (e) a conductivity enhancer.

14. The energy storage device of claim 1, wherein the graphene sheet comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof.

15. An electrode comprising: (a) a graphene sheet, wherein a percentage by mass or volume of the graphene sheet in the electrode is above 0.1% to about 5%; (b) a layered double hydroxide coupled to the graphene sheet; (c) a binder; (d) a conductive additive; and (e) a current collector.

16. The electrode of claim 15, wherein the graphene sheet comprises a graphene sheet, an activated graphene sheet, a reduced graphene sheet, a holey graphene sheet, a graphene oxide sheet, an activated graphene oxide sheet, a reduced graphene oxide sheet, a holey graphene oxide sheet, a reduced holey graphene oxide sheet, or any combination thereof.

17. The electrode of claim 15, wherein the layered double hydroxide comprises an $M^{2+}$ metal cation, an $M^{3+}$ metal cation, a hydroxide ion, an octahedral site with a trivalent metal cation, an octahedral site with a divalent metal cation, a water molecule, an anion, or any combination thereof.

18. The electrode of claim 17, wherein the $M^{2+}$ metal cation comprises barium, cadmium, calcium, cobalt, copper (II), iron (II), lead (II), magnesium, mercury (I), mercury (II), nickel, strontium, tin, zinc, or any combination thereof.

19. The electrode of claim 17, wherein the $M^{3+}$ metal cation comprises aluminum, bismuth, chromium (III), iron (III), or any combination thereof.

20. The electrode of claim 17, wherein the anion comprises nitrate, sulfate, carbonate, chloride, bromide, or any combination thereof.

* * * * *